United States Patent [19]

Narup et al.

[11] Patent Number: 5,001,704

[45] Date of Patent: Mar. 19, 1991

[54] MULTIPURPOSE BUS INTERFACE

[75] Inventors: Douglas W. Narup, Florissant; Reginald D. Varga, Chesterfield; Kevin P. Brady, Hazelwood; James S. Whitehouse; Richard M. Withers, both of Florissant, all of Mo.

[73] Assignee: McDonnell Douglas Corporation, St. Louis, Mo.

[21] Appl. No.: 154,181

[22] Filed: Feb. 9, 1988

[51] Int. Cl.[5] .................... H04J 3/02

[52] U.S. Cl. .................... 370/85.13; 370/85.1; 370/85.9

[58] Field of Search .................... 370/85, 85.13, 85.1, 370/85.9

[56] References Cited

U.S. PATENT DOCUMENTS

| | | | |
|---|---|---|---|
| 4,551,721 | 11/1985 | Kozlik | 370/85 |
| 4,652,874 | 3/1987 | Loyer | 370/85 |
| 4,680,581 | 7/1987 | Kozlik et al. | 370/85 |
| 4,750,115 | 6/1988 | Sekiya et al. | 370/85 |
| 4,754,274 | 6/1988 | Iles | 370/85 |

*Primary Examiner*—Salvatore Cangialosi

*Attorney, Agent, or Firm*—Rogers, Howell & Haferkamp

[57] ABSTRACT

A multipurpose bus interface circuit for interfacing a first communications bus to a second communications bus where at least one of the buses is a command/response time division multiplexing data bus. The interface circuit includes a main controller for controlling the transfer of data between the first bus and a RAM. A microstore contains the software for the main controller, the software controlling the handling and interpretation of data to and from the first bus and processed by the main controller. A co-processor has direct access to the RAM and performs primarily the data processing function of the interface circuit. An interface module provides interface between the RAM and the second bus, the module formatting the data transmitted between the RAM and the second bus, whereby the main controller performs primarily to handle the input/output functions and the co-processor performs primarily to handle the data processing functions of the interface circuit.

8 Claims, 4 Drawing Sheets

MULTIPURPOSE BUS INTERFACE

BACKGROUND AND SUMMARY OF THE INVENTION

This invention generally relates to a multipurpose interface circuit for use to interface one communication bus to another. More specifically, the present invention is in the form of a PC card that provides interface between a computer bus such as that of a general purpose computer and a command/response, time division multiplexing data bus such as, for example, a MIL-STD-1553 bus. This military standard contains requirements for aircraft internal command/response, time division multiplexing data bus techniques utilized in systems integration of aircraft subsystems. This MIL-STD applies to a variety of avionics applications including, for example, the F-15. The multipurpose interface of the present invention is particularly adapted for use with data buses where this MIL-STD applies, but more generally may also be adapted for use to interface other data buses as well. For purposes of explaining the features and advantages of the invention and its preferred embodiment, the invention will be described with reference to its application with a MIL-STD-1553 bus. It is to be understood that the version of MIL-STD-1553 being referred to throughout is the most current version as of the filing of this application.

The multipurpose interface of the present invention provides a host computer, such as a microcomputer, with a capacity of communicating on a MIL-STD-1553 avionics multiplex bus or the like. This allows the host computer to be used to emulate avionics for the purpose of simulation or testing. The invention provides an intelligent interface. It handles all of the communication protocol per the MIL-STD-1553 specification. 64K bytes of on-board RAM are used for all communication to and from the interface. It includes a modular memory mapped design allowing the PC card to be modified for use with different microcomputer bus systems, such as those known as the Multibus I, Multibus II, and Q-Bus Systems. The interface of the present invention functions in several modes: a bus controller mode, a remote terminal mode, a bus monitor mode, and a bus analyzer mode. In the bus controller mode the interface functions to provide the host computer with the capability of simulating the controller of a typical avionics bus. It is capable of handling all of the scheduling of the mux messages without intervention from the processor of the host computer. In the remote terminal mode the interface functions to provide the host computer with the capability to simulate any or all of the remote terminals of a typical avionics bus. In the monitor mode the interface functions to provide the host computer with the capability of monitoring the operation of any or all of the remote terminals. In the bus analyzer mode the interface functions to provide the host computer with the capability of taking a "snap shot" of the bus, thus giving an analysis of bus traffic versus time. In the bus analyzer mode bus traffic may be conditionally traced by a remote terminal address and/or subaddress. Using an on-board co-processor, the analyzer mode provides a message trapping capability similar to a logic analyzer.

The interface of this invention generally comprises a main controller which includes a 16-bit controller and a firmware microstore in the form of PROM which contains the software for the controller. The main controller primarily handles input/output functions and controls the transfer of data to and from the 1553 Bus into a shared RAM memory. The software stored in the microstore controls how the data is handled and interpreted making it easier to modify the controller's operation to accommodate its use with different bus standards and data protocols/formats. The interface also includes a co-processor which has direct access to the shared RAM. The main controller primarily handles input/output functions, while data processing is primarily handled by the co-processor. By using the on-board co-processor within the interface PC card, a greater number of interface PC cards of the present invention may be used with a single host computer.

The interface of the present invention also includes an interface module that formats and protocols data from the RAM as appropriate for the bus protocol and format of the host computer.

There are other known interface devices for use in providing interface between buses including a MIL-STD-1553 bus. These other known devices also are believed to operate in the various modes identified above. However, it is believed that the interface of the present invention has novel advantages over these other devices.

As mentioned previously, the interface of the present invention is an intelligent interface. Its modular memory mapped design allows the card to be modified to different microcomputers systems including the Multibus I, Multibus II, and Q-Bus Systems. Different derivatives of the 1553 specification can be accommodated with firmware changes. The timing requirements of all specifications including MIL-STD-1553A and McAir A3818 can be satisfied. Hence the interface of the present invention provides substantial versatility by making firmware and software as opposed to hardware changes.

In the bus controller mode the interface card is capable of scheduling bus traffic per the mux specifications without host processor intervention making sophisticated bus controller simulation possible. In the remote terminal and monitor modes the card can simulate or monitor any combination of remote terminals. For example, one or more terminals can be simulated while monitoring any or all of the remaining terminals. In the bus analyzer mode mux data can be conditionally collected according to remote terminal address and subaddress. This allows only the data of interest to be collected. Complex trigger conditions can be set up to stop data collection on certain events making the card a true mux analyzer. Messages are also time-tagged providing timing information. Another advantage of the interface of the present invention is that the on-board co-processor can be programmed to perform a wide range of user required processing of data or controlling of the mux interface. The co-processor software performs bus controller scheduling and bus analyzer triggering. In addition, the interface module for the host computer does not require that the interface card operate as a bus master. This simplifies modification for use with any system bus. The on-board memory also allows use of as many interfaces of this invention as needed for operation in a single host computer system without bus contention problems.

These and other advantages of the invention are apparent from the additional description to follow:

DETAILED DESCRIPTION OF THE PREFERRED EMBODIMENT

Figure 1:
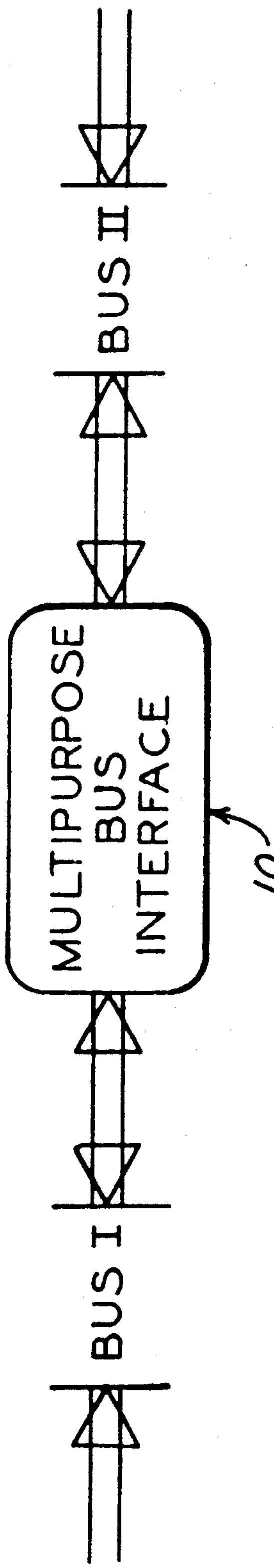
FIG. 1 is a general schematic block diagram showing a multipurpose bus interface of the present invention connected between two communications buses I and II.
Figure 2:
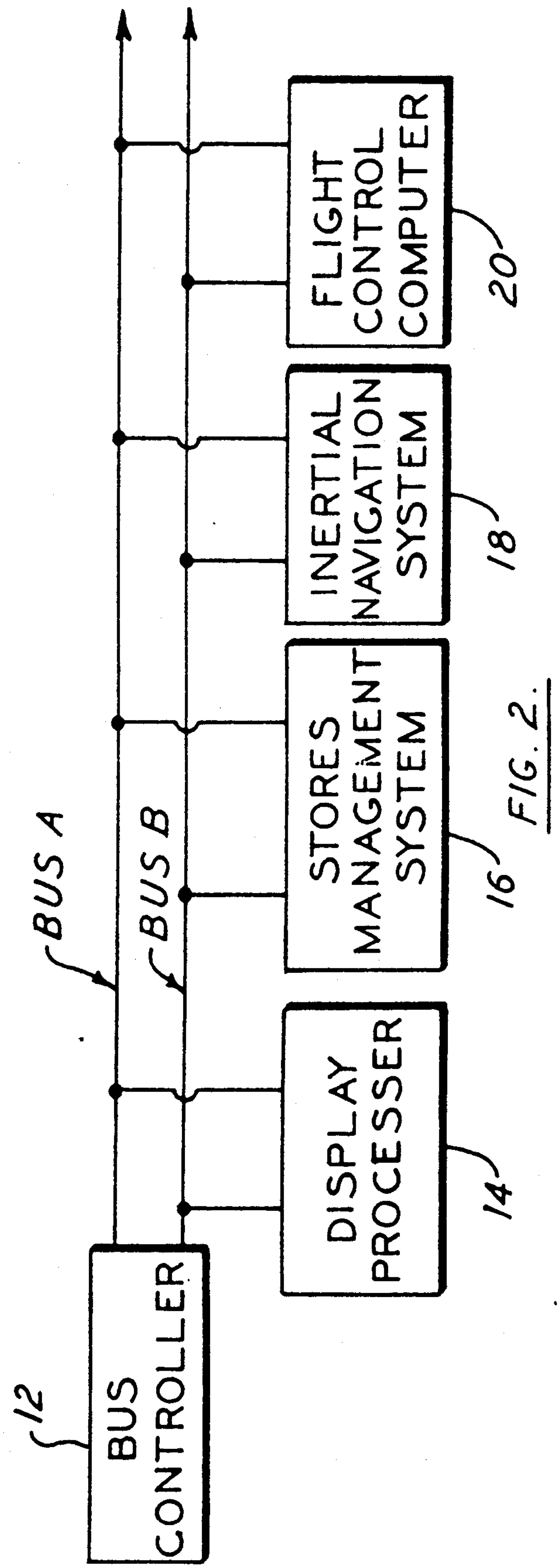
FIG. 2 is a schematic block diagram illustrating an avionics multiplex bus of a type with which a multipurpose bus interface of the present invention may be used.

With reference to FIG. 1 a multipurpose bus interface 10 of the present invention is shown connected between buses I and II. The multipurpose interface 10 provides intelligent interface between the two communication buses. In a more specific sense the present invention is particularly adapted to provide a host computer with the capability of communicating on an avionics multiplexed bus such as a MIL-STD-1553 bus. Such a bus is illustrated in FIG. 2 and may, for example, include a bus controller 12 connected with multiple terminals 14, 16, 18, and 20 over redundant buses A and B. Further by way of example, the terminals may be a display processor, a stores management system, an inertial navigation system and a flight control computer, respectively. Although four such terminals are shown, it is to be understood that an avionics bus may include a lesser or a substantially greater number of terminals, the ones shown being for illustration only.

Figure 3:
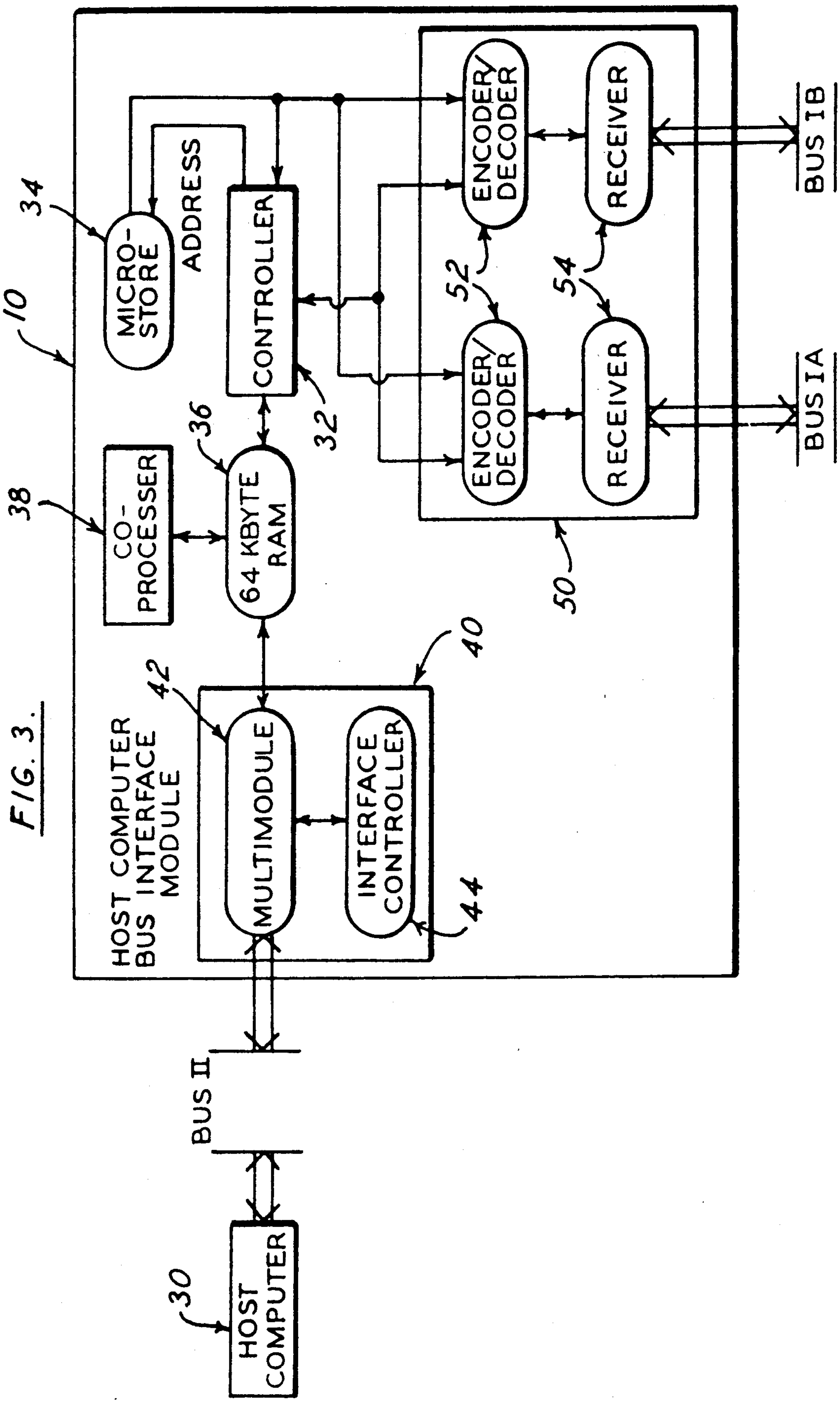
FIG. 3 is a more detailed schematic block diagram of a multipurpose bus interface of the present invention shown connected between redundant buses IA and IB of the type illustrated in FIG. 2, and bus II of a host computer.

With reference to FIG. 3 the multipurpose bus interface 10 is shown connected between the redundant BUSES IA and IB which may be the redundant buses of FIG. 2, and BUS II which may be the bus of a host computer 30. The interface 10 functions as an interface between the BUS II of the host computer and the redundant BUSES IA and IB to allow the host computer to function in any of several modes, namely, a bus controller mode, a remote terminal mode, a bus monitor mode, and a bus analyzer mode. The interface 10 is a PC Card that may be plugged into the host computer.

The multipurpose bus interface 10 includes a microcoded high-speed 16 bit processor or controller 32 and its associated PROM microstore 34. This is the main controller of the interface card and handles all of the MIL-STD-1553 interface control and data transfers to and from memory. The processor 32 operates at 8 Mhz with an architecture which allows many operations to be performed in parallel. Appendix A is a listing defining the instructions for the source code software for the microstore 34, and Appendix B is the source code listing for the microstore 34 in accordance with the preferred embodiment. The main controller 32 controls the transfer of data between the redundant BUSES IA and IB and a shared RAM memory 36. The software stored in the microstore 34 controls how the data is handled and interpreted making it easier to modify the main controller's operation to accommodate its use with different bus standards and data protocols/formats.

The interface 10 also includes another micro processor or co-processor 38 which has direct access to the shared RAM memory 36. The RAM memory 36 is used for all control information and data storage. This memory can be accessed by the main controller 32, the onboard co-processor 38, and the host computer bus. Programmable logic is used to arbitrate the memory between the three users.

The main controller 32 handles input/output functions while data processing is handled by the co-processor 38. By using the on-board co-processor within the interface PC card a greater number of interface cards of the present invention may be used with a single host computer 30. In other words, without the on-board co-processor, the host computer 30 would be required to process the data received by the interface card 10. If more than one card 10 were installed in the host computer, the data processing capability of the host would be forced to handle all of the data received by all of the cards, thus severely limiting the number of cards that could be used. The on-board co-processor 38 provides the card with on-board data processing capability and permits use of a substantially larger number of PC cards of the present invention with a single host computer. Appendix C is a source code listing for the co-processor 38 in accordance with this preferred embodiment of the invention and provides software for use of the interface 10 in the analyzer mode. One of the advantages of the on-board co-processor is that it may be programmed by the user to perform a wide variety of functions. The analyzer mode is one such function.

The interface 10 further includes a host computer bus interface module 40 that includes a multimodule 42 and interface controller 44. By way of example, BUS II may be what is known as MULTIBUS II. Interfaces to MULTIBUS I and Q Buses are less complex and consist mainly of address and data buffers. The host computer bus interface module 40 formats and protocols data into and out of the RAM as appropriate for the bus protocol and format of the host computer. Appendix D is a source code program listing for the interface controller 44 for use with a MULTIBUS II in accordance with a preferred embodiment of the invention.

The interface 10 further includes a dual redundant interface module 50 to interface with the redundant BUSES IA and IB. The module consists of Manchester incoders/decoders 52 and receivers 54 providing bus isolation. Interface to the controller 32 is over a bidirectional 16 bit parallel data bus.

Figure 4A:
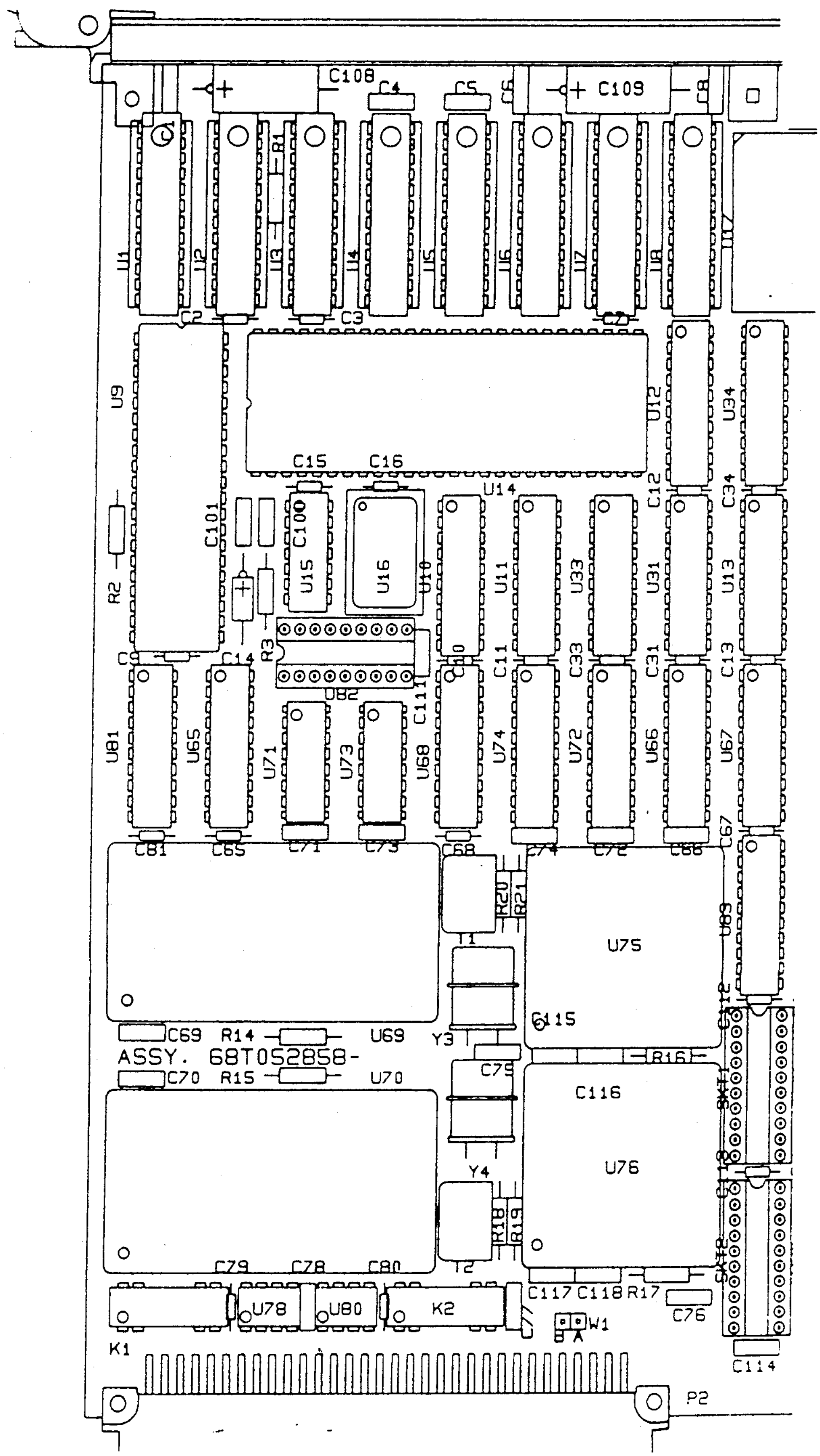
FIGS. 4A and 4B illustrate the PC card component layout for a multipurpose bus interface of the present invention.
Figure 4B:
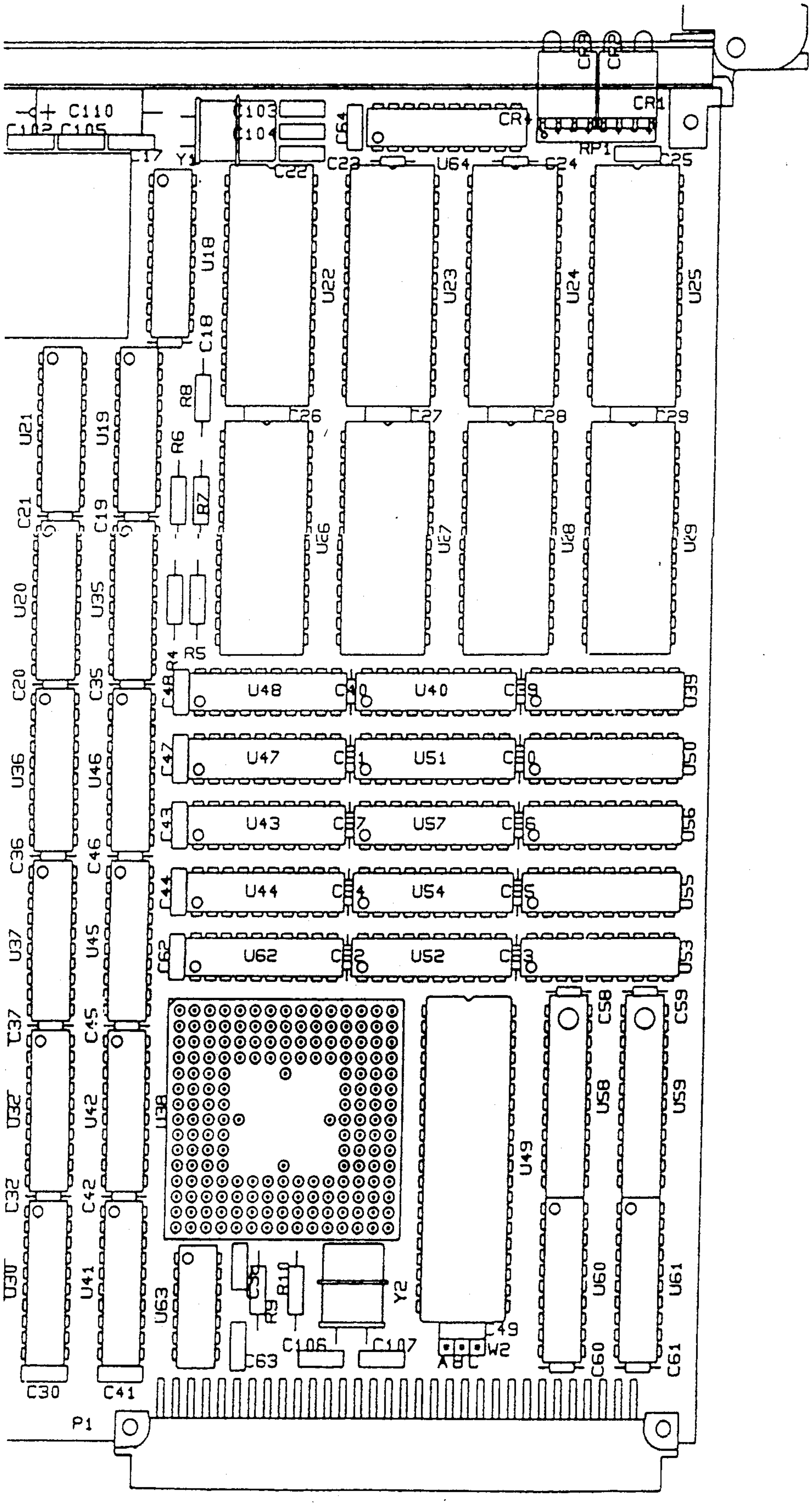

FIGS. 4A and 4B show a printed circuit board layout for the interface card 10 of the present invention showing the locations of the various components that comprise the circuitry in FIG. 3 in accordance with a preferred embodiment of this invention. Appendix E is a component listing by reference designations as shown in FIGS. 4A and 4B in accordance with this preferred embodiment of the invention. Appendix F is a network listing of all of the connections for the components of Appendix E and FIGS. 4A and 4B in accordance with the preferred embodiment. Appendix G is a program listing for the programmable logic arrays used in the circuitry of the preferred embodiment.

Hence, the present invention provides a multipurpose bus interface PC card which can be plugged into a general purpose computer (host computer) to provide that computer with the capability of communicating with another bus such as a dual redundant avionics bus of the type to which MIL-STD-1553 applies. This allows the host computer to function in any of several modes. The interface of the present invention has particular application for use with a MIL-STD-1553 avionics multiplexed bus for use in emulating avionics for the purpose of simulation or testing. Other applications may include use with diagnostic equipment, integration benches, ground support equipment, automatic test equipment and flight simulation facilities. It can be used to implement a high-speed data link between computer systems. Among its advantages the interface of the present invention, being microcontroller based, allows many changes to be made and additional capability added with firmware changes. The main controller 32 can control the interface without intervention by the host computer 30. The on-board co-processor can be used to perform many tasks in parallel with the interface operation. The on-board memory simplifies the host computer interface 40, allowing modification for use with other host computers. The on-board memory and co-processor also eliminate any bus contention problems. Also incorporation of several modes of operation on one interface PC card allows switching between modes under host computer control. Error generating capability is incorporated in the system for mux bus test applications.

There are various changes and modifications which may be made to the invention as would be apparent to those skilled in the art. However, these changes or modifications are included in the teaching of the disclosure, and it is intended that the invention be limited only by the scope of the claims appended hereto.

Appendix A

```
1LINE                  ASSEMBLER DEFINITION PROGRAM
      TITLE 29116 BIT SLICE CONTROLLER DPM MUX  V 1.01
      WORD 64                  :MAX SIZE IS 64
 ;
 DPM116.VERSION:     EQU H#0101
 ;
 ;**************************************************************************
 ;*************          LAST EDIT FEBRUARY 12 1986 ***************************
 ;*************                 REG VARGA       ******************************
 ;**************************************************************************
 ;**************************************************************************
 ;**************       MODS FROM V 1.0 BASE LINE    ***************************
 ;**************************************************************************
 ;**   MOD      DESCRIPTION          MADE BY        DATE                 ****
 ;**   ---      -----------          -------        -----                ****
 ;**   1.01     ADDED ORI.R          D.W.N          2/12/86              ****
 ;**            ADDED O.LIGHT        D.W.N          5/19/86              ****
 ;**************************************************************************
1LINE 29116 BIT SLICE CONTROLLER DPM MUX  V 1.01                PAGE    2
 ;
 ;                  ALU SOURCE RS
 R0:          EQU     5H#0%
 R1:          EQU     5H#1%
 R2:          EQU     5H#2%
 R3:          EQU     5H#3%
 R4:          EQU     5H#4%
 R5:          EQU     5H#5%
 R6:          EQU     5H#6%
 R7:          EQU     5H#7%
 R8:          EQU     5H#8%
 R9:          EQU     5H#9%
 R10:         EQU     5H#A%
 R11:         EQU     5H#B%
 R12:         EQU     5H#C%
 R13:         EQU     5H#D%
 R14:         EQU     5H#E%
 R15:         EQU     5H#F%
 R16:         EQU     5H#10:
 R17:         EQU     5H#11:
 R18:         EQU     5H#12:
 R19:         EQU     5H#13:
 R20:         EQU     5H#14:
 R21:         EQU     5H#15:
 R22:         EQU     5H#16:
 R23:         EQU     5H#17:
 R24:         EQU     5H#18:
 R25:         EQU     5H#19:
 R26:         EQU     5H#1A:
 DTR:         EQU     5H#1B:        ; DATA TRANSFER REGISTER
 FLG.REG:     EQU     5H#1C:        ; FLAG REGISTER
 R29:         EQU     5H#1D:
 MAR.2:       EQU     5H#1E:        ; LOCAL MEMORY ADDRESS REGISTER
 MAR:         EQU     5H#1F:
```

```
1LINE      29116 BIT SLICE CONTROLLER DPM MUX   V 1.01

     ;*****************************************************
     ;****** REGISTER DEFINITIONS ***********************
     ;*****************************************************
     ; REGISTER 0 - 26   ARE GENERAL PURPOSE
     ; REGISTER 28 FLAG   REGISTER
     ; REGISTER 29 LOCAL MEMORY ADDRESS REGISTER
     ; REGISTER 30 MEMORY ADDRESS REGISTER LOW WORD ADDRESS 0-15
     ; REGISTER 31 MEMORY ADDRESS REGISTER HIGH    .    ADDRESS 16-19
     ;
1LINE      29116 BIT SLICE CONTROLLER DPM MUX   V 1.01

     ;
     ;    2910 INSTUCTIONS
     ;
     ;
     UJZ:    SUB    4H#0        ;JUMP ZERO
     CJS:    SUB    4H#1        ;CONDITIONAL JMP TO SUB VIA PIPE
     JMAP:   SUB    4H#2        ;JUMP MAP
     CJP:    SUB    4H#3        ;CONDITIONAL JMP TO PIPE
     PUSH:   SUB    4H#4        ;PUSH/CONITIONAL LOAD COUNTER
     JSRP:   SUB    4H#5        ;CONITIONAL JMP TO SUB R OR PIPE
     CJV:    SUB    4H#6        ;CONDITIONAL JMP VECTOR
     JRP:    SUB    4H#7        ;CONDITIONAL JMP R OR PIPE
     RFCT:   SUB    4H#8        ;REPEAT LOOP IF COUNT NOT 0
     RPCT:   SUB    4H#9        ;REPEAT PIPELINE IF COUNT NOT 0
     CRTN:   SUB    4H#A        ;CONDITIONAL RETURN
     CJPP:   SUB    4H#B        ;CONDITIONAL JMP PIPE AND POP
     LOCT:   SUB    4H#C        ;LOAD COUNTER AND CONTINUE
     LOOP:   SUB    4H#D        ;TEST END    LOOP
     CONT:   SUB    4H#E        ;CONTINUE
     TWB:    SUB    4H#F        ;THREE WAY BRANCH
     ;
1LINE      29116 BIT SLICE CONTROLLER DPM MUX   V 1.01

     ;
     ;    CONDITION CODES
     ;
     ;    MUX    0
     ;
     PASS:          EQU    6B#000000
     FAIL:          EQU    6B#100000
     UOFLOW.L:      EQU    6B#000100
     UOFLOW.H:      EQU    6B#100100
     UNEG.L:        EQU    6B#000011
     UNEG.H:        EQU    6B#100011
     UCARRY.L:      EQU    6B#000010
     UCARRY.H:      EQU    6B#100010
     US.Z:          EQU    6B#100001
     US.NZ:         EQU    6B#000001
     US.ZERO:       EQU    6B#100001
     L.XACK:        EQU    6B#000101
     H.XACK:        EQU    6B#100101
     L.EVENT:       EQU    6B#000110
     H.EVENT:       EQU    6B#100110
     XFER.DONE:     EQU    6B#100111
     PXF:           EQU    6B#000111
     ;
```

```
L.RT.ENABLE:  EQU      6B#001000
H.RT.ENABLE:  EQU      6B#101000
L.TAKE.DATA:  EQU      6B#001001
H.TAKE.DATA:  EQU      6B#101001
L.VALID.WORD:EQU       6B#001010
H.VALID.WORD:EQU       6B#101010
L.MODE.CODE:  EQU      6B#001011
H.MODE.CODE:  EQU      6B#101011
L.BRDCAST:    EQU      6B#001100
H.BRDCAST:    EQU      6B#101100
DATA.SYNC:    EQU      6B#001101
CMND.SYNC:    EQU      6B#101101
L.SEND.DATA:  EQU      6B#001110
H.SEND.DATA:  EQU      6B#101110
L.FAIL.SAFE:  EQU      6B#001111
H.FAIL.SAFE:  EQU      6B#101111
DATA.PRESENT:  EQU     6B#001001
;
; DUAL CONDITIONS
L.TIMER:      EQU      6B#010011
H.TIMER:      EQU      6B#110011
L.RT.ON:      EQU      6B#010000
H.RT.ON:      EQU      6B#110000
BUS.ACTIVE:   EQU      6B#010001
NO.DATA.PRESENT:EQU 6B#010001
1LINE     29116 BIT SLICE CONTROLLER DPM MUX   V 1.01
;*********************************************
;         H009 CONDITION CODES
;*********************************************
;
H.NO.CLK:     EQU      6B#110000
L.NO.CLK:     EQU      6B#010000
H.MAN.FAIL:   EQU      6B#110001
L.MAN.FAIL:   EQU      6B#010001
H.DUAL.BUS:   EQU      6B#110010
L.DUAL.BUS:   EQU      6B#010010
H.PAR.FAIL:   EQU      6B#110011
L.PAR.FAIL:   EQU      6B#010011
H.CONT.MAX:   EQU      6B#110100
L.CONT.MAX:   EQU      6B#010100
H.CMD.RDY:    EQU      6B#110101
L.CMD.RDY:    EQU      6B#010101
H.RT.AD.VAL:  EQU      6B#110110
L.RT.AD.VAL:  EQU      6B#010110
H.SUB.AD.VAL:EQU       6B#110111
L.SUB.AD.VAL:EQU       6B#010111
H.2US.FLAG:   EQU      6B#111000
L.2US.FLAG:   EQU      6B#011000
H.09SEND.DAT:EQU       6B#111001
L.09SEND.DAT:EQU       6B#011001
L.DATA.VAL:   EQU      6B#011010
H.DATA.VAL:   EQU      6B#111010
L.VAL.LAT:    EQU      6B#011011
H.VAL.LAT:    EQU      6B#111011
1LINE     29116 BIT SLICE CONTROLLER DPM MUX   V 1.01
```

```
;
MEM.RD:     EQU 33#011
MEM.WR:     EQU 33#101
MARL:       EQU 33#110
;
IMED:       EQU 3B#001          ; IMMED BUS ACTIVE
IDLE:       EQU 33#011
VJMP:       EQU 3B#100
;
;     MUX BUS CONTROL
;
MUX.READ:     ECU 5B#11110    ; OUTPUT ENABLE
MUX.WR.CMD:   EQU 5B#10011    ; CMD SYNC, LOAD
MUX.WR.DAT:   ECU 5B#11011    ; DATA SYNC, LOAD
MUX.IDLE:     EQU 5B#11111    ; LATCH OFF
MUX.EN.CMD:   EQU 5B#00111    ; TX ENABLE, CMD SYNC
MUX.EN.DAT:   EQU 5B#01111    ; TX ENABLE, DATA SYNC
MXOFF:        EQU 5B#11111    ; LATCH OFF
MUX.RT.RD:    EQU 5B#11101    ; READ RT ID
MUX.ECHR:     EQU 5B#00011    ; CMD SYNC, LOAD, AND ENABLE
;
;
;
09.MUX.OFF: EQU 5B#11111    ;MUX INTERFACE DISABLED
09.MUX.IDLE:EQU 5B#11111    ;MUX INTERFACE DISABLED
09.MUX.READ:EQU 5B#01111    ;ENABLE THE SERIAL-IN/PARALLEL-OUT SHIFT REGISTERS TO READ DATA RECEIEVED
09.CCUNT.LD:EQU 5B#10111    ;LOAD THE BUS CLOCK TIMER
09.MUX.SOTC:EQU 5B#11101    ;GIVE THE TRANSMIT STATE MACHINE THE SIGNAL TO START SHIFTING DATA OUT
09.MUX.EOTC:EQU 5B#11110    ;GIVE THE TRANSMIT STATE MACHINE THE SIGNAL THAT THIS THE LAST DATA WORD
09.SOTC.LD.T:EQU 5B#10101   ;LOAD THE TIMER AND START THE TRANSMIT CYCLE
09.MUX.WRITE:EQU 5B#11011   ;LOAD THE PARALLEL-IN/SERIAL-OUT SHIFT REGISTERS WITH DATA TO BE TRANSMITTED
;
1LINE      29116 BIT SLICE CONTROLLER DPM MUX   V 1.01

; ****************************************************************
; ****************   LOCAL DEFINITIONS    ************************
; ****************************************************************
;
; BUS WAIT CYCLES IN USEC
;
WAIT.01:   EQU      4H#E%
WAIT.02:   EQU      4H#D%
WAIT.03:   EQU      4H#C%
WAIT.04:   EQU      4H#B%
WAIT.05:   EQU      4H#A%
WAIT.06:   EQU      4H#9%
WAIT.07:   EQU      4H#8%
WAIT.08:   EQU      4H#7%
WAIT.09:   EQU      4H#6%
WAIT.10:   EQU      4H#5%
WAIT.11:   EQU      4H#4%
WAIT.12:   EQU      4H#3%
WAIT.13:   EQU      4H#2%
WAIT.14:   EQU      4H#1%
WAIT.15:   EQU      4H#0%
;
;          BIT DEFINITIONS
;
```

```
BIT.0:          EQU 4H#0%
BIT.1:          EQU 4H#1%
BIT.2:          EQU 4H#2%
BIT.3:          EQU 4H#3%
BIT.4:          EQU 4H#4%
BIT.5:          EQU 4H#5%
BIT.6:          EQU 4H#6%
BIT.7:          EQU 4H#7%
BIT.8:          EQU 4H#8%
BIT.9:          EQU 4H#9%
BIT.10:         EQU 4H#A
BIT.11:         EQU 4H#B
BIT.12:         EQU 4H#C
BIT.13:         EQU 4H#D
BIT.14:         EQU 4H#E
BIT.15:         EQU 4H#F
:
1LINE     29116 BIT SLICE CONTROLLER DPM MUX   V 1.01
:
:     MOV OPCODES
:
MOVR.A:     EQU    11H#6C0:
MOVR.Y:     EQU    11H#6C2:
MOVR.S:     EQU    11H#6C3:
MOVA.R:     EQU    11H#6C4:
MOVD.R:     EQU    11H#6C6:
MOVI.R:     EQU    11H#6C7:
MOVO.R:     EQU    11H#6C8:
MOVOE.R:    EQU    11H#6C9:
MOVSE.R:    EQU    11H#6CA:
MOVR.R:     EQU    11H#6CB:
:
:COMP OPCODES
:
COMP.R.A:   EQU    11H#    6D0:
COMP.R.Y:   EQU    11H#    6D2:
COMP.R.S:   EQU    11H#    6D4:
COMP.D.R:   EQU    11H#    6D6:
COMP.I.R:   EQU    11H#    6D7:
COMP.O.R:   EQU    11H#    6D8:
COMP.OE.:   EQU    11H#    6D9:
COMP.SE.R:  EQU    11H#    6DA:
COMP.R.R:   EQU    11H#    6DB:
:
:INC OPCODES:
:
INC.R.A:   EQU     11H#    6E0:
INC.R.Y:   EQU     11H#    6E2:
INC.R.S:   EQU     11H#    6E3:
INC.A.R:   EQU     11H#    6E4:
INC.D.R:   EQU     11H#    6E6:
INC.I.R:   EQU     11H#    6E7:
INC.O.R:   EQU     11H#    6E8:
INC.OE.R:  EQU     11H#    6E9:
INC.SE.R:  EQU     11H#    6EA:
INC.R.R:   EQU     11H#     6EB:
1LINE     29116 BIT SLICE CONTROLLER DPM MUX   V 1.01
```

```
;
;        NEG     OPCODES:
;
NEG.R.A:    EQU      11H#     6F0:
NEG.R.Y:    EQU      11H#     6F2:
NEG.R.S:    EQU      11H#     6F3:
NEG.A.R:    EQU      11H#     6F4:
NEG.D.R:    EQU      11H#     6F6:
NEG.I.R:    EQU      11H#     6F7:
NEG.O.R:    EQU      11H#     6F8:
NEG.DE.R:   EQU      11H#     6F9:
NEG.SE.R:   EQU      11H#     6FA:
NEG.R.R:    EQU      11H#     6FB:
;
;MOV2 OPCODES:
;
MOV.2.A.Y:     EQU     11H#     7C4:
MOV.2.D.A:     EQU     11H#     7C6:
MOV.2.I.S:     EQU     11H#     7C7:
MOV.2.O.A:     EQU     11H#     7C8:
MOV.2.DO.A:    EQU     11H#     7C9:
MOV.2.DS.A:    EQU     11H#     7CA:
;
;COMP2 OPCODES:
;
CMP.2.A.Y:      EQU      11H#     7D4:
CMP.2.D.A:      EQU      11H#     7D6:
CMP.2.I.S:      EQU      11H#     7D7:
CMP.2.O.A:      EQU      11H#     7D8:
CMP.2.DO.A:     EQU      11H#     7D9:
CMP.2.DS.A:     EQU      11H#     7DA:
;
;INC2 OPCODES:
;
INC.2.A.Y:      EQU      11H#     7E4:
INC.2.D.A:      EQU      11H#     7E6:
INC.2.I.S:      EQU      11H#     7E7:
INC.2.O.A:      EQU      11H#     7E8:
INC.2.DO.A:     EQU      11H#     7E9:
INC.2.DS.A:     EQU      11H#     7EA:
;
;        NEG OPCODES:
;
NEG.2.A.Y:      EQU      11H#     7F4:
NEG.2.D.A:      EQU      11H#     7F6:
NEG.2.I.S:      EQU      11H#     7F7:
NEG.2.O.A:      EQU      11H#     7F8:
NEG.2.DO.A:     EQU      11H#     7F9:
NEG.2.DS.A:     EQU      11H#     7FA:
1LINE     29116 BIT SLICE CONTROLLER DPM MUX   V 1.01

;
;SUB.U OPCODES:
;
SBR.RAA:        EQU      11H#     400:
SBR.RIA:        EQU      11H#     420:
SBR.DFA:        EQU      11H#     430:
SBR.RAY:        EQU      11H#     480:
```

```
SBR.RIY:        EQU     11H#    4A0:
SBR.DRY:        EQU     11H#    4B0:
SBR.RAR:        EQU     11H#    4C0:
SBR.RIR:        EQU     11H#    4E0:
SBR.DRR:        EQU     11H#    4F0:
SBRC.RAA:       EQU     11H#    401:
SBRC.RIA:       EQU     11H#    421:
SBRC.DRA:       EQU     11H#    431:
SBRC.RAY:       EQU     11H#    481:
SBRC.RIY:       EQU     11H#    4A1:
SBRC.DRY:       EQU     11H#    4B1:
SBRC.RAR:       EQU     11H#    4C1:
SBRC.RIR:       EQU     11H#    4E1:
SBRC.DRR:       EQU     11H#    4F1:
SBS.RAA:        EQU     11H#    402:
SBS.RIA:        EQU     11H#    422:
SBS.DRA:        EQU     11H#    432:
SBS.RAY:        EQU     11H#    482:
SBS.RIY:        EQU     11H#    4A2:
SBS.DRY:        EQU     11H#    4B2:
SBS.RAR:        EQU     11H#    4C2:
SBS.RIR:        EQU     11H#    4E2:
SBS.DRR:        EQU     11H#    4F2:
SBSC.RAA:       EQU     11H#    403:
SBSC.RIA:       EQU     11H#    423:
SBSC.DRA:       EQU     11H#    433:
SBSC.RAY:       EQU     11H#    483:
SBSC.RIY:       EQU     11H#    4A3:
SBSC.DRY:       EQU     11H#    4B3:
SBSC.RAR:       EQU     11H#    4C3:
SBSC.RIR:       EQU     11H#    4E3:
SBSC.DRR:       EQU     11H#    4F3:
;
;AD.U OPCODES
;
AD.RAA:         EQU     11H#    404:
AD.RIA:         EQU     11H#    424:
AD.DRA:         EQU     11H#    434:
AD.RAY:         EQU     11H#    484:
AD.RIY:         EQU     11H#    4A4:
AD.DRY:         EQU     11H#    4B4:
AD.RAR:         EQU     11H#    4C4:
AD.RIR:         EQU     11H#    4E4:
AD.DRR:         EQU     11H#    4F4:
ADC.RAA:        EQU     11H#    405:
ADC.RIA:        EQU     11H#    425:
1LINE      29116 BIT SLICE CONTROLLER DPM MUX   V 1.01

ADC.DRA:        EQU     11H#    435:
ADC.RAY:        EQU     11H#    485:
ADC.RIY:        EQU     11H#    4A5:
ADC.DRY:        EQU     11H#    4B5:
ADC.RAR:        EQU     11H#    4C5:
ADC.RIR:        EQU     11H#    4E5:
ADC.DRR:        EQU     11H#    4F5:
1LINE      29116 BIT SLICE CONTROLLER DPM MUX   V 1.01
```

```
;
;        LOGICAL OPCODES:
;
AN.RAA:     EQU     11H#     406:
AN.RIA:     EQU     11H#     426:
AN.DRA:     EQU     11H#     436:
AN.RAY:     EQU     11H#     486:
AN.RIY:     EQU     11H#     4A6:
AN.DRY:     EQU     11H#     4B6:
AN.RAR:     EQU     11H#     4C6:
AN.RIR:     EQU     11H#     4E6:
AN.DRR:     EQU     11H#     4F6:
NAN.RAA:    EQU     11H#     407:
NAN.RIA:    EQU     11H#     427:
NAN.DRA:    EQU     11H#     437:
NAN.RAY:    EQU     11H#     487:
NAN.RIY:    EQU     11H#     4A7:
NAN.DRY:    EQU     11H#     4B7:
NAN.RAR:    EQU     11H#     4C7:
NAN.RIR:    EQU     11H#     4E7:
NAN.DRR:    EQU     11H#     4F7:
XR.RAA:     EQU     11H#     408:
XR.RIA:     EQU     11H#     428:
XR.DRA:     EQU     11H#     438:
XR.RAY:     EQU     11H#     488:
XR.RIY:     EQU     11H#     4A8:
XR.DRY:     EQU     11H#     4B8:
XR.RAR:     EQU     11H#     4C8:
XR.RIR:     EQU     11H#     4E8:
XR.DRR:     EQU     11H#     4F8:
NR.RAA:     EQU     11H#     409:
NR.RIA:     EQU     11H#     429:
NR.DRA:     EQU     11H#     439:
NR.RAY:     EQU     11H#     489:
NR.RIY:     EQU     11H#     4A9:
NR.DRY:     EQU     11H#     4B9:
NR.RAR:     EQU     11H#     4C9:
NR.RIR:     EQU     11H#     4E9:
NR.DRR:     EQU     11H#     4F9:
OR.RAA:     EQU     11H#     40A:
OR.RIA:     EQU     11H#     42A:
OR.DRA:     EQU     11H#     43A:
OR.RAY:     EQU     11H#     48A:
OR.RIY:     EQU     11H#     4AA:
OR.DRY:     EQU     11H#     4BA:
OR.RAR:     EQU     11H#     4CA:
OR.RIR:     EQU     11H#     4EA:
OR.DRR:     EQU     11H#     4FA:
XNR.RAA:    EQU     11H#     40B:
XNR.RIA:    EQU     11H#     42B:
XNR.DRA:    EQU     11H#     43B:
XNR.RAY:    EQU     11H#     48B:
XNR.RIY:    EQU     11H#     4AB:
LLINE      29116 BIT SLICE CONTROLLER DPM MUX   V 1.01

XNR.DRY:    EQU     11H#     4BB:
XNR.RAC:    EQU     11H#     4CB:
XNR.RIR:    EQU     11H#     4EB:
```

```
XNR.DRR:      EQU    11H#     4EB:
        29116 BIT SLICE CONTROLLER DPM MUX   V 1.01

;
;   SUB2.U OPCODES:
;
SBR2.DAR:     EQU    11H#     610:
SBR2.AIR:     EQU    11H#     620:
SBR2.DIR:     EQU    11H#     650:
SBRC2.DAR:    EQU    11H#     611:
SBRC2.AIR:    EQU    11H#     621:
SBRC2.DIR:    EQU    11H#     651:
SBS2.DAR:     EQU    11H#     612:
SBS2.AIR:     EQU    11H#     622:
SBS2.DIR:     EQU    11H#     652:
SBC2.DAR:     EQU    11H#     613:
SBC2.AIR:     EQU    11H#     623:
SBC2.DIR:     EQU    11H#     653:
;
;  AD2.U OPCODES:
;
AD2.DAR:      EQU    11H#     614:
AD2.AIR:      EQU    11H#     624:
AD2.DIR:      EQU    11H#     654:
ADC2.DAR:     EQU    11H#     615:
ADC2.AIR:     EQU    11H#     625:
ADC2.DIR:     EQU    11H#     655:
;
;      LOGICAL 2  OPCODES:
;
AN2.DAR:      EQU    11H#     616:
AN2.AIR:      EQU    11H#     626:
AN2.DIR:      EQU    11H#     656:
NAN2.DAR:     EQU    11H#     617:
NAN2.AIR:     EQU    11H#     627:
NAN2.DIR:     EQU    11H#     657:
XR2.DAR:      EQU    11H#     618:
XR2.AIR:      EQU    11H#     628:
XR2.DIR:      EQU    11H#     658:
NR2.DAR:      EQU    11H#     619:
NR2.AIR:      EQU    11H#     629:
NR2.DIR:      EQU    11H#     659:
OR2.DAR:      EQU    11H#     61A:
OR2.AIR:      EQU    11H#     62A:
OR2.DIR:      EQU    11H#     65A:
XNR2.DAR:     EQU    11H#     61B:
XNR2.AIR:     EQU    11H#     62B:
XNR2.DIR:     EQU    11H#     64B:
        29116 BIT SLICE CONTROLLER DPM MUX   V 1.01

;
;SUB3.U OPCODES:
;
SBR3.DAY:     EQU    16H#     7100:
SBR3.AIA:     EQU    16H#     7201:
SBR3.DIS:     EQU    16H#     7504:
SBR3.DIA:     EQU    16H#     7505:
SBRC3.DAY:    EQU    16H#     7110:
```

```
SBRC3.AIA:   EQU     16H#     7211:
SBRC3.DIS:   EQU     16H#     7514:
SBRC3..DIA:  EQU     16H#     7515:
SBS3.DAY:    EQU     16H#     7120:
SBS3.AIA:    EQU     16H#     7221:
SBS3.DIS:    EQU     16H#     7524:
SBS3.DIA:    EQU     16H#     7525:
SBC3.DAY:    EQU     16H#     7130:
SBC3.AIA:    EQU     16H#     7231:
SBC3.DIS:    EQU     16H#     7534:
SBC3.DIA:    EQU     16H#     7535:
;
;        AD3.U   OPCODES:
;
AD3.DAY:     EQU     16H#     7140:
AD3.AIA:     EQU     16H#     7241:
AD3.DIS:     EQU     16H#     7544:
AD3.DIA:     EQU     16H#     7545:
ADC3.DAY:    EQU     16H#     7150:
ADC3.AIA:    EQU     16H#     7251:
ADC3.DIS:    EQU     16H#     7554:
ADC3.DIA:    EQU     16H#     7555:
;
;LOGICAL  3 OPCODES:
;
AN3.DAY:     EQU     16H#     7160:
AN3.AIA:     EQU     16H#     7261:
AN3.DIS:     EQU     16H#     7564:
AN3.DIA:     EQU     16H#     7565:
NAN3.DAY:    EQU     16H#     7170:
NAN3.AIA:    EQU     16H#     7271:
NAN3.DIS:    EQU     16H#     7574:
NAN3.DIA:    EQU     16H#     7575:
XR3.DAY:     EQU     16H#     7180:
XR3.AIA:     EQU     16H#     7281:
XR3.DIS:     EQU     16H#     7584:
XR3.DIA:     EQU     16H#     7585:
NR3.DAY:     EQU     16H#     7190:
NR3.AIA:     EQU     16H#     7291:
NR3.DIS:     EQU     16H#     7594:
NR3.DIA:     EQU     16H#     7595:
OR3.DAY:     EQU     16H#     71A0:
OR3.AIA:     EQU     16H#     72A1:
OR3.DIS:     EQU     16H#     75A4:
OR3.DIA:     EQU     16H#     75A5:
      29116 BIT SLICE CONT[illegible]

XNR3.DAY:    EQU     16H[illegible]
XNR3.AIA:    EQU     16H[illegible]
XNR3.DIS:    EQU     16H#
XNR3.DIA:    EQU     16H#     74B5.
      29116 BIT SLICE CONTROLLER DPH MUX  V 1.01

;
;        SHUP    ** OPCODES:
;
SHUPZ.R.R:    EQU    11H#     660:
SHUPZ.D.R:    EQU    11H#     670:
```

```
SHUP1.R.R:      EQU     11H#     661:
SHUP1.D.R:      EQU     11H#     671:
SHUPL.R.R:      EQU     11H#     662:
SHUPL.D.R:      EQU     11H#     672:
SHDNZ.R.R:      EQU     11H#     664:
SHDNZ.D.R:      EQU     11H#     674:
SHDN1.P.R:      EQU     11H#     665:
SHDN1.D.R:      EQU     11H#     675:
SHDNL.R.R:      EQU     11H#     666:
SHDNL.D.R:      EQU     11H#     676:
SHDNC.R.R:      EQU     11H#     667:
SHDNC.D.R:      EQU     11H#     677:
SHDNOV.R.R:     EQU     11H#     668:
SHDNOV.D.R:     EQU     11H#     678:
;
;       NOOP INSTRUCTION::
;
;
; 29116 CONTROLS OEY.IEN.DLE
;
OEY.ON:   EQU 3B#000        ; /OEY,/IEN,/DLE  OUTPUT ON,INSTR VLD,  LATCH IDLE
CPU.OFF:  EQU 3B#110        ;  OEY, IEN,/DLE  NO OUTPUT,NO INSTR,   LATCH IDLE
CPU.Y2L:  EQU 3B#101        ;  OEY,/IEN, DLE  NO OUTPUT,INS VALID,  TRANS DLE
;
MEMO:     EQU 3B#111
;
; MUX COMMAND LATCH CONTROL
MLH:      EQU 1B#1      ; LATCH OFF
MLL:      EQU 1B#0      ; LATCH ON
;
; INTERRUPT CONTROL
I0:       EQU 2B#11     ; NO INTERRUPT
IN.2:     EQU 2B#10     ; INT 2 ACTIVE error
IN.1:     EQU 2B#00     ; INT 1 ACTIVE eot
I3:       EQU 2B#01     ; BOTH INTR ON
;
NOOP:     EQU 16H#7140%
1LINE  29116 BIT SLICE CONTROLLER DPM MUX   V 1.01                PAGE   19

;********************************************************************
;************  INSTRUCTION SET  *************************************
;********************************************************************
RESETO:   DEF UJZ,IDLE,3X,PASS,16X,NOOP,CPU.OFF,5X,MEMO,MLH,2V%IO,2X
NOP:      DEF CONT,IDLE,3X,PASS,16X,NOOP,CPU.OFF,5X,MEMO,MLH,2V%IO,2X
;
;
;
1LINE  29116 BIT SLICE CONTROLLER DPM MUX   V 1.01                PAGE   20

;********************************************************************
;*************  LOGIC OPERATORS  ************************************
;********************************************************************
LDA:      DEF CONT,IDLE,3X,PASS,16X,MOVR.A    ,5V,CPU.Y2L,5X,MEMO,MLH,2V%IO,2X
STA:      DEF CONT,IDLE,3X,PASS,16X,MOVA.R    ,5V,CPU.Y2L,5X,MEMO,MLH,2V%IO,2X
MOV.R.A:  DEF CONT,IDLE,3X,PASS,16X,MOVR.A    ,5V,CPU.Y2L,5X,MEMO,MLH,2V%IO,2X
MOV.A.R:  DEF CONT,IDLE,3X,PASS,16X,MOVA.R    ,5V,CPU.Y2L,5X,MEMO,MLH,2V%IO,2X
NOT.R:    DEF CONT,IDLE,3X,PASS,16X,11H#6C6:  ,5V,CPU.Y2L,5X,MEMO,MLH,2V%IO,2X
NOT.A:    DEF CONT,IDLE,3X,PASS,16X,11H#7C6:  ,5V,CPU.Y2L,5X,MEMO,MLH,2V%IO,2X
```

```
MVI.R:      DEF  CONT,IMED,3X,PASS,16V%,11H#6C6:,5V,CPU.Y2L,5X,MEMO,MLH,2V%IO,2X
MVI.A:      DEF  CONT,IMED,3X,PASS,16V%,16H#F8C1%  ,CPU.Y2L,5X,MEMO,MLH,2V%IO,2X
CMPI.R:     DEF  CONT,IMED,3X,PASS,16V%,11H#4B0:,5V,CPU.Y2L,5X,MEMO,MLH,2V%IO,2X
CMPI.A:     DEF  CONT,IMED,3X,PASS,16V%,16H#E20C%  ,CPU.Y2L,5X,MEMO,MLH,2V%IO,2X
CMP.R.Y:    DEF  CONT,IDLE,3X,PASS,16X,11H#4B0:,5V,CPU.Y2L,5X,MEMO,MLH,2V%IO,2X
CMP.A.Y:    DEF  CONT,IDLE,3X,PASS,16X,16H#C200%  ,CPU.Y2L,5X,MEMO,MLH,2V%IO,2X
CMP.A.R:    DEF  CONT,IDLE,3X,PASS,16X,11H#480:,5V,CPU.Y2L,5X,MEMO,MLH,2V%IO,2X
;
1LINE      29116 BIT SLICE CONTROLLER DPM MUX  V 1.01

;**************************************************************************
;************** BIT MANIPULATORS *******************************************
;**************************************************************************
SET.R: DEF  CONT,IDLE,3X,PASS,16X,3B#111,4V,4H#D,5V,CPU.Y2L,5X,MEMO,MLH,2V%IO,2X
CLR.R: DEF  CONT,IDLE,3X,PASS,16X,3B#111,4V,4H#E,5V,CPU.Y2L,5X,MEMO,MLH,2V%IO,2X
TST.R: DEF  CONT,IDLE,3X,PASS,16X,3B#111,4V,4H#F,5V,CPU.Y2L,5X,MEMO,MLH,2V%IO,2X
SET.A: DEF  CONT,IDLE,3X,PASS,16X,3B#111,4V,9H#182:,CPU.Y2L,5X,MEMO,MLH,2V%IO,2X
CLR.A: DEF  CONT,IDLE,3X,PASS,16X,3B#111,4V,9H#181:,CPU.Y2L,5X,MEMO,MLH,2V%IO,2X
TST.A: DEF  CONT,IDLE,3X,PASS,16X,3B#111,4V,9H#180:,CPU.Y2L,5X,MEMO,MLH,2V%IO,2X
1LINE      29116 BIT SLICE CONTROLLER DPM MUX  V 1.01                      PAGE   22

;
;**************************************************************************
;*************** ARITHMETIC OPERATORS **************************************
;**************************************************************************
INC.R:    DEF  CONT,IDLE,3X,PASS,16X,11H#6E8:    ,5V,CPU.Y2L,5X,MEMO,MLH,2V%IO,2X
INC.A:    DEF  CONT,IDLE,3X,PASS,16X,16H#FC81%      ,CPU.Y2L,5X,MEMO,MLH,2V%IO,2X
DEC.R:    DEF  CONT,IDLE,3X,PASS,16X,11H#60F:    ,5V,CPU.Y2L,5X,MEMO,MLH,2V%IO,2X
DEC.A:    DEF  CONT,IDLE,3X,PASS,16X,16H#E185%      ,CPU.Y2L,5X,MEMO,MLH,2V%IO,2X
DINC.P:   DEF  CONT,IDLE,3X,PASS,16X,11H#61E:    ,5V,CPU.Y2L,5X,MEMO,MLH,2V%IO,2X
DDEC.R:   DEF  CONT,IDLE,3X,PASS,16X,11H#61F:    ,5V,CPU.Y2L,5X,MEMO,MLH,2V%IO,2X
DINC.A:   DEF  CONT,IDLE,3X,PASS,16X,16H#E184%      ,CPU.Y2L,5X,MEMO,MLH,2V%IO,2X
DDEC.A:   DEF  CONT,IDLE,3X,PASS,16X,16H#E385%      ,CPU.Y2L,5X,MEMO,MLH,2V%IO,2X
ADD.A:    DEF  CONT,IDLE,3X,PASS,16X,11H#404:    ,5V,CPU.Y2L,5X,MEMO,MLH,2V%IO,2X
ADD.R:    DEF  CONT,IDLE,3X,PASS,16X,11H#4C4:    ,5V,CPU.Y2L,5X,MEMO,MLH,2V%IO,2X
ADDI.A:   DEF  CONT,IMED,3X,PASS,16V%,16H#E281%     ,CPU.Y2L,5X,MEMO,MLH,2V%IO,2X
ADDI.R:   DEF  CONT,IMED,3X,PASS,16V%,11H#4F4:   ,5V,CPU.Y2L,5X,MEMO,MLH,2V%IO,2X
SUBI.A:   DEF  CONT,IMED,3X,PASS,16V%,16H#E201%     ,CPU.Y2L,5X,MEMO,MLH,2V%IO,2X
SUBI.R:   DEF  CONT,IMED,3X,PASS,16V%,11H#4F0:   ,5V,CPU.Y2L,5X,MEMO,MLH,2V%IO,2X
SUB.A:    DEF  CONT,IDLE,3X,PASS,16X,11H#400:    ,5V,CPU.Y2L,5X,MEMO,MLH,2V%IO,2X
SUB.R:    DEF  CONT,IDLE,3X,PASS,16X,11H#4C2:    ,5V,CPU.Y2L,5X,MEMO,MLH,2V%IO,2X
AND.A:    DEF  CONT,IDLE,3X,PASS,16X,11H#406:    ,5V,CPU.Y2L,5X,MEMO,MLH,2V%IO,2X
AND.R:    DEF  CONT,IDLE,3X,PASS,16X,11H#4C6:    ,5V,CPU.Y2L,5X,MEMO,MLH,2V%IO,2X
ANDI.A:   DEF  CONT,IMED,3X,PASS,16V%,16H#E2C1%     ,CPU.Y2L,5X,MEMO,MLH,2V%IO,2X
ANDI.R:   DEF  CONT,IMED,3X,PASS,16V%,11H#4F6:   ,5V,CPU.Y2L,5X,MEMO,MLH,2V%IO,2X
OR.A:     DEF  CONT,IDLE,3X,PASS,16X,11H#40A:    ,5V,CPU.Y2L,5X,MEMO,MLH,2V%IO,2X
OR.R:     DEF  CONT,IDLE,3X,PASS,16X,11H#4CA:    ,5V,CPU.Y2L,5X,MEMO,MLH,2V%IO,2X
ORI.R:    DEF  CONT,IMED,3X,PASS,16V%,11H#4FA:   ,5V,CPU.Y2L,5X,MEMO,MLH,2V%IO,2X
NOR.A:    DEF  CONT,IDLE,3X,PASS,16X,11H#409:    ,5V,CPU.Y2L,5X,MEMO,MLH,2V%IO,2X
CPL.A:    DEF  CONT,IDLE,3X,PASS,16X,16H#FA81%      ,CPU.Y2L,5X,MEMO,MLH,2V%IO,2X
NOR.R:    DEF  CONT,IDLE,3X,PASS,16X,11H#4C9:    ,5V,CPU.Y2L,5X,MEMO,MLH,2V%IO,2X
NAND.A:   DEF  CONT,IDLE,3X,PASS,16X,11H#407:    ,5V,CPU.Y2L,5X,MEMO,MLH,2V%IO,2X
NAND.R:   DEF  CONT,IDLE,3X,PASS,16X,11H#4C7:    ,5V,CPU.Y2L,5X,MEMO,MLH,2V%IO,2X
EXNOR.A:DEF  CONT,IDLE,3X,PASS,16X,11H#40B:    ,5V,CPU.Y2L,5X,MEMO,MLH,2V%IO,2X
EXNOR.R:DEF  CONT,IDLE,3X,PASS,16X,11H#4CB:    ,5V,CPU.Y2L,5X,MEMO,MLH,2V%IO,2X
EXOR.A:  DEF  CONT,IDLE,3X,PASS,16X,11H#408:    ,5V,CPU.Y2L,5X,MEMO,MLH,2V%IO,2X
EXOR.R: DEF  CONT,IDLE,3X,PASS,16X,11H#4C8:    ,5V,CPU.Y2L,5X,MEMO,MLH,2V%IO,2X
1LINE      29116 BIT SLICE CONTROLLER DPM MUX  V 1.01
```

```
;*****************************************************************************
;**************** ROTATES AND SHIFTS OPERATORS ******************************
;*****************************************************************************
ROT.R:   DEF CONT,IDLE,3X,PASS,16X,3B#100,4V    ,4H#F  ,5V,CPU.Y2L,5X,MEMO,MLH,2V%IO,2X
ROT.A:   DEF CONT,IDLE,3X,PASS,16X,3B#111,4V    ,4H#C  ,5B#11101,CPU.Y2L,5X,MEMO,MLH,2V%IO,2X
SHL.R:   DEF CONT,IDLE,3X,PASS,16X,3B#110,4H#6%,4H#0%,5V,CPU.Y2L,5X,MEMO,MLH,2V%IO,2X
SHL.A:   DEF CONT,IDLE,3X,PASS,16X,3B#111,4H#6%,4H#0%,5B#00001,CPU.Y2L,5X,MEMO,MLH,2V%IO,2X
SHR.R:   DEF CONT,IDLE,3X,PASS,16X,3B#110,4H#6%,4H#4%,5V,CPU.Y2L,5X,MEMO,MLH,2V%IO,2X
SHR.A:   DEF CONT,IDLE,3X,PASS,16X,3B#111,4H#6%,4H#4%,5B#00001,CPU.Y2L,5X,MEMO,MLH,2V%IO,2X
1LINE
     29116 BIT SLICE CONTROLLER DPM MUX   V 1.01

;*****************************************************************************
;**************** BRANCH OPERATORS ******************************************
;*****************************************************************************
GO.TO:          DEF CJP,IDLE,3X,PASS       ,4X,12V%,NOOP,CPU.OFF,5X,MEMO,MLH,2V%IO,2X
JMP:            DEF CJP,IDLE,3X,PASS       ,4X,12V%,NOOP,CPU.OFF,5X,MEMO,MLH,2V%IO,2X
JUMP.IF:        DEF CJP,IDLE,3X,6V         ,4X,12V%,NOOP,CPU.OFF,5X,MEMO,MLH,2V%IO,2X
JUMP.IF.STA:DEF CJP,IDLE,3X,6V             ,4X,12V%,MOVA.R,5V,CPU.Y2L,5X,MEMO,MLH,2V%IO,2X
JNZ:            DEF CJP,IDLE,3X,US.NZ      ,4X,12V%,NOOP,CPU.OFF,5X,MEMO,MLH,2V%IO,2X
JZ:             DEF CJP,IDLE,3X,US.Z       ,4X,12V%,NOOP,CPU.OFF,5X,MEMO,MLH,2V%IO,2X
JNC:            DEF CJP,IDLE,3X,UCARRY.L,4X,12V%,NOOP,CPU.OFF,5X,MEMO,MLH,2V%IO,2X
JC:             DEF CJP,IDLE,3X,UCARRY.H,4X,12V%,NOOP,CPU.OFF,5X,MEMO,MLH,2V%IO,2X
JNOVF:          DEF CJP,IDLE,3X,UOFLOW.L,4X,12V%,NOOP,CPU.OFF,5X,MEMO,MLH,2V%IO,2X
JOVF:           DEF CJP,IDLE,3X,UOFLOW.H,4X,12V%,NOOP,CPU.OFF,5X,MEMO,MLH,2V%IO,2X
JNEG:           DEF CJP,IDLE,3X,UNEG.H     ,4X,12V%,NOOP,CPU.OFF,5X,MEMO,MLH,2V%IO,2X
JPOS:           DEF CJP,IDLE,3X,UNEG.L     ,4X,12V%,NOOP,CPU.OFF,5X,MEMO,MLH,2V%IO,2X
POP.STK.N.JMP: DEF CJPP,IDLE,3X,PASS,4X,12V%,NOOP,CPU.OFF,5X,MEMO,MLH,2V%IO,2X
VEC.SET:        DEF CONT,IDLE,3X,PASS      ,4X,12V%,11H#6C2:,5V,OEY.ON,5X,MEMO,MLH,2V%IO,2X
VECTOR:         DEF CJV,VJMP,3X,PASS       ,4X,12V%,11H#6C2:,5V,OEY.ON,5X,MEMO,MLH,2V%IO,2X
;
CALL:           DEF CJS,IDLE,3X,PASS       ,4X,12V%,NOOP,CPU.OFF,5X,MEMO,MLH,2V%IO,2X
CALL.STA:       DEF CJS,IDLE,3X,PASS       ,4X,12V%,MOVA.R    ,5V,CPU.Y2L,5X,MEMO,MLH,2V%IO,2X
CALL.IF:        DEF CJS,IDLE,3X,6V         ,4X,12V%,NOOP,CPU.OFF,5X,MEMO,MLH,2V%IO,2X
CALL.NZ:        DEF CJS,IDLE,3X,US.NZ      ,4X,12V%,NOOP,CPU.OFF,5X,MEMO,MLH,2V%IO,2X
CALL.Z:         DEF CJS,IDLE,3X,US.Z       ,4X,12V%,NOOP,CPU.OFF,5X,MEMO,MLH,2V%IO,2X
CALL.NC:        DEF CJS,IDLE,3X,UCARRY.L,4X,12V%,NOOP,CPU.OFF,5X,MEMO,MLH,2V%IO,2X
CALL.C:         DEF CJS,IDLE,3X,UCARRY.H,4X,12V%,NOOP,CPU.OFF,5X,MEMO,MLH,2V%IO,2X
CALL.NOVF:      DEF CJS,IDLE,3X,UOFLOW.L,4X,12V%,NOOP,CPU.OFF,5X,MEMO,MLH,2V%IO,2X
CALL.OVF:       DEF CJS,IDLE,3X,UOFLOW.H,4X,12V%,NOOP,CPU.OFF,5X,MEMO,MLH,2V%IO,2X
CALL.NEG:       DEF CJS,IDLE,3X,UNEG.L     ,4X,12V%,NOOP,CPU.OFF,5X,MEMO,MLH,2V%IO,2X
CALL.POS:       DEF CJS,IDLE,3X,UNEG.H     ,4X,12V%,NOOP,CPU.OFF,5X,MEMO,MLH,2V%IO,2X
RET.INCR:       DEF CRTN,IDLE,3X,PASS,16X,11H#6EB:,5V,CPU.Y2L,5X,MEMO,MLH,2V%IO,2X
RET:            DEF CRTN,IDLE,3X,PASS      ,4X,12X,16H#7140%,CPU.OFF,5X,MEMO,MLH,2V%IO,2X
RETURN:         DEF CRTN,IDLE,3X,PASS      ,16X,16H#7140%,CPU.OFF,5X,MEMO,MLH,2V%IO,2X
RET.IF:         DEF CRTN,IDLE,3X,6V        ,16X,16H#7140%,CPU.OFF,5X,MEMO,MLH,2V%IO,2X
RET.NZ:         DEF CRTN,IDLE,3X,US.NZ     ,16X,16H#7140%,CPU.OFF,5X,MEMO,MLH,2V%IO,2X
RET.Z:          DEF CRTN,IDLE,3X,US.Z      ,16X,16H#7140%,CPU.OFF,5X,MEMO,MLH,2V%IO,2X
RET.NC:         DEF CRTN,IDLE,3X,UCARRY.L,16X,16H#7140%,CPU.OFF,5X,MEMO,MLH,2V%IO,2X
RET.C:          DEF CRTN,IDLE,3X,UCARRY.H,16X,16H#7140%,CPU.OFF,5X,MEMO,MLH,2V%IO,2X
RET.NOVF:       DEF CRTN,IDLE,3X,UOFLOW.L,16X,16H#7140%,CPU.OFF,5X,MEMO,MLH,2V%IO,2X
RET.OVF:        DEF CRTN,IDLE,3X,UOFLOW.H,16X,16H#7140%,CPU.OFF,5X,MEMO,MLH,2V%IO,2X
RET.NEG:        DEF CRTN,IDLE,3X,UNEG.L    ,16X,16H#7140%,CPU.OFF,5X,MEMO,MLH,2V%IO,2X
RET.POS:        DEF CRTN,IDLE,3X,UNEG.H    ,16X,16H#7140%,CPU.OFF,5X,MEMO,MLH,2V%IO,2X
1LINE
     29116 BIT SLICE CONTROLLER DPM MUX   V 1.01
```

```
;*****************************************************************************
;*********************** I/O OPERATORS   **************************************
;*****************************************************************************
OUTMUX.A:      DEF CONT,IDLE,3X,6X,16X,16H#F880%    ,OEY.ON  ,5V,MEMO,MLH,2V%IO,2X
OUTMUX.R:      DEF CONT,IDLE,3X,6X,16X,11H#06C2:,5V,OEY.ON  ,5V,MEMO,MLH,2V%IO,2X
OUTMUX.I:      DEF CONT,IMED,3X,6X,16V%,NOOP          ,CPU.OFF,5V,MEMO,MLH,2V%IO,2X
OUTPUT.R:      DEF CONT,IDLE,3X,6X,16X,11H#06C2:,5V,OEY.ON  ,5V,MEMO,MLH,2V%IO,2X
OUTPUT.A:      DEF CONT,IDLE,3X,6X,16X,16H#F880%    ,OEY.ON  ,5V,MEMO,MLH,2V%IO,2X
OUTPUT.I:      DEF CONT,IMED,3X,6X,16V%,NOOP          ,CPU.OFF,5V,MEMO,MLH,2V%IO,2X
INPUT.R:       DEF CONT,IDLE,3X,6X,16X,11H#06C6:,5V,CPU.Y2L,5V,MEMO,MLH,2V%IO,2X
INPUT.A:       DEF CONT,IDLE,3X,6X,16X,16H#F8C1%    ,CPU.Y2L,5V,MEMO,MLH,2V%IO,2X
INMUX.R:       DEF CONT,IDLE,3X,6X,16X,11H#06C6:,5V,CPU.Y2L,5V,MEMO,MLH,2V%IO,2X
INMUX.A:       DEF CONT,IDLE,3X,6X,16X,16H#F8C1%    ,CPU.Y2L,5V,MEMO,MLH,2V%IO,2X
MUX.REG.CMD:   DEF CONT,IDLE,3X,6X,16X,11H#06C2:,5V,OEY.ON  ,5V%MXOFF,MEMO,MLL,2V%IO,2X
MUX.CONTROL:   DEF CONT,IMED,3X,6X,16V%,NOOP          ,CPU.OFF,5V%MXOFF,MEMO,MLL,2V%IO,2X
OUT.I.STA:     DEF CONT,IMED,3X,6X,16V%,MOVA.R     ,5V,CPU.Y2L,5V,MEMO,MLH,2V%IO,2X
1LINE     29116 BIT SLICE CONTROLLER DPM MUX   V 1.01                    PAGE    26

;*****************************************************************************
;**********   SPECIAL MULTIBUS CONTROLS  *************************************
;*****************************************************************************
SET.WR.RDY.LIMIT:           DEF PUSH,IDLE,3X,PASS  ,4X,12V%,11H#6C2:,MAR,OEY.ON  ,5X,MARL,MLH,2V%IO,2X
IF.WR.RDY.TIMEOUT.THEN:     DEF TWB,IDLE,3X,L.XACK,4X,12V%,11H#6C2:,5V%    ,OEY.ON  ,5X,MEM.WR,MLH,2V%IO,2X
SET.RD.RDY.LIMIT:           DEF PUSH,IDLE,3X,PASS  ,4X,12V%,11H#6C2:,MAR,OEY.ON  ,5X,MARL,MLH,2V%IO,2X
IF.RD.RDY.TIMEOUT.THEN:     DEF TWB,IDLE,3X,L.XACK,4X,12V%,11H#6C6:,5V%    ,CPU.Y2L,5X,MEM.RD,MLH,2V%IO,2X
SET.MAR2.LIMIT:             DEF PUSH,IDLE,3X,PASS  ,4X,12V%,11H#6C2:,MAR.2,OEY.ON  ,5X,MARL,MLH,2V%IO,2X
ACCUM.IF.RD.TIMEOUT.THEN: DEF TWB,IDLE,3X,L.XACK,4X,12V%,16H#F8C1%  ,CPU.Y2L,5X,MEM.RD,MLH,2V%IO,2X
1LINE     29116 BIT SLICE CONTROLLER DPM MUX   V 1.01                    PAGE    27

;
;
;
SET.LIMIT:           DEF PUSH,IDLE,3X,PASS   ,4X,12V%,NOOP,CPU.Y2L,5X,MEMO,MLH,2V%IO,2X
LOOP.TILL.LIMIT: DEF TWB,IDLE,3X,6V      ,4X,12V%,NOOP,CPU.Y2L,5V%MXOFF,MEMO,MLH,2V%IO,2X
INPUT.R.TILL.LIMIT: DEF TWB,IDLE,3X,6V,4X,12V%,11H#06C6:,5V,CPU.Y2L,5V,MEMO,MLH,2V%IO,2X
INPUT.A.TILL.LIMIT: DEF TWB,IDLE,3X,6V,4X,12V%,16H#F8C1%,CPU.Y2L,5V,MEMO,MLH,2V%IO,2X
DO.LOOP:             DEF PUSH,IDLE,3X,PASS   ,4X,12V%,NOOP,CPU.Y2L,5X,MEMO,MLH,2V%IO,2X
END.LOOP:            DEF RFCT,IDLE,3X,PASS   ,16X,16X  ,CPU.Y2L,5X,MEMO,MLH,2V%IO,2X
ACK.EVENT:           DEF 8X,1B#0,51X,2X,2X
MUXIO:               DEF 51X,5V,4X,2X,2X
MAN:                 DEF 52X,1B#0,1X
O.LIGHT:             DEF CONT,IDLE,1B#0,2X,6X,16X,11H#06C2:,5V,OEY.ON,5X,MEMO,MLH,2V%IO,2X
END;

  TOTAL DEFINITION ERRORS =      0
1        29116 BIT SLICE CONTROLLER DPM MUX   V 1.01                    PAGE    28

                         SYMBOL TABLE

ACCUM.IF  D            ACK.EVEN  D            AD2.AIR   A   00624  AD2.DAR   A   00614
AD2.DIR   A   00654    AD3.AIA   A   07241    AD3.DAY   A   07140  AD3.DIA   A   07545
AD3.DIS   A   07544    ADC2.AIR  A   00625    ADC2.DAR  A   00615  ADC2.DIR  A   00655
ADC3.AIA  A   07251    ADC3.DAY  A   07150    ADC3.DIA  A   07555  ADC3.DIS  A   07554
ADC.DRA   A   00435    ADC.DRR   A   004F5    ADC.DRY   A   00485  ADC.RAA   A   00405
ADC.RAR   A   004C5    ADC.RAY   A   00485    ADC.RIA   A   00425  ADC.RIR   A   004E5
ADC.RIY   A   004A5    ADDI.A    D            ADDI.R    D          ADD.A     D
```

| | | | | | | | | | | | |
|---|---|---|---|---|---|---|---|---|---|---|---|
| ADD.R | D | | AD.DRA | A | 00434 | AD.DRR | A | 004F4 | AD.DRY | A | 00434 |
| AD.RAA | A | 00404 | AD.RAR | A | 004C4 | AD.RAY | A | 00484 | AD.RIA | A | 00424 |
| AD.RIR | A | 004E4 | AD.RIY | A | 004A4 | AN2.AIR | A | 00626 | AN2.DAR | A | 00616 |
| AN2.DIP | A | 00656 | AN3.AIA | A | 07261 | AN3.DAY | A | 07160 | AN3.DIA | A | 07565 |
| AN3.DIS | A | 07564 | ANDI.A | D | | ANDI.R | D | | AND.A | D | |
| AND.R | D | | AN.DRA | A | 00436 | AN.DRR | A | 004F6 | AN.DRY | A | 004B6 |
| AN.RAA | A | 00406 | AN.RAR | A | 004C6 | AN.RAY | A | 00486 | AN.RIA | A | 00426 |
| AN.RIR | A | 004E6 | AN.RIY | A | 00446 | BIT.0 | A | 00000 | BIT.10 | A | 0000A |
| BIT.11 | A | 0000B | BIT.12 | A | 0000C | BIT.13 | A | 0000D | BIT.14 | A | 0000E |
| BIT.15 | A | 0000F | BIT.1 | A | 00001 | BIT.2 | A | 00002 | BIT.3 | A | 00003 |
| BIT.4 | A | 00004 | BIT.5 | A | 00005 | BIT.6 | A | 00006 | BIT.7 | A | 00007 |
| BIT.8 | A | 00008 | BIT.9 | A | 00009 | BUS.ACTI | A | 00011 | CALL | D | |
| CALL.C | D | | CALL.IF | D | | CALL.NC | D | | CALL.NEG | D | |
| CALL.NOV | D | | CALL.NZ | D | | CALL.OVF | D | | CALL.POS | D | |
| CALL.STA | D | | CALL.Z | D | | CJPP | S | | CJP | S | |
| CJS | S | | CJV | S | | CLR.A | D | | CLR.R | D | |
| CMND.SYN | A | 0002D | CMPI.A | D | | CMPI.R | D | | CMP.2.A. | A | 007D4 |
| CMP.2.DO | A | 007D9 | CMP.2.DS | A | 007DA | CMP.2.D. | A | 007D6 | CMP.2.I. | A | 007D7 |
| CMP.2.O. | A | 007D8 | CMP.A.R | D | | CMP.A.Y | D | | CMP.R.Y | D | |
| COMP.D.R | A | 006D6 | COMP.I.R | A | 006D7 | COMP.OE. | A | 006D9 | COMP.O.R | A | 006D8 |
| COMP.R.A | A | 006D0 | COMP.R.R | A | 006DB | COMP.R.S | A | 006D4 | COMP.R.Y | A | 006D2 |
| COMP.SE. | A | 006DA | CONT | S | | CPL.A | D | | CPU.OFF | A | 00006 |
| CPU.Y2L | A | 00005 | CRTN | S | | DATA.PRE | A | 00009 | DATA.SYN | A | 0000D |
| DDEC.A | D | | DDEC.R | D | | DEC.A | D | | DEC.R | D | |
| DINC.A | D | | DINC.R | D | | DO.LOOP | D | | DPM116.V | A | 00101 |
| DTR | A | 0001B | END.LOOP | D | | EXNOR.A | D | | EXNOR.R | D | |
| EXOR.A | D | | EXOR.R | D | | FAIL | A | 00020 | FLG.REG | A | 0001C |
| GO.TO | D | | H.2US.FL | A | 00038 | H.BRDCAS | A | 0002C | H.CMD.RD | A | 00035 |
| H.CONT.M | A | 00034 | H.DATA.V | A | 0003A | H.DUAL.B | A | 00032 | H.EVENT | A | 00026 |
| H.FAIL.S | A | 0002F | H.MAN.FA | A | 00031 | H.MODE.C | A | 0002B | H.NO.CLK | A | 00030 |
| H.09SEND | A | 00039 | H.PAR.FA | A | 00033 | H.RT.AD. | A | 00036 | H.RT.ENA | A | 00028 |
| H.RT.ON | A | 00030 | H.SEND.D | A | 0002E | H.SUB.AD | A | 00037 | H.TAKE.D | A | 00029 |
| H.TIMER | A | 00033 | H.VALID. | A | 0002A | H.VAL.LA | A | 0003B | H.XACK | A | 00025 |
| IO | A | 00003 | I3 | A | 00001 | IDLE | A | 00003 | IF.RD.RD | D | |
| IF.WR.RD | D | | IMED | A | 00001 | INC.2.A. | A | 007E4 | INC.2.DO | A | 007E9 |
| INC.2.DS | A | 007EA | INC.2.D. | A | 007E6 | INC.2.I. | A | 007E7 | INC.2.O. | A | 007E8 |
| INC.A.R | A | 006E4 | INC.A | D | | INC.D.R | A | 006E6 | INC.I.R | A | 006E7 |
| INC.OE.R | A | 006E9 | INC.O.R | A | 006E8 | INC.R.A | A | 006E0 | INC.R.R | A | 006EB |
| INC.R.S | A | 006E3 | INC.R.Y | A | 006E2 | INC.R | D | | INC.SE.R | A | 006EA |
| INMUX.A | D | | INMUX.R | D | | INPUT.A. | D | | INPUT.A | D | |
| INPUT.R. | D | | INPUT.R | D | | IN.1 | A | 00000 | IN.2 | A | 00002 |
| JC | D | | JMAP | S | | JMP | D | | JNC | D | |
| JNEG | D | | JNOVF | D | | JNZ | D | | JOVF | D | |
| JPOS | D | | JRP | S | | JSRP | S | | JUMP.IF. | D | |
| JUMP.IF | D | | JZ | D | | LDA | D | | LDCT | S | |
| LOOP | S | | LOOP.TIL | D | | L.2US.FL | A | 00018 | L.BRDCAS | A | 0000C |
| L.CMD.RD | A | 00015 | L.CONT.M | A | 00014 | L.DATA.V | A | 0001A | L.DUAL.B | A | 00012 |
| L.EVENT | A | 00006 | L.FAIL.S | A | 0000F | L.MAN.FA | A | 00011 | L.MODE.C | A | 0000B |
| L.NO.CLK | A | 00010 | L.09SEND | A | 00019 | L.PAR.FA | A | 00013 | L.RT.AD. | A | 00016 |
| L.RT.ENA | A | 00008 | L.RT.ON | A | 00010 | L.SEND.D | A | 0000E | L.SUB.AD | A | 00017 |
| L.TAKE.D | A | 00009 | L.TIMER | A | 00013 | L.VALID. | A | 0000A | L.VAL.LA | A | 0001B |
| L.XACK | A | 00005 | MAN | D | | MARL | A | 00006 | MAR.2 | A | 0001E |
| MAR | A | 0001F | MEMO | A | 00007 | MEM.RD | A | 00003 | MEM.WR | A | 00005 |
| MLH | A | 00001 | MLL | A | 00000 | MOVA.R | A | 006C4 | MOVD.R | A | 006C6 |
| MOVI.R | A | 006C7 | MOVOE.R | A | 006C9 | MOVO.R | A | 006C8 | MOVR.A | A | 006C0 |
| MOVR.R | A | 006CB | MOVR.S | A | 006C3 | MOVR.Y | A | 006C2 | MOVSE.R | A | 006CA |
| MOV.2.A. | A | 007C4 | MOV.2.DO | A | 007C9 | MOV.2.DS | A | 007CA | MOV.2.D. | A | 007C6 |
| MOV.2.I. | A | 007C7 | MOV.2.O. | A | 007C8 | MOV.A.R | D | | MOV.R.A | D | |

| | | | | | | | | | | | |
|---|---|---|---|---|---|---|---|---|---|---|---|
| MUXIO | D | | MUX.CONT | D | | MUX.ECWR | A | 00003 | MUX.EN.C | A | 00007 |
| MUX.EN.D | A | 0000F | MUX.IDLE | A | 0001F | MUX.READ | A | 0001E | MUX.REG. | D | |
| MUX.RT.R | A | 0001D | MUX.WR.C | A | 00013 | MUX.WR.D | A | 0001B | MVI.A | D | |
| MVI.R | D | | MXOFF | A | 0001F | NAN2.AIR | A | 00627 | NAN2.DAR | A | 00617 |
| NAN2.DIR | A | 00657 | NAN3.AIA | A | 07271 | NAN3.DAY | A | 07170 | NAN3.DIA | A | 07575 |
| NAN3.DIS | A | 07574 | NAND.A | D | | NAND.R | D | | NAN.DRA | A | 00437 |
| NAN.DRR | A | 004F7 | NAN.DRY | A | 004B7 | NAN.RAA | A | 00407 | NAN.RAR | A | 004C7 |
| NAN.RAY | A | 00487 | NAN.RIA | A | 00427 | NAN.RIR | A | 004E7 | NAN.RIY | A | 004A7 |
| NARG | A | 00000 | NEG.2.A. | A | 007F4 | NEG.2.DO | A | 007F9 | NEG.2.DS | A | 007FA |
| NEG.2.D. | A | 007F6 | NEG.2.I. | A | 007F7 | NEG.2.O. | A | 007F8 | NEG.A.R | A | 006F4 |
| NEG.D.R | A | 006F6 | NEG.I.R | A | 006F7 | NEG.OE.R | A | 006F9 | NEG.O.R | A | 006F8 |
| NEG.R.A | A | 006F0 | NEG.R.R | A | 006FB | NEG.R.S | A | 006F3 | NEG.R.Y | A | 006F2 |
| NEG.SE.R | A | 006FA | NOOP | A | 07140 | NOP | D | | NOR.A | D | |
| NOR.R | D | | NOT.A | D | | NOT.R | D | | NO.DATA. | A | 00011 |
| NR2.AIR | A | 00629 | NR2.DAR | A | 00619 | NR2.DIR | A | 00659 | NR3.AIA | A | 07291 |
| NR3.DAY | A | 07190 | NR3.DIA | A | 07595 | NR3.DIS | A | 07594 | NR.DRA | A | 00439 |
| NR.DRR | A | 004F9 | NR.DRY | A | 004B9 | NR.RAA | A | 00409 | NR.RAR | A | 004C9 |
| NR.RAY | A | 00489 | NR.RIA | A | 00429 | NR.RIR | A | 004E9 | NR.RIY | A | 004A9 |
| O9.CCUNT | A | 00017 | O9.MUX.E | A | 0001E | O9.MUX.I | A | 0001F | O9.MUX.O | A | 0001F |
| O9.MUX.R | A | 0000F | O9.MUX.S | A | 0001D | O9.MUX.W | A | 0001B | O9.SOTC. | A | 00015 |
| OEY.ON | A | 00000 | OR2.AIR | A | 0062A | OR2.DAR | A | 0061A | OR2.DIR | A | 0065A |
| OR3.AIA | A | 072A1 | OR3.DAY | A | 071A0 | OR3.DIA | A | 075A5 | OR3.DIS | A | 075A4 |
| ORI.R | D | | OR.A | D | | OR.DRA | A | 0043A | OR.DRR | A | 004FA |
| OR.DRY | A | 0048A | OR.R | D | | OR.RAA | A | 0040A | OR.RAR | A | 004CA |
| OR.RAY | A | 0048A | OR.RIA | A | 0042A | OR.RIR | A | 004EA | OR.RIY | A | 004AA |
| OUTMUX.A | D | | OUTMUX.I | D | | OUTMUX.R | D | | OUTPUT.A | D | |
| OUTPUT.I | D | | OUTPUT.R | D | | OUT.I.ST | D | | O.LIGHT | D | |
| PASS | A | 00000 | POP.STK. | D | | PUSH | S | | PXF | A | 00007 |
| PO | A | 00000 | R10 | A | 0000A | R11 | A | 0000B | R12 | A | 0000C |
| R13 | A | 0000D | R14 | A | 0000E | R15 | A | 0000F | R16 | A | 00010 |
| R17 | A | 00011 | R18 | A | 00012 | R19 | A | 00013 | R1 | A | 00001 |
| R20 | A | 00014 | R21 | A | 00015 | R22 | A | 00016 | R23 | A | 00017 |
| R24 | A | 00018 | R25 | A | 00019 | R26 | A | 0001A | R29 | A | 0001D |

| | | | | | | | | | | | |
|---|---|---|---|---|---|---|---|---|---|---|---|
| R2 | A | 00002 | R3 | A | 00003 | R4 | A | 00004 | R5 | A | 00005 |
| R6 | A | 00006 | R7 | A | 00007 | R8 | A | 00008 | R9 | A | 00009 |
| RESETO | D | | RETURN | D | | RET.C | D | | RET.IF | D | |
| RET.INCR | D | | RET.NC | D | | RET.NEG | D | | RET.NCVF | D | |
| RET.NZ | D | | RET.OVF | D | | RET.POS | D | | RET.Z | D | |
| RET | D | | RFCT | S | | ROT.A | D | | RUT.R | D | |
| RPCT | S | | SBC2.AIR | A | 00623 | SBC2.DAR | A | 00613 | SBC2.DIR | A | 00653 |

| | | | | | | | | | | | |
|---|---|---|---|---|---|---|---|---|---|---|---|
| SBC3.AIA | A | 07231 | SBC3.DAY | A | 07130 | SBC3.DIA | A | 07535 | SBC3.DIS | A | 07534 |
| SBR2.AIR | A | 00620 | SBR2.DAR | A | 00610 | SBR2.DIR | A | 00650 | SBR3.AIA | A | 07201 |
| SBR3.DAY | A | 07100 | SBR3.DIA | A | 07505 | SBR3.DIS | A | 07504 | SBRC2.AI | A | 00621 |
| SBRC2.DA | A | 00611 | SBRC2.DI | A | 00651 | SBRC3.AI | A | 07211 | SBRC3.DA | A | 07110 |
| SBRC3.DI | A | 07514 | SBRC3..D | A | 07515 | SBRC.DRA | A | 00431 | SBRC.DRR | A | 004F1 |
| SBRC.DRY | A | 004B1 | SBRC.RAA | A | 00401 | SBRC.RAR | A | 004C1 | SBRC.RAY | A | 00481 |
| SBRC.RIA | A | 00421 | SBRC.RIR | A | 004E1 | SBRC.RIY | A | 004A1 | SBR.DRA | A | 00430 |
| SBR.DRR | A | 004F0 | SBR.DRY | A | 004B0 | SBR.RAA | A | 00400 | SBR.RAR | A | 004C0 |
| SBR.RAY | A | 00480 | SBR.RIA | A | 00420 | SBR.RIR | A | 004E0 | SBR.RIY | A | 004A0 |
| SBS2.AIR | A | 00622 | SBS2.DAR | A | 00612 | SBS2.DIR | A | 00652 | SBS3.AIA | A | 07221 |
| SBS3.DAY | A | 07120 | SBS3.DIA | A | 07525 | SBS3.DIS | A | 07524 | SBSC.DRA | A | 00433 |
| SBSC.DRR | A | 004F3 | SBSC.DRY | A | 004B3 | SBSC.RAA | A | 00403 | SBSC.RAR | A | 004C3 |
| SBSC.RAY | A | 00483 | SBSC.RIA | A | 00423 | SBSC.RIR | A | 004E3 | SBSC.RIY | A | 004A3 |
| SBS.DRA | A | 00432 | SBS.DRR | A | 004F2 | SBS.DRY | A | 004B2 | SBS.RAA | A | 00402 |
| SBS.RAR | A | 004C2 | SBS.RAY | A | 00482 | SBS.RIA | A | 00422 | SBS.RIR | A | 004E2 |
| SBS.RIY | A | 004A2 | SET.A | D | | SET.LIMI | D | | SET.MAR2 | D | |

```
SE..RD.R   D             SET.R      D             SET.WR.R   D             SHDN1.D.   A   00675
SHDN1.R.   A   00665     SHCNC.D.   A   00677     SHDNC.R.   A   00667     SHDNL.D.   A   00676
SHDNL.R.   A   00666     SHDNOV.D   A   00678     SHDNOV.R   A   00668     SHDNZ.D.   A   00674
SHDNZ.R.   A   00664     SHL.A      D             SHL.R      D             SHR.A      D
SHR.R      D             SHUP1.D.   A   00671     SHUP1.R.   A   00661     SHUPL.D.   A   00672
SHUPL.R.   A   00662     SHUPZ.D.   A   00670     SHUPZ.R.   A   00660     STA        D
SUBI.A     D             SUBI.R     D             SUB.A      D             SUP.R      D
TST.A      D             TST.R      D             TWB        S             UCARRY.H   A   00022
UCARRY.L   A   00002     UJZ        S             UNEG.H     A   00023     UNEG.L     A   00003
UOFLOW.H   A   00024     UOFLOW.L   A   00004     US.NZ      A   00001     US.Z       A   00021
US.ZERO    A   00021     VECTOR     D             VEC.SET    D             VJMP       A   00004
WAIT.01    A   0000E     WAIT.02    A   00000     WAIT.03    A   0000C     WAIT.04    A   00008
WAIT.05    A   0000A     WAIT.06    A   00009     WAIT.07    A   00006     WAIT.08    A   00007
WAIT.09    A   00006     WAIT.10    A   00005     WAIT.11    A   00004     WAIT.12    A   00003
WAIT.13    A   00002     WAIT.14    A   00001     WAIT.15    A   00000     XFER.DON   A   00027
XNR2.AIR   A   00628     XNR2.DAR   A   0061B     XNR2.DIR   A   0064B     XNR3.AIA   A   07281
XNR3.DAY   A   07180     XNR3.DIA   A   07485     XNR3.DIS   A   07484     XNR.DRA    A   0043B
XNR.DRR    A   004F8     XNR.DRY    A   004B8     XNR.RAA    A   0049B     XNR.RAC    A   004CB
XNR.RAY    A   0049B     XNR.RIA    A   00423     XNR.RIR    A   004EB     XNR.RIY    A   004AB
XR2.AIR    A   00628     XR2.DAR    A   00613     XR2.DIR    A   00658     XR3.AIA    A   07281
XR3.DAY    A   07180     XR3.DIA    A   07585     XR3.DIS    A   07534     XR.DRA     A   00438
XR.DRR     A   004F8     XR.DRY     A   004B8     XR.RAA     A   00408     XR.RAR     A   004C8
XR.RAY     A   00498     XR.RIA     A   00428     XR.RIR     A   004E8     XR.RIY     A   004A8
```

Appendix B

```
                ;
                ;
                NOLIST L
     00000      ORG 0
     00000      ;
                TITLE  MUX INTERFACE PROCESSCR - A5690 VER 1.11 - 9/18/86
                ;                                               ^
                ;                                               !
                ;                               Update  -------*
                ;                                               !
                VERSION:                                        V
                ;                                  ECU H#0110  : VERSION CONTROL
                ;
                ;      *********************************************************
                ;      **************   LAST UPDATE  08/04/86  ***************
                ;      ******************   Varga     **********************
                ;      *********************************************************
                ;      ***** Written By:    REG VARGA, D. W. NARUP            ***
                ;      ***** Support By:    "    "   ,  "                     ***
                ;      ***** Group              Advanced Design               ***
                ;      *********************************************************
                ;      ***   MODIFICATIONS SINCE VER 1.00 BASELINE            ***
                ;      ***   Mod   Date      Function              Made By    ***
                ;      *********************************************************
                ;      ***   1.0   3/17/86 CHANGED BIT TO RETURN              ***
                ;      ***                 4 STATUS WORDS WHEN                ***
                ;      ***                 IT PASSES                    RMW   ***
```

```
        ***  1.0  4/08/86 DELETED WRITE OF SEQUENCE #         ***
        ***                IN TR.COMPLETE                DWN  ***
        ***  1.0  5/22/86 CORRECTED RESET REPORT BIT          ***
        ***                TO MUX.COMM                   DWN  ***
        ***  1.10 8/04/86 CHANGED TO 8797                     ***
        ***                CALCULATED SCHEDULING              ***
        ***                REMOVED TIMER CHECK FROM BIT       ***
        ***                PATCHED MEMORY BIT AROUND 8797     ***
        ***                SCHEDULE WORD                 DWN  ***
        ***  1.11 9/18/86 FIXED FLAG ERROR IN POKE       DWN  ***
        ********************************************************

1LINE    ADDR   MUX INTERFACE PROCESSOR - A5690 VER 1.11 - 9/18/86

       *******************************************************
       **  FOR THIS PROCESSOR THERE WILL ALWAYS BE A 10     **
       **  WORD TABLE RESIDENT AT SEGMENT:0000 WHICH WILL   **
       **  APPEAR AS FOLLOWS:                               **
       **                                                   **
       **    x0000 HOST HANDSHAKE/CMD       : word          **
       **    x0002 MUX HANDSHAKE/CMD ECHO   : word          **
       **    x0004 - x001F are function dependent           **
       **                                                   **
       **  THIS TABLE WILL SUBSTITUTE FOR THE HANDSHAKING   **
       **  DONE WITH THE ORIGINAL VARGA CARDS               **
       *******************************************************
1LINE    ADDR   MUX INTERFACE PROCESSOR - A5690 VER 1.11 - 9/18/86

      ***********************************************************
      ***              MUX   OPERATIONS                        **
      ***********************************************************

           THE MUX WILL OPERATE IN FOUR BASIC CONFIGURATIONS:
            1). COMPLETE DYNAMIC CENTRAL COMPUTER SIMULATION
                 ALL TASK SCHEDULING AND MESSAGE SELECTION IS
                 MADE DYNAMICALLY BY THE MUX. THIS MODE MORE
                 CLOSELY RESEMBLES THE RUN TIME ENVIRONMENT OF
                 MUX BUS DURING FLIGHT.
            2). POKE MODE - IS A SIMPLE MODE OF OPERATION IN
                 WHICH THE HOST SENDS SINGLE MESSAGES TO THE MUX
                 FOR PROCESSING. HOST CONTROLS ALL TIMING.
            3). RT SIMULATION - A DYNAMIC MODE IN WHICH THE MUX
                 WILL SIMULATE AND OR MONITOR ANY OR ALL 32 RT'S
                 ON THE 1553 MUX. (NOT YET IMPLEMENTED)
            4). TRACE MODE - A DYNAMIC MODE INWHICH A SERIES OF
                 TERMINALS MAY BE TRACED WITH MUX DATA PLACED
                 SEQUENTIALLY IN A TRACE BUFFER.

     PRESENTLY THERE ARE 4 BASIC COMMANDS THIS BOARD WILL RESPOND TO.

           ADC0 - ONBOARD BUILT-IN-TEST COMMAND
           ADC1 - TRACE MODE
           ADC2 - DYNAMIC CENTRAL COMPUTER AND REMOTE TERMINAL SIMULATION
           ADC3 - POKE COMMAND
           ADC4 - REPORTS VERSION NUMBER OF MICROCODE IN CMD ECHO
           ADC5 - MEMORY ARRAY CHECK
```

```
1LINE     ADDR    MUX INTERFACE PROCESSOR - A5690 VER 1.11 - 9/18/86

                  ;*************************************************************
                  ;**                     BUILT-IN-TEST                       **
                  ;*************************************************************
                  ;
                  ; BUILT-IN-TEST WILL BE RUN ONBOARD WHERE THE DATA IS WRAPPED
                  ; AROUND INTERNAL TO THE CT 1555 DATA TERMINAL BIT PROCESSOR AND
                  ; OFFBOARD WHERE THE DATA IS WRAPPED ARCUND ON THE BUS SIDE OF
                  ; THE TRANSCEIVER. ISOLATION RELAYS WILL INHIBIT DATA FROM REACHING
                  ; THE EXTERNAL MUX BUS. EACH BUS WILL TESTED SEPERATELY.
                  ; THE VALUE IN THE MUX TASK POINTER MUST BE SET TO A VALID MEMORY
                  ; LOCATION FOR BOTH MODES.
                  ;
                  ;      CMD.0 - ADCO - RUNS ONBOARD BIT
                  ;
                  ; THE BIT STATUS IS DEFINED AS:
                  ;
                  ;      BAD0: CPU INSTRUCTION ERRCR
                  ;      BAD1: TIMER LOAD ERRCR
                  ;      BAD2: TIMER CCUNT ERRCR
                  ;      BAD3: MEMORY WRITE TIMEOUT
                  ;      BAD4: MEMORY READ TIMECUT
                  ;      BAD5: MEMORY DATA READ <> DATA WRITTEN
                  ;      BAD6: NO HIGH SEND DATA AT TX ENABLE
                  ;      BAD7: NO LOW TAKE DATA - NO RCV DATA PRESENT
                  ;      BAD8: NO HIGH TAKE DATA
                  ;      BAD9: COMMAND SYNC ERRCR
                  ;      BADA: INVALID WORD
                  ;      BADB: DATA TRANSMITTED <> DATA RECEIVED
                  ;      BADC: DATA SYNC ERROR
                  ;      BADD: TIMER TIMEOUT ERROR
                  ;      BA10: CPU INSTRUCTION ERROR
                  ;      BA11: CPU INSTRUCTION ERROR ON MOVES
                  ;      BA12: CPU INSTRUCTION ERROR ON CLEAR
                  ;      BA13: CPU LOGICAL FUNCTION ERROR
                  ;      BA14: CPU LOGOCAL FUNCTION ERROR
                  ;      BA15: CPU ERROR ON SUBTRACT
                  ;      BA16: CPU ERROR ON JUMP
                  ;      BA17: CPU ERROR ON ROTATE
                  ;      4F4B: BUS FUNCTIONAL
                  ;
1LINE     ADDR    MUX INTERFACE PROCESSOR - A5690 VER 1.11 - 9/18/86     PAGE     5

                  ;*************************************************************
                  ;**               CENTRAL COMPUTER SIMULATION               **
                  ;*************************************************************
                  ;
                  ; CCSIM - ALLOWS THE USER TO SCHEDULE MORE THAN ONE TASK
                  ;         WITHOUT ANY FURTHER SUPPORT. THE TABLE THAT IS
                  ;         SET UP BY THE HOST IS AS FOLLOWS:
                  ;
                  ; HOST COMMUNICATION   :   WORD    :  HOST COMMUNICATION
                  ; MUX  COMMUNICATION   :   WORD    :  MUX COMMUNICATION
                  ; NEXT MUX TBL         :  POINTER  :  LINKAGE TO NEXT MUX TABLE
                  ; REMOTE TERMINAL PTR  :  POINTER  :  LOCATION OF RT TABLE
                  ; INTERRUPT INDICATOR  :   WORD    :  TASK WHICH CAUSED INTERRUPT
                  ; COUNT                :   WORD    :  # OF MESSAGES TO TRANSMIT
```

```
; BUS SELECT     (0)   :  BYTE    :  WHICH BUS
; RATE SELECT    (0)   :  BYTE    :  RATE TO TRANSMIT
; BUS.FLAGS      (0)   :  WORD    :  CONTROL FLAGS
; TRANSMIT PTR   (0)   :  POINTER :  POINTER TO TRANSMIT BUFFER
; RECEIVE PTR    (0)   :  POINTER :  POINTER TO RECEIVE BUFFER
; STATUS         (0)   :  WORD    :  STATUS OF THIS MESSAGE
;
; BUS SELECT     (1)   :  BYTE    :  WHICH BUS
; RATE SELECT    (1)   :  BYTE    :  RATE TO TRANSMIT
; BUS.FLAGS      (1)   :  WORD    :  CONTROL FLAGS
; TRANSMIT PTR   (1)   :  POINTER :  POINTER TO TRANSMIT BUFFER
; RECEIVE PTR    (1)   :  POINTER :  POINTER TO RECEIVE BUFFER
; STATUS         (1)   :  WORD    :  STATUS OF THIS MESSAGE
;
; ..... ETC.
;
; HOST COMM IS A WORD WHICH ALLOWS THE HOST TO COMMUNICATE WITH THE MUX
;          PROCESSOR. THIS WORD IS DEFINED AS:
;
;          BIT.15 -1      -> ROOT JOB ID
;          BIT.14 -1      -> BEGIN RT SIMULATION
;          BIT.13--BIT.3 -> RESERVED
;          BIT.2  -1      -> INTERRUPT AT EOT (INTR.1)
;          BIT.1  -1      -> RESET AT END OF TABLE
;          BIT.0  -1      -> WAIT AT TASK COMPLETION
;
; MUX COMM IS A WORD WHICH ALLOWS THE MUX TO COMMUNICATE WITH THE HOST
;          PROCESSOR. THIS WORD IS DEFINED AS:
;
;          BIT.15-BIT.4  -> RESERVED
;          BIT.3  -1      -> PROCESSOR WAITING FOR HOST
;          BIT.2  -1      -> MUX PROCESSOR HAS BEEN RESET
;          BIT.1  -1      -> MUX INTERRUPT 2 PENDING (ERROR)
;          BIT.0  -1      -> MUX INTERRUPT 1 PENDING (MESSAGE)
;
;     Note - All reserved bits are truly reserved. For proper operation
;          and version compatibility it is expected that reserved bits will
;          be set to zero by the user.
ILINE  ADDR   MUX INTERFACE PROCESSOR - A5690 VER 1.11 - 9/18/86    PAGE   6
;
; INTERRUPT INDICATOR = NUMBER OF TASK CAUSING THE INTERRUPT
;                       VALUE OF FFFFH => EOT INTERRUPT
;
; COUNT = NUMBER OF TASKS TO EXECUTE
;       = FFFFH = SOFT RESET
;
; BUS SELECT IS DEFINED AS:
;
;          BIT.7 - BIT.6 = RESERVED
;          BIT.5 = RELAY CONTROL 0-> ON MUX BUS
;          BIT.4 = ERROR CODE 2      * Note 1.0
;          BIT.3 = ERROR CODE 1
;          BIT.2 = ERROR CODE 0
;          BIT.1 = BUS.A.SELECT/ 0-> SELECTED
;          BIT.0 = BUS.B.SELECT/ 0-> SELECTED
;
; * NOTE 1.0 - ERROR CODES ARE AS INDICATED
```

```
;                    ERROR CODE 000 - sync late
;                               001 - sync early
;                               010 - manchester high error
;                               011 - manchester low  error
;                               100 - parity error
;                               101 - balance high
;                               110 - balance low
;                               111 - normal operation
; RATE SELECT IS DEFINED AS:
;
;              01H    = 80 TIMES/SEC
;              02H    = 40 TIMES/SEC
;              04H    = 20 TIMES/SEC
;              08H    = 10 TIMES/SEC
;              10H    =  5 TIMES/SEC
;              20H    =  2 TIMES/SEC
;              40H    =  1 TIMES/SEC
;              00H    =  0 TIMES/SEC
;
;  BUS.FLAGS ARE DEFINED AS
;
;       bit.15 -         reserved
;       bit.14 - 1->   interrupt host on error (int.2)
;       bit.13 - 1->   interrupt host on xmit  (int.1)
;       bit.12 -         reserved
;       bit.11 -         rt to rt transfer
;       bit.10 - 1->   auto answer 0-> normal
;       bit.9-bit.0 -  reserved
1LINE    ADDR    MUX INTERFACE PROCESSOR - A5690 VER 1.11 - 9/18/86

;*************************************************************
;**                        POKE METHOD                     **
;*************************************************************
;
; POKE - allows the user to send single messages all under user
;   control.  the user must issue a command of adc3 to the control
;   table of the board.  this command will be echoed in the cmd
;   echo word and cleared after the message is complete.   the mux
;   task block pointer points to the poke control table.
;
;  THE POKE CONTROL TABLE LOOKS LIKE:
;
;   POKE.FLAG      WORD
;   POKE.XMIT      POINTER         ; where is the txmit buffer
;   POKE.REC       PCINTER         ; where is receive buffer
;   POKE.STATUS    WORD            ; status of this message
;
;  POKE.FLAG HAS THE FOLLOWING MEANING
;
;            BIT.15 -         RESERVED
;            BIT.14 - 1->   INTERRUPT HOST ON ERROR (INT.2)
;            BIT.13 - 1->   INTERRUPT HOST ON XMIT  (INT.1)
;            BIT.12 -         RESERVED
;            BIT.11 -         RT TO RT TRANSFER
;            BIT.10 - 1->   AUTO ANSWER 0-> NORMAL
;            BIT.9-BIT.6 =  RESERVED
;            BIT.5 = RELAY  CONTROL 0-> ON MUX BUS
;            BIT.4 = ERROR  CODE 2     * Note 2.0
```

```
        ;            BIT.3 = ERROR CODE 1
        ;            BIT.2 = ERROR CODE 0
        ;            BIT.1 = BUS.A.SELECT/ 0-> SELECTED
        ;            BIT.0 = BUS.B.SELECT/ 0-> SELECTED
        ;
        ; * NOTE 2.0 - ERROR CODES ARE AS INDICATED
        ;
        ;              ERROR CODE 000 - sync late
        ;                         001 - sync early
        ;                         010 - manchester high error
        ;                         011 - manchester low  error
        ;                         100 - parity error
        ;                         101 - balance high
        ;                         110 - balance low
        ;                         111 - normal operation
        ;     BIT.2          = reserved for channel select offboard
        ;     BIT.1          = bus.a select/ 0-> selected
        ;     BIT.0          = bus.b select/ 0-> selected
        ;
        ;
1LINE    ADDR    MUX INTERFACE PROCESSOR - A5690 VER 1.11 - 9/18/86    PAGE    8

        ;*****************************************************
        ;**          REMOTE TERMINAL SIMULATION            **
        ;**                                                 **
        ;*****************************************************
        ;
        ; This implements the mux card as a remote terminal which
        ; can simulate/monitor any or all of 32 rts.  the pointer
        ; at tbl.rtptr points to the remote terminal table which
        ; consists of:
        ;               AN ARRAY OF 32 PCINTERS -- ONE FOR EACH RT
        ; FOLLOWED BY:  AN ARRAY OF 32 2 WORD STRUCTURES -- DEFINED AS:
        ;               FLAG WORD, STATUS WORD.
        ;
        ; The rt pointers point to an array of 32 pointers one for each
        ; subaddress of this rt.  these pointers point to the data buffer
        ; for that rt.
        ;
        ; The flag word is defined as:
        ;
        ;            BIT.15            = NOT USED
        ;            BIT.14            = INTERRUPT ON ERROR
        ;            BIT.13            = INTERRUPT ON MESSAGE
        ;            BIT.12            = 0 THEN SIMULATE, 1 THEN MONITOR
        ;            BIT.11            = NOT USED
        ;            BIT.10 - BIT.0    = RETURNED IN STATUS REPLY
        ;
        ; THE STATUS WORD IS DEFINED AS:
        ;
        ; FOR MESSAGES W/O ERRORS
        ;            BIT.15     = T/R BIT
        ;            BIT 14-10  = SUBADDRESS
        ;            BIT  9-5   = DATA WORD COUNT
        ;            BIT  4-1   = NOT USED
        ;            BIT.0      = I/O COMPLETE
```

```
                    ;
                    ; FOR MESSAGE WITH ERRORS
                    ;          ABXX = ABORT CODES
                    ;
        ADDR     MUX INTERFACE PROCESSOR - A5690 VER 1.11 - 9/18/86

                    ;*************************************************
                    ;**          REMOTE TERMINAL TRACE MODE         **
                    ;**                                             **
                    ;*************************************************
                    ;
                    ; TRACE - is a mode which allows a series of terminals
                    ;         mux bus activity to be aquired and stored sequentially
                    ;         in memory. The trace buffer contains a sequence number
                    ;         signifying its relationship to other commands, time of
                    ;         event, and status of the channel.
                    ;
                    ;   SetUp - The setup procedure for trace is identical to RT simulations
                    ;         with the following exceptions:
                    ;
                    ;   Command Block -
                    ;Intel location      X0000 - ADC1
                    ;                    X0002 - echo
                    ;                    X0004 - RT$Table PTR low
                    ;                    X0006 - RT$Table PTR high
                    ;                    X0008 - Start Address Of Trace Buffer Low
                    ;                    X000A -   "      "     "    "     "   High
                    ;                    X000C - Ccunt (i.e. Number of commands to store)
                    ;                    X000E - Address of last Sample command Low
                    ;                    X0010 -   "     "    "     "      "    High
                    ;                    X0012 - Software command
                    ;                            / exit Bit 14 = 0 -> exits trace and looks
                    ;                                                 for new command
                    ;                              hold Bit 13 = 1 -> holds trace off until
                    ;                                                 cleared by host
                    ;                    X0014 - Offset to most current Trace
                    ;                    X0016 - Sequence number in trace
                    ;
                    ;                    X0018 - Analyzer Processor command
                    ;                             XXXX software initiated analyzer
                    ;                             xxxx Hardware triggered analyzer (yyyy)
                    ;                    X001A - Echo command for Analyzer
                    ;                    X001C - Low  part pointer to Analyzer logic table
                    ;                    X001E - High Part pointer to Analyzer logic table
                    ;   Pointer Block -
                    ;             In RT simulations the pointer list in subaddress are
                    ;         pointers for data storage buffers. In Trace mode, these
                    ;         have been replaced with words which if are non zero, indicate
                    ;         that tracing is required for this subaddress. If zero, then
                    ;         this particular subaddress is not queued. Therefore, the
                    ;         subaddress pointer list pointed from RT$Sublist.RT(x) is
                    ;         32 words for trace mode.
        ADDR     MUX INTERFACE PROCESSOR - A5690 VER 1.11 - 9/18/86     PAGE   10

                    ;*********************************************
                    ;************** EQUATES **********************
                    ;*********************************************
                    ;
```

```
TIMER.97:        EQU   16H#000E
HRTEN:           EQU   6B#101000
LRTEN:           ECU   6B#001000
;
;       TIME CODE
;
TIME.0:          EQU    4H#F%
TIME.1:          EQU    4H#E%
TIME.2:          EQU    4H#D%
TIME.3:          EQU    4H#C%
TIME.4:          EQU    4H#B%
TIME.5:          EQU    4H#A%
TIME.6:          EQU    4H#9%
TIME.7:          EQU    4H#8%
TIME.8:          EQU    4H#7%
TIME.9:          EQU    4H#6%
TIME.10:         EQU    4H#5%
TIME.11:         EQU    4H#4%
TIME.12:         EQU    4H#3%
TIME.13:         EQU    4H#2%
TIME.14:         EQU    4H#1%
TIME.15:         EQU    4H#0%
;
;
;  CYCLES PER USEC = 8
;
T.1.USEC:        EQU    12D#0008%           :  1*cycles/usec
T.2.USEC:        EQU    12D#0016%           :  2*cycles/usec
T.3.USEC:        EQU    12D#0024%           :  3*cycles/usec
T.4.USEC:        EQU    12D#0032%           :  4*cycles/usec
T.5.USEC:        EQU    12D#0040%           :  5*cycles/usec
T.6.USEC:        EQU    12D#0048%           :  6*cycles/usec
T.7.USEC:        EQU    12D#0056%           :  7*cycles/usec
T.8.USEC:        EQU    12D#0064%           :  8*cycles/usec
T.9.USEC:        EQU    12D#0072%           :  9*cycles/usec
T.10.USEC:       EQU    12D#0080%           : 10*cycles/usec
T.11.USEC:       EQU    12D#0088%           : 11*cycles/usec
T.12.USEC:       EQU    12D#0096%           : 12*cycles/usec
T.13.USEC:       EQU    12D#0104%           : 13*cycles/usec
T.14.USEC:       EQU    12D#0112%           : 14*cycles/usec
T.15.USEC:       EQU    12D#0120%           : 15*cycles/usec
T.16.USEC:       EQU    12D#0128%           : 16*cycles/usec
T.17.USEC:       EQU    12D#0136%           : 17*cycles/usec
T.18.USEC:       EQU    12D#0144%           : 18*cycles/usec
T.19.USEC:       EQU    12D#0152%           : 19*cycles/usec
T.20.USEC:       EQU    12D#0160%           : 20*cycles/usec
;
WR.LIMIT:        EQU    12D#0030%           : write limit
RD.LIMIT:        EQU    12D#0030%           : read limit
LINE     ADDR   MUX INTERFACE PROCESSOR - A5690 VER 1.11 - 9/18/86     PAGE

;
VALID.WD:        EQU    12D#0016%           :  2*cycles/usec
SEND.ACK:        EQU    12D#0040%           :  5*cycles/usec
MAX.MESS:        EQU    12D#0160%           : 22*cycles/usec
MESS.RDY:        EQU    12D#0160%           : 22*cycles/usec
RESPON.GAP:      EQU    12D#0120%           : 15*cycles/usec
;
```

```
;
ONE:             EQU    B#1                       ; one=1
ZER:             EQU    B#0                       ; ZERO=0
;
                TIMER MASK
;
MASK.1:          EQU    B#0111111100000000 ;
MASK.2:          EQU    B#0010111100000000 ;
MASK.5:          EQU    B#0001111100000000 ;
MASK.10:         EQU    B#0000111100000000 ;
MASK.20:         EQU    B#0000011100000000 ;
MASK.40:         EQU    B#0000001100000000 ;
MASK.80:         EQU    B#0000000100000000 ;
;
1LINE    ADDR   MUX INTERFACE PROCESSOR - A5690 VER 1.11 - 9/18/86

;
;**************************************************************
;*********** MUX BUS CONTROL **********************************
;**************************************************************
;
BUS.A.NORMAL:    EQU    16H#8505
BUS.B.NORMAL:    EQU    16H#0585
RT.A.NORMAL:     EQU    16H#853D
RT.B.NORMAL:     EQU    16H#3D85
BUS.A.31:        EQU    16H#C07F          ; 1555 self test
BUS.A.B2:        EQU    16H#C07D          ; relay off wrap around
BUS.B.31:        EQU    16H#7FC0          ; 1555 self test
BUS.B.B2:        EQU    16H#7DC0          ; relay off wrap around
BUS.PASSIVE:     EQU    16H#8585
;
;*************************************************************
;****          1553 BUILT-IN-TEST TEST PATTERNS          ****
;*************************************************************
;
TEST.1:          EQU    16H#AAAA                 ; pattern 1
TEST.2:          EQU    16H#5555                 ; pattern 2
TEST.3:          EQU    16H#FFFF                 ; pattern 3
TEST.4:          EQU    16H#0000                 ; pattern 4
TEST.5:          EQU    16H#7FFF                 ; pattern 5
TEST.6:          EQU    16H#8000                 ; pattern 6
;
;**************************************************************
;****              BOARD COMMANDS                          ****
;**************************************************************
;
CMD.0:           EQU    H#ADC0                   ; run onboard bit command
CMD.1:           EQU    H#ADC1                   ; Trace messages
CMD.2:           EQU    H#ADC2                   ; run cc simulation - no bit
CMD.3:           EQU    H#ADC3                   ; run poke commands
CMD.4:           EQU    H#ADC4                   ; report version
CMD.5:           EQU    H#ADC5                   ; test memory array
;
1LINE    ADDR   MUX INTERFACE PROCESSOR - A5690 VER 1.11 - 9/18/86

;***************************************************************
;***                 BEGINNING OF CODE                       ***
;***************************************************************
;
```

```
00000   TOPPROG: NOP
00001            MUX.CONTROL BUS.PASSIVE          ; passive
00002            MVI.R    VERSION,R8              ; set version number to read
00003            MVI.R    DPM116.VERSION,R8
00004            LDA      R6                      ; start with register 6
00005            GO.TO    RE1                     ; begin
        ;
        CLEAR.ALL.REG:
00006            MVI.A       H#0000               ; set accum to zero
00007            STA         R0
00008            STA         R1
00009            STA         R2
0000A            STA         R3
0000B            STA         R4
0000C            STA         R5
0000D            STA         R6
0000E            STA         R7
0000F            STA         R8
00010            STA         R9
00011            STA         R10
00012            STA         R11
00013            STA         R12
00014            STA         R13
00015            STA         R14
00016            STA         R15
00017            STA         R16
00018            STA         R17
00019            STA         R18
0001A            STA         R19
0001B            STA         R20
0001C            STA         R21
0001D            STA         R22
0001E            STA         R23
0001F            STA         R24
00020            STA         R25
00021            STA         R26
00022            STA         DTR
00023            STA         FLG.REG
00024            STA         R29
00025            STA         MAP.2
00026            STA         MAR
00027            RETURN
        ;
        ;
        ;
1LINE   ADDR    MUX INTERFACE PROCESSOR - A5690 VER 1.11 - 9/18/86

        ;
        ;*****************************************************************
        ;** Dump.All.Reg - general utility procedure to dump all       ***
        ;***   registers to location 40H in user memory. Distroys MAR  ***
        ;***   accumulator, and DTR.                                   ***
        ;*****************************************************************
        ;
        DUMP.ALL.REG:
00028            LDA         MAR
00029            MVI.R       H#0020,MAR       ; set up mar report address
0002A            CALL        WR.MEM           ; write dtr first
0002B            CALL.STA    WR.MEM,DTR       ; now original MAR
```

```
00002C          LDA         R0
00002D          CALL.STA    WR.MEM,DTR      ;
00002E          LDA         R1
00002F          CALL.STA    WR.MEM,DTR      ;
000030          LDA         R2
000031          CALL.STA    WR.MEM,DTR      ;
000032          LDA         R3
000033          CALL.STA    WR.MEM,DTR      ;
000034          LDA         R4
000035          CALL.STA    WR.MEM,DTR      ;
000036          LDA         R5
000037          CALL.STA    WR.MEM,DTR      ;
000038          LDA         R6
000039          CALL.STA    WR.MEM,DTR      ;
00003A          LDA         R7
00003B          CALL.STA    WR.MEM,DTR      ;
00003C          LDA         R8
00003D          CALL.STA    WR.MEM,DTR      ;
00003E          LDA         R9
00003F          CALL.STA    WR.MEM,DTR      ;
000040          LDA         R10
000041          CALL.STA    WR.MEM,DTR      ;
000042          LDA         R11
000043          CALL.STA    WR.MEM,DTR      ;
000044          LDA         R12
000045          CALL.STA    WR.MEM,DTR      ;
000046          LDA         R13
000047          CALL.STA    WR.MEM,DTR      ;
000048          LDA         R14
000049          CALL.STA    WR.MEM,DTR      ;
00004A          LDA         R15
00004B          CALL.STA    WR.MEM,DTR      ;
00004C          LDA         R16
00004D          CALL.STA    WR.MEM,DTR      ;
00004E          LDA         R17
00004F          CALL.STA    WR.MEM,DTR      ;
000050          LDA         R18
000051          CALL.STA    WR.MEM,DTR      ;
000052          LDA         R19
000053          CALL.STA    WR.MEM,DTR      ;
000054          LDA         R20
000055          CALL.STA    WR.MEM,DTR      ;
000056          LDA         R21
000057          CALL.STA    WR.MEM,DTR      ;
000058          LDA         R22
000059          CALL.STA    WR.MEM,DTR      ;
00005A          LDA         R23
00005B          CALL.STA    WR.MEM,DTR      ;
00005C          LDA         R24
00005D          CALL.STA    WR.MEM,DTR      ;
00005E          LDA         R25
00005F          CALL.STA    WR.MEM,DTR      ;
000060          LDA         R26
000061          CALL.STA    WR.MEM,DTR      ;
000062          LDA         FLG.REG
000063          CALL.STA    WR.MEM,DTR      ;
000064          LDA         R29
000065          CALL.STA    WR.MEM,DTR      ;
000066          LDA         MAR.2
```

```
00067            CALL.STA  WR.MEM,DTR             ;
0006B            RETURN
          :
          :
          :
ADDR      MUX INTERFACE PROCESSOR - A5690 VER 1.11 - 9/1?/86    PAGE

          :
          :
          : ***********************************************************
          : ******  MEMORY WRITE - REGISTERS MAR.L MAR.H DTR       ***
          : ***********************************************************
          :
00069     WR.MEM: SET.WR.RDY.LIMIT WR.LIMIT              ; latch mar
0006A             IF.WR.RDY.TIMEOUT.THEN ABA0,DTR        ; write data
0006B             RET.INCR MAR                           ; inc memory address
          :
          :
          : ***********************************************************
          : ******  MEMORY READ  - REGISTERS MAR.L MAR.H DTR       ***
          : ***********************************************************
          :
0006C     RD.MEM: SET.RD.RDY.LIMIT  RD.LIMIT             ; latch mar
0006D             IF.RD.RDY.TIMEOUT.THEN AB90,DTR        ; read into dtr
0006E             RET.INCR MAR                           ; inc memory address
          :
          : ***********************************************************
          : ******  LOCAL MEMORY WRITE - REGISTERS MAR.2          ***
          : ***********************************************************
          :
0006F     LOC.WR.MEM: SET.MAR2.LIMIT  WR.LIMIT
00070             IF.WR.RDY.TIMEOUT.THEN ABA0,DTR        ; write data
00071             RETURN                                 ; inc memory address
          :
          :
          : ***********************************************************
          : ******  LOCAL MEMORY READ  - REGISTERS MAR2,DTR       ***
          : ***********************************************************
          :
00072     LOC.RD.MEM: SET.MAR2.LIMIT  RD.MEM             ; latch mar
00073             IF.RD.RDY.TIMEOUT.THEN AB90,DTR        ; read into dtr
00074             RETURN                                 ; inc memory address
          :
ADDR      MUX INTERFACE PROCESSOR - A5690 VER 1.11 - 9/18/86

          ;**********************************************************
          ;******* Memory Test - fill memory with sequence  *******
          ;**********************************************************
          :
00075     TST.WR:      SET.WR.RDY.LIMIT WR.LIMIT              ; latch mar
00076                  IF.WR.RDY.TIMEOUT.THEN TST.WR,DTR      ; write data
00077                  RET.INCR MAR                           ; inc memory address
          :
00078     TST.RD:      SET.RD.RDY.LIMIT  RD.LIMIT             ; latch mar
00079                  IF.RD.RDY.TIMEOUT.THEN TST.RD,DTR      ; read into dtr
0007A                  RET.INCR MAR                           ; inc memory address
          :
          :
```

```
         STARTO:
00078              CALL      CLEAR.ALL.REG
0007C              MVI.R     H#0000,MAR      ; start from known state
0007D              MVI.R     H#0000,DTR      ; clear set bus
0007E    LOOP.1:   CALL      TST.WR          ; set to zero data
0007F              INC.R     DTR             ; write data
00080              CMPI.R    H#8000,DTR      ; next data
00081              JNZ       LOOP.1          ; done ?
         ;                                   ; no then loop
00082              MVI.R     H#0000,MAR
00083              MVI.A     H#0000          ; start at 0000
00084    LOOP.3:   CALL      TST.RD          ; compare register
00085              CMP.A.R   DTR             ; get data into dtr
00086              CALL.NZ   ERR.RD          ; compare ref to memory
00087              INC.A                     ; on error abort
00088              CMPI.A    H#8000          ; next data
C0089              JZ        LOOP.2
0008A              JMP       LOOP.3          ; on zero quit
         ;                                   ; continue
0008B    LOOP.2:   MVI.R     H#0004,MAR
0008C              MVI.A     H#0004          ; point to response loc
0008D              CALL      TST.RD
0008E              CMP.A.R   DTR             ; see if memory test passed
0008F              JNZ       START           ; a 4 in dtr => passed
00090              MVI.R     H#0004,MAR      ; if not the same, then fail
00091              MVI.A     H#4F4B          ; point to response loc
00092              STA       DTR
00093              CALL      TST.WR          ; load pass code to write out
00094              JMP       START           ; write to memory
         ;
00095    ERR.WR:   MVI.R     H#ABA0,R6       ;
00096              JMP       ERROR.CODE
00097    ERR.RD:   CMPI.R    H#000E,MAR      ; error code
00098              RET.Z                     ; reading 8797 echo location?
00099              CMPI.R    H#000F,MAR      ; if so, then no error
0009A              RET.Z                     ; reading 8797 timer location?
0009B              MVI.R     H#ABB0,R6       ; if so, then no error
0009C              JMP       ERROR.CODE      ; error during read
         ;                                   ; report
         ;
LINE  ADDR   MUX INTERFACE PROCESSOR - A5690 VER 1.11 - 9/18/86    PAGE   19

         ERROR.CODE:
0009D              STA       R8
0009E              LDA       MAR             ; save last accu
0009F              STA       R1              ; get mar
000A0              LDA       DTR             ; save mar
000A1              STA       R2              ; get data
000A2              MVI.R     H#0004,MAR      ; save data
000A3              LDA       R6              ; set to error location
000A4              STA       DTR             ; get error code
000A5              CALL      TST.WR          ;
000A6              LDA       R1              ; write error code in loc 4
000A7              STA       DTR             ; get memory address of error
000A8              DEC.R     DTR             ; set to write data
000A9              CALL      TST.WR          ; set to correct address
000AA              LDA       R2              ; set correct value should be
000AB              STA       DTR
```

```
000AC              CALL     TST.WR                     ; send data read
             ;
000AD              LDA      R1                         ; get old mar
000AE              STA      MAR                        ; restore
000AF              LDA      R2                         ; get old data transfer
000B0              STA      DTR                        ; restore
000B1              LDA      R9                         ; restore accum
000B2              RETURN
             ;
000B3        START:  MUX.CONTROL BUS.PASSIVE           ; set mux bus passive
             ;
000B4              MVI.R    H#0000,MAR                 ; set mar registers to main table
000B5              MVI.R    H#0000,DTR                 ; clear all of table first
000B6              CALL     WR.MEM                     ; write mux command
000B7              CALL     WR.MEM                     ; reset mux responce
000B8              RETURN
1LINE  ADDR  MUX INTERFACE PROCESSOR - A5690 VER 1.11 - 9/18/86     PAGE   20

             ;
             ;************************************************************
             ;** INTERRUPT 1 - WRITES TASK ID, WRITES HOST.MUX     ******
             ;**              THEN WAITS FOR HOST.MUX TO BE CLEARED ******
             ;************************************************************
             ;
000B9        INT.1:  LDA      R24                      ; GET TOS
000BA              STA      MAR.2                      ; LOCAL POINTER
000BB              ADDI.R   H#0006,MAR.2               ; POINT TO INTERRUPT INDICATOR
000BC              LDA      R9                         ; get active task
000BD              STA      DTR                        ;
000BE              CALL     LOC.WR.MEM                 ;
000BF              SUBI.R   H#0005,MAR.2               ; mar to host.mux
000C0              MVI.R    H#0001,DTR                 ; write interrupt pending
000C1              CALL     LOC.WR.MEM                 ;
             ;
000C2        INT.1.LP: SET.MAR2.LIMIT RD.LIMIT,IN.1    ;
000C3              IF.RD.RDY.LIMIT.TIMEOUT.THEN INT.1.LP,DTR,IN.1  ;
000C4              NOP      IN.1                       ; wait loop for host to access
000C5              NOP      IN.1                       ;
000C6              NOP      IN.1                       ;
000C7              NOP      IN.1                       ;
000C8              NOP      IN.1                       ;
000C9              LDA      DTR,IN.1                   ;
000CA              JNZ      INT.1.LP,IN.1              ;
000CB              MVI.R    H#0000,DTR                 ; clear interrupt 1
000CC              CALL     LOC.WR.MEM                 ; zero reply
000CD              RETURN                              ;
             ;
             ;************************************************************
             ;** INTERRUPT 2 - WRITES TASK ID, WRITES HOST.MUX     ******
             ;**              THEN WAITS FOR HOST.MUX TO BE CLEARED ******
             ;************************************************************
             ;
000CE        INT.2:  LDA      R24                      ; GET TOS
000CF              STA      MAR.2                      ; LOCAL POINTER
000D0              ADDI.R   H#0006,MAR.2               ; POINT TO INTERRUPT INDICATOR
000D1              LDA      R9                         ; get active task
000D2              STA      DTR                        ;
000D3              CALL     LOC.WR.MEM                 ;
```

```
 769   000D4          SUBI.R   H#0005,MAR.2               ; mar to host.mux
 770   000D5          MVI.R    H#0002,DTR                 ; write interrupt pending
 771   000D6          CALL     LOC.WR.MEM                 ;
 772                ;
 773   000D7    INT.2.LP: SET.MAR2.LIMIT RD.LIMIT,IN.2    ; bit cleared ?
 774   000D8          IF.RD.RDY.LIMIT.TIMEOUT.THEN INT.2.LP,DTR,IN.2 ;
 775   000D9          NOP      IN.2                       ; allow host to access
 776   000DA          NOP      IN.2                       ;
 777   000DB          NOP      IN.2                       ;
 778   000DC          NOP      IN.2                       ;
 779   000DD          NOP      IN.2                       ;
 780   000DE          LDA      DTR,IN.2                   ;
 781   000DF          JNZ      INT.2.LP,IN.2              ;
1LINE   ADDR   MUX INTERFACE PROCESSOR - A5690 VER 1.11 - 9/18/86    PAGE   21

 782   000E0          MVI.R    H#0000,DTR                 ; clear interrupt 2
 783   000E1          CALL     LOC.WR.MEM                 ; zero reply
 784   000E2          RETURN                              ;
 785                ;
1LINE   ADDR   MUX INTERFACE PROCESSOR - A5690 VER 1.11 - 9/18/86    PAGE   22

 787                ;
 788                ; ***************************************************
 789                ; ******   EFFECTIVE ADDRESS CALCULATICN
 790                ; ******      PASS: ACCUM = OFFSET, DTR = SEGMENT       ***
 791                ; ******    RETURN: R26   = OFFSET, DTR = SEGMENT       ***
 792                ; ***************************************************
 793                ;
 794   000E3    EADD.CALC: STA   R26                        ; save offset
 795   000E4          ROT.R    H#4, DTR                   ; rotate segment
 796   000E5          LDA      DTR                        ; save rotated segment
 797   000E6          ANDI.R   H#000F,DTR                 ; mask for lower bits
 798   000E7          ANDI.A   H#FFF0                     ; mask for upper bits
 799   000E8          ADD.R    R26                        ; r26 has new offset
 800   000E9          JNC      NO.INC                     ;
 801   000EA          INC.R    DTR                        ;
 802   000EB    NO.INC: ROT.R  H#F,R26                    ; even boundry
 803   000EC          RETURN
 804                ;
 805                ; ***************************************************
 806                ; ******   INDIRECT - procedure to compute the indirect***
 807                ; ******        address of a pcinter                    ***
 808                ; ******     Pass - mar pointing to memory address of   ***
 809                ; ******       pointers (i.e. two words)                ***
 810                ; ******    RETURN: R26   = OFFSET, DTR = SEGMENT       ***
 811                ; ***************************************************
 812                ;
 813                INDIRECT:
 814   000ED          CALL       RD.MEM                   ; get low of rcv ptr
 815   000EE          LDA        DTR                      ; save
 816   000EF          CALL       RD.MEM                   ; get high of rcv ptr
 817   000F0          JMP        EADD.CALC                ; direct jmp no return
 818                ;
 819                ;
1LINE   ADDR   MUX INTERFACE PROCESSOR - A5690 VER 1.11 - 9/18/86    PAGE   23

 821                ;            *******************************************
 822                ;            ***********  LOOP FOR COMMAND   *************
 823                ;            *******************************************
```

```
                 ;
                 RESTART::
00F1                   CALL        CLEAR.ALL.REG          ; start from known state
000F2                  MUX.CONTROL  BUS.PASSIVE           ; set bus
000F3                  MVI.R       H#0000,MAR             ; set mar registers to main table
000F4                  CALL        RD.MEM                 ; read command word
000F5                  LDA         DTR                    ; save command word
000F6                  JZ          RESTART                ; no command then loop
000F7                  STA         R5                     ;
000F8                  CMPI.R      CMD.5,R5               ; Memory array test?
000F9                  JZ          MEMTEST                ;
000FA                  CMPI.R      CMD.4,R5               ; version command ?
000FB                  JNZ         NO.VERSION             ; no then skip
                 ;
000FC                  MVI.R       VERSION,DTR            ; report version
000FD                  MVI.R       H#0002,MAR             ; point to procer location
000FE                  CALL        WR.MEM                 ; write ucode version
000FF                  MVI.R       DPM116.VERSION,DTR     ;
00100                  CALL        WR.MEM                 ; write def file version
00101                  JMP         RE1                    ; finish up
                 ;
00102            NO.VERSION: CALL  WR.MEM                 ; echo command
00103                  CALL        INDIRECT               ; get effective pointer
00104                  LDA         DTR                    ; get segment
00105                  STA         R3                     ; copy to r3 for current segment
00106                  CMPI.R      CMD.3,R5               ; poke command ?
00107                  JZ          IPOKE.1553             ;
00108                  CMPI.R      CMD.0,R5               ; bit command?
00109                  JZ          IBUILT.IN.TEST         ;
0010A                  CMPI.R      CMD.1,R5               ; trace command ?
0010B                  JZ          TRC.BEGIN              ;
0010C                  CMPI.R      CMD.2,R5               ; cc simulation command ?
0010D                  JZ          ICCSIM                 ;
0010E                  JMP         RESTART                ; loop if no valid command
                 ;
                 IPOKE.1553:
0010F                  CALL        POKE.1553
00110                  JMP         RE1
                 ;
                 IBUILT.IN.TEST:
00111                  CALL        BUILT.IN.TEST
00112                  JMP         RE1
                 ;
                 ICCSIM:
00113                  CALL        CCSIM
00114                  JMP         RE1
                 ;
00115            MEMTEST: CALL     STARTO                 ; PERFORM MEMORY TEST
00116                  JMP         RE1                    ; COMPLETE
                 ;
LINE   ADDR      MUX INTERFACE PROCESSOR - A5690 VER 1.11 - 9/18/86     PAGE   24

00117            RE1:  MVI.R       H#0000,MAR             ; reset mux command word
00118                  MVI.R       H#0000,DTR             ; set to no command
00119                  CALL        WR.MEM                 ; write to location 0000
0011A                  CALL        WR.MEM                 ; reply echo reset
0011B                  JMP         RESTART
                 ;
```

```
ADDR   MUX INTERFACE PROCESSOR - A5690 VER 1.11 - 9/18/86    PAGE   25
       ;
       ;*****************************************************************
       ;**     POKE 1553 - TRANSMITS ONE MESSAGE FROM BUFFER           **
       ;**                                                             **
       ;**  R0 = XMIT OFFSET    R2 = RECV OFFSET    R10 = STATUS OFFSET**
       ;*****************************************************************
       ;
       POKE.1553:
0011C          MVI.R     H#0000,R6           ; clear error register
0011D          LDA       R26                 ; fetch offset
0011E          STA       MAR                 ; load mar
0011F          CALL      RD.MEM              ; get  bus control word
00120          LDA       DTR                 ; read bus control
00121          STA       R11                 ; save in flag reg for send V1.11
00122          STA       R8                  ; save control flags
00123          TST.R     BIT.0,R8            ; which bus ?
00124          JZ        ON.B                ;
00125          TST.R     BIT.1,R8            ; insure a was selected
00126          JZ        ON.A                ; yes then on bus a
00127          JMP       NO.P.BUS            ; no then bypass
00128  ON.A:   LDA       R8                  ; get old bus control word
00129          MVI.R     H#8505,R8           ; bus a normal
0012A          ROT.A     H#1                 ; shft err flag
0012B          ANDI.A    H#0078              ; mask all unused bits
0012C          OR.R      R8                  ; r8 has mux c0de
0012D          MUX.REG.CMD R8                ; not b then a
0012E          JMP       PO.CONT
       NO.P.BUS:
0012F          MUX.CONTROL BUS.PASSIVE       ; no selection made
00130          JMP       PO.CONT             ; bypass
00131  ON.B:   LDA       R8                  ; get select
00132          MVI.R     H#0585,R8           ; get b code normal
00133          ROT.A     H#9                 ; shift to upper word
00134          ANDI.A    H#7800              ; get only error codes
00135          OR.R      R8                  ; r8 now has b code
00136          MUX.REG.CMD R8                ; select bus b
       ;
       PO.CONT:
00137          CALL      INDIRECT            ; get effective pointer
00138          LDA       R26                 ; get offset
00139          STA       R0                  ; save xmit offset
0013A          CALL      INDIRECT            ; pointerize recv
0013B          LDA       R26                 ; get offset
0013C          STA       R2                  ; save recv offset
0013D          LDA       MAR                 ; save status offset
0013E          STA       R10                 ;
0013F          LDA       R0                  ; get txmit ptr
00140          STA       MAR                 ; set mar.l
00141          CALL      RD.MEM              ; get command word
00142          LDA       DTR                 ; save cw
00143          CALL      SEND.CMD            ; transmit this message
00144          LDA       R10                 ; get status ptr
00145          STA       MAR                 ; set mar.l
ADDR   MUX INTERFACE PROCESSOR - A5690 VER 1.11 - 9/18/86    PAGE   26

00146          LDA       R6                  ; get status
```

```
       00147            JNZ       POKE.ERR                    ; Jmp if error
       00148            MVI.A     H#0001                      ; no errors then 0001
       00149   POKE.ERR: STA      DTR                         ; prepare for write
       0014A            CALL      WR.MEM                      ; report status
               ;
       0014B            RETURN
1LINE   ADDR   MUX INTERFACE PROCESSOR - A5690 VER 1.11 - 9/18/86    PAGE   27

               ;
               ; ************************************************************
               ; ** TX.CMD.WORD - WILL TRANSMIT A COMMAND WORD ON THE ******
               ; **    PREVIOUSLY SELECTED BUS.                        ******
               ; **    REGISTERS USED                                  ******
               ; **                 DTR = COMMAND WORD                 ******
               ; **                                                    ******
               ; **                                                    ******
               ; ************************************************************
               ;
               TX.CMD.WORD:
       0014C            CMPI.R    H#0000,DTR                  ; command word = 0 ?
       0014D            JZ        AB08                        ; invalid command word
       0014E            JUMP.IF   DATA.PRESENT.AB02           ; some one is talking
       0014F            OUTMUX.R  DTR,MUX.WR.CMD              ; load command word
       00150            OUTMUX.R  DTR,MXOFF                   ; PAC AFTER LOAD
       00151            SET.LIMIT SEND.ACK                    ; limit till ack
       00152            LOOP.TILL.LIMIT H.SEND.DATA,AB50,MUX.EN.CMD ;
       00153            RETURN                                ; message sent
               ;
               ; ************************************************************
               ; ** TX.DAT.WORD - WILL TRANSMIT A DATA WORD ON THE    ******
               ; **    PREVIOUSLY SELECTED BUS.                        ******
               ; **    REGISTERS USED                                  ******
               ; **                 DTR = DATA    WORD                 ******
               ; **                                                    ******
               ; ************************************************************
               ;
               TX.DAT.WORD:
       00154            SET.LIMIT MAX.MESS                    ; max word length
       00155            LOOP.TILL.LIMIT L.SEND.DATA,AB52      ; transmitter busy
       00156            OUTMUX.R  DTR,MUX.WR.DAT              ; load data word
       00157            OUTMUX.R  DTR,MXOFF                   ; PAD AFTER LOAD PULSE
       00158            SET.LIMIT SEND.ACK                    ; limit till ack
       00159            LOOP.TILL.LIMIT H.SEND.DATA,AB50,MUX.EN.DAT ;
       0015A            RETURN                                ; message sent
               ;
       0015B   TX.D.DONE: SET.LIMIT MAX.MESS                  ;
       0015C            LOOP.TILL.LIMIT L.SEND.DATA,AB52      ; transmitter busy
       0015D            RETURN                                ; end loop
               ;
1LINE   ADDR   MUX INTERFACE PROCESSOR - A5690 VER 1.11 - 9/18/86    PAGE   28

               ;
               ;*******************************************************************
               ;*** TX.STAT.WRD - Procedure to send status word on selected bus ***
               ;***       Procedure assumes r9 is holding the original cmd word and flg ***
               ;***       has the selected bits to append to status word.      ***
               ;***       registers used are R9,DTR,FLG.REG                   ***
               ;*******************************************************************
```

```
;
TX.STAT.WRD:
00015E          JUMP.IF   DATA.PRESENT,AB02 & MUXIO MUX.EN.CMD ; some one is talking
0015F           LDA       R9                & MUXIO MUX.EN.CMD ; restore command word
00160           STA       DTR               & MUXIO MUX.EN.CMD ; ready in transfer req
00161           ANDI.R    H#F800,DTR        & MUXIO MUX.EN.CMD ; mask bits
00162           LDA       FLG.REG           & MUXIO MUX.EN.CMD ; get status word
00163           ANDI.A    H#07FF            & MUXIO MUX.EN.CMD ; mask upper bits of flags
00164           OR.R        DTR             & MUXIO MUX.EN.CMD ; combine
00165           OUTMUX.R DTR,                       MUX.ECWR   ; load command word
00166           OUTMUX.R DTR,                       MUX.EN.CMD ; PAD
00167           SET.LIMIT SEND.ACK          & MUXIO MUX.EN.CMD ; limit till ack
00168           LOOP.TILL.LIMIT H.SEND.DATA,AB50,   MUX.EN.CMD ;
00169           RETURN                                         ; end procedure
;
;
;*****************************************************************************
;*****   STAT.WRD.CHK - Procedure to validate status word received       ***
;*****              This procedure assumes r9 has original command word  ***
;*****                 - Registers used -    R5,R9,DTR.                  ***
;*****************************************************************************
;
STAT.WRD.CHK:
0016A        LDA      R9
0016B        STA      R5
0016C        ANDI.R H#F800,R5
0016D        LDA      DTR
0016E        ANDI.A H#F800                      ; mask accum
0016F        SUB.R    R5                        ; subtract r5 from accum
00170        JNZ      AB50                      ; wrong status
00171        RETURN                             ; end procedure
LINE   ADDR   MUX INTERFACE PROCESSOR - A5690 VER 1.11 - 9/18/86     PAGE    29

;
;*****************************************************************************
;*** TX1.STAT.WRD - Procedure to send status word on selected bus         ***
;***              - same as tx.stat.wrd - used for rt to rt transfers     ***
;***              - registers used are r2 - command word, r24 - flags     ***
;***              -                         dtr - destroyed               ***
;*****************************************************************************
;
TX1.STAT.WRD:
00172           JUMP.IF   DATA.PRESENT,AB02 & MUXIO MUX.EN.CMD ; some one is talking
00173           LDA       R2                & MUXIO MUX.EN.CMD ; restore command word
00174           STA       DTR               & MUXIO MUX.EN.CMD ; ready in transfer req
00175           ANDI.R    H#F800,DTR        & MUXIO MUX.EN.CMD ; mask bits
00176           LDA       R13               & MUXIO MUX.EN.CMD ; get status word
00177           ANDI.A    H#07FF            & MUXIO MUX.EN.CMD ; mask upper bits of flags
00178           OR.R        DTR             & MUXIO MUX.EN.CMD ; combine
00179           OUTMUX.R DTR,                       MUX.ECWR   ; load command word
0017A           OUTMUX.R DTR,                       MUX.EN.CMD ; PAD
0017B           SET.LIMIT SEND.ACK          & MUXIO MUX.EN.CMD ; limit till ack
0017C           LOOP.TILL.LIMIT H.SEND.DATA,AB50,   MUX.EN.CMD ;
0017D           RETURN                                         ; end procedure
;
;
```

```
            ;*****************************************************************
            ;*****  STAT1.WRD.CHK - Procedure to validate status word received     ***
            ;***                  - same as stat1.wrd.chk - used for rt to rt transfers ***
            ;***                  - registers used are r2 - command word, dtr - status  ***
            ;***                  -                    r5 - destroyed                   ***
            ;*****************************************************************
            ;
            STAT1.WRD.CHK:
0017E               LDA     R2                          ; get original command word
0017F               STA     R5                          ; temp command
00180               ANDI.R  H#F800,R5                   ; mask command word
00181               LDA     DTR                         ; read status word
00182               ANDI.A  H#F800                      ; mask accum
00183               SUB.R   R5                          ; subtract r5 from accum
00184               JNZ     ABE0                        ; wrong status
00185               RETURN                              ; end procedure
1LINE  ADDR   MUX INTERFACE PROCESSOR - A5690 VER 1.11 - 9/18/86     PAGE   30
            ;
            ;*****************************************************************
            ;*****  RECV.CMD.WORD - Procedure to receive a command word form the ***
            ;*****                -  previously selected data bus.              ***
            ;*****                -  Registers used - DTR.                      ***
            ;*****************************************************************
            ;
            RECV.CMD.WORD:
00186               SET.LIMIT MAX.MESS                  ; reply gap
00187               LOOP.TILL.LIMIT H.TAKE.DATA,AB54    ; wait for reply gap
            NO.GAP.RECV.CMD:                            ; RT TO RT LABEL
00188               SET.LIMIT RESPON.GAP                ; wait for status word
00189               LOOP.TILL.LIMIT L.TAKE.DATA,AB30    ; fail if not ready, bus timeout
0018A               SET.LIMIT MAX.MESS                  ; status valid at l.take.data
0018B               LOOP.TILL.LIMIT H.TAKE.DATA,AB54    ; take data hung
0018C               JUMP.IF DATA.SYNC,AB60              ; fail if data sync present
0018D               SET.LIMIT VALID.WD                  ; valid word - 2usec
0018E               INPUT.R.TILL.LIMIT L.VALID.WORD,AB10,DTR,MUX.READ ; loop till valid word
0018F               RETURN                              ; end procedure
            ;
            ;
            ;
            ;*****************************************************************
            ;*****  RECV.DATA.WORD - Procedure to receive a DATA word form the   ***
            ;*****                 -  previously selected data bus.             ***
            ;*****                 -  Registers used - DTR.                     ***
            ;*****************************************************************
            ;
            RECV.DATA.WORD:
00190               SET.LIMIT MESS.RDY                  ; till ready
00191               LOOP.TILL.LIMIT L.TAKE.DATA,AB20    ; next word
00192               SET.LIMIT MAX.MESS                  ; wait for next word
00193               LOOP.TILL.LIMIT H.TAKE.DATA,AB40    ; wait till ready
00194               SET.LIMIT VALID.WD                  ; set for valid word
00195               INPUT.R.TILL.LIMIT L.VALID.WORD,AB12,DTR,MUX.READ ; invalid word -- previous word
00196               JUMP.IF CMND.SYNC,AB70              ; wrong sync in data string
00197               RETURN                              ; end procedure
            ;
            ;
1LINE  ADDR   MUX INTERFACE PROCESSOR - A5690 VER 1.11 - 9/18/86     PAGE   31
```

```
        ;
        ;*********************************************************************
        ;*****  BLOCK.READ - Procedure to receive a block of DATA words from ***
        ;*****                - the previously selected data bus. word       ***
        ;*****                - is indicated via r4                          ***
        ;*****                -  Registers used - R4,DTR                     ***
        ;*****   WARNING - due to speed considerations, this procedure will  ***
        ;*****    return with the last data word in DTR and NOT written to   ***
        ;*****    memory. This must be accomplished by calling program       ***
        ;*********************************************************************
        ;
        BLOCK.READ:
00198          ANDI.R  H#001F,R4            ; get count
00199          JNZ     BR01                 ; 32 words ?
0019A          ADDI.R  H#0020,R4            ; make 32 words
0019B   BR01:  CALL    RECV.DATA.WORD       ; get one word
0019C   BR02:  CMPI.R  H#0001,R4            ; last word ?
0019D          RET.Z                        ; if done return w/out writ last word
0019E          LDA     R6                   ; errors in response
0019F          RET.NZ                       ; return if errors
001A0          CALL    WR.MEM               ; write data to memory
001A1          LDA     R6                   ; errors in response
001A2          RET.NZ                       ; return if errors
001A3          DEC.R   R4                   ; count = count -1
001A4          JMP     BR01                 ; get next
1LINE  ADDR  MUX INTERFACE PROCESSOR - A5690 VER 1.11 - 9/18/86    PAGE   32

        ;
        ;*************************************************************
        ;** SEND MESSAGE - WILL TRANSMIT A COMMAND WORD             **
        ;**   AND THE APPROPRIATE NUMBER OF DATA WORDS              **
        ;**   IF ERRORS THE ROUTINE IS ABORTED AND RETURNED         **
        ;**   REGISTERS     FLG.REG,DTR,R6/ERRORS,R5/COUNT          **
        ;**       ASSUMES COMMAND WORD ALREADY IN DTR               **
        ;**
        ;*************************************************************
        ;
        SEND.CMD:
001A5          TST.R   BIT.11.R11           ; get rt.rt indicator
001A6          JNZ     RT.RT.TX             ; rt is on
001A7          STA     R4                   ; save command word
001A8          SET.R   BIT.0,FLG.REG        ; set for rec command
001A9          CALL    TX.CMD.WORD          ; send command
001AA          LDA     R6                   ; errors present
001AB          RET.NZ                       ; yes then return
        ;
        ; A5690 MODE CODES
        ;
001AC   SND.01: LDA    DTR                  ; command to accum
001AD          ANDI.A  H#03E0               ; mask for mode code
001AE          JZ      MODE.CODE            ; jump if not
001AF          CMPI.A  H#03E0               ; check for all 1's
00130          JNZ     NO.MODE.CODE         ; if not then no further checks
        ;
        ;*********************************************************************
        ;** Mode Code present - check for A5690 protocol                    **
        ;*********************************************************************
```

```
                   ;
                   MODE.CODE:
         001B1             TST.R   BIT.10.DTR                 ; test for tx bit
         001B2             JNZ     MODE.REC                   ; rec mode command
         001B3             LDA     DTR                        ; get command word
         001B4             ANDI.A  H#0010                     ; test for > 16
         001B5             JZ      ONE.MODE                   ; if < 16 then only one word
         001B6             CALL    RD.MEM                     ; get next word
         001B7             CALL    TX.DAT.WRD                 ; send next data word
                   ONE.MODE:
         001B8             JMP     MODE.01                    ; complete txfer
                   MODE.REC:
         001B9             LDA     DTR                        ; get command word
         001BA             ANDI.A  H#0010                     ; check for > 16 mode code
         001BB             JZ      MODE.01                    ; yes then get status reply
         001BC             ANDI.R  H#FFE0,R4                  ; wipe mode code bits
         001BD             ADDI.R  H#0001,R4                  ; one word to receive
         001BE             JMP     RECV                       ; get receiver routine
                   MODE.01:
         001BF             ANDI.R  H#FBFF,R4                  ; fake tr bit
         001C0             JMP     RECV                       ; get receive routine
                   ;
                   ;************************************************************
1LINE    ADDR     MUX INTERFACE PROCESSOR - A5690 VER 1.11 - 9/18/86     PAGE   33

                   ;**  Normal Message Processing                            **
                   ;************************************************************
                   ;
                   NO.MODE.CODE:
         001C1             LDA     DTR                        ; command to accum
         001C2             TST.A   BIT.10                     ; tr bit set?
         001C3             JNZ     RECV                       ; yes then go to receiver
         001C4             ANDI.A  H#001F                     ; get mask
         001C5             JNZ     SND.ALL                    ; count 1-31
         001C6             ADDI.A  H#0020                     ; count =32
                   SND.ALL:
         001C7             CLR.R   BIT.0,FLG.REG              ; signal tx command
         001C8             STA     R5                         ; save count in r5
         001C9     SND.ON: CALL    RD.MEM                     ; get data from preset ptr
         001CA             LDA     R6                         ; errors ?
         001CB             RET.NZ                             ; return if errors
         001CC             CALL    TX.DAT.WORD                ; send next data word
         001CD             LDA     R6                         ; errors ?
         001CE             RET.NZ                             ; return if errors
         001CF             DEC.R   R5                         ; count=count-1
         001D0             JNZ     SND.ON                     ; loop while data
1LINE    ADDR     MUX INTERFACE PROCESSOR - A5690 VER 1.11 - 9/18/86     PAGE   34

                   ;
                   ;****************************************************
                   ;** RECV MESSAGE - WILL RECEIVE A STATUS WORD       **
                   ;**    AND THE APPROPRIATE NUMBER OF DATA WORDS     **
                   ;**   IF ERRORS THE ROUTINE IS ABORTED AND RETURNED **
                   ;**    REGISTERS     FLG.REG,DTR,R6/ERRORS,R4/COUNT  **
                   ;**         ASSUMES COMMAND WORD ALREADY IN R4      **
                   ;****************************************************
                   ;
         001D1     RECV::  TST.R   BIT.10,R11                 ; auto answer?
```

```
001D2              JNZ     AUTO.ON                        ; auto answer mode on
001D3              CALL    TX.D.DONE                      ; complete data
001D4              LDA     R2                             ; get recv ptr
001D5              STA     MAR                            ; set offset pointer
001D6              LDA     R6                             ; errors set ?
001D7              RET.NZ                                 ; yes then fail and return
001D8              CALL    RECV.CMD.WORD                  ; get status word
001D9              LDA     R6                             ; errors
001DA              RET.NZ                                 ; abort if error
001DB              CALL    WR.MEM                         ; wr to memory
001DC              LDA     R6                             ; errors
001DD              RET.NZ                                 ; fail if wr fail
001DE              LDA     R4                             ; get command word
001DF              STA     R5                             ; temp command
001E0              ANDI.R  H#F800,R5                      ; mask command word
001E1              LDA     DTR                            ; read status word
001E2              ANDI.A  H#F800                         ; mask accum
001E3              SUB.R   R5                             ; subtract r5 from accum
001E4              JNZ     ABEO                           ; wrong status
001E5              TST.R BIT.10,R4                        ; tr bit = 1
001E6              RET.Z                                  ; yes then done
001E7    REC.D1:   TST.R   BIT.15,R11                     ; test for mode codes
001E8              JZ      BLK.RD                         ; end if its a mode code
001E9              LDA     R9                             ; get original command word
001EA              ANDI.A  H#0010                         ; chk for >16
001EB              RET.Z                                  ; <16 then return
001EC              ANDI.R  H#FFE0,R4                      ; mask count
001ED              ADDI.R  H#0001,R4                      ; make count 1
001EE    BLK.RD:   CALL    BLOCK.READ                     ; get remaining block
001EF              LDA     R6                             ; get error codes
001F0              RET.NZ                                 ; return if errors
001F1              CALL    WR.MEM                         ; wr to memory
001F2              TST.R BIT.11, R11                      ; is this rt to rt
001F3              RET.NZ                                 ; if so then don't wait
001F4              SET.LIMIT D#32                         ; 4 usec
001F5              LOOP.TILL.LIMIT L.TAKE.DATA,REC.OK     ; look for additional words
001F6              JMP     AB00                           ; receiver run on
001F7    REC.OK:   RETURN
LINE  ADDR   MUX INTERFACE PROCESSOR - A5690 VER 1.11 - 9/18/86    PAGE   35
```

```
                   ;
                   ;
                   ;**************************************************************
                   ;*****   AUTO ANSWER MODE - This command will transmit normally    ****
                   ;*****                     -  and reply with status and data after a  ****
                   ;*****                     -  5 usec gap. This procedure is indicated ****
                   ;*****                     -  by bit.10 set in bus flags             ****
                   ;                          - registers used r0,r2,r4,r5,r6,mar,flag,dtr***
                   ;**************************************************************
                   ;
                   AUTO.ON:
001F8                     SET.LIMIT MAX.MESS                  ; wait for command to finish
001F9                     LOOP.TILL.LIMIT L.SEND.DATA,AB52    ; fail if overrun
001FA                     DO.LOOP    D#40                     ; set fake gap time 5.0 usec
001FB                     END.LOOP                            ; wait
001FC                     LDA     R2                          ; get to rec buffer
001FD                     STA     MAR                         ; position buffer
001FE                     LDA     R4                          ; tx word
001FF                     STA     R5                          ; tmp saver
                   ;
00200                     ANDI.A  H#F900                      ; mask for status word
00201                     SET.R   BIT.D.FLG.REG               ; set for rec command
00202                     STA     DTR                         ; get command word
00203                     CALL    TX.CMD.WORD                 ; send command
00204                     LDA     R6                          ; errors present
00205                     RET.NZ                              ; yes then return
00206                     TST.R   BIT.10,R5                   ; tr bit set
00207                     JNZ     REC.DATA                    ; getting max words
00208                     RETURN
                   REC.DATA:
00209                     ANDI.R  H#001F,R5                   ; get count
0020A                     JNZ     AUTO.2                      ; no adjust
0020B              AUTO.1: ADDI.R H#0020,R5                   ; force to 32
0020C              AUTO.2: CALL   RD.MEM                      ; get data word
0020D                     LDA     R6                          ; errors
0020E                     RET.NZ                              ; if error abort
```

```
0020F          CALL     TX.DAT.WORD                         ; send it
00210          LDA      R6                                  ; errors
00211          RET.NZ                                       ; if error abort
00212          DEC.R    R5                                  ; count=count-1
00213          JNZ      AUTO.2                              ; 32 words ?
00214          RETURN                                       ; done
ADDR  MUX INTERFACE PROCESSOR - A5690 VER 1.11 - 9/18/86    PAGE   36

      ;
      ;*********************************************************************
      ;*****  RT.RT.txfer - This procedure satifies the rt->rt protocol   ****
      ;*****               - Tx.buf(0) is transmitted first as command    ****
      ;*****               - Tx.buf(1) is transmitted next as source      ****
      ;*****               - replies are sent to rec.buf(0) in order.     ****
      ;*****               - registers used are r0,r2,r4,r5,r6,flg,mar,dtr***
      ;*********************************************************************
      ;
      RT.RT.TX:
00215          STA      R12                                 ; save command word
00216          SET.R    BIT.0,FLG.REG                       ; set for rec command
00217          CALL     TX.CMD.WORD                         ; send command
00218          LDA      R6                                  ; errors present
00219          RET.NZ                                       ; yes then return
      ;
0021A          CALL     RD.MEM                              ; get next command word
0021B          LDA      DTR                                 ; get command word
0021C          STA      R4                                  ; save command word
0021D          LDA      R6                                  ; get errors
0021E          RET.NZ                                       ; go home on error
0021F          SET.LIMIT MAX.MESS                           ; max word length
00220          LOOP.TILL.LIMIT L.SEND.DATA.A852             ; transmitter busy
00221          OUTMUX.R DTR.MUX.WR.CMD                      ; load data word
00222          OUTMUX.R DTR.MXOFF                           ; PAD AFTER LOAD
00223          SET.LIMIT SEND.ACK & MUXIO MUX.EN.CMD        ; limit till ack
00224          LOOP.TILL.LIMIT H.SEND.DATA.A850,MUX.EN.CMD  ;
00225          CALL     RECV                                ; get reply to mess 2
00226          LDA      R6                                  ; get errors
00227          RET.NZ                                       ; go home on error
00228          LDA      MAR                                 ; get current mar
00229          STA      R2                                  ; repoint to rec buff
0022A          LDA      R12                                 ; get mess 1
0022B          STA      DTR                                 ; save in dtr
0022C          STA      R4                                  ; save command word
0022D          CALL     RECV                                ; get status word for 1st cmd
0022E          RETURN
ADDR  MUX INTERFACE PROCESSOR - A5690 VER 1.11 - 9/18/86    PAGE   37
```

```
                      ;
                      ;*************************************************************
                      ;**      TASK TIMER - WAITS FOR TIMER PULSE FROM 8797 AND      **
                      ;**                   RETURNS MASK FROM LCC BASE:001C           **
                      ;**                   R14 = SCHEDULE TIMER                      **
                      ;**                   R15 = RETURNED MASK                       **
                      ;*************************************************************
                      ;
          0022F       TASK.TIMER: JUMP.IF L.EVENT,TASK.TIMER     ; wait for timer to fire
                      ;
          00230               LDA   MAR                          ; save mar
          00231               STA   R14                          ; in r14
          00232               MVI.P TIMER.97, MAR                ; point to timer word
          00233               CALL  RD.MEM                       ; get timer word from 97
          00234               LDA   DTR                          ; store timer
          00235               STA   R15                          ; save mask for return
          00236               LDA   R14                          ; restore mar
          00237               STA   MAR                          ; return w/ mask
          00238               RETURN
                      ;
1LINE     ADDR        MUX INTERFACE PROCESSOR - A5690 VER 1.11 - 9/18/86      PAGE   38

                      ;*************************************************************
                      ;**    CCSIM 1553 - DYNAMIC MUX SIMULATION OF BUS CONTROLLER   **
                      ;**                                                             **
                      ;**    REGISTERS DEDICATED:  R31 = MAR                          **
                      ;**                          R30 = MAR.2                        **
                      ;**                          R29 = N/U                          **
                      ;**                          R28 = FLAG REGISTER                **
                      ;**                          R27 = DATA TRANSFER REGISTER       **
                      ;**                          R26 = EFFECTIVE ADDR               **
                      ;**                          R25 = HOLDING REGISTER SOT FOR RT  **
                      ;**                          R24 = OFFSET OF COUNT PTR          **
                      ;**                          R15 = TASK MASK                    **
                      ;**                          R14 = TIMER TEST                   **
                      ;**                          [illegible]                        **
                      ;**                                                             **
                      ;**                                                             **
                      ;**                                                             **
                      ;**                          [illegible] NUMBER                 **
                      ;**                                                             **
                      ;**                          [illegible] COUNT                  **
                      ;**                          R6  = [illegible] REGISTER         **
                      ;**                          R5  = [illegible] (SEND.CMD)       **
                      ;**                          R4  = COUNT (RECV)                 **
                      ;**                          R3  = NU                           **
                      ;**                          R2  = RECV BUFFER OFFSET           **
                      ;**                          R1  = NU                           **
                      ;**                          R0  = XMIT BUFFER OFFSET           **
                      ;*************************************************************
                      ;
1LINE     ADDR        MUX INTERFACE PROCESSOR - A5690 VER 1.11 - 9/18/86      PAGE   39

                      ;
          00239       CCSIM:  LDA     R26                        ; fetch offset
          0023A               STA     MAR                        ; load mar = sot
          0023B               STA     R24                        ; save loc of mux.host
```

```
00230   STA     MAR.2                     ;
0023D   STA     R10                       ; save status location mess 0
0023E   ADDI.R  H#000E,R10                ; point to first status area
0023F   MVI.R   H#8000,DTR                ; clear host.mux
00240   CALL    [illegible]               ; clear host command word

00241   MVI.R   H#0000,DTR                ; set to clear mux comm
00242   CALL    WR.MEM                    ; clear mux  command word
00243   ADDI.R  H#0004,MAR                ; point to interrupt indicator
00244   CALL    WR.MEM                    ; clear interrupt indicator
        ;
00245   CCSIM.CNT: LDA      R24           ; READ HOST COMM
00246   STA         MAR.2                 ; SET TO LOCAL MAR
        ;
00247   RT.CHK: SET.MAR2.LIMIT  RD.LIMIT  ; bit cleared ?
00248   IF.RD.RDY.LIMIT.TIMEOUT.THEN RT.CHK,DTR  ;
00249   TST.R   BIT.14,DTR                ; sample rt/ccsim bit
0024A   JNZ     RT.SET
0024B   TST.R   BIT.15,DTR                ; check for root job
0024C   CALL.NZ TASK.TIMER                ; if root get schedule mask
        ;
0024D   CALL RD.MEM                       ; get count
0024E   LDA     DTR                       ; save count
0024F   JZ      SEQ.DONE                  ; if 0 then done
00250   STA     R7                        ;
00251   CMPI.A  H#FFFF                    ; check for soft reset
00252   JNZ     NO.SOFT
        ;
00253   MVI.R       H#0001,MAR            ; set mar registers to main table
00254   MVI.R       H#0004,DTR            ; clear cc simulation command
00255   CALL        WR.MEM                ;
00256   MVI.R       H#0004,DTR            ; processor reset in host.mux
00257   CALL        LOC.WR.MEM            ; write it
00258   RETURN                            ; yes then reset
        ;
00259   NO.SOFT: MVI.R      H#0000,R9     ; clear task count:
0025A   JMP         CCSIM.LP              ; its showtime folks
        ;
        ; RT sim will begin
        ;
0025B   RT.SET: ADDI.R    H#0004,MAR.2    ; set to rt.ptr
0025C   RTEX01: SET.MAR2.LIMIT RD.LIMIT   ; read first
0025D   ACCUM.IF.RD.TIMEOUT.THEN RTEX01   ; get low
0025E   INC.R       MAR.2                 ; next
0025F   RTEX02: SET.MAR2.LIMIT RD.LIMIT   ; read first
00260   IF.RD.RDY.TIME.OUT.THEN RTEX02,R0 ; get low
00261   ROT.R       H#4,R0                ; upper segment
00262   ANDI.R      H#FFF0,R0             ; mask upper of accum
00263   ADD.R       R0                    ; r0 has new offset
00264   ROT.R       H#F,R0                ; adjust register
1LINE   ADDR   MUX INTERFACE PROCESSOR - A5690 VER 1.11 - 9/18/86   PAGE   40

00265   ADDI.R      H#0001,MAR.2          ; position to count word
00266   LDA         R24                   ; get sot for rt to return from
00267   STA         R25                   ; save in r25
00268   JMP         RT.BEGIN              ; begin rt simulation
        ;
        ; CC Simulation will continue
        ;
```

```
          CCSIM.LP:
00269               CALL      RD.MEM              ; fetch bus control & rate
0026A               LDA       DTR                 ; save
0026B               STA       R8                  ; in r8
0026C               AND.A     R15                 ; time for this task
0026D               JZ        NOT.ACTIVE          ; no then not active
0026E               LDA       R15                 ; dummy for test
0026F               MVI.R     H#0000,R6           ; clear error register
00270               TST.R     BIT.0, R8           ; which bus ?
00271               JZ        CC.ON.B             ;
00272               TST.R     BIT.1,R8            ; insure a was selected
00273               JZ        CC.ON.A:            ; yes then on bus a
00274               JMP       NO.BUS              ; no then bypass
00275     CC.ON.A:  LDA       R8                  ; get old bus control word
00276               MVI.R     H#8505,R8           ; bus a normal
00277               ROT.A     H#1                 ; shft err flag
00278               ANDI.A    H#0078              ; mask all unused bits
00279               OR.R      R8                  ; r3 has mux c0de
0027A               MUX.REG.CMD R8                ; not b then a
0027B               JMP       CC.CONT
0027C     NO.BUS:   MUX.CONTROL BUS.PASSIVE       ; no selection made
0027D               JMP       CC.CONT             ; bypass
          CC.ON.B:
0027E               LDA       R8                  ; get select
0027F               MVI.R     H#0585,R8           ; get b code normal
00280               ROT.A     H#9                 ; shift to upper word
00281               ANDI.A    H#7800              ; get only error codes
00282               OR.R      R8                  ; r8 now has b code
00283               MUX.REG.CMD R8                ; select bus b
          ;
00284     CC.CONT:  CALL      RD.MEM              ; get bus control flags
00285               LDA       DTR                 ; read control
00286               STA       R11                 ; flags in r11
00287               CALL      INDIRECT            ; ponterize
00288               LDA       R26                 ; get address of tx in r0
00289               STA       R0                  ; save xmit offset
0028A               CALL      INDIRECT            ; pointerize
0028B               LDA       R26                 ; get offset
0028C               STA       R2                  ; save recv offset
0028D               LDA       MAR                 ; save status offset
0028E               STA       R10                 ; address of status word this task
0028F               LDA       R0                  ; get txmit ptr
00290               STA       MAR                 ; set mar.l
00291               CALL      RD.MEM              ; get command word
00292               LDA       DTR                 ; save cw
00293               CALL      SEND.CMD            ; transmit this message
00294               LDA       R10                 ; get status ptr
MUX INTERFACE PROCESSOR - A5690 VER 1.11 - 9/18/86    PAGE  41
LINE  ADDR
00295               STA       MAR                 ; set mar.l
00296               LDA       R6                  ; get status word for task
00297               JNZ       TASK.ERR            ; error ?
00298               MVI.A     H#0001              ; no error then 0001
00299     TASK.ERR: STA       DTR
0029A               CALL      WR.MEM              ; write status
0029B               LDA       R6                  ; error ?
0029C               JZ        NO.ERR.INT
0029D               TST.R     BIT.14,R11          ; interrupt on error ?
```

```
0029E                CALL.NZ    INT.2              ; error interrupt
          NO.ERR.INT:
0029F                TST.R      BIT.13,R11         ; interrupt on message
002A0                CALL.NZ    INT.1              ; message interrupt
002A1                JMP        CHECK.CCUNT
002A2     SEQ.DONE:  LDA        R24
002A3                STA        MAR                ; set to read host command word
002A4                CALL       RD.MEM             ; read in the host command word
002A5                LDA        DTR
002A6                STA        R13                ; save host command word in r13
002A7                TST.R      BIT.2,R13          ; interrupt on eot?
002A8                JZ         NO.EOT
          ;
002A9     TBL.INT:   MVI.R      H#FFFF,R9          ; interrupt is for eot
002AA                CALL       INT.1              ; write the eot interrupt
          ;
002AB     NO.EOT:    TST.R      BIT.0,R13          ; hold bit set?
002AC                JZ         PROCESS            ; if not, then continue
002AD                MVI.R      H#0008,DTR         ; tell host mux waitinc
002AE                LDA        R24                ; read in top of table
002AF                STA        MAR                ; set to write to memory
002B0                INC.R      MAR                ; point to correct location
002B1                CALL       WR.MEM             ; write the value
002B2                CALL       TASK.TIMER         ; wait till next window
002B3                GO.TO      SEQ.DONE           ; recheck host comm
002B4     PROCESS:   TST.R      BIT.1,R13          ; reset the mux?
002B5                JZ         SEQ.CONT           ; if a zero, then no reset
002B6                LDA        R24                ; get location of top of table
002B7                STA        MAR
002B8                INC.R      MAR                ; point to mux comm word
002B9                MVI.R      H#0004,DTR         ; show that mux was reset
002BA                CALL       WR.MEM             ; write it out
002BB                RETURN
          ;
002BC     SEQ.CONT:  LDA        R24                ; get address of tos for iopb
002BD                ADDI.A     H#0001             ; point to mux comm word
002BE                STA        MAR
002BF                MVI.R      H#0000,DTR         ; set to clear mux comm word
002C0                CALL       WR.MEM             ; clear the word
002C1                ADDI.A     H#0001             ; get linkage to next iopb
002C2                CALL.STA   INDIRECT,MAR       ; pointerize w/ mar
002C3                LDA        R26                ; get offset
002C4                STA        R24                ; save next tos ptr
002C5                ADDI.A     H#0007             ; point to the count
002C6                STA        MAR                ; position mar
LINE  ADDR   MUX INTERFACE PROCESSOR - A5690 VER 1.11 - 9/18/86    PAGE   42

002C7                STA        R10                ; position error ptr
002C8                ADDI.R     H#0006,R10         ; status word location
002C9                JMP        CCSIM.CNT          ;
002CA     NOT.ACTIVE: ADDI.R H#0006,MAR            ; pointer to next task
002CB     CHECK.COUNT: INC.R R9                    ; increment task count
002CC                LDA        R9
002CD                CMP.A.R    R7                 ; last task ?
002CE                JZ         SEQ.DONE           ;
002CF                JMP        CCSIM.LP           ; next task
          ;
          ;
```

```
1LINE     ADDR     MUX INTERFACE PROCESSOR - A5690 VER 1.11 - 9/18/86     PAGE    43

                   ;*************************************************************************
                   ;**   RT.SIM - Procedure to simulate and/or monitor any or all terminals **
                   ;**          resident on the 1553 mux. A pointer supplied from the ccsim **
                   ;**          command table points to a work space area which appears as: **
                   ;**          a 32 array of pointers one for each rt, followed by an array**
                   ;**          of 32 structures one word for flags, one word status for rt **
                   ;**          this array appears as:                                      **
                   ;**                   dcl rt$list(32) pointer:                           **
                   ;**                   dcl rt$info(32) structure (flags, status)  word:   **
                   ;**          RT(I).FLAGS HAS THE FOLLOWING MEANING                       **
                   ;**              BIT.15 - RESERVED                                       **
                   ;**              BIT.14 - interrupt host on int.2 if error               **
                   ;**              BIT.13 - interrupt host on int.1 if terminal activated  **
                   ;**              BIT.12 - 1-> monitor activity for this terminal 0-> sim **
                   ;**              BIT.11 - reserved                                       **
                   ;**   The following bits are sent with the status word for this rt       **
                   ;**              BIT.10 - message error                                  **
                   ;**              BIT.9  - instrumentation                                **
                   ;**              BIT.8  - service request                                **
                   ;**              BIT.7  - reserved                                       **
                   ;**              BIT.6  - reserved                                       **
                   ;**              BIT.5  - reserved                                       **
                   ;**              BIT.4  - Broadcast command received                     **
                   ;**              BIT.2  - Busy                                           **
                   ;**              BIT.1  - Dynamic bus control                            **
                   ;**              BIT.0  - terminal flag                                  **
                   ;*************************************************************************
                   ;**   RT(I).STATUS - is a parameter set bt the mux processor to indicate **
                   ;**        the status of the channel. Bit.0 of this word indicates no    **
                   ;**        errors and has the following meaning:                         **
                   ;**          Bit.15    - T/R bit of transfer                             **
                   ;**          Bit.14-10 - subaddress                                      **
                   ;**          Bit.9 -5  - data word count/mode code                       **
                   ;**          Bit.4 -1  - reserved                                        **
                   ;**     W/ Bit.0 = 0 -> error. See the abort codes for error definition  **
                   ;*************************************************************************
                   ;** Note 1.0 - minimal configuration for rt simulation is 32 rt$pointers**
                   ;**     32 flag words, and 32 status words. Plus 32 pointers for subadr  **
                   ;**     and 32 data words. total is 224 words minimum                    **
                   ;**                                                                      **
                   ;** Note 2.0 - for monitor commands, rt receive format is data then     **
                   ;**     status. Rt transmits format is status then data.                 **
                   ;*************************************************************************
                   ;
1LINE     ADDR     MUX INTERFACE PROCESSOR - A5690 VER 1.11 - 9/18/86     PAGE    44

                   ;****************************************************************
                   ;**    RTSIM 1553 - DYNAMIC MUX SIMULATION OF MUX BUS TERMINALS **
                   ;**                                                             **
                   ;**    REGISTERS DEDICATED:   R31 = MAR                         **
                   ;**                           R30 = MAR.2                       **
                   ;**                           R29 = N/U                         **
                   ;**                           R28 = FLAG REGISTER               **
                   ;**                           R27 = DATA TRANSFER REGISTER      **
                   ;**                           R26 = EFFECTIVE ADDR              **
                   ;**                           R25 = RETURN POINTER TO SOT CCSIM **
```

```
          ;**                                    R24 = POINTER TO HOST COMM            **
          ;**                                    R15 = TRACE REGISTER                  **
          ;**                                    R14 = SECUENCE NUMBER                 **
          ;**                                    R13 = RT TO RT FLAGS FOR RT 1         **
          ;**                                    R12 = RT TO RT DATA POINTER RT 2      **
          ;**                                    R11 = AUX FLAG REGISTER               **
          ;**                                    R10 = STATUS POINTER                  **
          ;**                                    R9  = ACTIVE RT COMMAND               **
          ;**                                    R8  = BUS CONTROL                     **
          ;**                                    R7  = TEMPORARY ERROR REGISTER        **
          ;**                                    R6  = ERROR REGISTER                  **
          ;**                                    R5  = CCUNT (SEND.CMD)                **
          ;**                                    R4  = CCUNT (RFCV)                    **
          ;**                                    R3  = RT TO RT STATUS PTR RT 1        **
          ;**                                    R2  = RT TO RT CMD WORD RT 1          **
          ;**                                    R1  = UTILITY REGISTER                **
          ;**                                    R0  = PCINTER TO RT SOT               **
          ;*************************************************************************
          ;
002D0     RT.BEGIN:  MVI.R     H#0000,R14                     ; clear the sequence number
          ;
002D1     RT.ENTRY:  MVI.R     H#0000,R11                     ; clear old flags
002D2                MVI.R     H#0000,R6                      ; clear any previous error
002D3                LDA       R25                            ; get tos table
002D4                STA       MAR.2                          ; set mar.2
002D5                LDA       R0                             ; get start address of rt.tbl
002D6                STA       MAR                            ; ready
002D7     RT.WAIT:   JUMP.IF   BUS.ACTIVE, RT.WAIT            ; wait for complete
002D8     RT.SIM:    SET.MAR2.LIMIT D#20                      ; max wait is 2 usec
002D9                IF.RD.RDY.LIMIT.TIMEOUT.THEN RT.SIM,DTR : get host.com word
002DA                TST.R     BIT.14,DTR                     ; back to ccsim?
002DB                JZ        RT.COMPLETE                    ; yes then restore registers
002DC                JUMP.IF   BUS.ACTIVE,RT.ON               ; loop waiting for activity
002DD                JMP       RT.SIM                         ; begin rt simulation
          RT.COMPLETE:
002DE                LDA       R25                            ; restore sot for ccsim
002DF                STA       R26                            ; reset pointer - begin
002E0                JMP       CCSIM                          ; back to ccsim for control
          ;
1LINE ADDR   MUX INTERFACE PROCESSOR - A5690 VER 1.11 - 9/18/86     PAGE  45

          ;
002E1     RT.ON:     MUX.CONTROL     RT.A.NORMAL              ; check bus a
002E2                NOP                                      ; setup for cmux
002E3                JUMP.IF L.TAKE.DATA,ON.BUS.A             ; on a then bus is active
002E4                MUX.CONTROL     RT.B.NORMAL              ; b is selected
002E5                NOP                                      ; pad for mux setup
002E6     ON.BUS.A:  NOP
002E7                JUMP.IF   DATA.SYNC.RT.ENTRY             ; false start on data word
002E8                SET.LIMIT       T.8.USEC                 ; ... wait
002E9                LOOP.TILL.LIMIT MRTEN, RTE.01            ; wait till address in
002EA                NOP
002EB                SET.LIMIT       T.3.USEC                 ; wait for complete
          ;
          ;  begin parsing command word for address and subaddress
          ;
002EC                INPUT.A.TILL.LIMIT LRTEN,RTE.01,MUX.RT.RD      ; loop
          ;
```

```
002ED                   NOP
002EE                   ANDI.A   H#003E                     ; mask all unused bits
002EF                   ADD.R    MAR                        ; index
                ;
                ; Index from base table to particular rt sub pointer
                ; compute the eadd of the sub block
                ;
002F0                   SET.RD.RDY.LIMIT RD.LIMIT           ; read first
002F1                   ACCUM.IF.RD.TIMEOUT.THEN RTE.RD     ; get low
002F2                   INC.R    MAR                        ; next
002F3                   SET.RD.RDY.LIMIT RD.LIMIT           ; read first
002F4                   IF.RD.RDY.TIME.OUT.THEN RTE.RD,R26  ; get low
002F5                   ROT.R    H#4,R26                    ; upper segment
002F6                   ANDI.R   H#FFF0,R26                 ; mask upper of accum
002F7                   ADD.R    R26                        ; r26 has new offset
002F8                   ROT.R    H#F,R26                    ; adjust register
002F9                   JZ       RT.ENTRY                   ; no sim?
                ;
002FA                   SET.LIMIT T.8.USEC                  ; wait only 4 usec
002FB                   INPUT.A.TILL.LIMIT HRTEN,RTE.01,MUX.RT.RD ; wait for subaddress
                ;
002FC                   NOP
002FD                   ANDI.A   H#003E                     ; mask unused bits
002FE                   JZ       RT.01x                     ; mode code check
002FF                   CMPI.A   H#003E                     ; all one's mode code?
00300                   JNZ      RT.01                      ; no match
00301     RT.01x:       SET.R    BIT.15,R11                 ; yes set the mode code bit
00302     RT.01:        ADD.R    R26                        ; rt sub address
00303                   ADDI.R   D#0063,MAR                 ; get rt.flags
00304                   SET.RD.RDY.LIMIT RD.LIMIT           ; read first
00305                   IF.RD.RDY.TIMEOUT.THEN RTE.RD,DTR   ; get low
00306                   INC.R    MAR                        ; next
00307                   LDA      MAR                        ; pointing to status word
00308                   STA      R10                        ; save status pointer
00309                   LDA      DTR                        ; get flags
0030A                   ANDI.A   H#7FFF                     ; mask bit.15 trace bit
LINE  ADDR        MUX INTERFACE PROCESSOR - A5690 VER 1.11 - 9/18/86    PAGE   46

0030B                   STA      FLG.REG                    ; save
0030C                   LDA      R26                        ; get real value
0030D                   STA      MAR                        ; read pointer
                ;
                ; Compute the index into the sub block get word and
                ;    compute its eff.address to data table
                ;
0030E                   SET.RD.RDY.LIMIT RD.LIMIT           ; read first
0030F                   ACCUM.IF.RD.TIMEOUT.THEN RTE.RD     ; get low
00310                   INC.R    MAR                        ; next
00311                   SET.RD.RDY.LIMIT RD.LIMIT           ; read first
00312                   IF.RD.RDY.TIME.OUT.THEN RTE.RD,MAR  ; get low into mar
00313                   ROT.R    H#4,MAR                    ; upper segment
00314                   ANDI.R   H#FFFC,MAR                 ; mask upper of accum
00315                   ADD.R    MAR                        ; mar has new offset
00316                   ROT.R    H#F,MAR                    ; mar points to data buffer
00317                   JNZ      RT.CMD                     ; error check
00318                   JMP      RTE.00                     ; rt sub address is zero
00319     RT.CMD:       SET.LIMIT   T.8.USEC                ; get ready for final command word
                ;
```

```
          ;
0031A                 LOOP.TILL.LIMIT H.TAKE.DATA,RTE.04 ; wait for finish
0031B                 INPUT.A    MUX.READ                ; read reply word
0031C                 STA        R4                      ; save for tx/rec
0031D                 STA        R9                      ; save copy of tx word
          ;
          ; Make a call to further operations if failures exist during
          ;  receipt of data return will bring pc to next instruction
          ;  which vectors to rt.exit
          ;
0031E                 CALL.STA RT.RUN,DTR                ; to get next address on stack
0031F                 CALL       RT.EXIT                 ; update error flags
00320                 JMP        RT.ENTRY                ; end rt pass
          ;
          ;***************************************************************
          ;** RT.RUN - a level one procedure to decide whether the command is a  ****
          ;**       transmit or recv command, indicated by bit.10 (T/R) of command ****
          ;***************************************************************
          ;
00321     RT.RUN:     TST.R      BIT.10,DTR              ; transmit message
00322                 JZ         RT.REC                  ; get ready to send data
LINE  ADDR    MUX INTERFACE PROCESSOR - A5690 VER 1.11 - 9/18/86    PAGE   47

          ;***************************************************************
          ;*** RT.TX - Procedure to respond to command for data for selected rt.   ***
          ;***     procedure decides whether to respond or monitor                 ***
          ;***     Status word is return along with requested data words.          ***
          ;***************************************************************
          ;
00323     RT.TX:      TST.R      BIT.12,FLG.REG          ; monitor?
00324                 JNZ        MON.TX                  ; yes then monitor receiption
00325                 JUMP.IF    H.VALID.WORD,RTE07      ; error in command word
00326     RT.LOOP0:   CALL       TX.STAT.WORD & MUXIC MUX.EN.CMD  ; send status word
00327                 LDA        MAR                     ; get current trace position
00328                 STA        R15                     ; save in trace register
00329                 LDA        R6                      ; check for errors
0032A                 RET.NZ                             ; return if errors
0032B                 TST.R      BIT.15,R11              ; mode codes set
0032C                 JZ         RT.MDC                  ; end if its a mode code
0032D                 LDA        R9                      ; get original command word
0032E                 ANDI.A     H#0010                  ; chk for >16
0032F                 RET.Z                              ; <16 then return
00330                 ANDI.R     H#FFE0,R4               ; mask count
00331                 ADDI.R     H#0001,R4               ; make count 1
00332     RT.MDC:     ANDI.R     H#001F,R4               ; get word count
00333                 JNZ        RT.LOOP1                ; if not count 0 jmp
00334                 ADDI.R     H#0020,R4               ; make 32 word = count
00335     RT.LOOP1:   LDA        MAR
00336                 STA        R15                     ; save trace start
00337     RT.LOOP2:   CALL       RD.MEM                  ; get next word
00338                 LDA        R6                      ; check for errors
00339                 RET.NZ                             ; return if errors
0033A                 CALL       TX.DAT.WORD             ; send next word
0033B                 LDA        R6                      ; check for errors
0033C                 RET.NZ                             ; return if errors
0033D                 DEC.R      R4                      ; count = count -1
0033E                 JNZ        RT.LOOP2                ; loop till zero
0033F                 RETURN                             ; when done update status
          ;
```

```
ADDR   MUX INTERFACE PROCESSOR - A5690 VER 1.11 - 9/18/86    PAGE   48

       ;
       ;*******************************************************************
       ;*** MON.TX - Procedure to monitor the transmit data to a selected rt.   ***
       ;***     data is sent to memory buffer as cmd...status.data....datan     ***
       ;*******************************************************************
       ;
       MON.TX:
00340              JUMP.IF H.VALID.WORD,RTE07        ; error in command word
00341              LDA     MAR                       ; get trace position
00342              STA     R15                       ; save in trace register
00343              CALL    WR.MEM                    ; save command word
00344              LDA     R6                        ; get error code
00345              RET.NZ                            ; fail out if errors
00346              CALL    RECV.CMD.WORD             ; fetch response
00347              LDA     R6                        ; get error codes
00348              RET.NZ                            ; fail out on errors
00349              CALL    WR.MEM                    ; save last read word
0034A              LDA     R6                        ; get error codes
0034B              RET.NZ                            ; fail out on errors
0034C              CALL    STAT.WRD.CHK              ; good status word?
0034D              LDA     R6                        ; any errors
0034E              RET.NZ                            ; yes, then return
0034F              TST.R   BIT.15,R11                ; is this a mode code?
00350              JZ      MON.BL                    ; end if its a mode code
00351              LDA     R9                        ; get original command word
00352              ANDI.A  H#0010                    ; chk for >16
00353              RET.Z                             ; <16 then return
00354              ANDI.R  H#FFE0,R4                 ; mask count
00355              ADDI.R  H#0001,R4                 ; make count 1
00356  MON.BL:     CALL    BLOCK.READ                ; get remaining block
00357              LDA     R6                        ; error codes
00358              RET.NZ                            ; abort on errors
00359              CALL    WR.MEM                    ; save last read word
0035A              LDA     R6                        ; get error codes
0035B              RET.NZ                            ; fail out on errors
0035C              RETURN                            ; procedure done
ADDR   MUX INTERFACE PROCESSOR - A5690 VER 1.11 - 9/18/86    PAGE   49

       ;
       ;*******************************************************************
       ;*** RT.REC - Procedure will respond to a cmd word with data and answer  ***
       ;***  with status word supplied via rt$info(flags) or monitor if the flag **
       ;***  word bit.12 is set.                                                ***
       ;*******************************************************************
       ;
       ;
       RT.REC:
0035D              JUMP.IF H.VALID.WORD,RTE07        ; error in command word
0035E              LDA     MAR                       ; get current postion
0035F              STA     R15                       ; save in trace register
00360              TST.R   BIT.12,FLG.REG            ; monitor command ?
00361              JZ      RT.R01                    ; bypass if sim only
00362              CALL    WR.MEM                    ; save save command word
00363              LDA     R6                        ; check for errors
00364              RET.NZ                            ; return if errors
00365  RT.R01:     TST.R   BIT.15,R11                ; is this a mode code?
00366              JNZ     MODE.CHK                  ; yes then procede to mode.check
```

```
00367   RT.R02:     SET.LIMIT MAX.MESS                  ; wait for next word
00369               LOOP.TILL.LIMIT L.TAKE.DATA,AB56    ; wait till next word start
        ;
00369               DO.LOOP   D#07                      ; burn time
0036A               END.LOOP                            ; get super processor so you can burn time !!!!!
0036B               JUMP.IF CMND.SYNC,REC.RT.RT         ; this is a rt to rt transfer
0036C               CALL      BLOCK.READ                ; no then get block
0036D               LDA       R6                        ; errors in procedure
0036E               RET.NZ                              ; then abort
0036F               TST.R     BIT.12,FLG.REG            ; monitor command ?
00370               JNZ       MON.NORM                  ; normal monitor status reply
00371               LDA       DTR          & MUXIC MUX.EN.CMD ; get last word
00372               STA       R1           & MUXIO MUX.EN.CMD ; hold last word
00373               CALL      TX.STAT.WRD  & MUXIO MUX.EN.CMD ; send status reply word
00374               LDA       R6                        ; errors
00375               RET.NZ                              ; return on errors
00376               LDA       R1                        ; restore last read word
00377               STA       DTR                       ; set up for write
00378               CALL      WR.MEM                    ; write to memory
00379               RETURN                              ; end procedure
        ;
0037A   MODE.CHK:   LDA       R9                        ; read command word
0037B               ANDI.A    H#0010                    ; > 16 mode code
0037C               JZ        MDC.01                    ; normal finish
0037D               MVI.R     H#0001,R4                 ; set to 1 word
0037E               JMP       RT.R02                    ; mode code w/ one data word
        MDC.01:
0037F               TST.R     BIT.12,FLG.REG            ; monitor this return?
00380               JNZ       MON.REC                   ; recv monitor
00381               CALL      TX.STAT.WRD & MUXIC MUX.EN.CMD ; send status reply word
00382               RETURN                              ; end of routine
00383   MON.NORM:   CALL      WR.MEM                    ; write last data word
00384               JMP       MON.REC                   ; monitor status word
1LINE    ADDR   MUX INTERFACE PROCESSOR - A5690 VER 1.11 - 9/18/86    PAGE  50

        ;
        ;*************************************************************************
        ; REC.Rt.Rt - Procedure to accomplish the protocol of rt to rt transfer.    *
        ;        in the transfer CW1-CW2--SW2:::::::---SW1, this procedure will allow *
        ;        for either simulation or monitoring of terminal #1 as well as either *
        ;        monitoring, simulating or cassing on terminal #2.                     *
        ;        To simulate the actions of RT to RT transfers in the case of both     *
        ;        terminals #1 and #2 are simulated, data from #2 buffer will be copied *
        ;        to terminal #1 data buffer.                                           *
        ;          Register Usage:                                                     *
        ;                   R5,R9,R10,DTR,FLG.REG,R2,R13,R3,R12                        *
        ;*************************************************************************
        ;
00385   Rec.rt.rt:   LDA     MAR            ; RESTORE ORIGINAL MAR
00386                STA     MAR.2          ; SAVE THE ORIGINAL MAR
        ;
        ; SAVE device #1 parameters
        ;
00387                LDA     R9             ; CW#1
00388                STA     R2             ; SAVE
        ;
00389                TST.R   BIT.0, R11     ; IS THIS A TRACE FUNCTION
0038A                JNZ     TRC.RT.RT      ; YES THEN JUMP
```

```
                 ;
00389                       LDA     FLG.REG           ; FLAGS#1
0038C                       STA     R13               ; SAVE
0038D                       LDA     R10               ; SW POINTER
0038E                       STA     R3                ; SAVe
                 ;
                 ;
                 ; note - parsing the command word will be necessary
                 ;
0038F                       SET.LIMIT T.8.USEC                       ; set wait
00390                       LOOP.TILL.LIMIT HRTEN,  RTT.01           ; wait till address in
00391                       NOP
00392                       SET.LIMIT T.3.USEC                       ; wait for complete
                 ;
                 ; Begin parsing command word for address and subaddress
                 ;
00393                       INPUT.A.TILL.LIMIT L3TEN,RTT.01,MUX.RT.RD     ; loop
                 ;
                 ; COMPUTE - RT INDEX
                 ;
00394                       ANDI.A H#003E                            ; MASK EXTRA BITS
00395                       ADD.A  R0                                ; ADD TO RT SOT
00396                       CALL.STA INDIRECT, MAR                   ; GET EFFECTIVE ADDRESS
00397                       LDA     R26                              ; SAVE POINTER TO RT TABLE
00398                       STA     R12                              ; SAVED
00399                       JZ      NOSIMRT                          ; IF ZERO THEN NOCARE
                 ;
                 ;   SIM IS GO, CHECK MONITOR FLAG
                 ;
0039A                       ADDI.R D#0062, MAR                       ; INDEX TO FLAG WORD
1LINE   ADDR     MUX INTERFACE PROCESSOR - A5690 VER 1.11 - 9/18/86     PAGE   51

0039B                       CALL    RD.MEM                           ; GET FLAGS
0039C                       LDA     DTR
0039D                       STA     FLG.REG                          ; SAVE IN FLAG REG
0039E                       LDA     MAR                              ; NOW POINTS TO STATUS
0039F                       STA     R10                              ; SAVE POINTER TO HOLD SW
                 ;
003A0                       SET.LIMIT MAX.MESS                       ; MAX WORD LEN
003A1                       LOOP.TILL.LIMIT H.TAKE.DATA, RTT.02 ; WAIT FOR END OF CW
003A2                       SET.LIMIT VALID.WD                       ; 2 USEC LIMIT
003A3                       INPUT.R.TILL.LIMIT L.VALID.WD, RTT.03,R9,MUX.READ ; GET CW
003A4                       TST.R   BIT.12,FLG.REG                   ; MONITOR
003A5                       JNZ     MONRT                            ; IF ZERO THEN ITS A MONITOR
1LINE   ADDR     MUX INTERFACE PROCESSOR - A5690 VER 1.11 - 9/18/86     PAGE   52

                 ;
                 ;
                 ;**************************************************************************
                 ;   Simulation of device #2 is indicated                                 *
                 ;                                                                        *
                 ;**************************************************************************
003A6            SIMRTRT:   TST.R   BIT.10,R9                 ; TEST T/R BIT
003A7                       JZ      ABE2                      ; ABORT INVALID
003A8                       CALL    TX.STAT.WRD               ; SEND STATUS WRD BACK
003A9                       LDA     R6                        ; ANY ERRORS
003AA                       RET.NZ                            ; YES, THEN RETURN
003AB                       CALL    SUB.INDEX                 ; GET TO DATA TABLE
003AC                       CALL    WORD.COUNT                ; GET NUMBER OF PASSES
```

```
003AD   SIMRTOO:   CALL    RD.MEM                 ; GET DATA WORD
003AE              LDA     R6                     ; ANY ERRORS
003AF              RET.NZ                         ; YES, THEN RETURN
003B0              CALL    LOC.WR.MEM             ; PUT IN BUFFER #1
003B1              LDA     R6                     ; ANY ERRORS
003B2              RET.NZ                         ; YES, THEN RETURN
003B3              CALL    TX.DAT.WORD            ; SEND DATA WORD
003B4              LDA     R6                     ; ANY ERRORS
003B5              RET.NZ                         ; YES, THEN RETURN
003B6              INC.R   MAR.2                  ; INCREMENT LOCAL POINTER
003B7              DEC.R   R5                     ; WORD COUNT
003B8              JNZ     SIMRTOO                ; LOOP TILL COMPLETE
003B9              JMP     DONE.RTRT              ; EL FINICO
           ;
1LINE ADDR  MUX INTERFACE PROCESSOR - A5690 VER 1.11 - 9/18/86    PAGE  53

           ;
           ;
           ;*************************************************************
           ;    Monitor data from device #2 placing data in buffer device #2   *
           ;     and device #1 buffer.                                         *
           ;*************************************************************
           ;
0038A   MONRT:     CALL    SUB.INDEX              ; GET TO DATA BUFFER
0038B              LDA     R9                     ; GET COMMAND WORD
0038C              STA     DTR                    ; SETUP FOR WRITE
0038D              CALL    WR.MEM                 ; WRITE
0038E              CALL    NO.GAP.RECV.CMD        ; GET STATUS WORD - LATE AT THIS POINT
0038F              LDA     R6                     ; ANY ERRORS
003C0              RET.NZ                         ; YES, THEN RETURN
003C1              CALL    STAT.WRD.CHK           ; CORRECT SW?
003C2              LDA     R6                     ; ANY ERRORS
003C3              RET.NZ                         ; YES, THEN RETURN
003C4              CALL    WR.MEM                 ; WRITE STATUS
003C5              CALL    WORD.COUNT             ; GET WORD LENGTH
003C6   MONRTOO:   CALL    RECV.DATA.WORD         ; GET A DATA WORD
003C7              LDA     R6                     ; ANY ERRORS
003C8              RET.NZ                         ; YES, THEN RETURN
003C9              CALL    WR.MEM                 ; SAVE IN BUFFER #2
003CA              LDA     R6                     ; ANY ERRORS
003CB              RET.NZ                         ; YES, THEN RETURN
003CC              CALL    LOC.WR.MEM             ; SAVE IN BUFFER #1
003CD              LDA     R6                     ; ANY ERRORS
003CE              RET.NZ                         ; YES, THEN RETURN
003CF              INC.R   MAR.2                  ; INCREMENT LOCAL POINTER
003D0              DEC.R   R5                     ; WORD COUNT DECREMENT
003D1              JNZ     MONRTOO                ; LOOP TILL COMPLETE
003D2              JMP     DONE.RTRT              ; EL FINICO
           ;
1LINE ADDR  MUX INTERFACE PROCESSOR - A5690 VER 1.11 - 9/18/86    PAGE  54

           ;
           ;
           ;*************************************************************
           ;    No simulation of device #2 therefore, record all data into   *
           ;     buffer #1                                                   *
           ;                                                                 *
           ;*************************************************************
           ;
```

```
              ;    FINISH COMMAND WORD THEN MONITOR DATA
              ;
00303         NOSIMRT:    SET.LIMIT MAX.MESS           ; MAX WORD LEN
00304                     LOOP.TILL.LIMIT H.TAKE.DATA, RTT.02 ; WAIT FOR END OF CW
00305                     SET.LIMIT VALID.WD           ; 2 USEC LIMIT
00306                     INPUT.R.TILL.LIMIT L.VALID.WD, RTT.03,R2,MUX.READ ; GET CW
              ;
00307                     CALL    RECV.CMD.WRD         ; GET STATUS WORD
00308                     LDA     R6                   ; ANY ERRORS
00309                     RET.NZ                       ; YES, THEN RETURN
0030A                     CALL    STAT1.WRD.CHK        ; CORRECT SW?
0030B                     LDA     R6                   ; ANY ERRORS
0030C                     RET.NZ                       ; YES, THEN RETURN
0030D                     ORI.R   H#1000, FLG.REG      ; THIS IS BASICALLY A MONITOR
0030E                     CALL    WORD.COUNT           ; GET WORD LENGTH
0030F         NOSIMOO:    CALL    RECV.DATA.WORD       ; GET A DATA WORD
003E0                     LDA     R6                   ; ANY ERRORS
003E1                     RET.NZ                       ; YES, THEN RETURN
003E2                     CALL    LOC.WR.MEM           ; SAVE IN BUFFER #1
003E3                     LDA     R6                   ; ANY ERRORS
003E4                     RET.NZ                       ; YES, THEN RETURN
003E5                     INC.R   MAR.2                ; INCREMENT LOCAL POINTER
003E6                     DEC.R   R5                   ; WORD COUNT DECREMENT
003E7                     JNZ     NOSIMOO              ; LOOP TILL COMPLETE
003E8                     JMP     DONE.RTRT            ; EL FINICO
              ;
1LINE   ADDR  MUX INTERFACE PROCESSOR - A5690 VER 1.11 - 9/18/86    PAGE    55

              ;
              ;
              ;*****************************************************************
              ;    Monitor data from both devices putting data in trace buffer  *
              ;    data will be collected even if rt #2 collection is not enabled *
              ;*****************************************************************
              ;
003E9         TRC.RT.RT:  ORI.R H#0400, R11                  ; SET TRC RT TO RT FLAG
003EA                     SET.LIMIT MAX.MESS                 ; MAX WORD LEN
003EB                     LOOP.TILL.LIMIT H.TAKE.DATA, RTT.02 ; WAIT FOR END OF CW
003EC                     SET.LIMIT VALID.WD                 ; 2 USEC LIMIT
003ED                     INPUT.R.TILL.LIMIT L.VALID.WD, RTT.03, R9, MUX.READ ; GET CW
003EE                     LDA  R9                            ; SETUP FOR WRITE
003EF                     STA  DTR                           ;
003F0                     CALL WR.MEM                        ; WRITE COMMAND WORD
003F1                     CALL NO.GAP.RECV.CMD               ; GET STATUS WORD
003F2                     LDA  R6                            ; ANY ERRORS ?
003F3                     RET.NZ                             ; YES, THEN RETURN
003F4                     CALL STAT.WRD.CHK                  ; CORRECT SW ?
003F5                     LDA  R6                            ; ANY ERRORS
003F6                     RET.NZ                             ; YES, THEN RETURN
003F7                     CALL WR.MEM                        ; WRITE STATUS
003F8                     CALL    WORD.COUNT                 ; GET WORD LENGTH
003F9         TRCRTOO:    CALL    RECV.DATA.WORD             ; GET A DATA WORD
003FA                     LDA     R6                         ; ANY ERRORS
003FB                     RET.NZ                             ; YES, THEN RETURN
003FC                     CALL    WR.MEM                     ; SAVE IN BUFFER #2
003FD                     LDA     R6                         ; ANY ERRORS
003FE                     RET.NZ                             ; YES, THEN RETURN
003FF                     DEC.R   R5                         ; WORD COUNT DECREMENT
00400                     JNZ     TRCRTOO                    ; LOOP TILL COMPLETE
```

```
00401                CALL    RECV.CMD.WORD           ; GET #1 STATUS
00402                LDA     R6                      ; ANY ERRORS
00403                RET.NZ                          ; YES, THEN RETURN
00404                CALL    STAT1.WRC.CHK           ; CHECK STAT WORD
00405                LDA     R6                      ; ANY ERRORS
00406                RET.NZ                          ; YES THEN RETURN
00407                CALL WR.MEM                     ; WRITE STATUS OF RT #1
00408                RETURN                          ; NO THEN RETURN ANYWAY
           ;
1LINE ADDR MUX INTERFACE PROCESSOR - A5690 VER 1.11 - 9/18/86   PAGE   56

           ;
           ;
00409  DONE.RTRT:    TST.R   BIT.12, FLG.REG         ; DID I SIMULATE RT #2
0040A                CALL.Z  BURN.TX                 ; IF YES THEN BURN LAST WORD
0040B                TST.R   BIT.12, R13             ; CHECK FOR MON/SIM
0040C                JNZ     MONEND                  ; YES THEN MONITOR END
0040D                CALL    TX1.STAT.WRD            ; SEND BACK RESPONSE
0040E                LDA     R6                      ; ANY ERRORS
0040F                JNZ     RT1.ERROR               ; SPECIAL ERROR CASE
00410                JMP     SW2.UPD                 ;
00411  MONEND:       CALL    RECV.CMD.WORD           ; GET #1 STATUS WORD
00412                LDA     R6                      ; ANY ERRORS
00413                JNZ     RT1.ERROR               ; SPECIAL ERROR CASE
00414                CALL    STAT1.WRD.CHK           ; CHECK THE REPLY
00415                LDA     R6                      ; ANY ERRORS
00416                JNZ     RT1.ERROR               ; SPECIAL ERROR CASE
00417                CALL LOC.WR.MEM                 ; WRITE STATUS WORD
00418  SW2.UPD:      CALL    RT.EXIT                 ; STATUS #2 UPDATE
           ;
           ;   RESTORE device #1 parameters
           ;
00419  SW1.UPD:      LDA     R3                      ; GET STATUS#1 PTR
0041A                STA     R10                     ; RESET
0041B                LDA     R13                     ; GET FLG.WORD #1
0041C                STA     FLG.REG                 ; RESET
0041D                LDA     R2                      ; CMD WRD #1
0041E                STA     R9                      ; RESET
0041F                RETURN
           ;
           ; SPECIAL ERROR CASE WHERE FAILURE OCCURS WITH RT#1 BUT REGISTERS STILL
           ; CONTAIN RT#2 VALUES - THEREFORE UPDATE RT#2 STATUS BEFORE FAILING
           ;
00420  RT1.ERROR:    LDA     R6                      ; SAVE ERROR STATUS FOR RT #1
00421                STA     R7                      ; IN R7
00422                MVI.R   H#0000, R6              ; RESTORE RT#2 STATUS - GOOD IF HERE
00423                CALL    RT.EXIT                 ; REPORT RT#2 STATUS
00424                LDA     R7                      ; RESTORE RT#1 STATUS
00425                STA     R6                      ; INTO R6
00426                JMP     SW1.UPD                 ; GO REPORT #1
           ;
           ;
1LINE ADDR MUX INTERFACE PROCESSOR - A5690 VER 1.11 - 9/18/86   PAGE   57

           ;
           ;   INDEX INTO SUB ADDRESS LIST
           ;
00427  SUB.INDEX:    LDA     R12             ; RESTORE INDIRECT MAR
```

```
00423              STA        MAR              ; NOW AT SUB POINTER LIST
00429              LDA        R9               ; GET COMMAND WORD
0042A              ROT.A      H#C              ; SHIFT CMD TO GET SUB
0042B              ANDI.A     H#003E           ; MASK SUB BITS
0042C              ADD.A      MAR              ; INDEXED POINTER
0042D              STA        MAR              ; NOW SET TO BUFFER LOCATION
0042E              CALL       INDIRECT         ; GET REAL ADDRESS
0042F              LDA        R26              ; OFFSET TO MAR
00430              STA        MAR              ; NOW AT DATA BUFFER
00431              RETURN
            ;
            ; COMMAND WORD IN R9 THEN COUNT IN R5
            ;
00432  WORD.COUNT: LDA        R9               ; GET COMMAND WORD
00433              SUBI.A     H#0001           ; GET OVER FLOW
00434              ANDI.A     H#001F           ; WORD COUNT
00435              ADDI.A     H#0001           ; INCREMENT
00436              STA        R5               ; GOT WORD LENGTH
00437              RETURN                      ; END PROCEDURE
            ;
            ; BURN OFF LAST TRANSMIT BEFORE TRANSMITTING AGAIN
            ;
00438  BURN.TX:    SET.LIMIT RESPON.GAP                  ; beginning of word
00439              LOOP.TILL.LIMIT L.TAKE.DATA,AB30      ; loop
0043A              SET.LIMIT MAX.MESS                    ; end of word
0043B              LOOP.TILL.LIMIT H.TAKE.DATA,AB54      ; take data hung
0043C              RETURN                                ; return
1LINE   ADDR   MUX INTERFACE PROCESSOR - A5690 VER 1.11 - 9/18/86    PAGE   58

            ;
            ;*******************************************************************
            ;*** MON.REC - Procedure to monitor the receive data for selected rt.  ***
            ;***       Data is sent to memory as cmd.data....datan..status       ***
            ;*******************************************************************
            ;
0043D  MON.REC:    CALL    RECV.CMD.WORD            ; get sw
0043E              LDA     R6                       ; problems with that?
0043F              RET.NZ                           ; return if errors
00440              CALL    STAT.WRD.CHK             ; was that correct
00441              LDA     R6                       ; problems with that?
00442              RET.NZ                           ; return if errors
00443              CALL    WR.MEM                   ; write status reply word
00444              LDA     R6                       ; problems with that?
00445              RET.NZ                           ; return if errors
00446              RETURN                           ; end procedure
            ;
1LINE   ADDR   MUX INTERFACE PROCESSOR - A5690 VER 1.11 - 9/18/86    PAGE   59

            ;*******************************************************************
            ;*** RT.EXIT - Procedure to complete a rt or monitor transfer. The rt   ***
            ;***    cmd word is saved in rt.info(status). and interrupts are issued ***
            ;***    if requested via rt$info(flags). This procedure is called if error***
            ;***    are encountered early in the cycle.                          ***
            ;*******************************************************************
00447  RT.EXIT:    LDA     R10                      ; recover status pointer
00448              STA     MAR                      ; set up for write
00449              LDA     R6                       ; read error codes
0044A              JNZ     RT.FAIL                  ; no errors
0044B              LDA     R9                       ; get mux message
```

```
0044C                   ROT.A   H#5                    ; remove address info
0044D                   ANDI.A  H#FFED                 ; mask reserved bits
0044E                   ADDI.A  H#0001                 ; signal success
0044F   RT.FAIL:        STA     DTR                    ; get in transfer reg
00450   HR.ERR:         SET.WR.RDY.LIMIT WR.LIMIT      ; latch mar
00451                   IF.WR.RDY.TIMEOUT.THEN WR.ERR.DTR ; write data
        ;
00452                   LDA     R6                     ; read error codes
00453                   JZ      CK.INT1                ; yes then continue
00454                   TST.R   BIT.14,FLG.REG         ; interrupt on error
00455                   CALL.NZ INT.2                  ; do interrupt procedure
00456   CK.INT1:        TST.R   BIT.13,FLG.REG         ; interrupt on eot
00457                   CALL.NZ INT.1                  ; done with interrupts
00458                   TST.R   BIT.0, R11             ; was this a trace ?
00459                   RET.Z                          ; no, then done.
0045A                   MVI.R     H#000A,MAR           ; set to trace buffer
0045B                   LDA       R15                  ; address of trace start
0045C                   CALL.STA  WR.MEM,DTR           ; write to table
0045D                   LDA       R14                  ; get sequence number
0045E                   CALL.STA  WR.MEM,DTR           ; save sequence number
0045F                   INC.R     R14                  ; increment seq number
00460                   RETURN                         ; end procedure
ADDR    MUX INTERFACE PROCESSOR - A5690 VER 1.11 - 9/19/86      PAGE   60

        ;*****************************************************************
        ;**     Trace 1553 - DYNAMIC TRACE OF SELECTED MUX BUS TERMINALS **
        ;**                                                             **
        ;**     REGISTERS DEDICATED:  R31 = MAR                         **
        ;**                           R30 = MAR.2                       **
        ;**                           R29 = N/U                         **
        ;**                           R28 = FLAG REGISTER               **
        ;**                           R27 = DATA TRANSFER REGISTER      **
        ;**                           R26 = EFFECTIVE ADDR              **
        ;**                           R25 =                             **
        ;**                           R24 =                             **
        ;**                           R15 = TRACE REGISTER              **
        ;**                           R14 = SEQUENCE NUMBER             **
        ;**                           R13 = trigger count               **
        ;**                           R12 = current MAR of data string  **
        ;**                           R11 = AUX FLAG REGISTER           **
        ;**                           R10 = STATUS POINTER              **
        ;**                           R9  = ACTIVE RT COMMAND           **
        ;**                           R8  = BUS CONTROL                 **
        ;**                           R7  = Pointer to storage buffer   **
        ;**                           R6  = ERROR REGISTER              **
        ;**                           R5  = COUNT (SEND.CMD)            **
        ;**                           R4  = COUNT (RECV)                **
        ;**                           R3  = current segment             **
        ;**                           R2  = command word #1 if rtrt     **
        ;**                           R1  = UTILITY REGISTER            **
        ;**                           R0  = POINTER TO RT SOT           **
        ;*****************************************************************
        ;
        ;*****************************************************************
        ;*** Trace command pointed by command ADC1                     ***
        ;***        Table @ 0 begins 0000 command =ADC1                ***
        ;***                         0001 echo                         ***
        ;***                         0002 RT$Table pointer low         ***
        ;***                         0003   "       "      High        ***
```

```
           ;***                     0004 Start Address Trace low          ***
           ;***                     0005   "     "      "   high          ***
           ;***                     0006 Count(i.e. number of samples)    ***
           ;***                     0007 Address of last sample low       ***
           ;***                     0008   "     "   "     "   high       ***
           ;***                     0009 Software command /exit           ***
           ;***                              bit -14 =1 -> stop trace     ***
           ;**************************************************************
           ;
ADDR   MUX INTERFACE PROCESSOR - A5690 VER 1.11 - 9/18/86    PAGE   61

       TRC.BEGIN:
00461               MVI.R     H#0000,R14           ; clear the sequence number
00462               MVI.R     H#0002,MAR           ; read table address
00463               CALL      INDIRECT             ; get table address
00464               LDA       R26                  ; save address
00465               CALL.STA  INDIRECT,R0          ; r0 = table address
00466               LDA       R26                  ; get trace buffer address
00467               STA       R7                   ; r7 = address of buffer
00468               CALL      RD.MEM               ; get count
00469               LDA       DTR                  ; count is in dtr
0046A               STA       R13                  ; R13 = count
0046B               LDA       R7                   ; buffer address
0046C               STA       MAR                  ; pointing at buffer
0046D               STA       R12                  ; position trace register
       ;
0046E  TRC.LOOP:    NOP                            ; Begin loop to sync with command
0046F               SET.LIMIT  D#103               ; start loop 13 usec quit time
00470               LOOP.TILL.LIMIT BUS.ACTIVE,TR.ENTRY ; if bus is quit then go to tr.wait
00471               JMP       TRC.LOOP             ; keep trucking
       ;
00472  TR.ENTRY:    MVI.R     H#0001,R11           ; clear old flags BIT.0=> TRACE
00473               MVI.R     H#0000,R6            ; clear any previous error
00474               MVI.R     H#0009,MAR.2         ; position mar.2 for command to start
00475               LDA       R0                   ; get start address of rt.tbl
00476               STA       MAR                  ; ready
       ;
00477  TR.WAIT:     JUMP.IF BUS.ACTIVE, TR.WAIT    ; wait for complete
00478  TR.SIM:      SET.MAR2.LIMIT D#20            ; max wait is 2 usec
00479               IF.RD.RDY.LIMIT.TIMEOUT.THEN TR.SIM,DTR ; get software trigger
0047A               TST.R     BIT.14,DTR           ; exit bit?
0047B               JZ        TR.COMPLETE          ; yes then restore registers
0047C               TST.R     BIT.13,DTR           ; hold bit on?
0047D               JNZ       TR.SIM               ; if = 1 then continuous loop
       ;
0047E               JUMP.IF BUS.ACTIVE,TR.ON       ; loop waiting for activity
0047F               JMP       TR.SIM               ; rescan waiting for data
       TR.COMPLETE:
00480               MVI.R     H#0007,MAR           ; point to table
00481               LDA       R12                  ; get current trace offset
00482               ROT.A     H#1                  ; shl 1 to get in intel format
00483               CALL.STA  WR.MEM,DTR           ; write pointer address
00484               LDA       R3                   ; get segment
00485               CALL.STA  WR.MEM,DTR           ; write segment to loc C008
00486               JMP       REI                  ; return to level one
       ;
ADDR   MUX INTERFACE PROCESSOR - A5690 VER 1.11 - 9/18/86    PAGE   62

       ;
```

```
00487   TP.ON:     MUX.CONTROL    RT.A.NORMAL                    ; check bus a
00488              NOP                                           ; setup for cmux
00489              JUMP.IF L.TAKE.DATA,TR.BUS.A                  ; on a then bus is active
0048A              MUX.CONTROL    RT.B.NORMAL                    ; b is selected
0048B              NOP                                           ; set up for cmux
0048C   TR.BUS.A:  NOP                                           ; continue setup
0048D              JUMP.IF    DATA.SYNC,TRE.03                   ; false start on data word
0043E              SET.LIMIT       T.8.USEC                      ; set wait
0049F              LOOP.TILL.LIMIT HRTEN,  TRE.01                ; wait till address in
00490              SET.LIMIT       T.3.USEC                      ; wait for complete
        ;
        ; Begin parsing command word for address and subaddress
        ;
00491              INPUT.A.TILL.LIMIT LRTEN,TRE.01,MUX.RT.RD     ; loop
        ;
00492              ANDI.A   H#003E                               ; mask all unused bits
00493              ADD.R    MAR                                  ; index
        ;
        ; Index from base table to particular rt sub pointer
        ; compute the eadd of the sub block
        ;
00494              SET.RD.RDY.LIMIT RD.LIMIT                     ; read first
00495              ACCUM.IF.RD.TIMEOUT.THEN TRE.RD               ; get low
00496              INC.R    MAR                                  ; next
00497              SET.RD.RDY.LIMIT RD.LIMIT                     ; read first
00498              IF.RD.RDY.TIME.OUT.THEN TRE.RD.R26            ; get low
00499              ROT.R    H#4,R26                              ; upper segment
0049A              ANDI.R   H#FFF0,R26                           ; mask upper of accum
0049B              ADD.R    R26                                  ; r26 has new offset
0049C              ROT.R    H#F,R26                              ; adjust register
0049D              JZ       TRC.LOOP                             ; no trace?
        ;
0049E              SET.LIMIT T.8.USEC                            ; wait only 4 usec
0049F              INPUT.A.TILL.LIMIT HRTEN,TRE.01,MUX.RT.RD ; wait for subaddress
        ;
004A0              ANDI.A   H#003E                               ; mask unused bits
004A1              JZ       TR.01x                               ; mode code check
004A2              CMPI.A   H#003E                               ; all one's mode code?
004A3              JNZ      TR.01                                ; no match
004A4   TR.01X:    SET.R    BIT.15,R11                           ; yes set the mode code bit
004A5   TR.01:     ROT.A    H#F                                  ; adjust accumlator to get proper format
004A6              ADD.R    R26                                  ; rt sub address
004A7              LDA      R26                                  ; get real value
004A8              STA      MAR                                  ; read pointer
        ;
        ; Read flag word of subaddress
        ;
00449              SET.RD.RDY.LIMIT RD.LIMIT                     ; read first
004AA              ACCUM.IF.RD.TIME.OUT.THEN TRE.RD              ; get low
004AB              JZ       TRC.LOOP                             ; zero => no trace this subaddress
004AC              LDA      R12                                  ; get current mar for data string
004AD              STA      MAR                                  ; pointing to data string
LINE   ADDR   MUX INTERFACE PROCESSOR - A5690 VER 1.11 - 9/18/86    PAGE   63

004AE              LDA      R14                                  ; sequence number
004AF              CALL.STA WR.MEM,DTR                           ; write current sequence number
004B0              INC.R    MAR                                  ; SKIP LOCATION FOR TIME TAG
        ;
004B1   TR.CMD:    SET.LIMIT    T.8.USEC                         ; get ready for final command word
```

```
004B2                   LOOP.TILL.LIMIT H.TAKE.DATA,TRE.04 ; wait for finish
004B3                   INPUT.A    MUX.READ                ; read reply word
004B4                   STA        R4                      ; save for tx/rec
004B5                   STA        R9                      ; save copy of tx word
            ;
            ; Make a call to further operations if failures exist during
            ;  receipt of data return will bring pc to next instruction
            ;  which vectors to rt.exit
            ;
004B6                   CALL.STA TR.RUN,DTR                ; to get next address on stack
004B7                   LDA        R6                      ; errors
004B8                   JZ         TR.GO                   ; trace has errors
            ;
            ;  TRACE ERROR AT THIS POINT - RELOAD MAR TO SEQUENCE NUMBER
            ;                            - INCREMENT TO STATUS USING COMMAND WORD COUNT
            ;                            - WRITE ABORT STATUS
            ;
004B9                   LDA        R12                     ; reload start address
004BA                   STA        MAR                     ; update Mar address
004BB                   ADDI.R     H#0003, MAR             ; SKIP SEQ, TIMER AND COMMAND
004BC                   TST.R      BIT.15,R11              ; mode code ?
004BD                   JZ         ERR.TRC1                ; no then bypass
004BE                   ADDI.R     H#0001,MAR              ; mode code then add 1 A5690
004BF                   LDA        R9                      ; get command word
004C0                   ANDI.A     H#0010                  ; > 16 mode code?
004C1                   JZ         ERR.TRC4                ; no then continue
004C2                   ADDI.R     H#0001,MAR              ; index one more word
004C3                   JMP        ERR.TRC4                ; complete error handling
004C4       ERR.TRC1:   TST.R      BIT.10,R11              ; was it a rt-rt txfer
004C5                   JZ         ERR.TRC2                ; if not then normal
004C6                   ADDI.R     H#0002,MAR              ; get status words and commands
004C7       ERR.TRC2:   ADDI.R     H#0001,MAR              ; normal path command and status
004C8                   LDA        R9                      ; get original command word
004C9                   ANDI.A     H#001F                  ; get word count
004CA                   JNZ        ERR.TRC3                ; not a 32 word tfer
004CB                   ADDI.A     H#0020                  ; is a 32 so adjust count
004CC       ERR.TRC3:   ADD.R      MAR                     ; index MAR
004CD       ERR.TRC4:   LDA        R6                      ; restore error code
004CE                   STA        DTR                     ; setup in dtr
004CF                   JMP        ERR.TRC5                ; error complete
            ;
004D0       TR.GO:      MVI.R      H#4F48,DTR              ; set for successful trace
004D1       ERR.TRC5:   CALL       WR.MEM                  ; save
004D2                   LDA        MAR                     ; move mar to the accumulator
004D3                   STA        R1                      ; then save it in rl
004D4                   MVI.R      H#000A,MAR              ; get response location
004D5                   LDA        R12                     ; get current memory pointer
004D6                   ROT.A      H#1                     ; shl 1 to get in intel format
004D7                   CALL.STA WR.MEM,DTR                ; write to location 14H intel
LINE  ADDR  MUX INTERFACE PROCESSOR - A5690 VER 1.11 - 9/18/86    PAGE   64

004D8                   LDA        R14                     ; get current sequence number
004D9                   CALL.STA WR.MEM,DTR                ; update sequence in memory
004DA                   LDA        R13       & ACK.EVENT   ; get original count
004DB                   CMPI.A     H#FFFF    & ACK.EVENT   ; ffff=> infinite roll over
004DC                   JZ         TRC.6     & ACK.EVENT   ; if infinite then bypass next check
004DD                   LDA        R14                     ; read current trace number
004DE                   CMP.A.R    R13                     ; at cutoff position?
```

```
004DF                 JZ        TR.DONE              ; complete?
                ;
004E0   TRC.6:        INC.R     R14                  ; next sequence number
004E1                 LDA       R1                   ; get current id
004E2                 STA       R12                  ; update pointer
004E3                 STA       MAR                  ; also restore the mar
004E4                 LDA       R12                  ; get current pointer
004E5                 CMPI.A    H#7FD9               ; reached limit?
004E6                 JNEG      ERR.CHK              ; overflow -> no limit yet
                ;
004E7                 LDA       R7                   ; reload start address
004E8                 STA       MAR                  ; update mar pointer
004E9                 STA       R12                  ; update hold pointer
                ;
004EA   ERR.CHK:      LDA       R6                   ; errors?
004EB                 JNZ       TRC.LOOP             ; if yes then resync
004EC                 JMP       TR.ENTRY             ; otherwise, normal finish of loop
                ;
                ;*********************************************************************
                ;** TR.RUN - a level one procedure to decide whether the command is a  ****
                ;**      transmit or recv command, indicated by bit.10 (T/R) of command ****
                ;*********************************************************************
                ;
004ED   TR.RUN:       SET.R     BIT.12,FLG.REG       ; force to monitor
004EE                 TST.R     BIT.10,DTR           ; transmit message
004EF                 JZ        RT.REC               ; get monitor rec
004F0                 JMP       RT.TX                ; get monitor tx
                ;
004F1   TR.DONE:      MVI.R     H#0001,MAR           ; get response location
004F2                 LDA       R14                  ; get current sequence number
004F3                 CALL.STA  WR.MEM,DTR           ; update sequence in memory
004F4                 JMP       TF.COMPLETE          ; Finish response
LINE  ADDR    MUX INTERFACE PROCESSOR - A5690 VER 1.11 - 9/18/86    PAGE   65

                ;
                ;*****************************************************************
                ;**************  MUX ERROR CODES  *********************************
                ;*****************************************************************
                ;
                ; Inline errors from rt sim for these errors no terminal has yet
                ;  been identified. Therefore they must be handled differently
                ;
004F5   RTE.00: MVI.R     H#EB00,R6            ; subaddress field compute C000
004F6           JMP       RT.ERR
004F7   RTE.01: MVI.R     H#EB02,R6            ;
004F8           JMP       RT.ERR
004F9   RTT.01: MVI.R     H#EB02, R6           ; CMD PARSE ERROR RT-RT CW2
004FA           POP.STK.N.JMP RT.ERR           ; RESTORE STACK
004FB   RTT.02: MVI.R     H#EB02, R6           ; RT TO RT CW2 ERROR TAKE DATA
004FC           POP.STK.N.JMP RT.ERR           ; RESTORE STACK
004FD   RTT.03: MVI.R     H#EB03, R6           ; RT TO RT CW2 INVALID
004FE           POP.STK.N.JMP RT.ERR           ; RESTORE STACK
004FF   RTE.04: MVI.R     H#EB04,R6            ;
00500           JMP       RT.ERR
00501   RTE.05: MVI.R     H#EB06,R6            ;
00502           JMP       RT.ERR
00503   RTE07:  MVI.R     H#EB08,R6            ; invalid command word
00504           TST.R     BIT.0, R11           ; come from trace?
00505           RET.NZ                         ; yes then return from whence you came
```

```
00506              POP.STK.N.JMP RT.ENTRY          ; came from a call so pop
00507   RTE.RD:  MVI.R      H#EB0A,R5               ;
00508            JMP        RT.ERR
00509   RT.ERR:  TST.R      BIT.0, R11              ; did I come from trace?
0050A            JNZ        TR.ERR                  ; yes, then get your ass out of here!
0050B            JMP        RT.ENTRY
        ;
0050C   TRE.01:  MVI.R      H#EB02,R6               ;
0050D            JMP        TR.ERR
0050E   TRE.03:  MVI.R      H#EB10,R6               ; error data sync found
0050F            JMP        TR.ERR
00510   TRE.04:  MVI.R      H#EB04,R6               ;
00511            JMP        TR.ERR
00512   TRE.RD:  MVI.R      H#EB0A,R6               ;
00513            JMP        TR.ERR
00514   TR.ERR:  JMP        TRC.LOOP                ; on error resync with bus
        ;
        ; Normal error path. Set error code in r6 and return to caller
        ;
00515   AB00:    MVI.R      H#AB00,R6               ; data present at start
00516            JMP        AB.PATH
00517   AB02:    MVI.R      H#AB02,R6               ; collision data present at start
00518            JMP        AB.PATH
00519   AB08:    MVI.R      H#AB08,R6               ; command word = 0
0051A            JMP        AB.PATH
0051B   AB10:    MVI.R      H#AB10,R6               ; invalid data word
0051C            JMP        AB.PATH
0051D   AB12:    MVI.R      H#AB12,R6               ; invalid status word
 ADDR   MUX INTERFACE PROCESSOR - A5690 VER 1.11 - 9/18/86    PAGE   66

0051E            JMP        AB.PATH
0051F   AB20:    MVI.R      H#AB20,R6               ; interqap timeout
00520            JMP        AB.PATH
00521   AB30:    MVI.R      H#AB30,R6               ; reply timeout
00522            JMP        AB.PATH
00523   AB32:    MVI.R      H#AB32,R6               ; timeout in recv
00524            JMP        AB.PATH
00525   AB40:    MVI.R      H#AB40,R6               ; invalid intramessage gap
00526            JMP        AB.PATH
00527   AB50:    MVI.R      H#AB50,R6               ; no high send take data at xmit
00528            JMP        AB.PATH
00529   AB52:    MVI.R      H#AB52,R6               ; no low  send data at xmit
0052A            JMP        AB.PATH
0052B   AB54:    MVI.R      H#AB54,R6               ; no high take data on recv
0052C            JMP        AB.PATH
0052D   AB56:    MVI.R      H#AB56,R6               ; no low  take data on recv
0052E            JMP        AB.PATH
0052F   AB60:    MVI.R      H#AB60,R6               ; status word sync error
00530            JMP        AB.PATH
00531   AB70:    MVI.R      H#AB70,R5               ; data word sync error
00532            JMP        AB.PATH
00533   AB90:    MVI.R      H#AB90,R6               ; fail multibus read
00534            JMP        AB.PATH
00535   ABA0:    MVI.R      H#ABA0,R6               ; fail multibus write
00536            JMP        AB.PATH
00537   ABE0:    MVI.R      H#ABE0,R6               ; wrong rt in status word
00538            JMP        AB.PATH
00539   ABE2:    MVI.R      H#ABE2,R6               ; INVALID RT.RT TXFER TR SET
0053A            JMP        AB.PATH
```

```
        0053B    AB.PATH: RETURN                                  ; global error path
                 ;
LLINE   ADDR     MUX INTERFACE PROCESSOR - A5690 VER 1.11 - 9/18/86     PAGE   67
                 ;
                 ;**************************************************************************
                 ;*****   BUILT-IN-TEST  - TESTS CPU FUNCTIONS                          ****
                 ;*****                  - TESTS USEC TIMER                             ****
                 ;*****                  - TESTS MEMORY ACCESS TO CONTROL TABLE         ****
                 ;*****                  - TESTS 1553 INTERFACE                         ****
                 ;**************************************************************************
                 ;
                 BUILT.IN.TEST:
        0053C              MVI.R      H#0000,DTR                  ; cpu instruction check
        0053D              MVI.A      H#0000                      ; load acc
        0053E    CPU.LP:   CMP.A.R    DTR                         ; compare
        0053F              JNZ        B.ERR.0                     ; cpu error
        00540              MVI.A      H#0000                      ; clear acc
        00541              JZ         CONT.BIT                    ; check for zero bit
        00542              JMP        B.ERR.0                     ; cpu error
                 CONT.BIT:
        00543              LDA        DTR                         ; dtr to acc
        00544              CMP.A.R    DTR                         ; compare
        00545              JNZ        B.ERR.0                     ; cpu error
        00546              INC.R      DTR                         ; increment both
        00547              INC.A
        00548              CMPI.R     H#FFFF,DTR                  ; end of loop
        00549              JNZ        CPU.LP
                 ;
                 CPU.CHECK:
        0054A              MVI.A      H#0000
        0054B              MVI.R      H#0000,R1                   ;do a zero check
        0054C              JNZ        B.ERR.10                    ;if not a zero, then an error
        0054D              DINC.R     R1
        0054E              JZ         B.ERR.10                    ;make sure not a zero
        0054F              CMPI.R     H#0002,R1                   ;now check for correct value
        00550              JNZ        B.ERR.10
        00551              MVI.R      H#FFFF,R2
        00552              INC.R      R2                          ;should roll over to zero
        00553              CMP.A.R    R2                          ;compare with accumaltor which is 0
        00554              JNZ        B.ERR.10
        00555              MVI.R      H#FFFF,R3                   ;check for all bits set
        00556              CMP.A.R    R3
        00557              JZ         B.ERR.11
        00558              MVI.R      H#5A5A,R4                   ;check to set alternate bits
        00559              CMPI.R     H#5A5A,R4
        0055A              JNZ        B.ERR.11
        0055B              MVI.R      H#A5A5,R5
        0055C              CMPI.R     H#A5A5,R5
        0055D              JNZ        B.ERR.11
        0055E              MOV.R.A    R4
        0055F              CMPI.A     H#5A5A
        00560              JNZ        B.ERR.11
        00561              MOV.A.R    R6                          ;test register to accumlator moves
        00562              CMPI.R     H#5A5A,R6
        00563              JNZ        B.ERR.11
        00564              CMP.A.R    R6
LLINE   ADDR     MUX INTERFACE PROCESSOR - A5690 VER 1.11 - 9/18/86     PAGE   68
```

```
00565          JNZ        B.ERR.11
00566          LDA        R5
00567          STA        R7
00568          CMPI.A     H#A5A5
00569          JNZ        B.ERR.11
0056A          CMP.A.R    R7
0056B          JNZ        B.ERR.11
0056C          DDEC.R     R1                   ;decrement r1 to zero
0056D          MVI.A      H#0001               ;set accumaltor to one
0056E          CMP.A.R    R1                   ;test to see if same
0056F          JZ         B.ERR.12             ;error if they are
00570          DEC.A
00571          CMP.A.R    R1                   ;test the accumaltor decrement
00572          JNZ        B.ERR.12
00573          CMPI.R     H#0000,R1
00574          JNZ        B.ERR.12             ;verify it is a zero
00575          MVI.R      H#1248,R8            ;load test pattern
00576          LDA        R8
00577          ADD.A      R8                   ;double the value in the accum
00578          ANDI.A     H#AAAA               ;use a mask
00579          CMPI.A     H#2080               ;correct value?
0057A          JNZ        B.ERR.13
0057B          ADDI.R     H#EDB7,R8            ;set r9 to ffffh
0057C          JZ         B.ERR.13
0057D          MVI.R      H#109F,R9
0057E          SUB.A      R9                   ;subtract off its old value
0057F          CMPI.A     H#0FE1               ;correct value in accum?
00580          JNZ        B.ERR.13
00581          SUBI.A     H#0FE0
00582          JZ         B.ERR.13             ;accum set to 1; no jump
00583          OR.A       R9
00584          ROT.A      H#4
00585          ROT.R      H#4,R9
00586          CMP.A.R    R9                   ;should be the same value
00587          JNZ        B.ERR.14
00588          MVI.R      H#B708,R10
00589          LDA        R10
0058A          NAND.A     R10
0058B          CMPI.A     H#48F7               ;is the value correct?
0058C          JNZ        B.ERR.14
0058D          EXOR.A     R10
0058E          CMPI.A     H#FFFF
0058F          JNZ        B.ERR.14
00590          STA        R11
00591          INC.A
00592          EXNOR.R    R10
00593          CMPI.R     H#48F7,R10
00594          JNZ        B.ERR.14
00595          MVI.R      H#1248,R11
00596          SHL.R      R11
00597          ANDI.R     H#FFFE,R11
00598          CMPI.R     H#2490,R11
00599          JNZ        B.ERR.15
0059A          MVI.A      H#1248
```

LLINE ADDR MUX INTERFACE PROCESSOR - A5690 VER 1.11 - 9/18/86 PAGE 69

```
0059B          OR.R       R11
0059C          CMPI.R     H#36DB,R11
0059D          JNZ        B.ERR.15
```

```
0059E              SUBI.R     H#15C9,R11
0059F              CMPI.R     H#210F,R11
005A0              JNZ        B.ERR.15
005A1              MVI.R      H#A5A5,R12
005A2              ANDI.R     H#5A24,R12
005A3              CMPI.R     H#0024,R12
005A4              JNZ        B.ERR.16
005A5              ADDI.R     H#FFDC,R12
005A6              JNZ        B.ERR.16
005A7              DEC.P      R12
005A8              CMPI.R     H#FFFF,R12
005A9              JNZ        B.ERR.16
005AA              GO.TO      N.BIT
005AB              RESETO
005AC     N.BIT:   MVI.R      H#55AA,R13
005AD              ROT.R      H#8,R13
005AE              CMPI.R     H#AA55,R13
005AF              JNZ        B.ERR.17
005B0              MVI.R      H#FFFE,R13
005B1              MVI.R      H#0001,R14
005B2              DO.LOOP    H#00F
005B3                ROT.R    H#1,R13              ;rotate a zero through
005B4                ROT.R    H#1,R14              ;rotate a one through
005B5              END.LOOP
005B6              CMPI.R     H#FFFE,R13
005B7              JNZ        B.ERR.17
005B8              CMPI.R     H#0001,R14
005B9              JNZ        B.ERR.17
005BA              MVI.R      H#7FFF,R15
005BB              MVI.R      H#8000,R16
005BC              DO.LOOP    H#00F
005BD                ROT.R    H#1,R15
005BE                ROT.R    H#1,R16
005BF              END.LOOP
005C0              CMPI.R     H#7FFF,R15
005C1              JNZ        B.ERR.17
005C2              CMPI.R     H#8000,R16
005C3              JNZ        B.ERR.17
005C4              MVI.R      H#005A,R16
005C5              DO.LOOP    H#007
005C6                SHL.R    R16
005C7              END.LOOP
005C8              CMPI.R     H#5A00,R16
005C9              JNZ        B.ERR.17
          ;
005CA     TIMEOK:  MVI.R      H#0000,R6            ; clear error register
005CB              LDA        R26                  ; get offset
005CC              STA        MAR                  ; set mar.l
005CD              ADDI.R     H#0005,MAR           ; offset to status
005CE              MVI.R      H#ABF0,DTR           ; test to dtr
005CF              CALL       WR.MEM               ; write memory
1LINE  ADDR   MUX INTERFACE PROCESSOR - A5690 VER 1.11 - 9/18/86   PAGE   70

005D0              LDA        R6                   ; get status
005D1              JNZ        B.ERR.3              ; error ?
005D2              DEC.R      MAR                  ; restore mar
005D3              CALL       RD.MEM               ; read memory
005D4              LDA        R6                   ; get status
005D5              JNZ        B.ERR.4              ; error ?
```

```
005D6          CMPI.R     H#ABF0,DTR          ; check data
005D7          JNZ        B.ERR.5             ; data error ?
005D8          DEC.R      MAR                 ; restore mar
005D9          MVI.R      H#0000,DTR          ; clear status location
005DA          CALL       WR.MEM              ; write
005DB          LDA        R6                  ; get status
005DC          JNZ        B.ERR.3             ; error ?
005DD          MVI.R      H#0004,MAR          ; set for status of a bit
          ;
LINE ADDR MUX INTERFACE PROCESSOR - A5690 VER 1.11 - 9/18/86    PAGE   71

          ;************************************************************
          ;***                1553 BUILT-IN-TEST                     ***
          ;************************************************************
005DE          MVI.R      H#0000,R6           ; clear status register
005DF          MUX.CONTROL BUS.A.B1           ; set bus
005E0          CALL       PATTERN             ; check bus a self test
005E1          LDA        R6                  ; any errors?
005E2          CALL.Z     FUNCTIONAL          ; if a zero, then no errors
005E3          MVI.R      H#0000,R6           ; clear status reg for next test
005E4          MUX.CONTROL BUS.A.B2           ; set bus
005E5          CALL       PATTERN             ; check bus a full test
005E6          LDA        R6                  ; any errors?
005E7          CALL.Z     FUNCTIONAL          ; if no errors, report success
          ;
          ;                        NOW TEST BUS B
          ;
005E8     TESTB:   MVI.R      H#0000,R6       ; clear status register
005E9          MUX.CONTROL BUS.B.B1           ; set bus
005EA          CALL       PATTERN             ; check bus b self test
005EB          LDA        R6                  ; errors?
005EC          CALL.Z     FUNCTIONAL          ; if 0 then no errors
005ED          MVI.R      H#0000,R6           ; clear status reg for next test
005EE          MUX.CONTROL BUS.B.B2           ; set bus
005EF          CALL       PATTERN             ; check bus b full test
005F0          LDA        R6                  ; errors?
005F1          CALL.Z     FUNCTIONAL          ; if 0, then no errors
005F2          RETURN                         ; end built in test
          ;
          ;
          PATTERN:
005F3          MVI.R      TEST.1,R7           ; load test pattern
005F4          CALL       XMIT.BIT            ;
005F5          MVI.R      TEST.2,R7           ; load test pattern
005F6          CALL       XMIT.BIT            ;
005F7          MVI.R      TEST.3,R7           ; load test pattern
005F8          CALL       XMIT.BIT            ;
005F9          MVI.R      TEST.4,R7           ; load test pattern
005FA          CALL       XMIT.BIT            ;
005FB          MVI.R      TEST.5,R7           ; load test pattern
005FC          CALL       XMIT.BIT            ;
005FD          RETURN                         ; end procedure
          ;
          FUNCTIONAL:
005FE          MVI.R      H#4F4B,R6           ; complete status ie "ok"
005FF     REPORT: LDA     R6                  ;
00600          STA        DTR                 ;
00601          CALL       WR.MEM              ;
```

```
      00602                 RETURN                                         ; end reporting
                   ;
                   ;
1LINE  ADDR        MUX INTERFACE PROCESSOR - A5690 VER 1.11 - 9/18/86    PAGE   72

                   ;****************************************************************
                   ;**    BIT TRANSMIT ROUTINE - WRAPS AROUND XMIT AND RECEIVE     **
                   ;**       REGISTERS USED - R8 = BUS SELECT                      **
                   ;**                        R7 = TEST PATTERN                    **
                   ;****************************************************************
      00603        XMIT.BIT: NOP                                            ; pad for 29116 emulator
      00604               OUTMUX.R R7,MUX.WR.CMD                            ; load select word
      00605               OUTMUX.R R7,MXOFF                                 ; SET PAD TO HOLD
      00606               SET.LIMIT T.5.USEC
      00607               LOOP.TILL.LIMIT H.SEND.DATA,B.ERR.6,MUX.EN.CMD
      00608               SET.LIMIT T.4.USEC
      00609               LOOP.TILL.LIMIT L.TAKE.DATA, B.ERR.7
      0060A               SET.LIMIT T.17.USEC                               ; message length
      0060B               LOOP.TILL.LIMIT H.TAKE.DATA, B.ERR.8
      0060C               JUMP.IF DATA.SYNC, B.ERR.9
      0060D               SET.LIMIT T.2.USEC                                ;
      0060E               LOOP.TILL.LIMIT L.VALID.WORD, B.ERR.A             ; check valid
      0060F               INPUT.A  MUX.READ                                 ; input wraparound
      00610               CMP.A.R  R7                                       ; compare data
      00611               JNZ      B.ERR.B                                  ; data error
                   ;
                   ;       REPEAT WITH DATA SYNC
                   ;
      00612               OUTMUX.R R7,MUX.WR.DAT                            ; load select word
      00613               OUTMUX.R R7,  MXOFF                               ; PAD AFTER LOAD
      00614               SET.LIMIT T.5.USEC
      00615               LOOP.TILL.LIMIT H.SEND.DATA, B.ERR.6,MUX.EN.DAT
      00616               SET.LIMIT T.4.USEC
      00617               LOOP.TILL.LIMIT L.TAKE.DATA, B.ERR.7
      00618               SET.LIMIT T.17.USEC                               ; message length
      00619               LOOP.TILL.LIMIT H.TAKE.DATA, B.ERR.8
      0061A               JUMP.IF CMND.SYNC, B.ERR.C
      0061B               SET.LIMIT T.2.USEC                                ;
      0061C               LOOP.TILL.LIMIT L.VALID.WORD, B.ERR.A             ; check valid
      0061D               INPUT.A  MUX.READ                                 ; input wraparound
      0061E               CMP.A.R  R7                                       ; compare data
      0061F               JNZ      B.ERR.B                                  ; data error
                   ;
      00620               RETURN
                   ;
1LINE  ADDR        MUX INTERFACE PROCESSOR - A5690 VER 1.11 - 9/18/86    PAGE   73

                   ;****************************************************************
                   ;****                   BIT ERROR CODES                      ****
                   ;****************************************************************
      00621        B.ERR.0:  MVI.R   H#BAD0,R6                     ;
      00622                  JMP     REPORT                        ;
      00623        B.ERR.1:  MVI.R   H#BAD1,R6                     ;
      00624                  JMP     REPORT                        ;
      00625        B.ERR.2:  MVI.R   H#BAD2,R6                     ;
      00626                  JMP     REPORT                        ;
      00627        B.ERR.3:  MVI.R   H#BAD3,R6                     ;
      00628                  JMP     REPORT                        ;
      00629        B.ERR.4:  MVI.R   H#BAD4,R6                     ;
```

```
0062A                   JMP     REPORT
00628   B.ERR.5:        MVI.R   H#BAD5,R6              :
0062C                   JMP     REPORT                 :
        :
        :   ERRORS FROM XMIT.BIT -- REQUIRE STACK TO BE RESTORED
        :
0062D   B.ERR.6:        MVI.R   H#BAD6,R6              :
0062E                   POP.STK.N.JMP REPORT           :
0062F   B.ERR.7:        MVI.R   H#BAD7,R6              :
00630                   POP.STK.N.JMP REPORT           :
00631   B.ERR.8:        MVI.R   H#BAD8,R6              :
00632                   POP.STK.N.JMP REPORT           :
00633   B.ERR.9:        MVI.R   H#BAD9,R6              :
00634                   POP.STK.N.JMP REPORT           :
00635   B.ERR.A:        MVI.R   H#BADA,R6              :
00636                   POP.STK.N.JMP REPORT           :
00637   B.ERR.B:        MVI.R   H#BADB,R6              :
00638                   POP.STK.N.JMP REPORT           :
00639   B.ERR.C:        MVI.R   H#BADC,R6              :
0063A                   POP.STK.N.JMP REPORT           :
0063B   B.ERR.D:        MVI.R   H#BADD,R6              :
0063C                   JMP     REPORT                 :
0063D   B.ERR.10:       MVI.R   H#BA10,R6              :
0063E                   JMP     REPORT                 :
0063F   B.ERR.11:       MVI.R   H#BA11,R6              :
00640                   JMP     REPORT                 :
00641   B.ERR.12:       MVI.R   H#BA12,R6              :
00642                   JMP     REPORT                 :
00643   B.ERR.13:       MVI.R   H#BA13,R6              :
00644                   JMP     REPORT                 :
00645   B.ERR.14:       MVI.R   H#BA14,R6              :
00646                   JMP     REPORT                 :
00647   B.ERR.15:       MVI.R   H#BA15,R6              :
00648                   JMP     REPORT                 :
00649   B.ERR.16:       MVI.R   H#BA16,R6              :
0064A                   JMP     REPORT                 :
0064B   B.ERR.17:       MVI.R   H#BA17,R6              :
0064C                   JMP     REPORT                 :
LINE    ADDR    MUX INTERFACE PROCESSOR - A5690 VER 1.11 - 9/18/86    PAGE   74
        :
        END

   TOTAL ASSEMBLY ERRORS =     0
1              MUX INTERFACE PROCESSOR - A5690 VER 1.11 - 9/18/86  PAGE   75
```

SYMBOL TABLE

| | | | | | | | | | | | |
|---|---|---|---|---|---|---|---|---|---|---|---|
| AB00 | A | 00515 | AB02 | A | 00517 | AB08 | A | 00519 | AB10 | A | 0051B |
| AB12 | A | 0051D | AB20 | A | 0051F | AB30 | A | 00521 | AB32 | A | 00523 |
| AB40 | A | 00525 | AB50 | A | 00527 | AB52 | A | 00529 | AB54 | A | 0052B |
| AB56 | A | 0052D | AB60 | A | 0052F | AB70 | A | 00531 | AB90 | A | 00533 |
| ABA0 | A | 00535 | ABE0 | A | 00537 | ABE2 | A | 00539 | AB.PATH | A | 00530 |
| ACCUM.IF | D | | ACK.EVEN | D | | AD2.AIR | A | 00624 | AD2.DAR | A | 00614 |
| AD2.DIR | A | 00654 | AD3.AIA | A | 07241 | AD3.DAY | A | 07140 | AD3.DIA | A | 07545 |
| AD3.DIS | A | 07544 | ADC2.AIR | A | 00625 | ADC2.DAR | A | 00615 | ADC2.DIR | A | 00655 |
| ADC3.AIA | A | 07251 | ADC3.DAY | A | 07150 | ADC3.DIA | A | 07555 | ADC3.DIS | A | 07554 |
| ADC.DRA | A | 00435 | ADC.DRR | A | 004F5 | ADC.DRY | A | 004B5 | ADC.RAA | A | 00405 |

| | | | | | | | | | | | |
|---|---|---|---|---|---|---|---|---|---|---|---|
| ADC.RAR | A | 004C5 | ADC.RAY | A | 00485 | ADC.RIA | A | 00425 | ADC.RIR | A | 00455 |
| ADC.RIY | A | 004A5 | ADDI.A | D | | ADDI.R | D | | ADD.A | D | |
| ADD.R | D | | AD.DRA | A | 00434 | AD.DRR | A | 004F4 | AD.DRY | A | 00484 |
| AD.RAA | A | 00404 | AD.RAR | A | 004C4 | AD.RAY | A | 00484 | AD.RIA | A | 00424 |
| AD.RIR | A | 004E4 | AD.RIY | A | 004A4 | AN2.AIR | A | 00626 | AN2.DAR | A | 00616 |
| AN2.DIR | A | 00656 | AN3.AIA | A | 07261 | AN3.DAY | A | 07160 | AN3.DIA | A | 07565 |
| AN3.DIS | A | 07564 | ANDI.A | D | | ANDI.R | D | | AND.A | D | |
| AND.R | D | | AN.DRA | A | 00436 | AN.DRR | A | 004F6 | AN.DRY | A | 004B6 |
| AN.RAA | A | 00406 | AN.RAR | A | 004C6 | AN.RAY | A | 00486 | AN.RIA | A | 00426 |
| AN.RIR | A | 004E6 | AN.RIY | A | 004A6 | AUTO.1 | A | 0020B | AUTO.2 | A | 0020C |
| AUTO.ON | A | 001F8 | BIT.0 | A | 00000 | BIT.10 | A | 0000A | BIT.11 | A | 0000B |
| BIT.12 | A | 0000C | BIT.13 | A | 0000D | BIT.14 | A | 0000E | BIT.15 | A | 0000F |
| BIT.1 | A | 00001 | BIT.2 | A | 00002 | BIT.3 | A | 00003 | BIT.4 | A | 00004 |
| BIT.5 | A | 00005 | BIT.6 | A | 00006 | BIT.7 | A | 00007 | BIT.8 | A | 00008 |
| BIT.9 | A | 00009 | BLK.RD | A | 001EE | BLOCK.RE | A | 00198 | BR01 | A | 0019B |
| BR02 | A | C019C | BUILT.IN | A | 0053C | BURN.TX | A | 00438 | BUS.ACTI | A | 00011 |
| BUS.A.B1 | A | 0C07F | BUS.A.B2 | A | 0C07D | BUS.A.NO | A | 08505 | BUS.B.B1 | A | 07FC0 |
| BUS.B.B2 | A | 07DC0 | BUS.B.NO | A | 005B5 | BUS.PASS | A | 085B5 | B.ERR.0 | A | 00621 |
| B.ERR.10 | A | 0063D | B.ERR.11 | A | 0063F | B.ERR.12 | A | 00641 | B.ERR.13 | A | 00643 |
| B.ERR.14 | A | 00645 | B.ERR.15 | A | 00647 | B.ERR.16 | A | 00649 | B.ERR.17 | A | 0064B |
| B.ERR.1 | A | 00623 | B.ERR.2 | A | 00625 | B.ERR.3 | A | 00627 | B.ERR.4 | A | 00629 |
| B.ERR.5 | A | 0062B | B.ERR.6 | A | 0062D | B.ERR.7 | A | 0062F | B.ERR.8 | A | 00631 |
| B.ERR.9 | A | 00633 | B.ERR.A | A | 00635 | B.ERR.B | A | 00637 | B.ERR.C | A | 00639 |
| B.ERR.D | A | 0063B | CALL | D | | CALL.C | D | | CALL.IF | D | |
| CALL.NC | D | | CALL.NEG | D | | CALL.NOV | D | | CALL.NZ | D | |
| CALL.OVF | D | | CALL.POS | D | | CALL.STA | D | | CALL.Z | D | |
| CCSIM.CN | A | 00245 | CCSIM.LP | A | 00269 | CCSIM | A | 00239 | CC.CONT | A | 00284 |
| CC.ON.A | A | 00275 | CC.ON.B | A | 0027E | CHECK.CO | A | 002C8 | CK.INT1 | A | 00456 |
| CLEAR.AL | A | 00006 | CLR.A | D | | CLR.R | D | | CMD.0 | A | 0ADC0 |
| CMD.1 | A | 0ADC1 | CMD.2 | A | 0ADC2 | CMD.3 | A | 0ADC3 | CMD.4 | A | 0ADC4 |
| CMD.5 | A | 0ADC5 | CMND.SYN | A | 0002D | CMPI.A | D | | CMPI.R | D | |
| CMP.2.A. | A | 007D4 | CMP.2.DD | A | 007D9 | CMP.2.DS | A | 007DA | CMP.2.D. | A | 007D6 |
| CMP.2.I. | A | 007D7 | CMP.2.O. | A | 007D8 | CMP.A.R | D | | CMP.A.Y | D | |
| CMP.R.Y | D | | COMP.O.R | A | 006D6 | COMP.I.R | A | 006D7 | COMP.OE. | A | 006D9 |
| COMP.O.R | A | 006D8 | COMP.R.A | A | 006D0 | COMP.R.R | A | 006DB | COMP.R.S | A | 006D4 |
| COMP.R.Y | A | 006D2 | COMP.SE. | A | 006DA | CONT.BIT | A | 00543 | CPL.A | D | |
| CPU.CHEC | A | 0054A | CPU.LP | A | 0053E | CPU.OFF | A | 00006 | CPU.Y2L | A | 00005 |
| DATA.PRE | A | 00009 | DATA.SYN | A | 0000D | DDEC.A | D | | DDEC.R | D | |
| DEC.A | D | | DEC.R | D | | DINC.A | D | | DINC.R | D | |
| DONE.RTR | A | 00409 | DO.LOOP | D | | DPM116.V | A | 00101 | DTR | A | 00018 |
| DUMP.ALL | A | 00028 | EADD.CAL | A | 000E3 | END.LOOP | D | | ERROR.CO | A | 0009D |
| ERR.CHK | A | 004EA | ERR.RD | A | 00097 | ERR.TRC1 | A | 004C4 | ERR.TRC2 | A | 004C7 |
| ERR.TRC3 | A | 004CC | ERR.TRC4 | A | 004CD | ERR.TRC5 | A | 004D1 | ERR.WR | A | 00095 |
| EXNOR.A | D | | EXNOR.R | D | | EXOR.A | D | | EXOR.R | D | |
| FAIL | A | 00020 | FLG.REG | A | 0001C | FUNCTION | A | 005FE | GO.TO | D | |
| HRTEN | A | 00028 | H.2US.FL | A | 00038 | H.BROCAS | A | 0002C | H.CMD.RD | A | 00035 |
| H.CCNT.M | A | 00034 | H.DATA.V | A | 0003A | H.DUAL.B | A | 00032 | H.EVENT | A | 00026 |
| H.FAIL.S | A | 0002F | H.MAN.FA | A | 00031 | H.MODE.C | A | 0002B | H.NO.CLK | A | 00030 |
| H.D9SEND | A | 00039 | H.PAR.FA | A | 00033 | H.RT.AD. | A | 00036 | H.RT.ENA | A | 00028 |
| H.RT.ON | A | 00030 | H.SEND.D | A | 0002E | H.SUB.AD | A | 00037 | H.TAKE.D | A | 00029 |
| H.TIMER | A | 00033 | H.VALID. | A | 0002A | H.VAL.LA | A | 0003B | H.XACK | A | 00025 |
| IO | A | 00003 | I3 | A | 00001 | IBUILT.I | A | 00111 | ICCSIM | A | 00113 |
| IDLE | A | 00003 | IF.RD.RD | D | | IF.WR.RD | D | | IMED | A | 00001 |
| INC.2.A. | A | 007E4 | INC.2.DD | A | 007E9 | INC.2.DS | A | 007EA | INC.2.D. | A | 007E6 |
| INC.2.I. | A | 007E7 | INC.2.O. | A | 007E8 | INC.A.R | A | 006E4 | INC.A | D | |
| INC.D.R | A | 006E6 | INC.I.R | A | 006E7 | INC.OE.R | A | 006E9 | INC.O.R | A | 006E8 |
| INC.R.A | A | 006E0 | INC.R.R | A | 006EB | INC.R.S | A | 006E3 | INC.R.Y | A | 006E2 |
| INC.R | D | | INC.SE.R | A | 006EA | INDIRECT | A | 000ED | INMUX.A | D | |

```
INMUX.R  D              INPUT.A. D              INPUT.A  D              INPUT.R. D
INPUT.R  D              INT.1.LP A  000C2       INT.1    A  00089       INT.2.LP A  000D7
INT.2    A  000CE       IN.1     A  00000       IN.2     A  00002       IPOKE.15 A  0010F
JC       D              JMP      D              JNC      D              JNEG     D
JNOVF    D              JNZ      D              JOVF     D              JPOS     D
JUMP.IF. D              JUMP.IF  D              JZ       D              LDA      D
LOC.RD.M A  00072       LOC.WR.M A  0006F       LOOP.1   A  0007E       LOOP.2   A  00088
LOOP.3   A  00084       LOOP.TIL D              LRTEN    A  00008       L.2US.FL A  00018
L.BROCAS A  0000C       L.CMD.RD A  00015       L.CONT.M A  00014       L.DATA.V A  0001A
L.DUAL.B A  00012       L.EVENT  A  00006       L.FAIL.S A  0000F       L.MAN.FA A  00011
L.MODE.C A  0000B       L.NO.CLK A  00010       L.O9SEND A  00019       L.PAR.FA A  00013
L.RT.AD. A  00016       L.RT.ENA A  00008       L.RT.ON  A  00010       L.SEND.D A  0000E
L.SUB.AD A  00017       L.TAKE.D A  00009       L.TIMER  A  00013       L.VALID. A  0000A
L.VAL.LA A  0001B       L.XACK   A  00005       MAN      D              MARL     A  00006
MAR.2    A  0001E       MAR      A  0001F       MASK.10  A  00F00       MASK.1   A  07F00
MASK.20  A  00700       MASK.Z   A  02F00       MASK.40  A  00300       MASK.5   A  01F00
MASK.80  A  00100       MAX.MESS A  000A0       MDC.01   A  0037F       MEMO     A  00007
MEMTEST  A  00115       MEM.RD   A  00003       MEM.WR   A  00005       MESS.RDY A  000A0
MLH      A  00001       MLL      A  00000       MODE.01  A  0013F       MODE.CHK A  0037A
MODE.COD A  001B1       MODE.REC A  00139       MONEND   A  00411       MONRTOO  A  003C6
MONRT    A  0038A       MON.BL   A  00356       MON.NORM A  00393       MON.REC  A  0043D
MON.TY   A  00340       MOVA.R   A  006C4       MOVD.R   A  006C6       MOVI.R   A  006C7
MOVOE.R  A  006C9       MOVO.R   A  006C8       MOVR.A   A  006C0       MOVR.R   A  006CB
MOVR.S   A  006C3       MOVR.Y   A  006C2       MOVSE.R  A  006CA       MOV.2.A. A  007C4
MOV.2.DO A  007C9       MOV.2.DS A  007CA       MOV.2.D. A  007C6       MOV.2.I. A  007C7
MOV.2.O. A  007C8       MOV.A.R  D              MOV.R.A  D              MUXIO    D
MUX.CONT D              MUX.ECWR A  00003       MUX.EN.C A  00007       MUX.EN.D A  0000F
MUX.IDLE A  0001F       MUX.READ A  0001E       MUX.REG. D              MUX.RT.R A  0001D
MUX.WR.C A  00013       MUX.WR.D A  0001B       MVI.A    D              MVI.R    D
MXOFF    A  0001F       NAN2.AIR A  00627       NAN2.DAR A  00617       NAN2.DIR A  00657
NAN3.AIA A  07271       NAN3.DAY A  07170       NAN3.DIA A  07575       NAN3.DIS A  07574
NAND.A   D              NAND.R   D              NAN.DRA  A  00437       NAN.DRR  A  004F7
NAN.DRY  A  00497       NAN.RAA  A  00407       NAN.RAR  A  004C7       NAN.RAY  A  00487
NAN.RIA  A  00427       NAN.RIR  A  00457       NAN.RIY  A  004A7       NARG     A  00000
NEG.2.A. A  007E4       NEG.2.DO A  007F9       NEG.2.DS A  007FA       NEG.2.D. A  007F6
NEG.2.I. A  007F7       NEG.2.O. A  007F8       NEG.A.R  A  006F4       NEG.D.R  A  006F6
NEG.I.R  A  006F7       NEG.OE.R A  006F9       NEG.O.R  A  006F8       NEG.R.A  A  006F0

NEG.R.R  A  006FB       NEG.R.S  A  006F3       NEG.R.Y  A  006F2       NEG.SE.R A  006FA
NOOP     A  07140       NOP      D              NOR.A    D              NOR.R    D
NOSIMOO  A  003DF       NOSIMRT  A  003D3       NOT.ACTI A  002CA       NOT.A    D
NOT.R    D              NO.BUS   A  0027C       NO.DATA. A  00011       NO.EOT   A  002AB
NO.ERR.I A  0029F       NO.GAP.R A  00188       NO.INC   A  0005B       NO.MODE. A  001C1
NO.P.BUS A  0012F       NO.SOFT  A  00259       NO.VERSI A  00102       NR2.AIR  A  00629
NR2.DAR  A  00619       NR2.DIR  A  00659       NR3.AIA  A  07291       NR3.DAY  A  07190
NR3.DIA  A  07595       NR3.DIS  A  07594       NR.DRA   A  00439       NR.DRR   A  004F9
NR.DRY   A  004B9       NR.RAA   A  00409       NR.RAR   A  004C9       NR.RAY   A  00489
NR.RIA   A  00429       NR.RIR   A  004E9       NR.RIY   A  004A9       N.BIT    A  005AC
O9.COUNT A  00017       O9.MUX.E A  0001E       O9.MUX.I A  0001F       O9.MUX.O A  0001F
O9.MUX.R A  0000F       O9.MUX.S A  0001D       O9.MUX.W A  0001B       O9.SOTC. A  00015
OEY.ON   A  00000       ONE.MODE A  001B2       ONE      A  00001       ON.A     A  00128
ON.B     A  00131       ON.BUS.A A  002E6       OR2.AIR  A  0062A       OR2.DAR  A  0061A
OR2.DIR  A  0065A       OR3.AIA  A  072A1       OR3.DAY  A  071A0       OR3.DIA  A  075A5
OR3.DIS  A  075A4       ORI.R    D              OR.A     D              OR.DRA   A  0043A
OR.DRR   A  004FA       OR.DRY   A  0049A       OR.R     D              OR.RAA   A  0040A
OR.RAR   A  004CA       OR.RAY   A  004BA       OR.RIA   A  0042A       OR.RIR   A  004EA
OR.RIY   A  004AA       OUTMUX.A D              OUTMUX.I D              OUTMUX.R D
OUTPUT.A D              OUTPUT.I D              OUTPUT.R D              OUT.I.ST D
O.LIGHT  D              PASS     A  00000       PATTERN  A  005F3       POKE.155 A  0011C
```

| Symbol | Type | Value | Symbol | Type | Value | Symbol | Type | Value | Symbol | Type | Value |
|---|---|---|---|---|---|---|---|---|---|---|---|
| POKE.LPR | A | 00149 | POP.STK. | D | | PO.CONT | A | 00137 | PROCESS | A | 00234 |
| PXF | A | 00007 | R0 | A | 00000 | R10 | A | 0000A | R11 | A | 0000B |
| R12 | A | 0000C | R13 | A | 0000D | R14 | A | 0000E | R15 | A | 0000F |
| R16 | A | 00010 | R17 | A | 00011 | R18 | A | 00012 | R19 | A | 00013 |
| R1 | A | 00001 | R20 | A | 00014 | R21 | A | 00015 | R22 | A | 00016 |
| R23 | A | 00017 | R24 | A | 00018 | R25 | A | 00019 | R26 | A | 0001A |
| R29 | A | 0001D | R2 | A | 00002 | R3 | A | 00003 | R4 | A | 00004 |
| R5 | A | 00005 | R6 | A | 00006 | R7 | A | 00007 | R8 | A | 00008 |
| R9 | A | 00009 | RD.LIMIT | A | 0001E | RD.MEM | A | 0006C | RE1 | A | 00117 |
| RECV | E | 001D1 | RECV.CMD | A | 00186 | RECV.DAT | A | 00190 | REC.D1 | A | 001E7 |
| REC.DATA | A | 00209 | REC.OK | A | 001F7 | REPORT | A | 005FF | RESETO | D | |
| RESPON.G | A | 00078 | RESTART | E | 000F1 | RETURN | D | | RET.C | D | |
| RET.IF | D | | RET.INCR | D | | RET.NC | D | | RET.NEG | D | |
| RET.NOVF | D | | RET.NZ | D | | RET.OVF | D | | RET.POS | D | |
| RET.Z | D | | RET | D | | ROT.A | D | | ROT.R | D | |
| RTI.ERRO | A | 0042C | RTE07 | A | 00503 | RTEX01 | A | 0025C | RTEX02 | A | 0025F |
| RTE.00 | A | 004F5 | RTE.01 | A | 004F7 | RTE.04 | A | 004FF | RTE.05 | A | 00501 |
| RTF.RD | A | 00507 | RTT.01 | A | 004F9 | RTT.02 | A | 004FB | RTT.03 | A | 004FD |
| RT.01x | A | 00301 | RT.01 | A | 00302 | RT.A.NOR | A | 0853D | RT.BEGIN | A | 002D0 |
| RT.B.NOR | A | 03D85 | RT.CHK | A | 00247 | RT.EMD | A | 00319 | RT.COMPL | A | 002DE |
| RT.ENTRY | A | 00201 | RT.ERR | A | 00509 | RT.EXIT | A | 00447 | RT.FAIL | A | 0044F |
| RT.LOOP0 | A | 00326 | RT.LOOP1 | A | 00335 | RT.LOOP2 | A | 00337 | RT.MDC | A | 00332 |
| RT.ON | A | 002E1 | RT.R01 | A | 00365 | RT.R02 | A | 00367 | RT.REC | A | 0035D |
| RT.RT.TX | A | 00215 | RT.RUN | A | 00321 | RT.SET | A | 00258 | RT.SIM | A | 002D8 |
| RT.TX | A | 00323 | RT.WAIT | A | 00207 | Rec.rt.r | A | 00385 | SBC2.AIR | A | 00623 |
| SBC2.DAR | A | 00613 | SBC2.DIR | A | 00653 | SBC3.AIA | A | 07231 | SBC3.DAY | A | 07130 |
| SBC3.DIA | A | 07535 | SBC3.DIS | A | 07534 | SBR2.AIR | A | 00620 | SBR2.DAR | A | 00610 |
| SBR2.DIR | A | 00650 | SBR3.AIA | A | 07201 | SBR3.DAY | A | 07100 | SBR3.DIA | A | 07505 |
| SBR3.DIS | A | 07504 | SBRC2.AI | A | 00621 | SBRC2.DA | A | 00611 | SBRC2.DI | A | 00651 |
| SBRC3.AI | A | 07211 | SBRC3.DA | A | 07110 | SBRC3.DI | A | 07514 | SBRC3..D | A | 07515 |
| SBRC.DRA | A | 00431 | SBRC.DRR | A | 004F1 | SBRC.DRY | A | 00481 | SBRC.RAA | A | 00401 |
| SBRC.RAR | A | 004C1 | SBRC.RAY | A | 00481 | SBRC.RIA | A | 00421 | SBRC.RIR | A | 004E1 |
| SBRC.RIY | A | 004A1 | SBR.DRA | A | 00430 | SBR.DRR | A | 004F0 | SBR.DRY | A | 00480 |
| SBR.RAA | A | 00400 | SBR.RAR | A | 004C0 | SBR.RAY | A | 00480 | SBR.RIA | A | 00420 |
| SBR.RIR | A | 004E0 | SBR.RIY | A | 004A0 | SBS2.AIR | A | 00622 | SBS2.DAR | A | 00612 |
| SBS2.DIR | A | 00652 | SBS3.AIA | A | 07221 | SBS3.DAY | A | 07120 | SBS3.DIA | A | 07525 |
| SBS3.DIS | A | 07524 | SBSC.DRA | A | 00433 | SBSC.DRR | A | 004F3 | SBSC.DRY | A | 00483 |
| SBSC.RAA | A | 00403 | SBSC.RAR | A | 004C3 | SBSC.RAY | A | 00483 | SBSC.RIA | A | 00423 |
| SBSC.RIR | A | 004E3 | SBSC.RIY | A | 004A3 | SBS.DRA | A | 00432 | SBS.DRR | A | 004F2 |
| SBS.DRY | A | 00482 | SBS.RAA | A | 00402 | SBS.RAR | A | 004C2 | SBS.RAY | A | 00482 |
| SBS.RIA | A | 00422 | SBS.RIR | A | 004E2 | SBS.RIY | A | 004A2 | SEND.ACK | A | 00028 |

Appendix C

```
PL/M-96 COMPILER    NANLZ3 - 8096 - VERSION X.00

SERIES-III PL/M-96 X005 COMPILATION OF MODULE NANLZ3
OBJECT MODULE PLACED IN :F1:NANLZ3.OBJ
COMPILER INVOKED BY:  PLM96.86 :F1:NANLZ3.P96

            $   TITLE ('NANLZ3 - 8096 - VERSION X.00')
            $   DEBUG
            /*

            WRITTEN BY:  RICH ROOD

            MAINTAINED BY:

            PROJECT:

            HOME DISK:

            HARDWARE REQUIRED:

            SOFTWARE REQUIRED: PLM96

            OPERATING INSTRUCTIONS:        SET UP FOR 4800 BAUD ?             */

 1          NANLZ3:DO:

 2   1      DECLARE
                NANLZ3 STRUCTURE (
                    MODULE$TYPE(3) BYTE,
                    VER(6) BYTE,
                    PNAME(22) BYTE,
                    MAC$ID(19) BYTE,
                    DATE$ID(11) BYTE) PUBLIC DATA (
                        'M',0AH,0DH,
                        'VX.0',0AH,0DH,
                        '<YOUR NAME>          ',0AH,0DH,
                        'MCDONNELL DOUGLAS',0AH,0DH,
                        '22-MAY-84',0AH,0DH);

            $   EJECT
            /*--------    DEFINE  I/O   -----------------------*/

 3   1      DECLARE
                RO              WORD   AT(0),
                AD$COMMAND      BYTE   AT(02H),
                AD$RESULT$0     BYTE   AT(02H),
                AD$RESULT$1     BYTE   AT(03H),
                HSI$MODE        BYTE   AT(03H),
                HSO$TIME        WORD   AT(04H),
                HSI$TIME        WORD   AT(04H),
                HSO$COMMAND     BYTE   AT(06H),
                HSI$STATUS      BYTE   AT(06H),
                SBUF            BYTE   AT(07H),
```

```
            INT$MASK        BYTE   AT(08H),
            INT$PENDING     BYTE   AT(09H),
            WATCHDOG        BYTE   AT(0AH),
            TIMER1          WORD   AT(0AH),
            TIMER2          WORD   AT(0CH),
            BAUD$RATE       BYTE   AT(0EH),
            IOPORT0         BYTE   AT(0EH),
            IOPORT1         BYTE   AT(0FH),
            IOPORT2         BYTE   AT(10H),
            SP$CON          BYTE   AT(11H),
            SP$STAT         BYTE   AT(11H),
            IOC0            BYTE   AT(15H),
            IOS0            BYTE   AT(15H),
            IOC1            BYTE   AT(16H),
            IOS1            BYTE   AT(16H),
            PWM$CONTROL     BYTE   AT(17H),
            IOS2            BYTE   AT(17H),
            TIMEOUT         WORD   AT(24H),
            PROQUE (70)     WORD   AT(26H),

            COMMAND         WORD   AT(8018H),
            ECHO            WORD   AT(801AH),
        /* CC MODE */
            MASK            WORD   AT(801CH),
            DELAY80         WORD   AT(801EH),
            DELAY40         WORD   AT(8020H),
            DELAY20         WORD   AT(8022H),
            DELAY10         WORD   AT(8024H),
            DELAY5          WORD   AT(8026H),
            DELAY2          WORD   AT(8028H),
            DELAY1          WORD   AT(802AH),
        /* BUILT-IN-TEST */
            BIT$RSLT        WORD   AT(8020H),
        /*  TRACE MODE */
            CURMES          WORD   AT(8014H),
            OFFSET          WORD   AT(8020H),
            SEG             WORD   AT(8022H),
            INCREMENT       WORD   AT(8024H),
            TRIGGERADR      WORD   AT(8026H),
            MESSAGECNT      WORD   AT(8028H);
        $   EJECT
        /* ********************************************** *
         * ************ LOCAL VARIABLES ***************** *
         * ********************************************** */

 4   1      DECLARE
                FIND BYTE,
                R BYTE,
                X BYTE,
                LOWBYT BYTE AT (.X),
                Y BYTE,
                QSTART BYTE,
                REPCNT BYTE;
 5   1      DECLARE
                COUNTER80 WORD,
                COUNTER40 WORD,
                COUNTER20 WORD,
                COUNTER10 WORD,
```

```
              COUNTER5 WORD,
              COUNTER2 WORD,
              COUNTER1 WORD,
              PULSE WORD,
              ERROR1 WORD,
              NEXTINT WORD,
              Z WORD,
              CMDWD WORD,
              CMDMSK WORD,
              TIMEMASK WORD,
              SAMPLE WORD AT (.CMDWD),
              FIRSTFIND WORD AT (.TIMEMASK),
              CHECKSUM WORD AT (.COUNTER80),
              TTAG WORD AT (.COUNTER80),
              SEQNO WORD AT (.COUNTER40),
              COUNTMES WORD AT (.COUNTER20),
              COMWORD WORD AT (.COUNTER10),
              QCNT BYTE AT (.COUNTER5),
              NEXTFIND WORD,
              TIMEX WORD,
              PRO$PTR WORD AT (.COUNTER2),
              PRO BASED PRO$PTR WORD,
              INC WORD AT (.COUNTER1),
              MUXDATA$PTR WORD AT (.PULSE),
              MUXDATA BASED MUXDATA$PTR WORD,
              QRDPTR WORD,
              QRD BASED QRDPTR WORD,
              QWRPTR WORD AT (.Z),
              QWR BASED QWRPTR WORD,
              A$PTR WORD,
              A BASED A$PTR WORD,
              EXT$PTR WORD AT (.A$PTR),
              EXT BASED EXT$PTR WORD;

          $   EJECT
          /* ********************************************* *
           * ************* LOCAL PROCEDURES **************** *
           * ********************************************* */

 6   1    DUMMY: PROCEDURE INTERRUPT 0;

 7   2        X   = X;

 8   2    END;

 9   1    TIMERINT: PROCEDURE INTERRUPT 5;

10   2        IF Y = 0FFH THEN               /* CHECK FOR SCHEDULING MODE          */

          /******************************************************************/
          /* IN SCHEDULING MODE, INTERRUPT EVERY 100 MICROSECONDS.          */
          /*                                                                */
          /* IF IT IS TIME FOR MESSAGES AT A GIVEN RATE TO GO OUT, THEN     */
          /* SET THE APPROPRIATE BIT AND RESET THE COUNTER FOR THAT RATE.   */
          /*                                                                */
          /* IF AT LEAST ONE RATE HAS TIMED OUT THEN SEND AN HSD PULSE.     */
          /*                                                                */
          /* DECREMENT ALL THE COUNTERS.                                    */
          /******************************************************************/
```

```
2     DO;
3         IOPORT1 = 0;
3         NEXTINT = NEXTINT + 32H;/* SET INTERRUPT FOR 100 MICRO SEC.    */
3         HSO$COMMAND = 18H:       /* INTERRUPT ON SOFTWARE TIMER 0       */
3         HSO$TIME = NEXTINT;      /* SET TIME FOR NEXT INTERRUPT         */
3         TIMEMASK = 0;

3         IF COUNTER80 = 0 THEN
3         DO;
4             TIMEMASK = 100H;      /* SET TIMEMASK TO SEND OUT 80HZ      */
4             COUNTER80 = 125;      /* REINITIALIZE CCUNTER80             */
4         END;

3         IF COUNTER40 = 0 THEN
3         DO;
4             TIMEMASK = TIMEMASK + 200H; /* SEND OUT 40HZ MESSAGES      */
4             COUNTER40 = 250;
4         END;

3         IF COUNTER20 = 0 THEN
3         DO;
4             TIMEMASK = TIMEMASK + 400H; /* SEND OUT 20HZ MESSAGES      */
4             COUNTER20 = 500;
4         END;

3         IF COUNTER10 = 0 THEN
3         DO;
4             TIMEMASK = TIMEMASK + 800H;
4             COUNTER10 = 1000;
4         END;

3         IF COUNTER5 = 0 THEN
3         DO;
4             TIMEMASK = TIMEMASK + 1000H;
4             COUNTER5 = 2000;
4         END;

3         IF COUNTER2 = 0 THEN
3         DO;
4             TIMEMASK = TIMEMASK + 2000H;
4             COUNTER2 = 5000;
4         END;

3         IF COUNTER1 = 0 THEN
3         DO;
4             TIMEMASK = TIMEMASK + 4000H;
4             COUNTER1 =10000;
4         END;

3         IF TIMEMASK <> 0 THEN
3         DO;
4             IOPORT1 = TIMEMASK;
4             MASK = TIMEMASK;        /* INDICATE WHICH MESSAGES TO SEND  */
4             PULSE = TIMER1 + 5;
4             HSO$COMMAND = 20H;      /* SET HSO PIN                      */
4             HSO$TIME = PULSE;       /* SET TIME FOR THE PULSE           */
4             HSO$COMMAND = 0;        /* RESET HSO PIN                    */
4             HSO$TIME = PULSE + 4;   /* SET TIME FOR PULSE END           */
4         END;
```

```
 62   3            COUNTER80 = COUNTER80 - 1;
 63   3            COUNTER40 = COUNTER40 - 1;
 64   3            COUNTER20 = COUNTER20 - 1;
 65   3            COUNTER10 = COUNTER10 - 1;
 66   3            COUNTER5 = COUNTER5 - 1;
 67   3            COUNTER2 = COUNTER2 - 1;
 68   3            COUNTER1 = COUNTER1 - 1;
 69   3        END;

          $    EJECT
          /* IN TRACE MODE, SCHEDULE THE NEXT INTERRUPT AND
             TURN OFF THE TRACE WHEN A TIMEOUT OCCURS. */

 70   2        ELSE
               DO:
 71   3            R = IOPORT2;
 72   3            IOPORT2 = 0;
 73   3            NEXTINT = NEXTINT + INC;          /* SET NEXT INTERRUPT          */
 74   3            HSO$COMMAND = 18H;                /* SET SOFTWARE TIMER 1        */
 75   3            HSO$TIME = NEXTINT;
 76   3            TTAG = TTAG + 1;
 77   3            TIMEX = TIMEX - 1;
 78   3            IF TIMEX = 0 THEN
 79   3            DO;
 80   4                DISABLE;
 81   4                INT$PENDING = 0;
 82   4                EXT$PTR = 8012H;      /* CUT OFF THE TRACE                   */
 83   4                EXT = 0;
 84   4                ERROR1 = 0BAD2H;      /* SET THE TIMEOUT FLAG                */
 85   4                QCNT = 10;            /* STOP WAITING FOR A MESSAGE          */
 86   4            END;
 87   3            IOPORT2 = R;
 88   3        END;

 89   2    END TIMERINT;

          $    EJECT
 90   1   MUXTRACEINT: PROCEDURE INTERRUPT 7;

          /********************************************************************/
          /* WHEN A MESSAGE CAUSES AN INTERRUPT,                              */
          /*                                                                  */
          /* READ IN THE LOCATION OF THAT MESSAGE,                            */
          /*                                                                  */
          /* INCREMENT THE QUEUE, AND STORE THE LOCATION OF THE COMMAND WORD, */
          /*                                                                  */
          /* COMPARE SEQUENCE NUMBERS AND WRITE THE TIME TAG                  */
          /********************************************************************/
 91   2        Y = IOPORT2;
 92   2        IOPORT2 = 0;
 93   2        CCNT = QCNT + 1;
 94   2        A$PTR = CURMES;                  /* STORE LOCATION OF CURRENT MESSAGE */
 95   2        QWRPTR = QWRPTR + 2;
 96   2        IF QWRPTR = 0B2H THEN QWRPTR = QSTART;
 98   2        QWR = A$PTR + 4;                 /* STORE LOCATION OF COMMAND WORD    */
 99   2        IF A$PTR > 7FF8H THEN IOPORT2 = 40H;    /*     IF IN THE LOWER BANK  */
101   2        ELSE A$PTR = A$PTR OR 8000H;            /* LEAVE BANKSELECT 0        */
102   2        SEQNO = SEQNO + 1;
```

```
103   2        IF SECND <> A THEN ERROR1 = 0BAD3H;
105   2        A$PTR = A$PTR + 2;
106   2        A = TTAG;
107   2        IOPORT2 = Y;

108   2    END MUXTRACEINT;

           $   EJECT
109   1    SEARCH: PROCEDURE;

           /*************************************************************************/
           /* SEARCH:  GET A MESSAGE AND COMPARE IT TO EACH OF THE TRIGGER MESSAGES.*/
           /*                                                                       */
           /* WAIT FOR A MESSAGE THEN STORE ITS COMMAND WORD.                       */
           /*                                                                       */
           /* GO THROUGH THE TRIGGER MESSAGES AND COMPARE UNTIL A MATCH             */
           /* OCCURS OR THERE ARE NO MORE "ORS".                                    */
           /*                                                                       */
           /* IF A MATCH OF COMMAND WORDS OCCURS THEN CHECK DATA WORD               */
           /* IF DATA WORDS MATCH THEN SET FIND.                                    */
           /*************************************************************************/
110   2        IOPORT2 = 0;
111   2        DO WHILE QCNT = 0;                      /* WAIT FOR A MESSAGE      */
112   3        END;
113   2        QCNT = QCNT - 1;
114   2        MUXDATA$PTR = QRD;          /* GET LOCATION OF MESSAGE COMMAND WORD */
115   2        IF MUXDATA$PTR > 7FFBH THEN IOPORT2 = 40H;
117   2        ELSE MUXDATA$PTR = MUXDATA$PTR OR 8000H;
118   2        COMWORD = MUXDATA;          /* STORE COMMAND WORD TO CHECK          */
119   2        IOPORT1 = OFFH;

           /* SEARCH THROUGH EACH "OR" CONDITION */
120   2        DO WHILE ((PRO = 8) OR (PRO$PTR = FIRSTFIND)) AND (FIND = 0);
121   3            PRO$PTR = PRO$PTR + 2;  /* GET THE COMMAND WORD                 */
122   3            CMDWD = PRO;
123   3            PRO$PTR = PRO$PTR + 2;  /* GET THE COMMAND MASK                 */
124   3            CMDMSK = PRO AND COMWORD;
125   3            IF CMDMSK = CMDWD THEN
126   3            DO;
127   4                PRO$PTR = PRO$PTR + 2;
128   4                X = SHL(PRO,1);                 /* GET PROPER DATA WORD     */
129   4                MUXDATA$PTR = X + MUXDATA$PTR;
130   4                PRO$PTR = PRO$PTR + 2;
131   4                CMDMSK = MUXDATA AND PRO;       /* MASK THE DATA WORD       */
132   4                PRO$PTR = PRO$PTR + 2;
133   4                IF CMDMSK = PRO THEN FIND = 1;  /* IF DATAWORD: SET FIND    */
135   4                PRO$PTR = PRO$PTR + 2;
136   4            END;
137   3            ELSE PRO$PTR = PRO$PTR + 8;
138   3        END;
139   2        IOPORT1 = 0;

140   2    END SEARCH;

           $   EJECT
```

```
PL/M-96 COMPILER    NANLZ3 - 8096 - VERSION X.00

141  1     MAIN: DO;

           /* INITIALIZE MESSAGE DELAYS AND START THE SCHEDULE TIMER  */

142  2        IOPORT2 = 0;
143  2        IOC1 = 20H;                 /* SET P2.0 TO TXD             */
144  2        SP$CON = 1;                 /* SET SERIAL PORT TO MODE 1   */
145  2        BAUD$RATE = 19H;            /* 4800 BAUD AT 8MHZ           */
146  2        BAUD$RATE = 80H;
147  2        EXT$PTR = 8000H;
148  2        EXT = 0ADC0H;               /* START SELF BIT              */
149  2        DO X = 0 TO 10;             /* WAIT FOR ECHO               */
150  3        END;
151  2        EXT$PTR = 8002H;
152  2        IF EXT = 0ADC0H THEN
153  2        DO;
154  3            CALL TIME(20);
155  3            SBUF = 0A5H;
156  3            CALL TIME(20);
157  3            SBUF = 0A5H;
158  3            CALL TIME(20);
159  3            EXT$PTR = 800AH;
160  3            LOWBYT = EXT AND 0FFH;
161  3            SBUF = LOWBYT;     /* SEND BUS A STATUS      */
162  3            CALL TIME(20);
163  3            EXT$PTR = 800EH;
164  3            LOWBYT = EXT AND 0FFH;
165  3            SBUF = LOWBYT;   /* SEND BUS B STATUS        */
166  3        END;
167  2        ELSE
              DO;
168  3            CALL TIME(20);
169  3            SBUF = 0A5H;
170  3            CALL TIME(20);
171  3            SBUF = 0A5H;
172  3            CALL TIME(20);
173  3            SBUF = 20H;             /* IF NO ECHO SEND INDICATION */
174  3            CALL TIME(20);
175  3            SBUF = 20H;
176  3        END;
177  2        DELAY80 = 0;
178  2        DELAY40 = 0;
179  2        DELAY20 = 0;
180  2        DELAY10 = 0;
181  2        DELAY5 = 0;
182  2        DELAY2 = 0;
183  2        DELAY1 = 0;
184  2        EXT$PTR = 8018H;
185  2        EXT = 05DC6H;

186  2     DO WHILE 1;

187  3        X = 100;
188  3        DO WHILE X <> 0;
189  4            X = X - 1;
190  4        END;
```

```
PL/M-96 COMPILER    NANLZ3 - 8096 - VERSION X.00

191   3          ECHO = COMMAND;

              /*******************************************************************/
              /* BUILT-IN-TEST:                                                  */
              /*                                                                 */
              /* WRITE TO MEMORY IN INCREMENTING VALUES,                         */
              /* THEN READ MEMORY.                                               */
              /*                                                                 */
              /* INITIATE ON BOARD BUILT-IN-TEST                                 */
              /*                                                                 */
              /* PROCESS THE RESULTS BY CHECKING MEMORY LOCATIONS 08H TO 0EH.    */
              /*******************************************************************/
192   3          IF COMMAND = 0EDC0H THEN
193   3          DO;
194   4             DISABLE;
195   4             Y = 0FFH;
196   4             ERROR1 = 7800H;
197   4             IOPORT2 = 0;
198   4             DO A$PTR = 8000H TO 0FFFEH BY 2;/* WRITE TO LOWER BANK OF MEMORY */
199   5                A = A$PTR AND 7FFFH;
200   5             END;
201   4             IOPORT2 = 40H;
202   4             DO A$PTR = 8000H TO 0FFFEH BY 2;/* WRITE TO HIGH BANK OF MEMORY */
203   5                A = A$PTR;
204   5             END;
205   4             IOPORT2 = 0;
206   4             DO A$PTR = 80                                               */
207   5                IF (A <> (A$PTR
209   5             END;
210   4             IOPORT2 = 40H;
211   4             DO A$PTR = 8000H TO 0FFFEH BY 2;   READ HIGH MEMORY
212   5                IF A <> A$PTR THEN ERROR1 = 1000H;
214   5             END;

215   4             ENABLE;
216   4             IOPORT2 = 0;
217   4             SP$CON = 1;                /* SET SERIAL PORT TO MODE 1 */
218   4             EXT$PTR = 8000H;
219   4             EXT = 0ADC0H;              /* START SELF BIT          */
220   4             DO X = 0 TO 10;            /* WAIT FOR ECHO           */
221   5             END;
222   4             EXT$PTR = 8002H;
223   4             IF EXT = 0ADC0H THEN
224   4             DO;
225   5                CALL TIME(20);
226   5                SBUF = 0A5H;
227   5                CALL TIME(20);
228   5                SBUF = 0A5H;
229   5                CALL TIME(20);
230   5                EXT$PTR = 800AH;
231   5                LOWBYT = EXT AND 0FFH;
232   5                SBUF = LOWBYT;         /* SEND BUS A STATUS       */
233   5                CALL TIME(20);
234   5                EXT$PTR = 800EH;
235   5                LOWBYT = EXT AND 0FFH;
236   5                SBUF = LOWBYT;         /* SEND BUS B STATUS       */
```

```
237  5            DO Z = 0 TO 5000H;   /* WAIT FOR BIT TO FINISH   */
238  6            END;

239  5            EXT$PTR = 8008H;
240  5            IF EXT <> 4F4BH THEN Z = EXT AND OFFH;
242  5            ELSE Z = 1EH;
243  5            Z = SHL(Z,5);             /* SHIFT PROPER MESSAGE INTO ERROR1  */
244  5            ERROR1 = ERROR1 OR Z;

245  5            EXT$PTR = 800AH;
246  5            IF EXT <> 4F4BH THEN Z = EXT AND OFFH;
248  5            ELSE Z = 1EH;             /* SHIFT IN THE PROPER ERROR MESSAGE */
249  5            ERROR1 = ERROR1 OR Z;

250  5            EXT$PTR = 8000H;
251  5            EXT = 0ADC5H;        /* INITIATE MEMORY TEST          */
252  5            DO Z = 0 TO 5000H;
253  6            END;
254  5            EXT$PTR = 8008H;
255  5            IF EXT = 4F4BH THEN ERROR1 = ERROR1 OR 8000H;
257  5         END;
253  4         ELSE ERROR1 = ERROR1 OR 339H;
259  4         BIT$RSLT = ERROR1;   /* STORE RESULTS OF BIT          */
260  4      END;

     $   EJECT


/************************************************************************/
/* TRACE MODE:                                                          */
/*                                                                      */
/*  LOAD THE PROGRAM TABLE INTO LOCAL RAM,                              */
/*                                                                      */
/* INITIALIZE VARIABLES AND START TIMER FOR TIMETAG AND TIMEOUT,        */
/*                                                                      */
/* PROCESS THE OPCODES UNTIL TIMEOUT, ERROR, OR THE END OF THE TABLE,   */
/*                                                                      */
/* ECHO A ZERO IN THE COMMAND WORD OR INDICATE THE ERROR.               */
/************************************************************************/

261  3     IF (COMMAND > OEDCOH) AND (COMMAND < OEDC5H) THEN
262  3     DO;
263  4        DISABLE;
264  4        Y = 0;
265  4        IOPORT2 = 0;
266  4        EXT$PTR = 8012H;        /* HOLD THE TRACE MODE          */
267  4        EXT = 6000H;
268  4        EXT$PTR = 800CH;        /* SET THE COUNT FOR INFINITE TRACE */
269  4        EXT = OFFFFH;
270  4        ERROR1 = 0;             /* CLEAR ERROR FLAG             */
271  4        EXT$PTR = 8000H;
272  4        EXT = 0ADC1H;           /* START TRACE MODE             */
     $   EJECT
```

```
/***********************************************************************/
/* LOAD PROGRAM TABLE:                                                 */
/*                                                                     */
/*   CALCULATE THE EFFECTIVE ADDRESS OF THE TABLE IN MEMORY.           */
/*                                                                     */
/*   IF A PROPER LENGTH, THEN LOAD THE TABLE INTO LOCAL RAM,           */
/*   CALCULATE AND COMPARE THE CHECKSUM.                               */
/*                                                                     */
/*   SET THE START POINTER OF THE QUEUE AT THE END OF THE PROGRAM TABLE. */
/***********************************************************************/
        IF COMMAND AND 1 <> 0 THEN
        DO;
            PRO$PTR = 24H;
            EXT$PTR = SHL(SEG,4);
            EXT$PTR = EXT$PTR + OFFSET;
            IF EXT$PTR > 7F80H THEN IOPORT2 = 40H;   /* ACCOUNT FOR BANKSEL. */
            ELSE EXT$PTR = EXT$PTR OR 8000H;          /* CHECK TABLE LENGTH   */
            IF (EXT < 4) OR (EXT > 50) THEN ERROR1 = 0BAD8H;
            ELSE
            DO;
                CHECKSUM = 0;
                X = EXT - 1;
                EXT$PTR = EXT$PTR + 2;
            /* READ IN TABLE, AND COMPARE CHECKSUM  */
                DO WHILE X <> 0;
                    PRO = EXT;
                    CHECKSUM = CHECKSUM + PRO;
                    PRO$PTR = PRO$PTR + 2;
                    EXT$PTR = EXT$PTR + 2;
                    X = X - 1;
                END;
                IF CHECKSUM <> EXT THEN ERROR1 = 0BAD4H;
                QSTART = PRO$PTR;
            END;
        END;
$   EJECT
/* INITIALIZATIONS  */
            QRDPTR = QSTART - 2;
            QWRPTR = QRDPTR;
            PRO$PTR = 26H;   /* SET PROGRAM POINTER AT FIRST COMMAND WORD    */
            SEQNO = 0FFFFH;
            REPCNT = 0;
            QCNT = 0;
            TTAG = 0;
            IOPORT2 = 0;
            TIMEX = TIMEOUT;
            INC = INCREMENT;     /* SET SIZE OF TIME INCREMENTS              */
            CCUNTMES = 0;
            TRIGGERADR = 0;
            MUXDATA$PTR = 0;

            IF COMMAND > 0EDC2H THEN
            DO WHILE (IOPORT2 AND 8) = 0;
                DO Z = 1 TO 5000;
                END;
            END;
```

```
317  4        /* SET UP INTERRUPTS AND START THE TRACE    */
318  4        IOC0 = 80H;
319  4        IOC1 = 0A0H;
320  4        INT$MASK = 0A0H;       /* MESSAGE INTERRUPTS AND TIMEOUTS  */
321  4        INT$PENDING = 0;
322  4        NEXTINT = TIMER1 + INC;
323  4        HSO$COMMAND = 18H;
324  4        HSO$TIME = NEXTINT;
325  4        EXT$PTR = 8012H;
326  4        EXT = 4000H;
              ENABLE;

327  4        DO WHILE QCNT = 0;   /* WAIT FOR THE FIRST MESSAGE          */
328  5        END;
329  4        DO WHILE (PRO < 7) AND (ERROR1 = 0);

330  5            DO CASE PRO;
     $ EJECT
331  6        /* FIND */
                  DO;
332  7                FIND = 0;
333  7                FIRSTFIND = PRO$PTR;      /* STORE LOCATION OF FIRST FIND */
334  7                DO WHILE (FIND = 0) AND (ERROR1 = 0);
335  8                    PRO$PTR = FIRSTFIND;
336  8                    QRDPTR = QRDPTR + 2;
337  9                    IF QRDPTR = 0B2H THEN QRDPTR = QSTART;
339  8                    CALL SEARCH;
340  8                END;
341  7                DO WHILE PRO = 8;         /* SKIP THROUGH "OR"S AFTER FOUND */
342  8                    PRO$PTR = PRO$PTR + 0CH;
343  8                END;
344  7                TRIGGERADR = QRD - 4;     /* STORE THE ADDRESS OF TRIGGER   */
345  7                IOPORT2 = 0;
346  7            END;

              /* IF */
347  6            DO;
348  7                FIND = 0;
349  7                FIRSTFIND = PRO$PTR;
350  7                CALL SEARCH;
351  7                DO WHILE PRO = 8;
352  8                    PRO$PTR = PRO$PTR + 0CH;
353  8                END;
354  7                IOPORT2 = 0;
355  7                IF FIND = 0 THEN PRO$PTR = PRO$PTR + 4;
357  7            END;

              /* GO TO */
358  6            DO;
359  7                PRO$PTR = PRO$PTR + 2;
360  7                X = 2 * PRO;
361  7                PRO$PTR = PRO$PTR + X;
362  7            END;

     $ EJECT
```

```
363   6      /* SAMPLE */
364   7        DO:
365   7            PRO$PTR = PRO$PTR + 2;
366   7            SAMPLE = PRO;
367   8            DO WHILE (SAMPLE > 0) AND (ERROR1 = 0);
368   9                DO WHILE QCNT = 0:
369   8                END;
370   8                SAMPLE = SAMPLE - 1;
371   8                QCNT = QCNT - 1;
372   8                QRDPTR = QRDPTR + 2;
374   8                IF QRDPTR = 0B2H THEN QRDPTR = QSTART;
375   7            END;
376   7            PRO$PTR = PRO$PTR + 2;
               END;

377   6      /* NEXT */
378   7        DO:
379   7            FIND = 0;
380   7            NEXTFIND = FIRSTFIND;
381   7            FIRSTFIND = PRO$PTR;
382   7            QRDPTR = QRDPTR + 2;
384   7            IF QRDPTR = 0B2H THEN QRDPTR = QSTART;
                   CALL SEARCH;

385   7            DO WHILE PRO = 8;
386   8                PRO$PTR = PRO$PTR + 0CH;
387   8            END;
388   7            IOPORT2 = 0;
389   7            IF FIND = 0 THEN
390   7            DO;
391   8                TRIGGERADR = 0;
392   9                QRDPTR = QRDPTR - 2;
393   8                IF QRDPTR < QSTART THEN QRDPTR = 0B2H;
395   9                PRO$PTR = NEXTFIND;
396   8            END;
397   7        END;

$   EJECT

398   6      /* COUNT */
399   7        DO:
400   7            FIRSTFIND = PRO$PTR;
401   8            DO WHILE ERROR1 = 0;
402   8                FIND = 0;
403   9                DO WHILE (FIND = 0) AND (ERROR1 = 0);
404   9                    PRO$PTR = FIRSTFIND;
405   9                    QRDPTR = QRDPTR + 2;
407   9                    IF QRDPTR = 0B2H THEN QRDPTR = QSTART;
408   9                    CALL SEARCH;
409   8                END;
410   8                IOPORT2 = 0;
412   8                IF FIND = 1 THEN COUNTMES = COUNTMES + 1;
413   7            END;
415   7            IF ERROR1 = 0BAD2H THEN ERROR1 = 0;
416   8            DO WHILE PRO = 8;
417   8                PRO$PTR = PRO$PTR + 0CH;
419   7            END;
               END;
```

```
419   6           /* REPEAT */
                     DO:
420   7                  PRO$PTR = PRO$PTR + 2;
421   7                  REPCNT = REPCNT + 1;
422   7                  IF REPCNT < PRO THEN PRO$PTR = 26H;
424   7                  ELSE PRO$PTR = PRO$PTR + 2;
425   7              END;
426   6              END;

427   5           END;
428   4           DISABLE;
429   4           EXT$PTR = 8012H;
430   4           EXT = 0;
431   4           ECHO = ERROR1;
432   4           COMMAND = ECHO;
433   4           MESSAGECNT = COUNTMES;

434   4       END;

      $   EJECT
/**********************************************************************/
/* RESET THE TIMER:                                                   */
/*                                                                    */
/*   SET THE DELAYS OF THE VARIOUS MESSAGE RATES.                     */
/*   WHEN EDC6 IS INVOKED, THESE NEW DELAYS ARE READ IN TO THE CCUNTERS */
/*                                                                    */
/*   REINITIALIZE AND ENABLE THE EXTERNAL INTERRUPT.                  */
/**********************************************************************/

435   3     IF COMMAND = 0EDC6H THEN
436   3     DO;
437   4         IOPORT2 = 0;
438   4         IOPORT1 = 0;
439   4         Y = 0FFH;
440   4         DISABLE;
          /* READ IN SPACING OF MESSAGES */
441   4         COUNTER80 = DELAY80;
442   4         COUNTER40 = DELAY40;
443   4         COUNTER20 = DELAY20;
444   4         COUNTER10 = DELAY10;
445   4         COUNTER5 = DELAY5;
446   4         COUNTER2 = DELAY2;
447   4         COUNTER1 = DELAY1;
448   4         INT$MASK = 20H;
449   4         IOC0 = 80H;
450   4         IOC1 = 0A0H;
451   4         NEXTINT = TIMER1 + 32H; /* INITIALIZE INTERRUPT TIME    */
452   4         HSO$COMMAND = 18H;      /* SET SOFTWARE TIMER 0         */
453   4         HSO$TIME = NEXTINT;     /* SET TIME OF FIRST INTERRUPT  */
454   4         INT$PENDING = 0;
455   4         ENABLE;
456   4         COMMAND = 0;
457   4     END;

458   3   END;
459   2   END MAIN;

460   1   END NANLZ3;
```

```
MODULE INFORMATION:

     CODE AREA SIZE                = 072EH    1839D
     CONSTANT AREA SIZE            = 003DH      61D
     DATA AREA SIZE                = 0000H       0D
     STATIC REGS AREA SIZE         = 002AH      42D
     OVERLAYABLE REGS AREA SIZE    = 0000H       0D
     MAXIMUM STACK SIZE            = 0018H      24D
     752 LINES READ

PL/M-96 COMPILATION COMPLETE.      0 WARNINGS,     0 ERRORS
```

Appendix D

```
ISIS-II PL/M-51 X003
COMPILER INVOKED BY:  PLM51 :F1:mb2int.P51

           $    TITLE ('MB2 interface processor VERSION 1.0')
           $    DATE ('14-apr-86')
           $    debug
           $    ROM(SMALL)
           $    REGISTERBANK(0)
           $    xref
           /*
           WRITTEN BY:          kevin brady
           support by:          Dept. 314 ADG
           hardware:            MB II interface hardware
                                page 4 of 6, dwg no. 68T052869
           software:            plm51

           */
 1   1     multi$bus$2: DO;

 2   1     DECLARE
               MB2$HEADER   STRUCTURE (
                   MODULE$TYPE(2) BYTE,
                   VER(5) BYTE,
                   PNAME(4) BYTE,
                   DATE$ID(12) BYTE) PUBLIC constant (
                       'S:',
                       'V1.0',':',
                       'kpb',':',
                       '14-apr-86',':',0AH,0DH);
```

```
            $    eject
            /*---------------literal definitions ----------------*,

 3   1      declare dcl literally   'declare';
 4   1      dcl lit literally   'literally';
 5   1      dcl reg literally   'register';
 6   1      DCL AUX LIT 'AUXILIARY';
 7   1      dcl rdy              lit  '1';
 8   1      dcl inactive         lit  '1';
 9   1      dcl active           lit  '0';
10   1      dcl on               lit  '1';
11   1      dcl off              lit  '0';
12   1      dcl run              lit  '1';

13   1      dcl complete         lit '0',
                reg$int          lit '80h',
                bit$int          lit '84h',
                NEW              lit  '80h';

14   1      dcl NULL             lit '00h',
                psb$rec          lit '06h',
                adg$rec          lit '07h',
                class$id         lit '40h',
                st$send          lit '0a5h',
                hard$ver         lit '01h';

15   1      dcl clear            lit  '0';

            /*see PLA docomentation for U42,
              for the following mic access decodings*/

16   1      dcl rd$mic$stat      lit '080h',
                rd$mic$host      lit '081h',
                rd$mic$conf      lit '082h',
                rd$mic$cont      lit '083h',
                rd$mic$data      lit '084h',
                rd$mic$err       lit '085h',
                rd$mic$comm      lit '087h',
                wr$mic$stat      lit '090h',
                wr$mic$host      lit '091h',
                wr$mic$conf      lit '092h',
                wr$mic$cont      lit '093h',
                wr$mic$data      lit '094h',
                wr$mic$err       lit '095h',
                wr$mic$comm      lit '097h',
                release          lit '0c0h';

17   1      dcl set$l            lit '0a8H',
                set$h            lit '0a9H',
                hgh$wr           lit '0bch',
                low$wr           lit '09ch',
                wr$l$data        lit '09EH',
                l$access         lit '0f8H',
                r$access         lit '0';

18   1      dcl slot$no          lit '34',
                arb$no           lit '35',
```

```
              sel$h              lit '36',
              sel$l              lit '37';
19    1    dcl destsisd          lit '40',
              svc$i$ds1          lit '41',
              svc$i$d$2          lit '42',
              svc$i$d$3          lit '43',
              bist$reg$1         lit '18',
              bist$reg$2         lit '19';
           $  eject
           /*--------    define   i/o   ----------------------*/
20    1    dcl DATA$PORT   byte    at (0a0h) reg;
21    1    dcl a2          bit     at (90h)  reg;
22    1    dcl in$data     byte    at (080h) reg;
23    1    dcl tcon        byte    at (088h) reg,
               pcon        byte    at (087h) reg,
               scon        byte    at (098h) reg,
               tmod        byte    at (089h) reg,
               tl0         byte    at (08ah) reg,
               tl1         byte    at (08bh) reg,
               th0         byte    at (08ch) reg,
               th1         byte    at (08dh) reg,
               s$buf       byte    at (99h)  reg,
               ie          byte    at (0a8h) reg,
               ip          byte    at (0b8h) reg;
24    1    dcl w$m         bit     at (97h)  reg,
               int$type    bit     at (0b4h) reg,
               int1        bit     at (0b3h) reg,
               con$port    byte    at (90h)  reg;
25    1    dcl f0          bit     at (0d5h) reg;
26    1    dcl ri          bit     at (098h) reg;
27    1    dcl ti          bit     at (099h) reg;
          $  eject
          /* external variables for communication to MM */
28    1   dcl RISTAT       BYTE    AT (80H) AUX,
              INPROC       BYTE    AT (81H) AUX,
              RIADRL       BYTE    AT (82H) AUX,
              RIADRH       BYTE    AT (83H) AUX,
              SETERR       BYTE    AT (84H) AUX,
              CLRERR       BYTE    AT (85H) AUX,
              RTSYNC       BYTE    AT (86H) AUX,
              SLREG        BYTE    AT (87H) AUX,
              RIDATA       BYTE    AT (88H) AUX,
              SLOTID       BYTE    AT (8DH) AUX,
              ARBID        BYTE    AT (8EH) AUX,
              ERRREG       BYTE    AT (8FH) AUX;

          /* random variables */
29    1   dcl flag          byte    at (19h);
30    1   dcl i$var0        byte    at (1ah);
31    1   dcl i$var1        byte    at (1bh);
32    1   dcl i$var2        byte    at (1ch);
```

```
33   1      dcl  i$var3          byte     at (1dh);
34   1      dcl  i$var4          byte     at (1eh);
35   1      dcl  i$d$count       byte     at (1fh);

36   1      dcl  err$svc byte;
37   1      dcl  err$cnt byte;
38   1      dcl  inter$connect$array(30h) byte;

            /*CONSTANT DECLARATIONS FOR DEFAULT VALUES FOR INTERCONNECT SPACE*/

39   1      DCL HEADER(*) BYTE CONSTANT (NULL,NULL,'ADGDPM1553',NULL,NULL,NULL,
                                         NULL,HARD$VER,CLASS$ID,NULL);
40   1      DCL PSB(*) BYTE CONSTANT (PSB$REC,04H,33H,00H,0CH,00H);
41   1      DCL ADG(*) BYTE CONSTANT (ADG$REC,04H,22H,01H,02H,03H);

            /* bit variables */
            $   eject
            /*      ***********************************     *
             *      ***** local procedures begin *******     *
             *      ***********************************     */
42   1      initialize$51:  procedure;

               /* Initialize Timer0 and set interrupts -
                  INT0 - interconnect space
                  INT1 - main level interrupt from host
                  TIMER0 - timer 0 is set up as a counter, and preloaded
                           with FFFF. On the first input (lo-hi) it rolls over
                           to 0 and issues interrupt and is auto-reloaded.
                  TIMER1 - timer 1 is used to generate the baud rate for the
                           serial port - 9600 baud with 8751H

              conditions       INT1        TIMER0          action        Int i.d.
                                1            1             Normal Op
                                0            1             Error            0
                                0            0             EOT              1
                                1          0 to 1          Special          2

            NOTE: In case of EOT the INT1 handler must wait for TIMER0 line to
            go high, clear the interrupt flag and reload TIMER0 preset before
            exiting.   */

43   2         tmod=0010$0110b:      /* timer0 - mode 2 auto-reload counter
                                        timer1 - mode 2 timer for serial port   */
44   2         th0 =0ffh;            /* auto re-load */
45   2         tl0 =0ffh;            /* preload */
46   2         th1 = (-6);           /* reload for baud generation 9600 on 8751H */
47   2         tcon=0101$0101b:      /* counter 0 and timer 1 on, 1 off,
                                        int 0 and 1 edge triggered*/
48   2         scon=0101$0000b;      /* serial port mode 2 recv. enabled*/

49   2         ip   =0000$0101b;     /* external 0 is high priority */
50   2         ie   =0001$0111b;     /* interrupts  will be enabled later*/
51   2         PCON=NEW;             /* set for next generation 8751's */

52   2      end;

53   1      i$sp$setup: procedure;
               /*called to set up INTERCONNECT SPACE at reset*/
```

```
/*interconnect structure for this board

Reg     Value               Meaning

0       00H          Non-Intel licensed board
1       00H
2       'A'               Board I.D
3       'D'               Board I.D
4       'G'               Board I.D
5       'D'               Board I.D
6       'P'               Board I.D
7       'M'               Board I.D
8       '1'               Board I.D
9       '5'               Board I.D
10      '5'               Board I.D
11      '3'               Board I.D
12      00H             Intel Reserved
13      00H             Intel Reserved
14      00H             Intel Reserved
15      00H             Intel Reserved
16      01H             Hardware Version #
17      40H               Class I.D
                      4 = communication board
                      0 = reserved subclass
18      00H           Bist register 1
19      00H           Bist register 2
20      00H           Undefined as yet for us
thru
31

                    iPSB Control Record
32      06H           Record Type
33      04H           Record Length
34      33H           Slot I.D.
35      00H           Arb. I.D.
36      00H           Sel_H
37      00H           Sel_L

                     ADG Record
38      07H           Record Type
39      04H           Record Length
40      22H           Interrupt Dest.
41      01            Service i.d. 1
42      02            Service i.d. 2
43      03            Service i.d. 3

44      FFH           End of Template

*/

    DO i$var0 = 0 to 18;
      interconnect$array(i$var0) = HEADER(i$var0);   /*BOARD HEADER*/
    END;

    DO i$var0 = 0 to 5;
      interconnect$array(32 + i$var0) = PSB(i$var0);   /*PSB INFO*/
    END;
```

```
        DO i$var0 = 0 to 5;
          interconnect$array(38 + i$var0) = ADG(i$var0);    /*BOARD PECULIAR*/
        END;

       interconnect$array(44) = 0FFH;  /*END OF TEMPLATE*/
       interconnect$array(30h) = 0EEH;  /*out of range indicator*/

    end i$sp$setup;

    bist$recieve: procedure interrupt 4 using 2;

    /*this routine is called to wait for serial port inputs.
    the incoming words are stored in the template. if an error
    occurs in header transmission, procedure is aborted. data$port
    contains 55H while in this procedure - uses i$var0*/

      ie = 1000$0001b;        /*enable interconnect*/
      DATA$PORT = 55H;      /*signal in bist*/

      i$var0 = s$buf;
      if i$var0 <> st$send                        /*check for start char*/
        then do;
            inter$connect$array(bist$reg$1) = 0daH;
            return;                                          /*bail out*/
        end;

      ri = 0;
      do while ri =0;                            /*wait for recieve char*/
        end;

      i$var0 = s$buf;
      if i$var0 <> st$send                             /*check for start char*/
        then do;
            inter$connect$array(bist$reg$2) = 0daH;
            return;                                        /*bail out*/
        end;

      ri = 0;
      do while ri =0;                                  /*wait for recieve char*/
        end;

      inter$connect$array(bist$reg$1) = s$buf;

      ri = 0;
      do while ri =0;                                  /*wait for recieve char*/
        end;

      inter$connect$array(bist$reg$2) = s$buf;

      DATA$PORT = 0ffH;                               /*signal bist completed*/

    end bist$recieve;

    inter$connect$rep:  procedure interrupt 0 using 1;

    /* this routine responds to an IREQ from the MM. An INPROC is set back in the
       MM. RIADRL and RIADRL are read as well as the status to determine what kind
```

```
of a request the MM thinks it has. The data is then supplied (read) or
stored   (write).

status register format

bit 0 INPROC            1 = active
    1 PSB READ          0 = active
    2 LOCAL READ        0 = active
    3 LOCAL ACCESS      0 = active

uses variable i$var0,i$var1,i$var2 */
beg: inproc = 0;                /*write to 81h with dummy data, sets INPROC bit*/
     i$var0    = RIADRL;             /*read low address from 82h*/
     i$var1    = RIADRH;             /*read high address from 83h*/
     i$var2 = RISTAT;                /*read MM interconnect status*/
     if (i$var2 and 01h) <> 01h      /*check for INPROC set*/
       then goto beg;

     if (i$var2 and 08h) = 0                /*check access status*/
       then do;                             /*local access*/
          i$var0 = RIDATA;                     /*get written value*/
          do case (i$var0 and 01h);            /*one case so far*/
             do;                                 /*case 0*/
                i$var0 = SLOTID;                 /*read slot i.d. */
                inter$connect$array(slot$no) = i$var0;   /*store*/
                i$var0 = shl(i$var0,3);        /*shift for good old Intel*/
                SLREG = i$var0;                /*latch into MM pal*/
                inter$connect$array(arb$no) = ARBID;    /*store arb*/
                RTSYNC = 0;                    /*clear rt sync*/
             end;
             ;                                /*case 1*/
          end;    /*case*/
       end;

       else do;                                            /*PSB access*/
         i$var0 = shl((i$var1 and 07h),6) or
                  shr((i$var0 and 0fch),2);                       /*get index value*/
         if ((i$var0 > 30h) or ((i$var1 and 04h) <> 0))          /*check reg. no.*/
           then i$var0 = 30h;                                     /*set out of range
                                                                   to last*/
         if (i$var2 and 02h) = 0                                  /*check PSB status*/
           then RIDATA = interconnect$array(i$var0);              /*read - output data*/
           else do;                                              /*write - input data*/
              if i$var0 = 36 or i$var0 = 37 or                   /*check for read only*/
                 (i$var0 > 39 and i$var0 < 44)
                 then interconnect$array(i$var0) = RIDATA;
              if i$var0 = sel$h
                 then do;                                        /*high written last*/
                    RISTAT = 0;                    /*dummy write to complete transfer*/
                    data$port = inter$connect$array(sel$h);     /*write value*/
                    con$port = set$l;                           /*latch low*/
                    con$port = release;                           /*reset data strobe*/
                    data$port = inter$connect$array(sel$l);     /*write value*/
                    con$port = set$h;                           /*latch high*/
                    con$port = release;                         /*reset data strobe*/
                    RETURN;
                 end;
           end;
```

```
            end;
        RISTAT = 0;                /*dummy write to complete transfer*/
        RETURN;
    end inter$connect$rep;
    int$trans: procedure using 2;
      if f0 = 0          /*check for main interrupt- INT1 */
        then do;
          if int$type = 0
            then i$var3 = inter$connect$array(svc$i$d$1);      /*ERROR INT*/
            else i$var3 = inter$connect$array(svc$i$d$2);      /*eot int*/
        end;
        else i$var3 = inter$connect$array(svc$i$d$3);     /*SPECIAL SOFTWARE INT*/

    /*check status for transmit FIFO not full*/
      data$port = 0ffh;                      /*prepare for input*/
      con$port = rd$mic$stat;
      do while w$m = active;                 /*wait signal*/
        end;
      i$var4 = data$port;    /*read status*/
      con$port = release;                  /*reset data strobe*/
       /*send destination i.d. to data port*/
      data$port = inter$connect$array(dest$i$d);  /*dest i.d.*/
      con$port = wr$mic$data;
      do while w$m = active;                 /*wait signal*/
        end;
      con$port = release;                  /*reset data strobe*/
       /*send service i.d. to data port*/
      data$port = i$var3;                              /*service i.d.*/
      con$port = wr$mic$data;
      do while w$m = active;                 /*wait signal*/
        end;
      con$port = release;                  /*reset data strobe*/
       /*send message type - 00h for int*/
      data$port = 00h;
      con$port = wr$mic$data;
      do while w$m = active;                 /*wait signal*/
        end;
      con$port = release;                  /*reset data strobe*/
       /*send request i.d. to data port*/
      data$port = i$d$count;                 /*i.d. for int*/
      con$port = wr$mic$data;
      do while w$m = active;                 /*wait signal*/
        end;
      con$port = release;                  /*reset data strobe*/
       /*send 00h to command port to intiate int*/
      data$port = 00h;                             /*dummy value*/
      con$port = wr$mic$comm;
      do while w$m = active;                 /*wait signal*/
        end;
```

```
179   2        con$port = release;               /*reset data strobe*/

                /*set up interrupt queue for error repeats*/

180   2        i$d$count = i$d$count + 1;  /*increment count*/
181   2        if i$d$count = 10h
                 then i$d$count = 0;

183   3        do while int$type = 0;       /* wait for special int to go high*/
184   3          end;

185   2      end int$trans;

186   1      main$int: procedure interrupt 2 using 2;

               /*this int routine occurs when a main INT1 comes, it calls
                int$transmit to determine the type of int and to respond AND
                then clears int 2 and int 1*/

187   2      disable;
188   2      f0 = 0;                       /*set flag to 0 for main*/
189   2      call int$trans;               /*HANDLE INTERRUPT TRANSMISSICN*/
190   2      tcon = (tcon and 0dfh);         /*CLEAR TIMER 0 INT FLAG*/

191   2      end main$int;

192   1      secondary$int: procedure interrupt 1 using 2;

               /*OCCURS ON A SPECIAL SOFTWARE INTERRUPT. CALLS INT$TRANSMISSION
               TO HANDLE INT AND RETURNS*/

193   2      disable;
194   2      f0 = 1;                       /*set flag to 1 for secondary*/
195   2      call int$trans;      /*handle int*/
196   2      tcon = (tcon and 0dfh);      /*CLEAR TIMER 0 INT FLAG*/

197   2      end secondary$int;

198   1      local$access: procedure;

             /*called to send a local MM access to intiate an interconnect request
               uses i$var4  */

199   2        data$port = l$access;              /*write local accesss*/
200   2        con$port = hgh$wr;                 /*set be0 = 1*/
201   3        do while w$m = active;            /*wait states from MIC*/
202   3          end;
203   2        con$port = release;                   /*reset data strobe*/

204   2        data$port = r$access;              /*write local accesss*/
205   2        con$port = low$wr;                 /*set be0 = 0*/
206   3        do while w$m = active;            /*wait states from MIC*/
207   3          end;
208   2        con$port = release;                   /*reset data strobe*/

209   2        data$port = i$var4;                   /*write passed value*/
210   2        con$port = wr$l$data;                 /*set be0 = 0*/
211   3        do while w$m = active;            /*wait states from MIC*/
212   3          end;
```

```
213   2       consport = release;
214   2     end local$access;
215   1     int$err: procedure;
              /*this routine is called when a MINT has been asserted. it interrogates
                the MIC for the error and repeats the message*/
216   2       disable;                 /*disable incoming*/
              /*read mic status */
217   2        data$port = 0ffh;                         /*prepare for input*/
218   2        con$port = rd$mic$stat;
219   3        do while w$m = active;                    /*wait signal*/
220   3          end;
221   2        i$var4 = data$port;     /*read status*/
222   2        conport = release;                       /*reset data strobe*/
              /*read byte count from error port - should be 4*/
223   2        data$port = 0ffh;                         /*prepare for input*/
224   2        con$port = rd$mic$err;
225   3        do while w$m = active;                    /*wait signal*/
226   3          end;
227   2        i$var4 = data$port;
228   2        con$port = release;                      /*reset data strobe*/
              /*read dest i.d.*/
229   2        data$port = 0ffh;                         /*prepare for input*/
230   2        con$port = rd$mic$err;
231   3        do while w$m = active;                    /*wait signal*/
232   3          end;
233   2        i$var4 = data$port;
234   2        con$port = release;                      /*reset data strobe*/
              /*read source i.d.*/
235   2        data$port = 0ffh;                         /*prepare for input*/
236   2        con$port = rd$mic$err;
237   3        do while w$m = active;                    /*wait signal*/
238   3          end;
239   2        err$svc = data$port;    /*save service i.d.*/
240   2        con$port = release;                      /*reset data strobe*/
              /*read type i.d.*/
241   2        data$port = 0ffh;                         /*prepare for input*/
242   2        con$port = rd$mic$err;
243   3        do while w$m = active;                    /*wait signal*/
244   3          end;
245   2        i$var4 = data$port;
246   2        con$port = release;                      /*reset data strobe*/
              /*read i$d$count.*/
247   2        data$port = 0ffh;                         /*prepare for input*/
248   2        con$port = rd$mic$err;
249   3        do while w$m = active;                    /*wait signal*/
250   3          end;
251   2        err$cnt = data$port;    /*save i.d. count*/
252   2        con$port = release;                      /*reset data strobe*/
253   2       data$port = 0;                                 /*dummy value of 0*/
```

```
254  2        con$port = wr$mic$err;
255  3        do while w$m = active;                  /*wait signal*/
256  3          end;
257  2        con$port = release;                    /*reset data strobe*/

258  2        if (err$cnt and 80h) = 80h
                then return;

260  2     st:

              flag = on;
261  3        do while flag = on;
262  3        data$port = 0ffh;                       /*prepare for input*/
263  3        con$port = rd$mic$stat;
264  4        do while w$m = active;                  /*wait signal*/
265  4          end;
266  3        isvar4 = data$port;    /*read status*/
267  3        con$port = release;                    /*reset data strobe*/
268  3          if (isvar4 and 01h) = 01h            /*loop if MTNF bit not set*/
                  then flag = off;
270  3        end;

               /*send destination i.d. to data port*/
271  2        data$port =  inter$connect$array(dest$isd);  /*dest i.d.*/
272  2        con$port = wr$mic$data;
273  3        do while w$m = active;                  /*wait signal*/
274  3          end;
275  2        con$port = release;                    /*reset data strobe*/

               /*send service i.d. to data port*/
276  2        data$port = err$svc;                                 /*service i.d.*/
277  2        con$port = wr$mic$data;
278  3        do while w$m = active;                  /*wait signal*/
279  3          end;
280  2        con$port = release;                    /*reset data strobe*/

               /*send message type - 00h for int*/
281  2        data$port = 00h;
282  2        con$port = wr$mic$data;
283  3        do while w$m = active;                  /*wait signal*/
284  3          end;
285  2        con$port = release;                    /*reset data strobe*/

               /*send request i.d. to data port*/
286  2        data$port = (err$cnt and 0fh);                  /*i.d. for int*/
287  2        con$port = wr$mic$data;
288  3        do while w$m = active;                  /*wait signal*/
289  3          end;
290  2        con$port = release;                    /*reset data strobe*/

               /*send 00h to command port to intiate int*/
291  2        data$port = 00h;                              /*dummy value*/
292  2        con$port = wr$mic$comm;
293  3        do while w$m = active;                  /*wait signal*/
294  3          end;
295  2        con$port = release;                    /*reset data strobe*/
```

```
end int$err;

mic$setup: procedure;

/*set up MIC for operation*/

 /*read MIC status*/

 flag = off;
 do while flag = off;
   data$port = 0ffh;                          /*prepare for input*/
   con$port = rd$mic$stat;
   do while w$m = active;                     /*wait signal*/
     end;
   i$var4 = data$port;
   con$port = release;                       /*reset data strobe*/
   if (i$var4 and 01h) = 01h
     then flag = on;
 end;

     /*write configuration byte*/

 flag = off;
 do while flag = off;
   data$port = 00h;                           /*conf byte*/
   con$port = wr$mic$conf;
   do while w$m = active;                     /*wait signal*/
     end;
   con$port = release;                       /*reset data strobe*/

     /*read configuration byte*/

   data$port = 0ffh;                          /*prepare for input*/
   con$port = rd$mic$conf;
   do while w$m = active;                     /*wait signal*/
     end;
   i$var4 = data$port;
   con$port = release;                       /*reset data strobe*/
   if (i$var4 and 80h) = 0h
     then flag = on;
end;

     /*write control byte*/

   data$port = 04H;                          /*interrupt on INT MES error*/
   con$port = wr$mic$cont;
   do while w$m = active;                     /*wait signal*/
     end;
   con$port = release;                       /*reset data strobe*/

     /*write host i.d. byte*/

   data$port = 33H;                          /*host i.d. 33h , why not*/
   con$port = wr$mic$host;
   do while w$m = active;                     /*wait signal*/
     end;
   con$port = release;                       /*reset data strobe*/
```

```
                /*read status byte*/
            data$port = 0ffh;
            con$port = rd$mic$stat;               /*prepare for input*/
            do while w$m = active;
              end;                                /*wait signal*/
            i$var4 = data$port;
            con$port = release;
            if (i$var4 and 80h) <> 80h         /*reset data strobe*/
              then do;
                DATA$PORT = 33H;
                do while 1;
                  end;                   /*hang up forever*/
              end;
        end mic$setup;
$     eject
mb2$main:
      disable;
      disable;
      call     initialize$51;         /* set parameters*/

      /*set up default values for output pins*/
      in$data = 0;                    /*set debug port*/
      i$d$count = 0:                  /*initialize int i.d. count*/

      call i$sp$setup;                  /*initialize interconnect array*/
      call mic$setSup;                /*set up mic*/
      i$var4 = 0;                  /*set for clear rtsync in local access*/
      pcon = reg$int;                  /*no conditions present yet*/
      ie = 1000$0001b;          /* accept interconnect interrupts now */
      call local$access;         /*local access to interconnect space*/
      th0 =0ffh;              /* auto re-load */
      tl0 =0ffh;              /* preload */
      ie = 0001$0111b:        /*enable all int*/

      do  while 1;                          /* Begin Local level procedure */
          enable;                           /* accept interrupts now */

          data$port = 0aah;                 /*signal ready for serial port*/

          if w$m = 1 then call int$err;     /*error in int trans*/
      end;                                  /* end local module */
    end multi$bus$2;                      /* end main.run */
```

```
CROSS-REFERENCE LISTING
-----------------------

DEFN  SPACE  SIZE  NAME             ATTRIBUTES AND REFERENCES
----  -----  ----  ----             -------------------------

 21                A2 . . . . . . . BIT REGISTER AT(90H)
  9                ACTIVE . . . . . LITERALLY
                                      151  157  162  167  172  177  201  206  211  219  225  231  237  243  249
                                      255  264  273  278  283  288  293  302  313  318  327  332  337
 41   CODE     6   ADG. . . . . . . BYTE ARRAY(6)
                                      61
 14                ADGREC . . . . . LITERALLY
                                      41
 28   XDATA    1   ARBID. . . . . . BYTE AT(008EH)
                                      110
 18                ARBNO. . . . . . LITERALLY
                                      110
  6                AUX. . . . . . . LITERALLY
                                      28
 95   CODE         BEG. . . . . . . LABEL
                                      100
 66   CODE    69   BISTRECIEVE. . . PROCEDURE USING(2) STACK=09H INTERRUPT(4)
 19                BISTREG1 . . . . LITERALLY
                                      72   87
 19                BISTREG2 . . . . LITERALLY
                                      81   91
 13                BITINT . . . . . LITERALLY
 14                CLASSID. . . . . LITERALLY
                                      39
 15                CLEAR. . . . . . LITERALLY
 28   XDATA    1   CLRERR . . . . . BYTE AT(0085H)
 13                COMPLETE . . . . LITERALLY
 24                CONPORT. . . . . BYTE REGISTER AT(90H)
                                      129  130  132  133  150  154  156  159  161  164  166  169  171  174  176
                                      179  200  203  205  208  210  213  218  222  224  228  230  234  236  240
                                      242  246  248  252  254  257  263  267  272  275  277  280  282  285  287
                                      290  292  295  301  305  312  315  317  321  326  329  331  334  336  340
 20                DATAPORT . . . . BYTE REGISTER AT(A0H)
                                      68   92   128  131  149  153  155  160  165  170  175  199  204  209  217
                                      221  223  227  229  233  235  239  241  245  247  251  253  262  266  271
                                      276  281  286  291  300  304  311  316  320  325  330  335  339  343  364
  2   CODE    12   DATEIO . . . . . BYTE ARRAY(12) MEMBER OF M02HEADER ; OFFSET=11
  3                DCL. . . . . . . LITERALLY
                                      3    4    5    6    7    8    9    10   11   12   13   14   15   16   17
                                      18   19   20   21   22   23   24   25   26   27   28   29   30   31   32
                                      33   34   35   36   37   38   39   40
 19                DESTID . . . . . LITERALLY
                                      155  271
 37   DATA     1   ERRCNT . . . . . BYTE
                                      251  258  286
 28   XDATA    1   ERRREG . . . . . BYTE AT(008FH)
 36   DATA     1   ERRSVC . . . . . BYTE
                                      239  276
 25                F0 . . . . . . . BIT REGISTER AT(D5H)
```

```
                                           142  188  194
 29  DATA      1  FLAG . . . . . . . . BYTE AT(0019H)
                                           260  261  269  298  299  307  309  310  323
 14               HARDVER. . . . . . . LITERALLY
                                           39
 39  CODE     19  HEADER . . . . . . . BYTE ARRAY(19)
                                           55
 17               HGHWR. . . . . . . . LITERALLY
                                           200
 35  DATA      1  IDCOUNT. . . . . . . BYTE AT(001FH)
                                           170  180  181  182  352
 23               IE . . . . . . . . . BYTE REGISTER AT(A8H)
                                           50   67   357  361
  8               INACTIVE . . . . . . LITERALLY
 22               INDATA . . . . . . . BYTE REGISTER AT(80H)
                                           351
 42  CODE     28  INITIALIZE51 . . . . PROCEDURE USING(0) STACK=02H
                                           350
 28  XDATA     1  INPROC . . . . . . . BYTE AT(0081H)
                                           95
 24               INT1 . . . . . . . . BIT REGISTER AT(B3H)
 38  DATA     48  INTERCONNECTARRAY. BYTE ARRAY(48)
                                           55   58   61   63   64   72   81   87   91   107  110  121  124  128  131
                                           145  146  148  155  271
 94  CODE    234  INTERCONNECTREP. . PROCEDURE USING(1) STACK=09H INTERRUPT(0)
215  CODE    263  INTERR . . . . . . . PROCEDURE USING(0) STACK=02H
                                           366
141  CODE    140  INTTRANS . . . . . . PROCEDURE USING(2) STACK=02H
                                           189  195
 24               INTTYPE. . . . . . . BIT REGISTER AT(B4H)
                                           144  183
 23               IP . . . . . . . . . BYTE REGISTER AT(B8H)
                                           49
 53  CODE    110  ISPSETUP . . . . . . PROCEDURE USING(0) STACK=02H
                                           353
 30  DATA      1  IVAR0. . . . . . . . BYTE AT(001AH)
                                           54   55   57   58   60   61   69   70   78   79   96   103  104  106  107
                                           108  109  117  118  119  121  123  124  125
 31  DATA      1  IVAR1. . . . . . . . BYTE AT(001BH)
                                           97   117  118
 32  DATA      1  IVAR2. . . . . . . . BYTE AT(001CH)
                                           98   99   101  120
 33  DATA      1  IVAR3. . . . . . . . BYTE AT(001DH)
                                           145  146  148  160
 34  DATA      1  IVAR4. . . . . . . . BYTE AT(001EH)
                                           153  209  221  227  233  245  266  268  304  306  320  322  339  341  355
 17               LACCESS. . . . . . . LITERALLY
                                           199
  4               LIT. . . . . . . . . LITERALLY
                                           6    7    8    9    10   11   12   13   14   15   16   17   18   19
193  CODE     49  LOCALACCESS. . . . PROCEDURE USING(0) STACK=02H
                                           358
 17               LOWHR. . . . . . . . LITERALLY
                                           205
196  CODE     13  MAININT. . . . . . . PROCEDURE USING(2) STACK=09H INTERRUPT(2)
  2  CODE     23  MB2HEADER. . . . . . STRUCTURE PUBLIC
348  CODE         MB2MAIN. . . . . . . LABEL
```

```
297  CODE     159  MICSETUP . . . . . . PROCEDURE USING(0) STACK=02H
                                        354
  2  CODE       2  MODULETYPE . . . . . BYTE ARRAY(2) MEMBER OF MB2HEADER ; OFFSET=0
  1  CODE      51  MULTIBUS2. . . . . . MODULE
 13                NEW. . . . . . . . . LITERALLY
                                        51
 14                NULL . . . . . . . . LITERALLY
                                        39
 11                OFF. . . . . . . . . LITERALLY
                                        269  298  299  309  310
 10                ON . . . . . . . . . LITERALLY
                                        260  261  307  323
 23                PCON . . . . . . . . BYTE REGISTER AT(87H)
                                        51   356
  2  CODE       4  PNAME. . . . . . . . BYTE ARRAY(4) MEMBER OF MB2HEADER ; OFFSET=7
 40  CODE       6  PSB. . . . . . . . . BYTE ARRAY(6)
                                        58
 14                PSBREC . . . . . . . LITERALLY
                                        40
 17                RACCESS. . . . . . . LITERALLY
                                        204
 16                RDMICCOMM. . . . . . LITERALLY
 16                RDMICCONF. . . . . . LITERALLY
                                        317
 16                RDMICCONT. . . . . . LITERALLY
 16                RDMICDATA. . . . . . LITERALLY
 16                RDMICERR . . . . . . LITERALLY
                                        224  230  236  242  248
 16                RDMICHOST. . . . . . LITERALLY
 16                RDMICSTAT. . . . . . LITERALLY
                                        150  218  263  301  336
  7                RDY. . . . . . . . . LITERALLY
  5                REG. . . . . . . . . LITERALLY
                                        20   21   22   23   24   25   26   27
 13                REGINT . . . . . . . LITERALLY
                                        356
 16                RELEASE. . . . . . . LITERALLY
                                        130  133  154  159  164  169  174  179  203  208  213  222  228  234  240
                                        246  252  257  267  275  280  285  290  295  305  315  321  329  334  340
 26                RI . . . . . . . . . BIT REGISTER AT(98H)
                                        75   76   84   85   88   89
 28  XDATA      1  RIADRH . . . . . . . BYTE AT(0083H)
                                        97
 28  XDATA      1  RIADRL . . . . . . . BYTE AT(0082H)
                                        95
 28  XDATA      1  RIDATA . . . . . . . BYTE AT(0088H)
                                        103  121  124
 28  XDATA      1  RISTAT . . . . . . . BYTE AT(0080H)
                                        93   127  138
 28  XDATA      1  RTSYNC . . . . . . . BYTE AT(0086H)
                                        111
 12                RUN. . . . . . . . . LITERALLY
 23                SBUF . . . . . . . . BYTE REGISTER AT(99H)
                                        69   78   87   91
 23                SCON . . . . . . . . BYTE REGISTER AT(98H)
                                        48
192  CODE      13  SECONDARYINT . . . . PROCEDURE USING(2) STACK=09H INTERRUPT(1)
```

```
 18                     SELH . . . . . . . . LITERALLY
                                               125   128
 18                     SELL . . . . . . . . LITERALLY
                                               131
 28   XDATA        1    SETERR . . . . . . . BYTE AT(0084H)
 17                     SETH . . . . . . . . LITERALLY
                                               132
 17                     SETL . . . . . . . . LITERALLY
                                               129
                        SHL. . . . . . . . . BUILTIN
                                               108   117
                        SHR. . . . . . . . . BUILTIN
                                               117
 28   XDATA        1    SLOTID . . . . . . . BYTE AT(008DH)
                                               106
 18                     SLOTNO . . . . . . . LITERALLY
                                               107
 28   XDATA        1    SLREG. . . . . . . . BYTE AT(0087H)
                                               109
260   CODE              ST . . . . . . . . . LABEL
 14                     STSEND . . . . . . . LITERALLY
                                                70    79
 19                     SVCID1 . . . . . . . LITERALLY
                                               145
 19                     SVCID2 . . . . . . . LITERALLY
                                               146
 19                     SVCID3 . . . . . . . LITERALLY
                                               148
 23                     TCON . . . . . . . . BYTE REGISTER AT(88H)
                                                47   190   196
 23                     THO. . . . . . . . . BYTE REGISTER AT(8CH)
                                                44   359
 23                     TH1. . . . . . . . . BYTE REGISTER AT(8DH)
                                                46
 27                     TI . . . . . . . . . BIT REGISTER AT(99H)
 23                     TLO. . . . . . . . . BYTE REGISTER AT(8AH)
                                                45   360
 23                     TL1. . . . . . . . . BYTE REGISTER AT(8BH)
 23                     TMOD . . . . . . . . BYTE REGISTER AT(89H)
                                                43
  2   CODE         5    VER. . . . . . . . . BYTE ARRAY(5) MEMBER OF MB2HEADER ; OFFSET=2
 24                     WM . . . . . . . . . BIT REGISTER AT(97H)
                                               151   157   162   167   172   177   201   206   211   219   225   231   237   243   249
                                               255   264   273   278   283   288   293   302   313   318   327   332   337   365
 17                     WRLDATA. . . . . . . LITERALLY
                                               210
 16                     WRMICCOMM. . . . . . LITERALLY
                                               176   292
 16                     WRMICCONF. . . . . . LITERALLY
                                               312
 16                     WRMICCONT. . . . . . LITERALLY
                                               326
 16                     WRMICDATA. . . . . . LITERALLY
                                               156   161   166   171   272   277   282   287
 16                     WRMICERR . . . . . . LITERALLY
                                               254
 16                     WRMICHOST. . . . . . LITERALLY
```

```
WARNINGS:
    4 IS THE HIGHEST USED INTERRUPT


MODULE INFORMATION:                    (STATIC+OVERLAYABLE)
    CODE SIZE                          = 0460H        1133D
    CONSTANT SIZE                      = 0036H          54D
    DIRECT VARIABLE SIZE               =    32H+00H      50D+    0D
    INDIRECT VARIABLE SIZE             =    00H+00H       0D+    0D
    BIT SIZE                           =    00H+00H       0D+    0D
    BIT-ADDRESSABLE SIZE               =    00H+00H       0D+    0D
    AUXILIARY VARIABLE SIZE            = 0000H            0D
    MAXIMUM STACK SIZE                 = 0022H           34D
    REGISTER-BANK(S) USED:               0 1 2
    725 LINES READ
    0 PROGRAM ERROR(S)
 END OF PL/M-51 COMPILATION
```

Appendix E

| QTY REQD | QTY REQD | REF DES | PART OR IDENTIFYING NO. | NOMENCLATURE OR DESCRIPTION | STF NO | STOCK |
|---|---|---|---|---|---|---|
| | | C18-C21 | | | | |
| | | C15, C16 | | | | |
| | | C9-C13 | | | | |
| 48 | 48 | C2, C3, C7 | HT11BX103H | CAPACITOR | | REPUBLIC ELEC CORP |
| | | C114 | | | | |
| | | C105, C111 | | | | |
| | | C69-C78 | | | | |
| | | C66 | | | | |
| | | C62-C64 | | | | |
| | | C47-C49 | | | | |
| | | C43, C44 | | | | |
| | | C38, C41 | | | | |
| | | C25-C30 | | | | |
| | | C22 | | | | |
| | | C8, C17 | | | | |
| 37 | 37 | C1, C4-C6 | H39014-02-1310 | CAPACITOR | | |
| 1 | 1 | U82 | | | | |
| 2 | 2 | U78, U80 | SN75451N | DRIVER | | TI |
| 2 | 2 | U75, U76 | CT3232 | BUS TRANCEIVER | | CIRCUIT TECH., INC |
| 2 | 2 | U71, U73 | AM2923DC | MULTIPLEXER | | ADVANCED MICRO DEV |
| 2 | 2 | U69, U70 | CT1555 | MIL-STD-1553 USART | | CIRCUIT TECH., INC |
| 1 | 1 | U63 | SN74LS04A | HEX INVERTER | | TI |
| 2 | 2 | U58, U59 | AM298530C | OCTAL TRANCEIVER | | ADVANCED MICRO DEV |
| | | U83 | | | | |
| | | U61, U62 | | | | |
| 5 | 4 | U56, U57 | SN74LS245N | OCTAL TRANCEIVER | | TI |
| 2 | 2 | U52, U53 | P8283 | INV OCTAL LATCH | | INTEL |
| | | U60 | | | | |
| 3 | 3 | U50, U51 | SN74LS241N | BUFFER/LINE DRIVER | | TI |
| 1 | 1 | U49 | P8751H | MICROCOMPUTER | | INTEL |
| 2 | 2 | U47, U48 | SN74LS240N | BUFFER/LINE DRIVER | | TI |
| | | U44 | | | | |
| 3 | 3 | U41, U43 | N82S155N | PLA | | SIGNETICS |
| 2 | 2 | U39, U40 | P8287 | OCTAL TRANCEIVER | | INTEL |
| 1 | 1 | U38 | | | | |
| | | U72, U74 | | | | |
| | | U65, U67 | | | | |
| | | U45, U46 | | | | |
| 8 | 8 | U30, U31 | N82S159N | PLA | | SIGNETICS |
| 8 | 8 | U22-U29 | HM6264LP-15 | RAM | | HITACHI |
| 2 | 2 | U20, U21 | P8282 | OCTAL TRANCEIVER | | INTEL |
| 2 | 2 | U18, U19 | P8286 | OCTAL LATCH | | INTEL |
| 1 | 1 | U17 | A87978H | MICROCONTROLLER | | INTEL |
| 1 | 1 | U16 | M1144-8M | 8MHZ OSCILLATOR | | M F ELECTRONICS |
| 1 | 1 | U15 | SN74LS32N | 2-INPUT OR GATE | | TI |
| 1 | 1 | U14 | AM29116DC | PROCESSOR | | ADVANCED MICRO DEV |
| | | U34, U35 | | | | |
| 4 | 4 | U12, U13 | AM2947DC | OCTAL TRANCEIVER | | ADVANCED MICRO DEV |
| | | U66, U68 | | | | |
| | | U37, U64 | | | | |
| 6 | 6 | U11, U36 | AM2954DC | OCTAL LATCH | | ADVANCED MICRO DEV |
| | | U81 | | | | |
| | | U54, U55 | | | | |
| | | U33, U42 | | | | |
| 7 | 7 | U10, U32 | N82S153N | PLA | | SIGNETICS |
| 1 | 1 | U9 | AM2910ADC | BIT SLICE SEQ | | ADVANCED MICRO DEV |
| 1 | 1 | U2 | AM27S291DC | PROM | | ADVANCED MICRO DEV |
| 7 | 7 | U1, U3-U8 | AM27S45DC | PROM | | ADVANCED MICRO DEV |
| -1003 | -1001 | | | | | |

Appendix F

```
-----------------------------------------------------------------------------
ET LIST                                         DATE: 10-15-1986    PAGE: 1
IP1553
-----------------------------------------------------------------------------

-1,\DASH\MIPSHET1.DWG
          Title: AVIONIC MUX INTERFACE
          Title: PROCESSOR A5690
          Drawing Number: 68T052858
          Page No.: 1 OF 8

-2,\DASH\MIPSHETA.DWG
          Title: AVIONIC MUX INTERFACE
          Title: PROCESSOR A5690
          Drawing Number: 68T052858
          Page No.: 2 OF 8

-3,\DASH\MIPSHET2.DWG
          Title: AVIONIC MUX INTERFACE
          Title: PROCESSOR A5690
          Drawing Number: 68T052858
          Page No.: 3 OF 8

-4,\DASH\MIPSHET3.DWG
          Title: AVIONIC MUX INTERFACE
          Title: PROCESSOR A5690
          Drawing Number: 68T052858
          Page No.: 4 OF 8

-5,\DASH\MIPSHET4.DWG
          Title: AVIONIC MUX INTERFACE
          Title: PROCESSOR A5690
          Drawing Number: 68T052858
          Page No.: 5 OF 8

-6,\DASH\MIPSHET5.DWG
          Title: AVIONIC MUX INTERFACE
          Title: PROCESSOR A5690
          Drawing Number: 68T052858
          Page No.: 6 OF 8

-7,\DASH\MIPSHET6.DWG
          Title: AVIONIC MUX INTERFACE
          Title: PROCESSOR A5690
          Drawing Number: 68T052858
          Page No.: 7 OF 8

-8,\DASH\MIPSHET7.DWG
          Title: AVIONIC MUX INTERFACE
          Title: PROCESSOR A5690
          Drawing Number: 68T052858
          Page No.: 8 OF 8
```

| ignal Desc | Path Ref | Circuit Designator | Symbol Ref | Pin |
|---|---|---|---|---|
| IOT CONNECTED | | | | |
| | 1-3 | DS1 | 63 | 1 |
| | 1-3 | DS2 | 64 | 1 |
| | 1-7 | K1 | 52 | 6 |
| | 1-7 | K1 | 52 | 13 |
| | 1-7 | K2 | 62 | 6 |
| | 1-7 | K2 | 62 | 13 |
| | 1-3 | U9 | 17 | 5 |
| | 1-3 | U9 | 17 | 6 |
| | 1-3 | U9 | 17 | 7 |
| | 1-3 | U9 | 17 | 16 |
| | 1-3 | U9 | 17 | 28 |
| | 1-3 | U10 | 21 | 13 |
| | 1-3 | U11 | 23 | 2 |
| | 1-3 | U11 | 23 | 3 |
| | 1-3 | U11 | 23 | 4 |
| | 1-3 | U11 | 23 | 5 |
| | 1-3 | U11 | 23 | 6 |
| | 1-3 | U11 | 23 | 7 |
| | 1-3 | U11 | 23 | 12 |
| | 1-3 | U11 | 23 | 13 |
| | 1-3 | U11 | 23 | 14 |
| | 1-3 | U11 | 23 | 15 |
| | 1-3 | U14 | 22 | 21 |
| | 1-5 | U17 | 2 | 13 |
| | 1-5 | U17 | 2 | 15 |
| | 1-5 | U17 | 2 | 37 |
| | 1-5 | U20 | 8 | 19 |
| | 1-4 | U31 | 28 | 9 |
| | 1-4 | U31 | 28 | 12 |
| | 1-4 | U31 | 28 | 13 |
| | 1-4 | U31 | 28 | 14 |
| | 1-4 | U31 | 29 | 17 |
| | 1-4 | U31 | 29 | 18 |

| ignal Desc | Path Ref | Circuit Designator | Symbol Ref | Pin |
| --- | --- | --- | --- | --- |
| | 1-4 | U31 | 28 | 19 |
| | 1-4 | U32 | 29 | 18 |
| | 1-4 | U33 | 27 | 13 |
| | 1-4 | U33 | 27 | 14 |
| | 1-4 | U33 | 27 | 15 |
| | 1-4 | U33 | 27 | 16 |
| | 1-4 | U37 | 15 | 19 |
| | 1-6 | U38 | 117 | 1 |
| | 1-6 | U38 | 117 | 2 |
| | 1-6 | U38 | 117 | 3 |
| | 1-6 | U38 | 117 | 4 |
| | 1-6 | U38 | 117 | 5 |
| | 1-6 | U38 | 117 | 6 |
| | 1-6 | U38 | 117 | 17 |
| | 1-6 | U38 | 117 | 18 |
| | 1-6 | U38 | 117 | 19 |
| | 1-6 | U38 | 117 | 20 |
| | 1-6 | U38 | 117 | 21 |
| | 1-6 | U38 | 117 | 32 |
| | 1-6 | U38 | 117 | 33 |
| | 1-6 | U38 | 117 | 34 |
| | 1-6 | U38 | 117 | 35 |
| | 1-6 | U38 | 117 | 36 |
| | 1-6 | U38 | 117 | 86 |
| | 1-6 | U38 | 117 | 87 |
| | 1-6 | U38 | 117 | 96 |
| | 1-6 | U38 | 117 | 97 |
| | 1-6 | U38 | 117 | 105 |
| | 1-6 | U38 | 117 | 106 |
| | 1-6 | U38 | 117 | 114 |
| | 1-6 | U38 | 117 | 126 |
| | 1-6 | U38 | 117 | 143 |
| | 1-6 | U41 | 48 | 9 |
| | 1-6 | U41 | 48 | 15 |
| | 1-6 | U41 | 48 | 17 |
| | 1-6 | U41 | 43 | 19 |
| | 1-6 | U43 | 27 | 17 |
| | 1-6 | U44 | 30 | 17 |
| | 1-6 | U45 | 211 | 9 |
| | 1-6 | U46 | 210 | 4 |
| | 1-6 | U46 | 210 | 5 |
| | 1-6 | U46 | 210 | 7 |
| | 1-6 | U46 | 210 | 8 |
| | 1-6 | U46 | 210 | 9 |
| | 1-6 | U49 | 32 | 15 |
| | 1-6 | U49 | 32 | 29 |
| | 1-6 | U54 | 212 | 9 |
| | 1-6 | U55 | 213 | 9 |
| | 1-6 | U61 | 197 | 3 |
| | 1-6 | U61 | 197 | 4 |
| | 1-6 | U61 | 197 | 5 |
| | 1-6 | U61 | 197 | 6 |
| | 1-6 | U61 | 197 | 7 |
| | 1-6 | U61 | 197 | 8 |
| | 1-6 | U61 | 197 | 9 |
| | 1-6 | U61 | 197 | 11 |
| | 1-6 | U61 | 197 | 12 |
| | 1-6 | U61 | 197 | 13 |
| | 1-6 | U61 | 197 | 14 |
| | 1-6 | U61 | 197 | 15 |
| | 1-6 | U61 | 197 | 16 |
| | 1-6 | U61 | 197 | 17 |
| | 1-6 | U62 | 196 | 3 |
| | 1-6 | U62 | 196 | 4 |
| | 1-6 | U62 | 196 | 5 |
| | 1-6 | U62 | 196 | 6 |
| | 1-6 | U62 | 196 | 7 |
| | 1-6 | U62 | 196 | 8 |
| | 1-6 | U62 | 196 | 9 |
| | 1-6 | U62 | 196 | 11 |
| | 1-6 | U62 | 196 | 12 |
| | 1-6 | U62 | 196 | 13 |
| | 1-6 | U62 | 196 | 14 |
| | 1-6 | U62 | 196 | 15 |
| | 1-6 | U62 | 196 | 16 |
| | 1-6 | U62 | 196 | 17 |
| | 1-6 | U62 | 196 | 19 |
| | 1-3 | U64 | 61 | 12 |
| | 1-3 | U64 | 61 | 15 |
| | 1-3 | U64 | 61 | 16 |
| | 1-3 | U64 | 61 | 19 |
| | 1-7 | U65 | 4 | 8 |
| | 1-7 | U65 | 4 | 9 |
| | 1-7 | U67 | 66 | 4 |
| | 1-7 | U67 | 66 | 5 |
| | 1-7 | U67 | 66 | 7 |
| | 1-7 | U67 | 66 | 8 |
| | 1-7 | U67 | 66 | 9 |
| | 1-7 | U69 | 3 | 8 |
| | 1-7 | U69 | 3 | 9 |
| | 1-7 | U69 | 3 | 10 |

| Signal Desc | Path Ref | Circuit Designator | Symbol Ref | Pin |
|---|---|---|---|---|
| | 1-7 | U69 | 3 | 12 |
| | 1-7 | U69 | 3 | 13 |
| | 1-7 | U69 | 3 | 32 |
| | 1-7 | U70 | 55 | 8 |
| | 1-7 | U70 | 55 | 9 |
| | 1-7 | U70 | 55 | 10 |
| | 1-7 | U70 | 55 | 12 |
| | 1-7 | U70 | 55 | 13 |
| | 1-7 | U70 | 55 | 32 |
| | 1-7 | U71 | 6 | 6 |
| | 1-7 | U72 | 7 | 9 |
| | 1-7 | U72 | 7 | 12 |
| | 1-7 | U72 | 7 | 13 |
| | 1-7 | U72 | 7 | 14 |
| | 1-7 | U72 | 7 | 15 |
| | 1-7 | U72 | 7 | 16 |
| | 1-7 | U72 | 7 | 17 |
| | 1-7 | U72 | 7 | 18 |
| | 1-7 | U72 | 7 | 19 |
| | 1-7 | U73 | 54 | 6 |
| | 1-7 | U74 | 68 | 9 |
| | 1-7 | U74 | 68 | 12 |
| | 1-7 | U74 | 68 | 13 |
| | 1-7 | U74 | 68 | 14 |
| | 1-7 | U74 | 68 | 15 |
| | 1-7 | U74 | 68 | 16 |
| | 1-7 | U74 | 68 | 17 |
| | 1-7 | U74 | 68 | 18 |
| | 1-7 | U74 | 68 | 19 |
| | 1-7 | U75 | 9 | 5 |
| | 1-7 | U75 | 9 | 12 |
| | 1-7 | U76 | 60 | 5 |
| | 1-7 | U76 | 60 | 12 |
| | 1-7 | U81 | 88 | 8 |
| -3,***040154 | | | | |
| | 1-3 | U9 | 17 | 31 |
| | 1-3 | U14 | 22 | 19 |
| | 1-3 | U15 | 32 | 6 |
| -3,***043157 | | | | |
| | 1-3 | U9 | 17 | 14 |
| | 1-3 | U11 | 23 | 9 |
| -3,***060068 | | | | |
| | 1-3 | U1 | 2 | 19 |
| | 1-3 | U3 | 4 | 13 |
| | 1-3 | U4 | 5 | 18 |
| | 1-3 | U11 | 23 | 11 |
| | 1-3 | U15 | 27 | 8 |
| -3,***065068 | | | | |
| | 1-3 | U1 | 2 | 17 |
| | 1-3 | U9 | 17 | 8 |
| -5,***066039 | | | | |
| | 1-5 | P2 | 12 | A21 |
| | 1-5 | U17 | 2 | 40 |
| -5,***066042 | | | | |
| | 1-5 | P2 | 12 | B21 |
| | 1-5 | U17 | 2 | 53 |
| 1-5,***066045 | | | | |
| | 1-5 | P2 | 12 | C21 |
| | 1-5 | U17 | 2 | 54 |
| 1-5,***066048 | | | | |
| | 1-5 | P2 | 12 | A22 |
| | 1-5 | U17 | 2 | 36 |
| -5,***066051 | | | | |
| | 1-5 | P2 | 12 | C23 |
| | 1-5 | U17 | 2 | 56 |
| -5,***066054 | | | | |
| | 1-5 | P2 | 12 | B23 |
| | 1-5 | U17 | 2 | 57 |
| -5,***066057 | | | | |
| | 1-5 | P2 | 12 | A23 |
| | 1-5 | U17 | 2 | 58 |
| -5,***066060 | | | | |
| | 1-5 | P2 | 12 | C22 |
| | 1-5 | U17 | 2 | 59 |
| -5,***066112 | | | | |
| | 1-5 | P2 | 12 | A12 |
| | 1-5 | U17 | 2 | 4 |
| -5,***066115 | | | | |
| | 1-5 | P2 | 12 | B12 |
| | 1-5 | U17 | 2 | 5 |

| ignal Desc | Path Ref | Circuit Designator | Symbol Ref | Pin |
|---|---|---|---|---|
| -5,***066118 | 1-5 | P2 | 12 | C12 |
| | 1-5 | U17 | 2 | 3 |
| -5,***066121 | 1-5 | P2 | 12 | A13 |
| | 1-5 | U17 | 2 | 6 |
| -5,***066124 | 1-5 | P2 | 12 | B13 |
| | 1-5 | U17 | 2 | 67 |
| -5,***066127 | 1-5 | P2 | 12 | C13 |
| | 1-5 | U17 | 2 | 68 |
| -5,***066130 | 1-5 | P2 | 12 | A14 |
| | 1-5 | U17 | 2 | 2 |
| -5,***066133 | 1-5 | P2 | 12 | B14 |
| | 1-5 | U17 | 2 | 1 |
| -5,***066154 | 1-5 | E2 | 25 | A |
| | 1-5 | P2 | 12 | A16 |
| -5,***066160 | 1-5 | P2 | 12 | C16 |
| | 1-5 | U17 | 2 | 52 |
| -5,***066163 | 1-5 | P2 | 12 | A17 |
| | 1-5 | U17 | 2 | 51 |
| -5,***066166 | 1-5 | P2 | 12 | B17 |
| | 1-5 | U17 | 2 | 39 |
| -5,***066178 | 1-5 | P2 | 12 | C17 |
| | 1-5 | U17 | 2 | 44 |
| -5,***066181 | 1-5 | P2 | 12 | A18 |
| | 1-5 | U17 | 2 | 43 |
| -3,***070330 | 1-3 | E1 | 51 | A |
| | 1-3 | P2 | 53 | A8 |
| | 1-3 | U15 | 27 | 9 |
| | 1-3 | U15 | 30 | 12 |
| | 1-3 | U15 | 32 | 4 |
| | 1-3 | U15 | 34 | 1 |
| -3,***071068 | 1-3 | U1 | 2 | 15 |
| | 1-3 | U9 | 17 | 9 |
| -3,***077068 | 1-3 | U1 | 2 | 15 |
| | 1-3 | U9 | 17 | 11 |
| 1-3,***083068 | 1-3 | U1 | 2 | 14 |
| | 1-3 | U9 | 17 | 12 |
| 1-6,***085199 | 1-6 | R9 | 145 | 1 |
| | 1-6 | U38 | 117 | 63 |
| | 1-6 | U38 | 117 | 72 |
| | 1-6 | U38 | 117 | 80 |
| | 1-6 | U38 | 117 | 83 |
| | 1-6 | U38 | 117 | 98 |
| 1-3,***089068 | 1-3 | U1 | 2 | 13 |
| | 1-3 | U3 | 4 | 19 |
| | 1-3 | U4 | 5 | 19 |
| 1-3,***090108 | 1-3 | R2 | 16 | 2 |
| | 1-3 | U9 | 17 | 15 |
| | 1-3 | U9 | 17 | 32 |
| 1-3,***095068 | 1-3 | U1 | 2 | 11 |
| | 1-3 | U12 | 19 | 9 |
| | 1-3 | U13 | 20 | 9 |

| Signal Desc | Path Ref | Circuit Designator | Symbol Ref | Pin |
|---|---|---|---|---|
| 1-3,***101068 | | | | |
| | 1-3 | U1 | 2 | 10 |
| | 1-3 | U12 | 19 | 11 |
| | 1-3 | U13 | 20 | 11 |
| 1-3,***104393 | | | | |
| | 1-3 | E1 | 51 | 3 |
| | 1-3 | P2 | 53 | 33 |
| | 1-3 | U16 | 35 | 5 |
| 1-3,***107068 | | | | |
| | 1-3 | U1 | 2 | 9 |
| | 1-3 | U64 | 61 | 11 |
| 1-3,***117030 | | | | |
| | 1-3 | R1 | 1 | 2 |
| | 1-3 | U2 | 3 | 13 |
| | 1-3 | U2 | 3 | 19 |
| -7,***121103 | | | | |
| | 1-7 | U66 | 5 | 6 |
| | 1-7 | U69 | 3 | 35 |
| -7,***122312 | | | | |
| | 1-7 | U68 | 78 | 6 |
| | 1-7 | U70 | 55 | 35 |
| -7,***124100 | | | | |
| | 1-7 | U66 | 5 | 5 |
| | 1-7 | U69 | 3 | 19 |
| -3,***124212 | | | | |
| | 1-3 | U10 | 21 | 19 |
| | 1-3 | U11 | 23 | 3 |
| -7,***124309 | | | | |
| | 1-7 | U68 | 78 | 5 |
| | 1-7 | U70 | 55 | 19 |
| -7,***126094 | | | | |
| | 1-7 | U66 | 5 | 2 |
| | 1-7 | U69 | 3 | 33 |
| | 1-7 | U69 | 3 | 33 |
| -7,***126303 | | | | |
| | 1-7 | U68 | 78 | 2 |
| | 1-7 | U70 | 55 | 33 |
| | 1-7 | U70 | 55 | 39 |
| -7,***128239 | | | | |
| | 1-7 | U67 | 66 | 6 |
| | 1-7 | U73 | 54 | 4 |
| -7,***130242 | | | | |
| | 1-7 | U67 | 66 | 3 |
| | 1-7 | U70 | 55 | 37 |
| | 1-7 | U73 | 54 | 3 |
| -7,***132089 | | | | |
| | 1-7 | U65 | 4 | 2 |
| | 1-7 | U69 | 3 | 36 |
| -7,***132297 | | | | |
| | 1-7 | U67 | 66 | 2 |
| | 1-7 | U70 | 55 | 36 |
| -3,***136068 | | | | |
| | 1-3 | U2 | 3 | 17 |
| | 1-3 | U11 | 23 | 19 |
| -5,***140142 | | | | |
| | 1-5 | C104 | 20 | 2 |
| | 1-5 | U17 | 2 | 12 |
| | 1-5 | Y1 | 6 | 2 |
| -3,***142068 | | | | |
| | 1-3 | U2 | 3 | 16 |
| | 1-3 | U11 | 23 | 17 |
| -5,***147154 | | | | |
| | 1-5 | E2 | 25 | 8 |
| | 1-5 | U17 | 2 | 61 |
| -3,***148068 | | | | |
| | 1-3 | U2 | 3 | 15 |
| | 1-3 | U10 | 21 | 6 |
| -3,***154068 | | | | |
| | 1-3 | U2 | 3 | 14 |
| | 1-3 | U10 | 21 | 5 |
| -3,***154212 | | | | |
| | 1-3 | U10 | 21 | 14 |

| ignal Desc | Path Ref | Circuit Designator | Symbol Ref | Pin |
|---|---|---|---|---|
| -3,***160212 | 1-3 | U10 | 21 | 13 |
| | 1-3 | U14 | 22 | 27 |
| -5,***162139 | 1-5 | C103 | 17 | 1 |
| | 1-5 | U17 | 2 | 11 |
| | 1-5 | Y1 | 6 | 1 |
| -3,***166212 | 1-3 | U10 | 21 | 12 |
| | 1-3 | U14 | 22 | 26 |
| -3,***172212 | 1-3 | U10 | 21 | 11 |
| | 1-3 | U14 | 22 | 24 |
| -3,***178212 | 1-3 | U10 | 21 | 9 |
| | 1-3 | U14 | 22 | 23 |
| 1-5,***196187 | 1-5 | P2 | 12 | B18 |
| | 1-5 | U17 | 2 | 55 |
| 1-7,***202091 | 1-7 | U65 | 4 | 1 |
| | 1-7 | U69 | 3 | 31 |
| 1-7,***202300 | 1-7 | U67 | 66 | 1 |
| | 1-7 | U70 | 55 | 31 |
| 1-7,***204029 | 1-7 | U65 | 4 | 6 |
| | 1-7 | U71 | 6 | 4 |
| 1-5,***205187 | 1-5 | P2 | 12 | C18 |
| | 1-5 | U17 | 2 | 43 |
| 1-7,***207032 | 1-7 | U65 | 4 | 3 |
| | 1-7 | U69 | 3 | 37 |
| | 1-7 | U71 | 6 | 3 |
| 1-7,***210112 | 1-7 | R14 | 41 | 1 |
| | 1-7 | U69 | 3 | 49 |
| | 1-7 | U69 | 3 | 52 |
| 1-7,***210321 | 1-7 | R15 | 73 | 1 |
| | 1-7 | U70 | 55 | 49 |
| | 1-7 | U70 | 55 | 52 |
| 1-3,***211068 | 1-3 | U3 | 4 | 17 |
| | 1-3 | U12 | 19 | 8 |
| 1-5,***215187 | 1-5 | P2 | 12 | A19 |
| | 1-5 | U17 | 2 | 47 |
| 1-3,***217068 | 1-3 | U3 | 4 | 16 |
| | 1-3 | U12 | 19 | 7 |
| -3,***223068 | 1-3 | U3 | 4 | 15 |
| | 1-3 | U12 | 19 | 6 |
| -5,***225187 | 1-5 | P2 | 12 | B19 |
| | 1-5 | U17 | 2 | 45 |
| -3,***229068 | 1-3 | U3 | 4 | 14 |
| | 1-3 | U12 | 19 | 5 |
| -3,***235068 | 1-3 | U3 | 4 | 13 |
| | 1-3 | U9 | 17 | 27 |
| | 1-3 | U12 | 19 | 4 |
| -3,***241068 | 1-3 | U3 | 4 | 11 |
| | 1-3 | U9 | 17 | 25 |
| | 1-3 | U12 | 19 | 3 |

| ignal Desc | Path Ref | Circuit Designator | Symbol Ref | Pin |
|---|---|---|---|---|
| -3,***247068 | 1-3 | U3 | 4 | 10 |
| | 1-3 | U9 | 17 | 23 |
| | 1-3 | U12 | 19 | 2 |
| -5,***252187 | 1-5 | P2 | 12 | C10 |
| | 1-5 | U17 | 2 | 40 |
| -3,***253068 | 1-3 | U3 | 4 | 9 |
| | 1-3 | U9 | 17 | 21 |
| | 1-3 | U12 | 19 | 1 |
| -7,***262043 | 1-7 | U69 | 3 | 14 |
| | 1-7 | U71 | 6 | 2 |
| -7,***262046 | 1-7 | U69 | 3 | 40 |
| | 1-7 | U71 | 6 | 1 |
| -7,***262049 | 1-7 | U69 | 3 | 39 |
| | 1-7 | U71 | 6 | 15 |
| 1-7,***262052 | 1-7 | U69 | 3 | 16 |
| | 1-7 | U71 | 6 | 14 |
| 1-7,***262055 | 1-7 | U69 | 3 | 27 |
| | 1-7 | U71 | 6 | 13 |
| 1-7,***262058 | 1-7 | U69 | 3 | 15 |
| | 1-7 | U71 | 6 | 12 |
| 1-7,***262067 | 1-7 | U69 | 3 | 21 |
| | 1-7 | U75 | 9 | 7 |
| 1-7,***262070 | 1-7 | U69 | 3 | 22 |
| | 1-7 | U75 | 9 | 10 |
| 1-7,***262073 | 1-7 | U69 | 3 | 17 |
| | 1-7 | U69 | 3 | 18 |
| 1-7,***262097 | 1-7 | U69 | 3 | 29 |
| | 1-7 | Y3 | 34 | 1 |
| 1-7,***262103 | 1-7 | U69 | 3 | 23 |
| | 1-7 | U72 | 7 | 1 |
| 1-7,***262252 | 1-7 | U70 | 55 | 14 |
| | 1-7 | U73 | 54 | 2 |
| 1-7,***262255 | 1-7 | U70 | 55 | 40 |
| | 1-7 | U73 | 54 | 1 |
| 1-7,***262258 | 1-7 | U70 | 55 | 39 |
| | 1-7 | U73 | 54 | 15 |
| 1-7,***262261 | 1-7 | U70 | 55 | 16 |
| | 1-7 | U73 | 54 | 14 |
| -7,***262264 | 1-7 | U70 | 55 | 27 |
| | 1-7 | U73 | 54 | 13 |
| -7,***262267 | 1-7 | U70 | 55 | 15 |
| | 1-7 | U73 | 54 | 12 |
| -7,***262276 | 1-7 | U70 | 55 | 21 |
| | 1-7 | U76 | 60 | 7 |
| -7,***262279 | 1-7 | U70 | 55 | 22 |
| | 1-7 | U76 | 60 | 10 |
| -7,***262282 | 1-7 | U70 | 55 | 17 |
| | 1-7 | U70 | 55 | 18 |

| Signal Desc | Path Ref | Circuit Designator | Symbol Ref | Pin |
|---|---|---|---|---|
| -7,***262306 | 1-7 | U70 | 55 | 29 |
| | 1-7 | Y4 | 65 | 1 |
| -7,***262312 | 1-7 | U70 | 55 | 28 |
| | 1-7 | U74 | 68 | 1 |
| -5,***276135 | 1-5 | P2 | 12 | B10 |
| | 1-5 | U17 | 2 | 34 |
| -3,***284068 | 1-3 | U4 | 5 | 17 |
| | 1-3 | U9 | 17 | 17 |
| | 1-3 | U13 | 20 | 8 |
| -3,***287379 | 1-3 | DS1 | 63 | 2 |
| | 1-3 | U64 | 61 | 9 |
| -3,***290068 | 1-3 | U4 | 5 | 16 |
| | 1-3 | U9 | 17 | 17 |
| | 1-3 | U13 | 20 | 7 |
| 1-3,***293379 | 1-3 | DS2 | 64 | 2 |
| | 1-3 | U64 | 61 | 6 |
| 1-6,***295369 | 1-6 | C106 | 153 | 1 |
| | 1-6 | U49 | 32 | 13 |
| | 1-6 | Y2 | 150 | 1 |
| 1-6,***295386 | 1-6 | C107 | 154 | 1 |
| | 1-6 | U49 | 32 | 13 |
| | 1-6 | Y2 | 150 | 2 |
| 1-3,***296068 | 1-3 | U4 | 5 | 15 |
| | 1-3 | U9 | 17 | 4 |
| | 1-3 | U13 | 20 | 6 |
| 1-3,***299379 | 1-3 | DS3 | 65 | 2 |
| | 1-3 | U64 | 61 | 5 |
| 1-3,***302068 | 1-3 | U4 | 5 | 14 |
| | 1-3 | U9 | 17 | 2 |
| | 1-3 | U13 | 20 | 5 |
| 1-3,***305379 | 1-3 | DS4 | 66 | 2 |
| | 1-3 | U64 | 61 | 2 |
| 1-3,***308068 | 1-3 | U4 | 5 | 13 |
| | 1-3 | U9 | 17 | 40 |
| | 1-3 | U13 | 20 | 4 |
| 1-3,***314068 | 1-3 | U4 | 5 | 11 |
| | 1-3 | U9 | 17 | 39 |
| | 1-3 | U13 | 20 | 3 |
| 1-3,***320068 | 1-3 | U4 | 5 | 10 |
| | 1-3 | U9 | 17 | 36 |
| | 1-3 | U13 | 20 | 2 |
| 1-3,***326068 | 1-3 | U4 | 5 | 9 |
| | 1-3 | U9 | 17 | 34 |
| | 1-3 | U13 | 20 | 1 |
| 1-3,***352068 | 1-3 | U5 | 6 | 18 |
| | 1-3 | U6 | 7 | 18 |
| | 1-3 | U7 | 8 | 18 |
| | 1-3 | U8 | 9 | 18 |
| | 1-3 | U15 | 30 | 11 |
| 1-3,***357068 | 1-3 | U5 | 6 | 17 |
| | 1-3 | U14 | 22 | 52 |
| 1-3,***363068 | 1-3 | U5 | 6 | 16 |
| | 1-3 | U14 | 22 | 1 |

| ignal Desc | Path Ref | Circuit Designator | Symbol Ref | Pin |
|---|---|---|---|---|
| 1-3,***369068 | 1-3 | U5 | 6 | 15 |
| | 1-3 | U14 | 22 | 2 |
| 1-3,***375068 | 1-3 | U5 | 6 | 14 |
| | 1-3 | U14 | 22 | 3 |
| 1-3,***381068 | 1-3 | U5 | 6 | 13 |
| | 1-3 | U14 | 22 | 4 |
| 1-3,***387068 | 1-3 | U5 | 6 | 11 |
| | 1-3 | U14 | 22 | 5 |
| 1-3,***393068 | 1-3 | U5 | 6 | 10 |
| | 1-3 | U14 | 22 | 6 |
| 1-3,***399068 | 1-3 | U5 | 6 | 9 |
| | 1-3 | U14 | 2[illegible] | 7 |
| 1-7,***401064 | 1-7 | P16 | 32 | 1 |
| | 1-7 | U7[illegible] | 9 | 8 |
| -7,***409256 | 1-7 | [illegible] | 57 | 1 |
| | 1-7 | [illegible]76 | 60 | 8 |
| -3,***4[illegible] | 1-3 | U6 | 7 | 17 |
| | 1-3 | U14 | 22 | 8 |
| -3,***434068 | 1-3 | U6 | 7 | 16 |
| | 1-3 | U14 | 22 | 9 |
| -3,***440068 | 1-3 | U6 | 7 | 15 |
| | 1-3 | U14 | 22 | 10 |
| -3,***446068 | 1-3 | U6 | 7 | 14 |
| | 1-3 | U14 | 22 | 13 |
| -3,***452068 | 1-3 | U6 | 7 | 13 |
| | 1-3 | U14 | 22 | 14 |
| -4,***456063 | 1-4 | P8 | 5 | 2 |
| | 1-4 | U22 | 2 | 25 |
| | 1-4 | U23 | 3 | 26 |
| | 1-4 | U24 | 8 | 25 |
| | 1-4 | U25 | 9 | 26 |
| | 1-4 | U26 | 13 | 26 |
| | 1-4 | U27 | 14 | 26 |
| | 1-4 | U28 | 18 | 25 |
| | 1-4 | U29 | 19 | 26 |
| -3,***458068 | 1-3 | U6 | 7 | 11 |
| | 1-3 | U14 | 22 | 15 |
| -6,***462139 | 1-6 | U52 | 203 | 19 |
| | 1-6 | U54 | 212 | 8 |
| -6,***462142 | 1-6 | U52 | 203 | 18 |
| | 1-6 | U54 | 212 | 7 |
| 1-6,***462145 | 1-6 | U52 | 203 | 17 |
| | 1-6 | U54 | 212 | 6 |
| 1-6,***462148 | 1-6 | U52 | 203 | 16 |
| | 1-6 | U54 | 212 | 5 |
| 1-6,***462151 | 1-6 | U52 | 203 | 15 |
| | 1-6 | U54 | 212 | 4 |
| 1-6,***462154 | 1-6 | U52 | 203 | 14 |
| | 1-6 | U54 | 212 | 3 |

| Signal Desc | Path Ref | Circuit Designator | Symbol Ref | Pin |
|---|---|---|---|---|
| 1-6,***462157 | 1-6 | U52 | 203 | 13 |
| | 1-6 | U54 | 212 | 2 |
| 1-6,***462160 | 1-6 | U52 | 203 | 12 |
| | 1-6 | U54 | 212 | 1 |
| 1-6,***462187 | 1-6 | U53 | 202 | 19 |
| | 1-6 | U55 | 213 | 8 |
| 1-6,***462190 | 1-6 | U53 | 202 | 18 |
| | 1-6 | U55 | 213 | 7 |
| 1-6,***462193 | 1-6 | U53 | 202 | 17 |
| | 1-6 | U55 | 213 | 6 |
| 1-6,***462196 | 1-6 | U53 | 202 | 16 |
| | 1-6 | U55 | 213 | 5 |
| 1-6,***462199 | 1-6 | U53 | 202 | 15 |
| | 1-6 | U55 | 213 | 4 |
| 1-6,***462202 | 1-6 | U53 | 202 | 14 |
| | 1-6 | U55 | 213 | 3 |
| 1-6,***462205 | 1-6 | U53 | 202 | 13 |
| | 1-6 | U55 | 213 | 2 |
| 1-6,***462208 | 1-6 | U53 | 202 | 12 |
| | 1-6 | U55 | 213 | 1 |
| 1-3,***464068 | 1-3 | U6 | 7 | 10 |
| | 1-3 | U14 | 22 | 15 |
| 1-3,***468248 | 1-3 | R3 | 24 | 1 |
| | 1-3 | U14 | 22 | 22 |
| 1-3,***470068 | 1-3 | U6 | 7 | 9 |
| | 1-3 | U14 | 22 | 17 |
| 1-7,***471078 | 1-7 | K1 | 52 | 14 |
| | 1-7 | U75 | 9 | 1 |
| | 1-7 | U75 | 9 | 25 |
| 1-7,***471084 | 1-7 | K1 | 52 | 7 |
| | 1-7 | U75 | 9 | 2 |
| | 1-7 | U75 | 9 | 26 |
| 1-7,***478270 | 1-7 | K2 | 62 | 14 |
| | 1-7 | U76 | 60 | 1 |
| | 1-7 | U76 | 60 | 25 |
| 1-7,***478276 | 1-7 | K2 | 62 | 7 |
| | 1-7 | U76 | 60 | 2 |
| | 1-7 | U76 | 60 | 26 |
| 1-3,***503068 | 1-3 | U7 | 8 | 17 |
| | 1-3 | U14 | 22 | 43 |
| 1-3,***509068 | 1-3 | U7 | 8 | 16 |
| | 1-3 | U14 | 22 | 19 |
| 1-3,***515068 | 1-3 | U7 | 8 | 15 |
| | 1-3 | U14 | 22 | 36 |
| 1-7,***551077 | 1-7 | K1 | 52 | 8 |
| | 1-7 | T1 | 47 | 5 |
| 1-7,***551083 | 1-7 | K1 | 52 | 1 |
| | 1-7 | T1 | 47 | 1 |

| Signal Desc | Path Ref | Circuit Designator | Symbol Ref | Pin |
|---|---|---|---|---|
| 1-7,***551096 | 1-7 | K1 | 52 | 9 |
| | 1-7 | U78 | 48 | 3 |
| 1-7,***551269 | 1-7 | K2 | 62 | 8 |
| | 1-7 | T2 | 61 | 5 |
| 1-7,***551275 | 1-7 | K2 | 62 | 1 |
| | 1-7 | T2 | 61 | 1 |
| 1-7,***551288 | 1-7 | K2 | 62 | 9 |
| | 1-7 | U80 | 71 | 3 |
| 1-6,***553223 | 1-6 | U59 | 16 | 11 |
| 1-3,***588068 | 1-3 | U8 | 9 | 15 |
| | 1-3 | U15 | 34 | 2 |
| 1-7,***592080 | 1-7 | P2 | 83 | C5 |
| | 1-7 | T1 | 47 | 4 |
| 1-7,***592083 | 1-7 | R21 | 38 | 1 |
| | 1-7 | T1 | 47 | 2 |
| 1-7,***592272 | 1-7 | P2 | 84 | C6 |
| | 1-7 | T2 | 61 | 4 |
| -7,***592275 | 1-7 | R19 | 64 | 1 |
| | 1-7 | T2 | 61 | 2 |
| -7,***602073 | 1-7 | R20 | 37 | 1 |
| | 1-7 | T1 | 47 | 6 |
| -7,***604265 | 1-7 | R18 | 59 | 1 |
| | 1-7 | T2 | 61 | 6 |
| -7,***616073 | 1-7 | P2 | 83 | B5 |
| | 1-7 | R20 | 37 | 2 |
| -7,***616265 | 1-7 | P2 | 84 | B6 |
| | 1-7 | R18 | 59 | 2 |
| -7,***618275 | 1-7 | P2 | 84 | A6 |
| | 1-7 | R19 | 64 | 2 |
| -7,***619083 | 1-7 | P2 | 83 | A5 |
| | 1-7 | R21 | 38 | 2 |
| ,*BCLK/ | 1-4 | U30 | 30 | 1 |
| | 1-4 | U31 | 28 | 1 |
| | 1-4 | U31 | 28 | 8 |
| ,*BHEN/ | 1-4 | U32 | 29 | 19 |
| | 1-4 | U33 | 27 | 6 |
| ,*INIT | 1-3 | U1 | 2 | 20 |
| | 1-3 | U3 | 4 | 20 |
| | 1-3 | U4 | 5 | 20 |
| | 1-3 | U5 | 6 | 20 |
| | 1-3 | U6 | 7 | 20 |
| | 1-3 | U7 | 8 | 20 |
| | 1-3 | U8 | 9 | 20 |
| | 1-5 | U17 | 2 | 62 |
| | 1-6 | U41 | 48 | 12 |
| 1,*HWTC/ | 1-4 | U30 | 30 | 8 |
| | 1-4 | U31 | 28 | 6 |
| ,+5V | 1-8 | C1 | 3 | 1 |
| | 1-8 | C2 | 2 | 1 |
| | 1-8 | C3 | 4 | 1 |

| Signal Desc | Path Ref | Circuit Designator | Symbol Ref | Pin |
|---|---|---|---|---|
| | 1-8 | C4 | 5 | 1 |
| | 1-8 | C5 | 6 | 1 |
| | 1-8 | C6 | 7 | 1 |
| | 1-8 | C7 | 8 | 1 |
| | 1-8 | C8 | 9 | 1 |
| | 1-8 | C9 | 10 | 1 |
| | 1-8 | C10 | 11 | 1 |
| | 1-8 | C11 | 12 | 1 |
| | 1-8 | C12 | 13 | 1 |
| | 1-8 | C13 | 14 | 1 |
| | 1-8 | C14 | 15 | 1 |
| | 1-8 | C15 | 16 | 1 |
| | 1-8 | C16 | 17 | 1 |
| | 1-8 | C17 | 18 | 1 |
| | 1-8 | C18 | 19 | 1 |
| | 1-8 | C19 | 20 | 1 |
| | 1-8 | C20 | 21 | 1 |
| | 1-8 | C21 | 22 | 1 |
| | 1-8 | C22 | 23 | 1 |
| | 1-8 | C23 | 24 | 1 |
| | 1-8 | C24 | 25 | 1 |
| | 1-8 | C25 | 26 | 1 |
| | 1-8 | C26 | 27 | 1 |
| | 1-8 | C27 | 28 | 1 |
| | 1-8 | C28 | 29 | 1 |
| | 1-8 | C29 | 30 | 1 |
| | 1-8 | C30 | 59 | 1 |
| | 1-8 | C31 | 58 | 1 |
| | 1-8 | C32 | 57 | 1 |
| | 1-8 | C33 | 56 | 1 |
| | 1-8 | C34 | 55 | 1 |
| | 1-8 | C35 | 54 | 1 |
| | 1-8 | C36 | 53 | 1 |
| | 1-8 | C37 | 52 | 1 |
| | 1-8 | C38 | 51 | 1 |
| | 1-8 | C39 | 50 | 1 |
| | 1-8 | C40 | 49 | 1 |
| | 1-8 | C41 | 48 | 1 |
| | 1-8 | C42 | 47 | 1 |
| | 1-8 | C43 | 46 | 1 |
| | 1-8 | C44 | 45 | 1 |
| | 1-8 | C45 | 44 | 1 |
| | 1-8 | C46 | 43 | 1 |
| | 1-8 | C47 | 42 | 1 |
| | 1-8 | C48 | 41 | 1 |
| | 1-8 | C49 | 40 | 1 |
| | 1-8 | C50 | 39 | 1 |
| | 1-8 | C51 | 38 | 1 |
| | 1-8 | C52 | 37 | 1 |
| | 1-8 | C53 | 36 | 1 |
| | 1-8 | C54 | 35 | 1 |
| | 1-8 | C55 | 34 | 1 |
| | 1-8 | C56 | 33 | 1 |
| | 1-8 | C57 | 32 | 1 |
| | 1-8 | C58 | 31 | 1 |
| | 1-8 | C59 | 60 | 1 |
| | 1-8 | C60 | 61 | 1 |
| | 1-8 | C61 | 62 | 1 |
| | 1-8 | C62 | 101 | 1 |
| | 1-8 | C63 | 64 | 1 |
| | 1-8 | C64 | 65 | 1 |
| | 1-8 | C65 | 66 | 1 |
| | 1-8 | C66 | 67 | 1 |
| | 1-8 | C67 | 68 | 1 |
| | 1-8 | C68 | 69 | 1 |
| | 1-8 | C69 | 70 | 1 |
| | 1-8 | C70 | 71 | 1 |
| | 1-8 | C71 | 72 | 1 |
| | 1-8 | C72 | 73 | 1 |
| | 1-8 | C73 | 74 | 1 |
| | 1-8 | C74 | 75 | 1 |
| | 1-8 | C75 | 76 | 1 |
| | 1-8 | C76 | 77 | 1 |
| | 1-8 | C77 | 78 | 1 |
| | 1-8 | C78 | 79 | 1 |
| | 1-8 | C79 | 80 | 1 |
| | 1-8 | C80 | 81 | 1 |
| | 1-8 | C81 | 86 | 1 |
| | 1-8 | C100 | 87 | 1 |
| | 1-8 | C101 | 88 | 1 |
| | 1-5 | C105 | 30 | 1 |
| | 1-8 | C108 | 91 | 1 |
| | 1-8 | C109 | 92 | 1 |
| | 1-8 | C110 | 93 | 1 |
| | 1-8 | C111 | 109 | 1 |
| | 1-8 | C112 | 103 | 1 |
| | 1-8 | C113 | 108 | 1 |
| | 1-8 | C114 | 104 | 1 |
| | 1-3 | DS3 | 65 | 1 |
| | 1-3 | DS4 | 66 | 1 |
| | 1-7 | K1 | 52 | 2 |
| | 1-7 | K2 | 62 | 2 |
| | 1-6 | P1 | 46 | A2 |

| Signal Desc | Path Ref | Circuit Designator | Symbol Ref | Pin |
|---|---|---|---|---|
| | 1-6 | P1 | 46 | A22 |
| | 1-6 | P1 | 46 | A31 |
| | 1-6 | P1 | 46 | B10 |
| | 1-6 | P1 | 46 | B12 |
| | 1-6 | P1 | 46 | B22 |
| | 1-6 | P1 | 46 | B24 |
| | 1-6 | P1 | 46 | C2 |
| | 1-6 | P1 | 46 | C31 |
| | 1-3 | R1 | 1 | 1 |
| | 1-3 | R2 | 16 | 1 |
| | 1-3 | R3 | 24 | 2 |
| | 1-4 | R4 | 23 | 1 |
| | 1-4 | R5 | 24 | 1 |
| | 1-4 | R6 | 25 | 1 |
| | 1-4 | R7 | 26 | 1 |
| | 1-4 | R8 | 5 | 1 |
| | 1-6 | R9 | 145 | 2 |
| | 1-6 | R10 | 169 | 1 |
| | 1-7 | R14 | 41 | 2 |
| | 1-7 | R15 | 73 | 2 |
| | 1-7 | R16 | 32 | 2 |
| | 1-7 | R17 | 57 | 2 |
| | 1-3 | U1 | 2 | 24 |
| | 1-3 | U2 | 3 | 24 |
| | 1-3 | U3 | 4 | 24 |
| | 1-3 | U4 | 5 | 24 |
| | 1-3 | U5 | 6 | 24 |
| | 1-3 | U6 | 7 | 24 |
| | 1-3 | U7 | 8 | 24 |
| | 1-3 | U8 | 9 | 24 |
| | 1-3 | U9 | 17 | 10 |
| | 1-3 | U10 | 21 | 20 |
| | 1-3 | U11 | 23 | 20 |
| | 1-3 | U12 | 19 | 20 |
| | 1-3 | U13 | 20 | 20 |
| | 1-3 | U14 | 22 | 12 |
| | 1-3 | U14 | 22 | 40 |
| | 1-3 | U14 | 22 | 41 |
| | 1-3 | U15 | 27 | 14 |
| | 1-3 | U16 | 35 | 14 |
| | 1-5 | U17 | 2 | 7 |
| | 1-5 | U17 | 2 | 8 |
| | 1-5 | U17 | 2 | 9 |
| | 1-5 | U17 | 2 | 14 |
| | 1-5 | U17 | 2 | 64 |
| | 1-5 | U17 | 2 | 65 |
| | 1-5 | U18 | 3 | 20 |
| | 1-5 | U19 | 4 | 20 |
| | 1-5 | U20 | 8 | 20 |
| | 1-5 | U21 | 9 | 20 |
| | 1-4 | U22 | 2 | 29 |
| | 1-4 | U23 | 3 | 29 |
| | 1-4 | U24 | 8 | 28 |
| | 1-4 | U25 | 9 | 29 |
| | 1-4 | U26 | 13 | 28 |
| | 1-4 | U27 | 14 | 28 |
| | 1-4 | U28 | 18 | 29 |
| | 1-4 | U29 | 19 | 29 |
| | 1-4 | U30 | 30 | 20 |
| | 1-4 | U31 | 28 | 20 |
| | 1-4 | U32 | 29 | 20 |
| | 1-4 | U33 | 27 | 20 |
| | 1-4 | U34 | 4 | 20 |
| | 1-4 | U35 | 7 | 20 |
| | 1-4 | U36 | 11 | 20 |
| | 1-4 | U37 | 15 | 20 |
| | 1-6 | U38 | 117 | 41 |
| | 1-6 | U38 | 117 | 52 |
| | 1-6 | U38 | 117 | 53 |
| | 1-6 | U38 | 117 | 54 |
| | 1-6 | U38 | 117 | 65 |
| | 1-6 | U38 | 117 | 75 |
| | 1-6 | U38 | 117 | 109 |
| | 1-6 | U38 | 117 | 116 |
| | 1-6 | U38 | 117 | 127 |
| | 1-6 | U38 | 117 | 128 |
| | 1-6 | U38 | 117 | 129 |
| | 1-6 | U38 | 117 | 138 |
| | 1-6 | U39 | 38 | 20 |
| | 1-6 | U40 | 39 | 20 |
| | 1-6 | U41 | 48 | 20 |
| | 1-6 | U42 | 49 | 20 |
| | 1-6 | U43 | 29 | 20 |
| | 1-6 | U44 | 30 | 20 |
| | 1-6 | U45 | 211 | 20 |
| | 1-6 | U46 | 210 | 20 |
| | 1-6 | U47 | 44 | 20 |
| | 1-6 | U48 | 171 | 20 |
| | 1-6 | U49 | 32 | 31 |
| | 1-6 | U49 | 32 | 40 |
| | 1-6 | U50 | 216 | 20 |
| | 1-6 | U51 | 41 | 20 |
| | 1-6 | U52 | 203 | 20 |

| Signal Desc | Path Ref | Circuit Designator | Symbol Ref | Pin |
|---|---|---|---|---|
| | 1-6 | U53 | 202 | 20 |
| | 1-6 | U54 | 212 | 20 |
| | 1-6 | U55 | 213 | 20 |
| | 1-6 | U56 | 191 | 20 |
| | 1-6 | U57 | 192 | 20 |
| | 1-6 | U58 | 15 | 24 |
| | 1-6 | U59 | 16 | 24 |
| | 1-6 | U60 | 195 | 20 |
| | 1-6 | U61 | 197 | 20 |
| | 1-6 | U62 | 196 | 20 |
| | 1-6 | U63 | 52 | 14 |
| | 1-3 | U64 | 61 | 20 |
| | 1-7 | U65 | 4 | 20 |
| | 1-7 | U66 | 5 | 20 |
| | 1-7 | U67 | 66 | 20 |
| | 1-7 | U68 | 78 | 20 |
| | 1-7 | U69 | 3 | 1 |
| | 1-7 | U69 | 3 | 30 |
| | 1-7 | U70 | 55 | 1 |
| | 1-7 | U70 | 55 | 30 |
| | 1-7 | U71 | 6 | 16 |
| | 1-7 | U72 | 7 | 20 |
| | 1-7 | U73 | 54 | 16 |
| | 1-7 | U74 | 63 | 20 |
| | 1-7 | U75 | 9 | 30 |
| | 1-7 | U76 | 60 | 30 |
| | 1-7 | U73 | 48 | 14 |
| | 1-7 | U80 | 71 | 14 |
| | 1-7 | U81 | 88 | 20 |
| +12V | | | | |
| | 1-7 | C116 | 51 | 1 |
| | 1-7 | C118 | 75 | 1 |
| | 1-6 | P1 | 46 | A3 |
| | 1-6 | P1 | 46 | C3 |
| | 1-7 | U75 | 9 | 4 |
| | 1-7 | U75 | 9 | 23 |
| | 1-7 | U76 | 60 | 4 |
| | 1-7 | U76 | 60 | 23 |
| -12V | | | | |
| | 1-7 | C115 | 49 | 1 |
| | 1-7 | C117 | 72 | 1 |
| | 1-6 | P1 | 46 | A30 |
| | 1-6 | P1 | 46 | C30 |
| | 1-7 | U75 | 9 | 29 |
| | 1-7 | U75 | 9 | 34 |
| | 1-7 | U76 | 60 | 29 |
| | 1-7 | U76 | 60 | 34 |
| 1,97INIT | | | | |
| | 1-6 | U41 | 48 | 13 |
| 1,A | | | | |
| | 1-3 | U2 | 3 | 9 |
| | 1-3 | U10 | 21 | 1 |
| | 1-7 | U71 | 6 | 11 |
| | 1-7 | U73 | 54 | 11 |
| 1,ACC | | | | |
| | 1-6 | U43 | 29 | 14 |
| 1,AD0/ | | | | |
| | 1-6 | P1 | 46 | A7 |
| | 1-6 | U56 | 191 | 18 |
| 1,AD1/ | | | | |
| | 1-6 | P1 | 46 | B7 |
| | 1-6 | U56 | 191 | 17 |
| 1,AD2/ | | | | |
| | 1-6 | P1 | 46 | A8 |
| | 1-6 | U56 | 191 | 16 |
| 1,AD3/ | | | | |
| | 1-6 | P1 | 46 | C8 |
| | 1-6 | U56 | 191 | 15 |
| 1,AD4/ | | | | |
| | 1-6 | P1 | 46 | A9 |
| | 1-6 | U56 | 191 | 14 |
| 1,AD5/ | | | | |
| | 1-6 | P1 | 46 | B9 |
| | 1-6 | U56 | 191 | 13 |
| 1,AD6/ | | | | |
| | 1-6 | P1 | 46 | C9 |
| | 1-6 | U56 | 191 | 12 |
| 1,AD7/ | | | | |
| | 1-6 | P1 | 46 | A10 |
| | 1-6 | U56 | 191 | 11 |
| 1,AD8/ | | | | |

| Signal Desc | Path Ref | Circuit Designator | Symbol Ref | Pin |
|---|---|---|---|---|
| | 1-6 | P1 | 46 | A11 |
| | 1-6 | U57 | 192 | 13 |
| 1,AD9/ | | | | |
| | 1-6 | P1 | 46 | B11 |
| | 1-6 | U57 | 192 | 17 |
| 1,AD10/ | | | | |
| | 1-6 | P1 | 46 | C11 |
| | 1-6 | U57 | 192 | 16 |
| 1,AD11/ | | | | |
| | 1-6 | P1 | 46 | A12 |
| | 1-6 | U57 | 192 | 15 |
| 1,AD12/ | | | | |
| | 1-6 | P1 | 46 | C12 |
| | 1-6 | U57 | 192 | 14 |
| 1,AD13/ | | | | |
| | 1-6 | P1 | 46 | A13 |
| | 1-6 | U57 | 192 | 13 |
| 1,AD14/ | | | | |
| | 1-6 | P1 | 46 | B13 |
| | 1-6 | U57 | 192 | 12 |
| 1,AD15/ | | | | |
| | 1-6 | P1 | 46 | C13 |
| | 1-6 | U57 | 192 | 11 |
| 1,AD16/ | | | | |
| | 1-6 | P1 | 46 | C14 |
| | 1-6 | U58 | 15 | 23 |
| 1,AD17/ | | | | |
| | 1-6 | P1 | 46 | A15 |
| | 1-6 | U58 | 15 | 22 |
| 1,AD18/ | | | | |
| | 1-6 | P1 | 46 | B15 |
| | 1-6 | U58 | 15 | 21 |
| 1,AD19/ | | | | |
| | 1-6 | P1 | 46 | C15 |
| | 1-6 | U58 | 15 | 20 |
| 1,AD20/ | | | | |
| | 1-6 | P1 | 46 | A16 |
| | 1-6 | U58 | 15 | 19 |
| 1,AD21/ | | | | |
| | 1-6 | P1 | 46 | C16 |
| | 1-6 | U58 | 15 | 18 |
| 1,AD22/ | | | | |
| | 1-6 | P1 | 46 | A17 |
| | 1-6 | U58 | 15 | 17 |
| 1,AD23/ | | | | |
| | 1-6 | P1 | 46 | B17 |
| | 1-6 | U58 | 15 | 16 |
| 1,AD24/ | | | | |
| | 1-6 | P1 | 46 | A18 |
| | 1-6 | U59 | 16 | 23 |
| 1,AD25/ | | | | |
| | 1-6 | P1 | 46 | C18 |
| | 1-6 | U59 | 16 | 22 |
| 1,AD26/ | | | | |
| | 1-6 | P1 | 46 | A19 |
| | 1-6 | U59 | 16 | 21 |
| 1,AD27/ | | | | |
| | 1-6 | P1 | 46 | B19 |
| | 1-6 | U59 | 16 | 20 |
| 1,AD28/ | | | | |
| | 1-6 | P1 | 46 | C19 |
| | 1-6 | U59 | 16 | 19 |
| 1,AD29/ | | | | |
| | 1-6 | P1 | 46 | A20 |
| | 1-6 | U59 | 16 | 18 |
| 1,AD30/ | | | | |
| | 1-6 | P1 | 46 | C20 |
| | 1-6 | U59 | 16 | 17 |

| Signal Desc | Path Ref | Circuit Designator | Symbol Ref | Pin |
|---|---|---|---|---|
| 1.AD31/ | | | | |
| | 1-6 | P1 | 46 | A21 |
| | 1-6 | U59 | 16 | 15 |
| 1.ADDIR | | | | |
| | 1-6 | U38 | 117 | 173 |
| | 1-6 | U56 | 191 | 1 |
| | 1-6 | U57 | 192 | 1 |
| | 1-6 | U58 | 15 | 1 |
| | 1-6 | U59 | 16 | 1 |
| | 1-6 | U63 | 63 | 3 |
| 1.AEN0/ | | | | |
| | 1-4 | U30 | 30 | 14 |
| | 1-4 | U31 | 28 | 2 |
| | 1-4 | U32 | 29 | 2 |
| | 1-4 | U33 | 27 | 3 |
| | 1-6 | U42 | 49 | 1 |
| 1.AEN1/ | | | | |
| | 1-4 | U30 | 30 | 16 |
| | 1-4 | U31 | 28 | 3 |
| | 1-4 | U32 | 29 | 3 |
| | 1-4 | U33 | 27 | 4 |
| | 1-4 | U34 | 4 | 9 |
| | 1-4 | U35 | 7 | 9 |
| | 1-4 | U36 | 11 | 1 |
| | 1-4 | U37 | 15 | 1 |
| 1.AEN2/ | | | | |
| | 1-5 | U18 | 3 | 9 |
| | 1-5 | U19 | 4 | 9 |
| | 1-5 | U20 | 8 | 9 |
| | 1-5 | U21 | 9 | 9 |
| | 1-4 | U30 | 30 | 12 |
| | 1-4 | U31 | 28 | 4 |
| | 1-4 | U32 | 29 | 7 |
| | 1-4 | U33 | 27 | 7 |
| 1.ALE | | | | |
| | 1-5 | U17 | 2 | 16 |
| | 1-5 | U20 | 8 | 11 |
| | 1-5 | U21 | 9 | 11 |
| 1.B | | | | |
| | 1-3 | U2 | 3 | 10 |
| | 1-3 | U10 | 21 | 2 |
| | 1-7 | U71 | 6 | 10 |
| | 1-7 | U73 | 54 | 10 |
| 1.B1AEN0/ | | | | |
| | 1-6 | U42 | 49 | 14 |
| | 1-6 | U43 | 29 | 9 |
| | 1-6 | U45 | 211 | 11 |
| | 1-6 | U46 | 210 | 11 |
| | 1-6 | U50 | 216 | 19 |
| | 1-6 | U51 | 41 | 19 |
| 1.B2AEN0/ | | | | |
| | 1-6 | U38 | 117 | 55 |
| | 1-6 | U39 | 38 | 9 |
| | 1-6 | U40 | 39 | 9 |
| | 1-6 | U42 | 49 | 13 |
| | 1-6 | U47 | 44 | 1 |
| | 1-6 | U47 | 44 | 19 |
| | 1-6 | U48 | 171 | 1 |
| | 1-6 | U48 | 171 | 19 |
| 1.BANKSEL | | | | |
| | 1-5 | U17 | 2 | 45 |
| | 1-7 | U65 | 4 | 4 |
| 1.BCLK | | | | |
| | 1-6 | P1 | 46 | C4 |
| 1.BCLK/ | | | | |
| | 1-4 | U31 | 28 | 7 |
| 1.BE0 | | | | |
| | 1-6 | U38 | 117 | 61 |
| | 1-6 | U42 | 49 | 12 |
| | 1-6 | U63 | 52 | 1 |
| 1.BE1 | | | | |
| | 1-6 | U38 | 117 | 62 |
| | 1-6 | U63 | 52 | 2 |
| .BHEN/ | | | | |

| Signal Desc | Path Ref | Circuit Designator | Symbol Ref | Pin |
|---|---|---|---|---|
| | 1-4 | U32 | 29 | 4 |
| | 1-6 | U45 | 211 | 8 |
| I,BPAR2/ | | | | |
| | 1-6 | U58 | 15 | 15 |
| | 1-6 | U60 | 195 | 6 |
| I,BPAR3/ | | | | |
| | 1-6 | U59 | 16 | 15 |
| | 1-6 | U60 | 195 | 8 |
| I,BUSA | | | | |
| | 1-3 | U10 | 21 | 7 |
| | 1-7 | U66 | 5 | 10 |
| | 1-7 | U81 | 88 | 7 |
| I,BUSB | | | | |
| | 1-3 | U10 | 21 | 8 |
| | 1-7 | U68 | 78 | 10 |
| | 1-7 | U81 | 88 | 6 |
| I,BUSRX | | | | |
| | 1-5 | P2 | 12 | B16 |
| | 1-5 | U17 | 2 | 60 |
| I,BUSTX | | | | |
| | 1-5 | P2 | 25 | C |
| I,C | | | | |
| | 1-3 | U2 | 3 | 11 |
| | 1-3 | U10 | 21 | 3 |
| | 1-7 | U71 | 6 | 9 |
| | 1-7 | U73 | 54 | 9 |
| I,CERR | | | | |
| | 1-6 | U44 | 30 | 15 |
| I,CNTCLK | | | | |
| | 1-6 | U43 | 29 | 3 |
| | 1-6 | U45 | 211 | 1 |
| | 1-6 | U46 | 210 | 1 |
| I,CS0/ | | | | |
| | 1-4 | U22 | 2 | 20 |
| | 1-4 | U32 | 29 | 9 |
| I,CS1/ | | | | |
| | 1-4 | U23 | 3 | 20 |
| | 1-4 | U32 | 29 | 11 |
| I,CS2/ | | | | |
| | 1-4 | U24 | 8 | 20 |
| | 1-4 | U32 | 29 | 12 |
| I,CS3/ | | | | |
| | 1-4 | U25 | 9 | 20 |
| | 1-4 | U32 | 29 | 13 |
| I,CS4/ | | | | |
| | 1-4 | U26 | 13 | 20 |
| | 1-4 | U32 | 29 | 14 |
| I,CS5/ | | | | |
| | 1-4 | U27 | 14 | 20 |
| | 1-4 | U32 | 29 | 15 |
| I,CS6/ | | | | |
| | 1-4 | U28 | 18 | 20 |
| | 1-4 | U32 | 29 | 16 |
| I,CS7/ | | | | |
| | 1-4 | U29 | 19 | 20 |
| | 1-4 | U32 | 29 | 17 |
| I,CSVALID | | | | |
| | 1-4 | U31 | 28 | 15 |
| | 1-4 | U32 | 29 | 8 |
| I,D | | | | |
| | 1-3 | U2 | 3 | 13 |
| | 1-3 | U10 | 21 | 4 |
| I,DBERR/ | | | | |
| | 1-6 | U38 | 117 | 74 |
| | 1-6 | U41 | 48 | 4 |
| | 1-6 | U44 | 30 | 8 |
| I,DPMXACK/ | | | | |
| | 1-3 | U10 | 21 | 17 |
| | 1-4 | U33 | 27 | 11 |
| I,ECOA | | | | |
| | 1-7 | U66 | 5 | 9 |
| | 1-7 | U72 | 7 | 2 |

| Signal Desc | Path Ref | Circuit Designator | Symbol Ref | Pin |
|---|---|---|---|---|
| 1,EC0B | 1-7 | U68 | 78 | 9 |
| | 1-7 | U74 | 69 | 2 |
| 1,EC1A | 1-7 | U66 | 5 | 12 |
| | 1-7 | U72 | 7 | 3 |
| 1,EC1B | 1-7 | U68 | 78 | 12 |
| | 1-7 | U74 | 69 | 3 |
| 1,EC2A | 1-7 | U66 | 5 | 15 |
| | 1-7 | U72 | 7 | 4 |
| 1,EC2B | 1-7 | U68 | 78 | 15 |
| | 1-7 | U74 | 69 | 4 |
| 1,EC3A | 1-7 | U66 | 5 | 16 |
| | 1-7 | U78 | 43 | 1 |
| | 1-7 | U78 | 49 | 2 |
| 1,EC3B | 1-7 | U68 | 78 | 16 |
| | 1-7 | U80 | 71 | 1 |
| | 1-7 | U80 | 71 | 2 |
| ,EN | 1-6 | U45 | 211 | 6 |
| | 1-6 | U46 | 210 | 2 |
| ,ENCENAA | 1-7 | U69 | 3 | 23 |
| | 1-7 | U81 | 89 | 9 |
| ,ENCENAB | 1-7 | U70 | 55 | 23 |
| | 1-7 | U81 | 88 | 15 |
| ,ENDMEM | 1-6 | U44 | 30 | 12 |
| | 1-6 | U45 | 211 | 7 |
| ,EXFER | 1-6 | U41 | 48 | 5 |
| | 1-6 | U43 | 29 | 12 |
| ,FULL | 1-6 | U45 | 211 | 3 |
| | 1-6 | U46 | 210 | 6 |
| GND SEE 1, PARERR | | | | |
| 1,IAEN0 | 1-6 | U42 | 49 | 15 |
| | 1-6 | U50 | 216 | 1 |
| | 1-6 | U51 | 41 | 1 |
| 1,INT0 | 1-3 | U8 | 9 | 11 |
| ,INT1 | 1-3 | U8 | 9 | 13 |
| 1,LAD0/ | 1-6 | U45 | 211 | 19 |
| | 1-6 | U47 | 44 | 2 |
| | 1-6 | U50 | 216 | 18 |
| ,LAD1/ | 1-6 | U45 | 211 | 18 |
| | 1-6 | U47 | 44 | 4 |
| | 1-6 | U50 | 216 | 16 |
| ,LAD2/ | 1-6 | U45 | 211 | 17 |
| | 1-6 | U47 | 44 | 6 |
| | 1-6 | U50 | 216 | 14 |
| ,LAD3/ | 1-6 | U45 | 211 | 16 |
| | 1-6 | U47 | 44 | 8 |
| | 1-6 | U50 | 216 | 12 |
| ,LAD4/ | 1-6 | U45 | 211 | 15 |
| | 1-6 | U47 | 44 | 11 |
| | 1-6 | U50 | 216 | 9 |
| ,LAD5/ | 1-6 | U45 | 211 | 14 |

| Signal Desc | Path Ref | Circuit Designator | Symbol Ref | Pin |
|---|---|---|---|---|
| | 1-6 | U47 | 44 | 13 |
| | 1-6 | U50 | 216 | 7 |
| I,LAD6/ | 1-6 | U45 | 211 | 13 |
| | 1-6 | U47 | 44 | 15 |
| | 1-6 | U50 | 216 | 5 |
| I,LAD7/ | 1-6 | U45 | 211 | 12 |
| | 1-6 | U47 | 44 | 17 |
| | 1-6 | U50 | 216 | 3 |
| I,LAD8/ | 1-6 | U46 | 210 | 19 |
| | 1-6 | U48 | 171 | 2 |
| | 1-6 | U51 | 41 | 13 |
| I,LAD9/ | 1-6 | U46 | 210 | 18 |
| | 1-6 | U48 | 171 | 4 |
| | 1-6 | U51 | 41 | 16 |
| I,LAD10/ | 1-6 | U46 | 210 | 17 |
| | 1-6 | U48 | 171 | 6 |
| | 1-6 | U51 | 41 | 14 |
| I,LAD11/ | 1-6 | U46 | 210 | 16 |
| | 1-6 | U48 | 171 | 8 |
| | 1-6 | U51 | 41 | 12 |
| I,LAD12/ | 1-6 | U46 | 210 | 15 |
| | 1-6 | U48 | 171 | 11 |
| | 1-6 | U51 | 41 | 9 |
| I,LAD13/ | 1-6 | U46 | 210 | 14 |
| | 1-6 | U48 | 171 | 13 |
| | 1-6 | U51 | 41 | 7 |
| I,LAD14/ | 1-6 | U46 | 210 | 13 |
| | 1-6 | U48 | 171 | 15 |
| | 1-6 | U51 | 41 | 5 |
| I,LAD15/ | 1-6 | U46 | 210 | 12 |
| | 1-6 | U48 | 171 | 17 |
| | 1-6 | U51 | 41 | 3 |
| I,LATCHN/ | 1-6 | P1 | 46 | A6 |
| | 1-6 | U63 | 200 | 9 |
| I,LOADA | 1-7 | U69 | 3 | 51 |
| | 1-7 | U69 | 3 | 53 |
| | 1-7 | U81 | 88 | 12 |
| I,LOADB | 1-7 | U70 | 55 | 51 |
| | 1-7 | U70 | 55 | 53 |
| | 1-7 | U81 | 89 | 17 |
| I,MAR# | 1-3 | U15 | 34 | 3 |
| | 1-4 | U36 | 11 | 11 |
| | 1-4 | U37 | 15 | 11 |
| I,MATCH-H | 1-6 | U41 | 48 | 2 |
| | 1-6 | U54 | 212 | 19 |
| I,MATCH-L | 1-6 | U41 | 48 | 3 |
| | 1-6 | U55 | 213 | 17 |
| I,MBCS/ | 1-4 | U30 | 30 | 7 |
| | 1-6 | U41 | 48 | 14 |
| | 1-6 | U44 | 30 | 9 |
| I,MPXACK/ | 1-4 | U33 | 27 | 9 |
| | 1-6 | U38 | 117 | 113 |
| I,MEMRDY | 1-4 | U31 | 29 | 15 |
| | 1-4 | U33 | 27 | 8 |
| I,MEMREQ | 1-6 | U41 | 49 | 6 |

| Signal Desc | Path Ref | Circuit Designator | Symbol Ref | Pin |
|---|---|---|---|---|
| | 1-6 | U43 | 29 | 13 |
| 1,MINIT | 1-6 | U41 | 48 | 16 |
| 1,MINT | 1-6 | U38 | 117 | 104 |
| | 1-6 | U42 | 49 | 7 |
| 1,MRTC/ | 1-4 | U31 | 28 | 5 |
| 1,MUX 0 | 1-3 | U7 | 8 | 9 |
| | 1-7 | U81 | 88 | 1 |
| 1,MUX 1 | 1-3 | U7 | 8 | 10 |
| | 1-7 | U81 | 88 | 2 |
| 1,MUX 2 | 1-3 | U7 | 8 | 11 |
| | 1-7 | U81 | 88 | 3 |
| 1,MUX 3 | 1-3 | U7 | 8 | 13 |
| | 1-7 | U81 | 88 | 4 |
| 1,MUX 4 | 1-3 | U7 | 8 | 14 |
| | 1-7 | U81 | 88 | 5 |
| 1,MUXA | 1-3 | U10 | 21 | 15 |
| | 1-7 | U71 | 6 | 5 |
| | 1-7 | U73 | 54 | 5 |
| 1,MUXB SEE 1, MUXA | | | | |
| 1,MUXOUT | 1-3 | U8 | 9 | 14 |
| | 1-7 | U66 | 5 | 11 |
| | 1-7 | U68 | 78 | 11 |
| 1,MWTC/ | 1-4 | U30 | 30 | 9 |
| 1,OE | 1-4 | U22 | 2 | 22 |
| | 1-4 | U23 | 3 | 22 |
| | 1-4 | U24 | 8 | 22 |
| | 1-4 | U25 | 9 | 22 |
| | 1-4 | U26 | 13 | 22 |
| | 1-4 | U27 | 14 | 22 |
| | 1-4 | U28 | 18 | 22 |
| | 1-4 | U29 | 19 | 22 |
| | 1-4 | U30 | 30 | 13 |
| 1,OEA | 1-7 | U69 | 3 | 7 |
| | 1-7 | U69 | 3 | 43 |
| | 1-7 | U81 | 88 | 14 |
| 1,OEB | 1-7 | U70 | 55 | 7 |
| | 1-7 | U70 | 55 | 43 |
| | 1-7 | U81 | 88 | 19 |
| 1,PAR0/ | 1-6 | P1 | 46 | C10 |
| | 1-6 | U60 | 195 | 9 |
| | 1-6 | U60 | 195 | 18 |
| 1,PAR1/ | 1-6 | P1 | 46 | A14 |
| | 1-6 | U60 | 195 | 7 |
| | 1-6 | U60 | 195 | 16 |
| 1,PAR2/ | 1-6 | P1 | 46 | C17 |
| | 1-6 | U60 | 195 | 5 |
| | 1-6 | U60 | 195 | 14 |
| 1,PAR3/ | 1-6 | P1 | 46 | C21 |
| | 1-6 | U60 | 195 | 3 |
| | 1-6 | U60 | 195 | 12 |
| 1,PAREN | 1-6 | U58 | 15 | 14 |
| | 1-6 | U59 | 16 | 14 |
| | 1-6 | U60 | 195 | 1 |
| | 1-6 | U60 | 195 | 19 |

| Signal Desc | Path Ref | Circuit Designator | Symbol Ref | Pin |
|---|---|---|---|---|
| | 1-6 | U63 | 63 | 4 |
| 1,PARERR | | | | |
| | 1-8 | C1 | 3 | 2 |
| | 1-8 | C2 | 2 | 2 |
| | 1-8 | C3 | 4 | 2 |
| | 1-8 | C4 | 5 | 2 |
| | 1-8 | C5 | 6 | 2 |
| | 1-8 | C6 | 7 | 2 |
| | 1-8 | C7 | 8 | 2 |
| | 1-8 | C8 | 9 | 2 |
| | 1-8 | C9 | 10 | 2 |
| | 1-8 | C10 | 11 | 2 |
| | 1-8 | C11 | 12 | 2 |
| | 1-8 | C12 | 13 | 2 |
| | 1-8 | C13 | 14 | 2 |
| | 1-8 | C14 | 15 | 2 |
| | 1-8 | C15 | 16 | 2 |
| | 1-8 | C16 | 17 | 2 |
| | 1-8 | C17 | 18 | 2 |
| | 1-8 | C18 | 19 | 2 |
| | 1-8 | C19 | 20 | 2 |
| | 1-8 | C20 | 21 | 2 |
| | 1-8 | C21 | 22 | 2 |
| | 1-8 | C22 | 23 | 2 |
| | 1-8 | C23 | 24 | 2 |
| | 1-8 | C24 | 25 | 2 |
| | 1-8 | C25 | 26 | 2 |
| | 1-8 | C26 | 27 | 2 |
| | 1-8 | C27 | 28 | 2 |
| | 1-8 | C28 | 29 | 2 |
| | 1-8 | C29 | 30 | 2 |
| | 1-8 | C30 | 59 | 2 |
| | 1-8 | C31 | 58 | 2 |
| | 1-8 | C32 | 57 | 2 |
| | 1-8 | C33 | 56 | 2 |
| | 1-8 | C34 | 55 | 2 |
| | 1-8 | C35 | 54 | 2 |
| | 1-8 | C36 | 53 | 2 |
| | 1-8 | C37 | 52 | 2 |
| | 1-8 | C38 | 51 | 2 |
| | 1-8 | C39 | 50 | 2 |
| | 1-8 | C40 | 49 | 2 |
| | 1-8 | C41 | 48 | 2 |
| | 1-8 | C42 | 47 | 2 |
| | 1-8 | C43 | 46 | 2 |
| | 1-8 | C44 | 45 | 2 |
| | 1-8 | C45 | 44 | 2 |
| | 1-8 | C46 | 43 | 2 |
| | 1-8 | C47 | 42 | 2 |
| | 1-8 | C48 | 41 | 2 |
| | 1-8 | C49 | 40 | 2 |
| | 1-8 | C50 | 39 | 2 |
| | 1-8 | C51 | 38 | 2 |
| | 1-8 | C52 | 37 | 2 |
| | 1-8 | C53 | 36 | 2 |
| | 1-8 | C54 | 35 | 2 |
| | 1-8 | C55 | 34 | 2 |
| | 1-8 | C56 | 33 | 2 |
| | 1-8 | C57 | 32 | 2 |
| | 1-8 | C58 | 31 | 2 |
| | 1-8 | C59 | 60 | 2 |
| | 1-8 | C60 | 61 | 2 |
| | 1-8 | C61 | 62 | 2 |
| | 1-8 | C62 | 101 | 2 |
| | 1-8 | C63 | 64 | 2 |
| | 1-8 | C64 | 65 | 2 |
| | 1-8 | C65 | 66 | 2 |
| | 1-8 | C66 | 67 | 2 |
| | 1-8 | C67 | 68 | 2 |
| | 1-8 | C68 | 69 | 2 |
| | 1-8 | C69 | 70 | 2 |
| | 1-8 | C70 | 71 | 2 |
| | 1-8 | C71 | 72 | 2 |
| | 1-8 | C72 | 73 | 2 |
| | 1-8 | C73 | 74 | 2 |
| | 1-8 | C74 | 75 | 2 |
| | 1-8 | C75 | 76 | 2 |
| | 1-8 | C76 | 77 | 2 |
| | 1-8 | C77 | 78 | 2 |
| | 1-8 | C78 | 79 | 2 |
| | 1-8 | C79 | 80 | 2 |
| | 1-8 | C80 | 81 | 2 |
| | 1-8 | C81 | 86 | 2 |
| | 1-8 | C100 | 87 | 2 |
| | 1-8 | C101 | 88 | 2 |
| | 1-5 | C102 | 32 | 2 |
| | 1-5 | C103 | 17 | 2 |
| | 1-5 | C104 | 20 | 1 |
| | 1-5 | C105 | 30 | 2 |
| | 1-6 | C106 | 153 | 2 |
| | 1-6 | C107 | 154 | 2 |
| | 1-8 | C108 | 91 | 2 |
| | 1-8 | C109 | 92 | 2 |

| Signal Desc | Path Ref | Circuit Designator | Symbol Ref | Pin |
|---|---|---|---|---|
| | 1-8 | C110 | 93 | 2 |
| | 1-8 | C111 | 109 | 2 |
| | 1-8 | C112 | 103 | 2 |
| | 1-8 | C113 | 108 | 2 |
| | 1-8 | C114 | 104 | 2 |
| | 1-7 | C115 | 49 | 2 |
| | 1-7 | C116 | 51 | 2 |
| | 1-7 | C117 | 72 | 2 |
| | 1-7 | C118 | 75 | 2 |
| | 1-6 | P1 | 46 | A1 |
| | 1-6 | P1 | 46 | A4 |
| | 1-6 | P1 | 46 | A32 |
| | 1-6 | P1 | 46 | B6 |
| | 1-6 | P1 | 46 | B8 |
| | 1-6 | P1 | 46 | B14 |
| | 1-6 | P1 | 46 | B16 |
| | 1-6 | P1 | 46 | B18 |
| | 1-6 | P1 | 46 | B20 |
| | 1-6 | P1 | 46 | B26 |
| | 1-6 | P1 | 46 | B23 |
| | 1-6 | P1 | 46 | C1 |
| | 1-6 | P1 | 46 | C5 |
| | 1-6 | P1 | 46 | C7 |
| | 1-6 | P1 | 46 | C32 |
| | 1-3 | P2 | 53 | C8 |
| | 1-5 | P2 | 12 | A11 |
| | 1-5 | P2 | 12 | A15 |
| | 1-5 | P2 | 12 | A20 |
| | 1-5 | P2 | 12 | B11 |
| | 1-5 | P2 | 12 | B13 |
| | 1-5 | P2 | 12 | B20 |
| | 1-5 | P2 | 12 | B22 |
| | 1-5 | P2 | 12 | C11 |
| | 1-5 | P2 | 12 | C14 |
| | 1-5 | P2 | 12 | C15 |
| | 1-5 | P2 | 12 | C19 |
| | 1-5 | P2 | 12 | C20 |
| | 1-7 | P2 | 84 | C7 |
| | 1-6 | R10 | 169 | 2 |
| | 1-3 | U1 | 2 | 12 |
| | 1-3 | U1 | 2 | 19 |
| | 1-3 | U2 | 3 | 12 |
| | 1-3 | U2 | 3 | 20 |
| | 1-3 | U3 | 4 | 12 |
| | 1-3 | U4 | 5 | 12 |
| | 1-3 | U5 | 6 | 12 |
| | 1-3 | U5 | 6 | 19 |
| | 1-3 | U6 | 7 | 12 |
| | 1-3 | U6 | 7 | 19 |
| | 1-3 | U7 | 8 | 12 |
| | 1-3 | U7 | 8 | 19 |
| | 1-3 | U8 | 9 | 12 |
| | 1-3 | U8 | 9 | 19 |
| | 1-3 | U9 | 17 | 13 |
| | 1-3 | U9 | 17 | 29 |
| | 1-3 | U9 | 17 | 30 |
| | 1-3 | U10 | 21 | 10 |
| | 1-3 | U11 | 23 | 1 |
| | 1-3 | U11 | 23 | 10 |
| | 1-3 | U12 | 19 | 10 |
| | 1-3 | U13 | 20 | 10 |
| | 1-3 | U14 | 22 | 11 |
| | 1-3 | U14 | 22 | 20 |
| | 1-3 | U14 | 22 | 25 |
| | 1-3 | U14 | 22 | 35 |
| | 1-3 | U14 | 22 | 44 |
| | 1-3 | U15 | 27 | 7 |
| | 1-3 | U15 | 27 | 10 |
| | 1-3 | U15 | 30 | 13 |
| | 1-3 | U15 | 32 | 5 |
| | 1-3 | U16 | 35 | 7 |
| | 1-5 | U17 | 2 | 10 |
| | 1-5 | U17 | 2 | 42 |
| | 1-5 | U17 | 2 | 66 |
| | 1-5 | U18 | 3 | 10 |
| | 1-5 | U19 | 4 | 10 |
| | 1-5 | U20 | 8 | 10 |
| | 1-5 | U21 | 9 | 10 |
| | 1-4 | U22 | 2 | 14 |
| | 1-4 | U23 | 3 | 14 |
| | 1-4 | U24 | 8 | 14 |
| | 1-4 | U25 | 9 | 14 |
| | 1-4 | U26 | 13 | 14 |
| | 1-4 | U27 | 14 | 14 |
| | 1-4 | U28 | 18 | 14 |
| | 1-4 | U29 | 19 | 14 |
| | 1-4 | U30 | 30 | 10 |
| | 1-4 | U30 | 30 | 11 |
| | 1-4 | U31 | 28 | 10 |
| | 1-4 | U31 | 28 | 11 |
| | 1-4 | U32 | 29 | 10 |
| | 1-4 | U33 | 27 | 10 |
| | 1-4 | U34 | 4 | 10 |
| | 1-4 | U35 | 7 | 10 |

| Signal Desc | Path Ref | Circuit Designator | Symbol Ref | Pin |
|---|---|---|---|---|
| | 1-4 | U36 | 11 | 10 |
| | 1-4 | U37 | 15 | 10 |
| | 1-6 | U38 | 117 | 48 |
| | 1-6 | U38 | 117 | 49 |
| | 1-6 | U38 | 117 | 50 |
| | 1-6 | U38 | 117 | 56 |
| | 1-6 | U38 | 117 | 57 |
| | 1-6 | U38 | 117 | 58 |
| | 1-6 | U38 | 117 | 64 |
| | 1-6 | U38 | 117 | 65 |
| | 1-6 | U38 | 117 | 81 |
| | 1-6 | U38 | 117 | 82 |
| | 1-6 | U38 | 117 | 89 |
| | 1-6 | U38 | 117 | 90 |
| | 1-6 | U38 | 117 | 91 |
| | 1-6 | U38 | 117 | 92 |
| | 1-6 | U38 | 117 | 93 |
| | 1-6 | U38 | 117 | 99 |
| | 1-6 | U38 | 117 | 100 |
| | 1-6 | U38 | 117 | 108 |
| | 1-6 | U38 | 117 | 115 |
| | 1-6 | U38 | 117 | 117 |
| | 1-6 | U38 | 117 | 124 |
| | 1-6 | U38 | 117 | 125 |
| | 1-6 | U38 | 117 | 130 |
| | 1-6 | U38 | 117 | 131 |
| | 1-6 | U38 | 117 | 132 |
| | 1-6 | U38 | 117 | 139 |
| | 1-6 | U38 | 117 | 140 |
| | 1-6 | U38 | 117 | 141 |
| | 1-6 | U38 | 117 | 142 |
| | 1-6 | U38 | 117 | 145 |
| | 1-6 | U38 | 117 | 148 |
| | 1-6 | U39 | 38 | 10 |
| | 1-6 | U40 | 39 | 10 |
| | 1-6 | U41 | 48 | 10 |
| | 1-6 | U41 | 48 | 11 |
| | 1-6 | U42 | 49 | 10 |
| | 1-6 | U43 | 29 | 10 |
| | 1-6 | U43 | 29 | 11 |
| | 1-6 | U44 | 30 | 10 |
| | 1-6 | U44 | 30 | 11 |
| | 1-6 | U45 | 211 | 10 |
| | 1-6 | U46 | 210 | 10 |
| | 1-6 | U47 | 44 | 10 |
| | 1-6 | U48 | 171 | 10 |
| | 1-6 | U49 | 32 | 20 |
| | 1-6 | U50 | 216 | 10 |
| | 1-6 | U51 | 41 | 10 |
| | 1-6 | U52 | 203 | 9 |
| | 1-6 | U52 | 203 | 10 |
| | 1-6 | U53 | 202 | 9 |
| | 1-6 | U53 | 202 | 10 |
| | 1-6 | U54 | 212 | 10 |
| | 1-6 | U55 | 213 | 10 |
| | 1-6 | U56 | 191 | 10 |
| | 1-6 | U56 | 191 | 10 |
| | 1-6 | U57 | 192 | 10 |
| | 1-6 | U57 | 192 | 19 |
| | 1-6 | U58 | 15 | 10 |
| | 1-6 | U58 | 15 | 11 |
| | 1-6 | U58 | 15 | 12 |
| | 1-6 | U58 | 15 | 13 |
| | 1-6 | U59 | 16 | 10 |
| | 1-6 | U59 | 16 | 12 |
| | 1-6 | U59 | 16 | 13 |
| | 1-6 | U60 | 195 | 10 |
| | 1-6 | U61 | 197 | 10 |
| | 1-6 | U61 | 197 | 19 |
| | 1-6 | U62 | 196 | 10 |
| | 1-6 | U63 | 52 | 7 |
| | 1-3 | U64 | 61 | 1 |
| | 1-3 | U64 | 61 | 10 |
| | 1-7 | U65 | 4 | 10 |
| | 1-7 | U66 | 5 | 1 |
| | 1-7 | U66 | 5 | 10 |
| | 1-7 | U67 | 66 | 10 |
| | 1-7 | U68 | 73 | 1 |
| | 1-7 | U68 | 78 | 10 |
| | 1-7 | U69 | 3 | 11 |
| | 1-7 | U69 | 3 | 20 |
| | 1-7 | U69 | 3 | 34 |
| | 1-7 | U70 | 55 | 11 |
| | 1-7 | U70 | 55 | 20 |
| | 1-7 | U70 | 55 | 34 |
| | 1-7 | U71 | 6 | 7 |
| | 1-7 | U71 | 6 | 8 |
| | 1-7 | U72 | 7 | 10 |
| | 1-7 | U72 | 7 | 11 |
| | 1-7 | U73 | 54 | 7 |
| | 1-7 | U73 | 54 | 8 |
| | 1-7 | U74 | 68 | 10 |
| | 1-7 | U74 | 68 | 11 |
| | 1-7 | U75 | 9 | 3 |

| Signal Desc | Path Ref | Circuit Designator | Symbol Ref | Pin |
|---|---|---|---|---|
| | 1-7 | U75 | 9 | 6 |
| | 1-7 | U75 | 9 | 9 |
| | 1-7 | U75 | 9 | 11 |
| | 1-7 | U75 | 9 | 27 |
| | 1-7 | U75 | 9 | 28 |
| | 1-7 | U75 | 9 | 31 |
| | 1-7 | U76 | 60 | 3 |
| | 1-7 | U76 | 60 | 6 |
| | 1-7 | U76 | 60 | 9 |
| | 1-7 | U76 | 60 | 11 |
| | 1-7 | U76 | 60 | 27 |
| | 1-7 | U76 | 60 | 28 |
| | 1-7 | U76 | 60 | 31 |
| | 1-7 | U78 | 48 | 4 |
| | 1-7 | U78 | 48 | 7 |
| | 1-7 | U80 | 71 | 4 |
| | 1-7 | U80 | 71 | 7 |
| | 1-7 | U81 | 88 | 10 |
| | 1-7 | U82 | 99 | 9 |
| | 1-7 | Y3 | 34 | 2 |
| | 1-7 | Y4 | 65 | 2 |
| 1,RD/ | 1-6 | U38 | 117 | 71 |
| | 1-6 | U42 | 49 | 18 |
| 1,RD1 | 1-3 | U8 | 9 | 17 |
| | 1-4 | U30 | 30 | 5 |
| | 1-4 | U34 | 4 | 11 |
| | 1-4 | U35 | 7 | 11 |
| 1,RD2 | 1-5 | U17 | 2 | 17 |
| | 1-5 | U18 | 3 | 11 |
| | 1-5 | U19 | 4 | 11 |
| | 1-4 | U30 | 30 | 3 |
| 1,RDY0 | 1-4 | R4 | 23 | 2 |
| | 1-4 | U22 | 2 | 1 |
| | 1-4 | U23 | 3 | 1 |
| 1,RDY1 | 1-4 | R5 | 24 | 2 |
| | 1-4 | U24 | 8 | 1 |
| | 1-4 | U25 | 9 | 1 |
| 1,RDY2 | 1-4 | R6 | 25 | 2 |
| | 1-4 | U26 | 13 | 1 |
| | 1-4 | U27 | 14 | 1 |
| 1,RDY3 | 1-4 | R7 | 26 | 2 |
| | 1-4 | U28 | 18 | 1 |
| | 1-4 | U29 | 19 | 1 |
| 1,REGSEL/ | 1-6 | U38 | 117 | 79 |
| | 1-6 | U42 | 49 | 11 |
| 1,REQ0 | 1-4 | U30 | 30 | 19 |
| 1,REQ1 | 1-4 | U30 | 30 | 18 |
| 1,REQ2 | 1-4 | U30 | 30 | 17 |
| 1,RESET | 1-4 | U30 | 30 | 6 |
| 1,RST | 1-6 | U38 | 117 | 69 |
| | 1-6 | U41 | 48 | 18 |
| | 1-6 | U49 | 32 | 9 |
| 1,RT ADDRA | 1-7 | U65 | 4 | 11 |
| | 1-7 | U81 | 88 | 13 |
| 1,RT ADDRB | 1-7 | U67 | 66 | 11 |
| | 1-7 | U81 | 83 | 18 |
| 1,SBH/ | 1-4 | U33 | 27 | 12 |
| 1,SBHL/ | 1-4 | U33 | 27 | 17 |
| 1,SBL/ | 1-4 | U33 | 27 | 13 |

| Signal Desc | Path Ref | Circuit Designator | Symbol Ref | Pin |
|---|---|---|---|---|
| 1,SC0/ | 1-6 | P1 | 46 | B32 |
| | 1-6 | U62 | 196 | 18 |
| 1,SC1/ | 1-6 | P1 | 46 | B31 |
| 1,SC2/ | 1-6 | P1 | 46 | C29 |
| 1,SC3/ | 1-6 | P1 | 46 | B29 |
| 1,SC4/ | 1-6 | P1 | 46 | A29 |
| | 1-6 | U61 | 197 | 18 |
| 1,SC5/ | 1-6 | P1 | 46 | C28 |
| 1,SC6/ | 1-6 | P1 | 46 | A28 |
| 1,SC7/ | 1-6 | P1 | 46 | C27 |
| 1,SC8/ | 1-6 | P1 | 46 | B27 |
| 1,SC9/ | 1-6 | P1 | 46 | A27 |
| 1,SEL-H | 1-6 | U41 | 48 | 7 |
| | 1-6 | U42 | 49 | 16 |
| | 1-6 | U52 | 203 | 11 |
| 1,SEL-L | 1-6 | U42 | 49 | 17 |
| | 1-6 | U53 | 202 | 11 |
| 1,SEC | 1-6 | U43 | 29 | 16 |
| | 1-6 | U45 | 211 | 5 |
| 1,SPARE 1 | 1-3 | P2 | 53 | B9 |
| | 1-3 | U11 | 23 | 16 |
| 1,SPARE 2 | 1-3 | P2 | 53 | C9 |
| | 1-7 | P2 | 83 | C9 |
| | 1-3 | U8 | 9 | 9 |
| | 1-7 | U82 | 99 | 13 |
| 1,SPARE 3 | 1-3 | P2 | 53 | A10 |
| | 1-3 | U8 | 9 | 10 |
| 1,SYNCSELA | 1-7 | U69 | 3 | 24 |
| | 1-7 | U81 | 88 | 11 |
| 1,SYNCSELB | 1-7 | U70 | 55 | 24 |
| | 1-7 | U81 | 88 | 16 |
| 1,TIMER | 1-3 | U10 | 21 | 16 |
| | 1-5 | U17 | 2 | 50 |
| 1,TIMCUT/ | 1-6 | P1 | 46 | A5 |
| | 1-6 | U63 | 198 | 5 |
| 1,TRACEINT | 1-3 | U11 | 23 | 19 |
| | 1-5 | U17 | 2 | 63 |
| 1,TRAD0 | 1-5 | U17 | 2 | 18 |
| | 1-5 | U18 | 3 | 1 |
| | 1-5 | U20 | 8 | 1 |
| 1,TRAD1 | 1-5 | U17 | 2 | 19 |
| | 1-5 | U18 | 3 | 2 |
| | 1-5 | U20 | 8 | 2 |
| 1,TRAD2 | 1-5 | U17 | 2 | 20 |
| | 1-5 | U18 | 3 | 3 |
| | 1-5 | U20 | 8 | 3 |

| Signal Desc | Path Ref | Circuit Designator | Symbol Ref | Pin |
|---|---|---|---|---|
| 1,TRAD3 | 1-5 | U17 | 2 | 21 |
| | 1-5 | U18 | 3 | 4 |
| | 1-5 | U20 | 8 | 4 |
| 1,TRAD4 | 1-5 | U17 | 2 | 22 |
| | 1-5 | U18 | 3 | 5 |
| | 1-5 | U20 | 8 | 5 |
| 1,TRAD5 | 1-5 | U17 | 2 | 23 |
| | 1-5 | U18 | 3 | 6 |
| | 1-5 | U20 | 8 | 6 |
| 1,TRAD6 | 1-5 | U17 | 2 | 24 |
| | 1-5 | U18 | 3 | 7 |
| | 1-5 | U20 | 8 | 7 |
| 1,TRAD7 | 1-5 | U17 | 2 | 25 |
| | 1-5 | U18 | 3 | 8 |
| | 1-5 | U20 | 8 | 8 |
| 1,TRAD8 | 1-5 | U17 | 2 | 26 |
| | 1-5 | U19 | 4 | 1 |
| | 1-5 | U21 | 9 | 1 |
| 1,TRAD9 | 1-5 | U17 | 2 | 27 |
| | 1-5 | U19 | 4 | 2 |
| | 1-5 | U21 | 9 | 2 |
| 1,TRAD10 | 1-5 | U17 | 2 | 28 |
| | 1-5 | U19 | 4 | 3 |
| | 1-5 | U21 | 9 | 3 |
| 1,TRAD11 | 1-5 | U17 | 2 | 29 |
| | 1-5 | U19 | 4 | 4 |
| | 1-5 | U21 | 9 | 4 |
| 1,TRAD12 | 1-5 | U17 | 2 | 30 |
| | 1-5 | U19 | 4 | 5 |
| | 1-5 | U21 | 9 | 5 |
| 1,TRAD13 | 1-5 | U17 | 2 | 31 |
| | 1-5 | U19 | 4 | 6 |
| | 1-5 | U21 | 9 | 6 |
| 1,TRAD14 | 1-5 | U17 | 2 | 32 |
| | 1-5 | U19 | 4 | 7 |
| | 1-5 | U21 | 9 | 7 |
| 1,TRAD15 | 1-5 | U17 | 2 | 33 |
| | 1-5 | U19 | 4 | 8 |
| | 1-7 | U65 | 4 | 5 |
| 1,TRAD15* | 1-5 | U21 | 9 | 8 |
| | 1-7 | U65 | 4 | 7 |
| 1,TX1A | 1-7 | U69 | 3 | 25 |
| | 1-7 | U72 | 7 | 5 |
| 1,TX1A* | 1-7 | U72 | 7 | 7 |
| | 1-7 | U75 | 9 | 32 |
| 1,TX1B | 1-7 | U70 | 55 | 25 |
| | 1-7 | U74 | 68 | 5 |
| 1,TX1B* | 1-7 | U74 | 68 | 7 |
| | 1-7 | U76 | 69 | 32 |
| 1,TXDA | 1-7 | U69 | 3 | 26 |
| | 1-7 | U72 | 7 | 6 |
| 1,TXDA* | 1-7 | U72 | 7 | 8 |
| | 1-7 | U75 | 9 | 33 |

| Signal Desc | Path Ref | Circuit Designator | Symbol Ref | Pin |
|---|---|---|---|---|
| 1,TXOB | | | | |
| | 1-7 | U70 | 55 | 26 |
| | 1-7 | U74 | 68 | 6 |
| 1,TXOB* | | | | |
| | 1-7 | U74 | 68 | 8 |
| | 1-7 | U76 | 60 | 33 |
| 1,UCCEWR | | | | |
| | 1-3 | U8 | 9 | 16 |
| | 1-4 | U30 | 30 | 4 |
| 1,WAIT | | | | |
| | 1-6 | U38 | 117 | 78 |
| | 1-6 | U42 | 49 | 6 |
| 1,WE | | | | |
| | 1-4 | U22 | 2 | 27 |
| | 1-4 | U23 | 3 | 27 |
| | 1-4 | U24 | 8 | 27 |
| | 1-4 | U25 | 9 | 27 |
| | 1-4 | U26 | 13 | 27 |
| | 1-4 | U27 | 14 | 27 |
| | 1-4 | U28 | 18 | 27 |
| | 1-4 | U29 | 19 | 27 |
| | 1-4 | U30 | 30 | 15 |
| 1,WERR | | | | |
| | 1-6 | U44 | 30 | 14 |
| 1,WIDTH | | | | |
| | 1-6 | U43 | 29 | 15 |
| | 1-6 | U45 | 211 | 2 |
| 1,WR/ | | | | |
| | 1-6 | U38 | 117 | 70 |
| | 1-6 | U42 | 49 | 19 |
| 1,WR8097 | | | | |
| | 1-5 | U17 | 2 | 38 |
| | 1-4 | U30 | 30 | 2 |
| 1,XACK2 | | | | |
| | 1-5 | C102 | 32 | 1 |
| | 1-5 | U17 | 2 | 35 |
| | 1-5 | U17 | 2 | 41 |
| | 1-4 | U33 | 27 | 19 |
| 1,XNU | | | | |
| | 1-6 | U44 | 30 | 16 |
| 1-6,***172258 | AGERR0 | | | |
| | 1-6 | U38 | 117 | 107 |
| | 1-6 | U44 | 30 | 18 |
| 1-6,***172258 | AGERR1 | | | |
| | 1-6 | U38 | 117 | 73 |
| | 1-6 | U44 | 30 | 19 |
| 1-6,***172258 | AGERR2 | | | |
| | 1-6 | U38 | 117 | 51 |
| | 1-6 | U44 | 30 | 13 |
| 1-7,***564232 | Y8 | | | |
| | 1-7 | U82 | 99 | 10 |
| 1-7,***564232 | Y9 | | | |
| | 1-7 | U82 | 99 | 11 |
| 1-7,***564232 | Y10 | | | |
| | 1-7 | U82 | 99 | 12 |
| 1-7,***564232 | Y11 | | | |
| | 1-7 | U82 | 99 | 13 |
| 1-7,***564232 | Y12 | | | |
| | 1-7 | U82 | 99 | 14 |
| 1-7,***564232 | Y13 | | | |
| | 1-7 | U82 | 99 | 15 |
| 1-7,***564232 | Y14 | | | |
| | 1-7 | U82 | 99 | 16 |
| 1-7,***564232 | Y15 | | | |
| | 1-7 | U82 | 99 | 17 |
| 1-5,***589111 | DATA0 | | | |
| | 1-5 | U18 | 3 | 19 |
| 1-5,***589111 | DATA1 | | | |
| | 1-5 | U18 | 3 | 18 |
| 1-5,***589111 | DATA2 | | | |
| | 1-5 | U18 | 3 | 17 |
| 1-5,***589111 | DATA3 | | | |
| | 1-5 | U18 | 3 | 16 |

| Signal Desc | Path Ref | Circuit Designator | Symbol Ref | Pin |
|---|---|---|---|---|
| 1-5,***589111 DATA4 | 1-5 | U18 | 3 | 15 |
| 1-5,***589111 DATA5 | 1-5 | U18 | 3 | 14 |
| 1-5,***589111 DATA6 | 1-5 | U18 | 3 | 13 |
| 1-5,***589111 DATA7 | 1-5 | U18 | 3 | 12 |
| 1,BAD/ BAD0/ | | | | |
| | 1-6 | U38 | 117 | 77 |
| | 1-6 | U39 | 38 | 1 |
| | 1-6 | U50 | 216 | 2 |
| | 1-6 | U56 | 191 | 2 |
| 1,BAD/ BAD1/ | | | | |
| | 1-6 | U38 | 117 | 85 |
| | 1-6 | U39 | 38 | 2 |
| | 1-6 | U50 | 216 | 4 |
| | 1-6 | U56 | 191 | 3 |
| 1,BAD/ BAD2/ | | | | |
| | 1-6 | U38 | 117 | 84 |
| | 1-6 | U39 | 38 | 3 |
| | 1-6 | U50 | 216 | 6 |
| | 1-6 | U56 | 191 | 4 |
| 1,BAD/ BAD3/ | | | | |
| | 1-6 | U38 | 117 | 83 |
| | 1-6 | U39 | 38 | 4 |
| | 1-6 | U50 | 216 | 8 |
| | 1-6 | U56 | 191 | 5 |
| 1,BAD/ BAD4/ | | | | |
| | 1-6 | U38 | 117 | 95 |
| | 1-6 | U39 | 38 | 5 |
| | 1-6 | U50 | 216 | 11 |
| | 1-6 | U56 | 191 | 6 |
| 1,BAD/ BAD5/ | | | | |
| | 1-6 | U38 | 117 | 94 |
| | 1-6 | U39 | 38 | 6 |
| | 1-6 | U50 | 216 | 12 |
| | 1-6 | U56 | 191 | 7 |
| 1,BAD/ BAD6/ | | | | |
| | 1-6 | U38 | 117 | 103 |
| | 1-6 | U39 | 38 | 7 |
| | 1-6 | U50 | 216 | 15 |
| | 1-6 | U56 | 191 | 8 |
| 1,BAD/ BAD7/ | | | | |
| | 1-6 | U38 | 117 | 102 |
| | 1-6 | U39 | 38 | 8 |
| | 1-6 | U50 | 216 | 17 |
| | 1-6 | U56 | 191 | 9 |
| 1,BAD/ BAD8/ | | | | |
| | 1-6 | U38 | 117 | 111 |
| | 1-6 | U40 | 39 | 1 |
| | 1-6 | U51 | 41 | 2 |
| | 1-6 | U57 | 192 | 2 |
| 1,BAD/ BAD9/ | | | | |
| | 1-6 | U38 | 117 | 110 |
| | 1-6 | U40 | 39 | 2 |
| | 1-6 | U51 | 41 | 4 |
| | 1-6 | U57 | 192 | 3 |
| 1,BAD/ BAD10/ | | | | |
| | 1-6 | U38 | 117 | 120 |
| | 1-6 | U40 | 39 | 3 |
| | 1-6 | U51 | 41 | 6 |
| | 1-6 | U57 | 192 | 4 |
| 1,BAD/ BAD11/ | | | | |
| | 1-6 | U38 | 117 | 119 |
| | 1-6 | U40 | 39 | 4 |
| | 1-6 | U51 | 41 | 8 |
| | 1-6 | U57 | 192 | 5 |
| 1,BAD/ BAD12/ | | | | |
| | 1-6 | U38 | 117 | 113 |
| | 1-6 | U40 | 39 | 5 |
| | 1-6 | U51 | 41 | 11 |
| | 1-6 | U57 | 192 | 6 |
| 1,BAD/ BAD13/ | | | | |
| | 1-6 | U38 | 117 | 135 |
| | 1-6 | U40 | 39 | 6 |

| Signal Desc | Path Ref | Circuit Designator | Symbol Ref | Pin |
|---|---|---|---|---|
| | 1-6 | U51 | 41 | 13 |
| | 1-6 | U57 | 192 | 7 |
| 1,BAD/ BAD14/ | 1-6 | U38 | 117 | 134 |
| | 1-6 | U40 | 39 | 7 |
| | 1-6 | U51 | 41 | 15 |
| | 1-6 | U57 | 192 | 8 |
| 1,BAD/ BAD15/ | 1-6 | U38 | 117 | 133 |
| | 1-6 | U40 | 39 | 8 |
| | 1-6 | U51 | 41 | 17 |
| | 1-6 | U57 | 192 | 9 |
| 1,BAD/ BAD16/ | 1-6 | U38 | 117 | 150 |
| | 1-6 | U54 | 212 | 18 |
| | 1-6 | U58 | 15 | 2 |
| 1,BAD/ BAD17/ | 1-6 | U38 | 117 | 149 |
| | 1-6 | U54 | 212 | 17 |
| | 1-6 | U58 | 15 | 3 |
| 1,BAD/ BAD18/ | 1-6 | U38 | 117 | 165 |
| | 1-6 | U54 | 212 | 16 |
| | 1-6 | U58 | 15 | 4 |
| 1,BAD/ BAD19/ | 1-6 | U38 | 117 | 164 |
| | 1-6 | U54 | 212 | 15 |
| | 1-6 | U58 | 15 | 5 |
| 1,BAD/ BAD20/ | 1-6 | U38 | 117 | 163 |
| | 1-6 | U54 | 212 | 14 |
| | 1-6 | U58 | 15 | 6 |
| 1,BAD/ BAD21/ | 1-6 | U38 | 117 | 180 |
| | 1-6 | U54 | 212 | 13 |
| | 1-6 | U58 | 15 | 7 |
| 1,BAD/ BAD22/ | 1-6 | U38 | 117 | 179 |
| | 1-6 | U54 | 212 | 12 |
| | 1-6 | U58 | 15 | 8 |
| 1,BAD/ BAD23/ | 1-6 | U38 | 117 | 178 |
| | 1-6 | U54 | 212 | 11 |
| | 1-6 | U58 | 15 | 9 |
| 1,BAD/ BAD24/ | 1-6 | U38 | 117 | 177 |
| | 1-6 | U55 | 213 | 18 |
| | 1-6 | U59 | 16 | 2 |
| 1,BAD/ BAD25/ | 1-6 | U38 | 117 | 162 |
| | 1-6 | U55 | 213 | 17 |
| | 1-6 | U59 | 16 | 3 |
| 1,BAD/ BAD26/ | 1-6 | U38 | 117 | 176 |
| | 1-6 | U55 | 213 | 16 |
| | 1-6 | U59 | 16 | 4 |
| 1,BAD/ BAD27/ | 1-6 | U38 | 117 | 161 |
| | 1-6 | U55 | 213 | 15 |
| | 1-6 | U59 | 16 | 5 |
| 1,BAD/ BAD28/ | 1-6 | U38 | 117 | 175 |
| | 1-6 | U55 | 213 | 14 |
| | 1-6 | U59 | 16 | 6 |
| 1,BAD/ BAD29/ | 1-6 | U38 | 117 | 160 |
| | 1-6 | U55 | 213 | 13 |
| | 1-6 | U59 | 16 | 7 |
| 1,BAD/ BAD30/ | 1-6 | U38 | 117 | 174 |
| | 1-6 | U55 | 213 | 12 |
| | 1-6 | U59 | 16 | 8 |
| 1,BAD/ BAD31/ | 1-6 | U38 | 117 | 159 |
| | 1-6 | U55 | 213 | 11 |
| | 1-6 | U59 | 16 | 9 |

| Signal Desc | Path Ref | Circuit Designator | Symbol Ref | Pin |
|---|---|---|---|---|
| 1,BREQ ARB0/ | | | | |
| | 1-6 | P1 | 46 | C26 |
| | 1-6 | U38 | 117 | 154 |
| 1,BREQ ARB1/ | | | | |
| | 1-6 | P1 | 46 | A26 |
| | 1-6 | U38 | 117 | 169 |
| 1,BREQ ARB2/ | | | | |
| | 1-6 | P1 | 46 | C25 |
| | 1-6 | U38 | 117 | 155 |
| 1,BREQ ARB3/ | | | | |
| | 1-6 | P1 | 46 | A25 |
| | 1-6 | U38 | 117 | 170 |
| 1,BREQ ARB4/ | | | | |
| | 1-6 | P1 | 46 | C24 |
| | 1-6 | U38 | 117 | 157 |
| 1,BREQ ARB5/ | | | | |
| | 1-6 | P1 | 46 | A24 |
| | 1-6 | U38 | 117 | 171 |
| 1,BREQ BREQ/ | | | | |
| | 1-6 | P1 | 46 | A23 |
| | 1-6 | U38 | 117 | 172 |
| 1,BSC BSC0 | | | | |
| | 1-6 | U38 | 117 | 121 |
| | 1-6 | U43 | 29 | 2 |
| | 1-6 | U44 | 30 | 2 |
| | 1-6 | U45 | 211 | 4 |
| | 1-6 | U46 | 210 | 3 |
| | 1-6 | U62 | 196 | 2 |
| 1,BSC BSC1 | | | | |
| | 1-6 | U38 | 117 | 122 |
| 1,BSC BSC2 | | | | |
| | 1-6 | U38 | 117 | 123 |
| | 1-6 | U43 | 29 | 3 |
| | 1-6 | U44 | 30 | 3 |
| 1,BSC BSC3 | | | | |
| | 1-6 | U38 | 117 | 136 |
| | 1-6 | U43 | 29 | 4 |
| | 1-6 | U44 | 30 | 4 |
| 1,BSC BSC4 | | | | |
| | 1-6 | U38 | 117 | 166 |
| | 1-6 | U43 | 29 | 5 |
| | 1-6 | U44 | 30 | 5 |
| | 1-6 | U61 | 197 | 2 |
| 1,BSC BSC5 | | | | |
| | 1-6 | U38 | 117 | 152 |
| | 1-6 | U43 | 29 | 6 |
| | 1-6 | U44 | 30 | 6 |
| 1,BSC BSC6 | | | | |
| | 1-6 | U38 | 117 | 167 |
| | 1-6 | U43 | 29 | 7 |
| 1,BSC BSC7 | | | | |
| | 1-6 | U38 | 117 | 153 |
| 1,BSC BSC8 | | | | |
| | 1-6 | U38 | 117 | 168 |
| 1,BSC BSC9 | | | | |
| | 1-6 | U38 | 117 | 137 |
| 1,BUSTX BUSRX | | | | |
| | 1-6 | U49 | 32 | 10 |
| 1,BUSTX BUSTX | | | | |
| | 1-6 | U49 | 32 | 11 |
| 1,DATA DATA0 | | | | |
| | 1-4 | U23 | 3 | 11 |
| | 1-4 | U25 | 9 | 11 |
| | 1-4 | U27 | 14 | 11 |
| | 1-4 | U29 | 19 | 11 |
| | 1-4 | U35 | 7 | 19 |
| | 1-6 | U39 | 38 | 19 |
| 1,DATA DATA1 | | | | |
| | 1-4 | U23 | 3 | 12 |
| | 1-4 | U25 | 9 | 12 |
| | 1-4 | U27 | 14 | 12 |
| | 1-4 | U29 | 19 | 12 |
| | 1-4 | U35 | 7 | 18 |

| Signal Desc | Path Ref | Circuit Designator | Symbol Ref | Pin |
|---|---|---|---|---|
| | 1-6 | U39 | 38 | 18 |
| 1,DATA DATA2 | | | | |
| | 1-4 | U23 | 3 | 13 |
| | 1-4 | U25 | 9 | 13 |
| | 1-4 | U27 | 14 | 13 |
| | 1-4 | U29 | 19 | 13 |
| | 1-4 | U35 | 7 | 17 |
| | 1-6 | U39 | 38 | 17 |
| 1,DATA DATA3 | | | | |
| | 1-4 | U23 | 3 | 15 |
| | 1-4 | U25 | 9 | 15 |
| | 1-4 | U27 | 14 | 15 |
| | 1-4 | U29 | 19 | 15 |
| | 1-4 | U35 | 7 | 16 |
| | 1-6 | U39 | 38 | 16 |
| 1,DATA DATA4 | | | | |
| | 1-4 | U23 | 3 | 16 |
| | 1-4 | U25 | 9 | 16 |
| | 1-4 | U27 | 14 | 16 |
| | 1-4 | U29 | 19 | 16 |
| | 1-4 | U35 | 7 | 15 |
| | 1-6 | U39 | 38 | 15 |
| 1,DATA DATA5 | | | | |
| | 1-4 | U23 | 3 | 17 |
| | 1-4 | U25 | 9 | 17 |
| | 1-4 | U27 | 14 | 17 |
| | 1-4 | U29 | 19 | 17 |
| | 1-4 | U35 | 7 | 14 |
| | 1-6 | U39 | 38 | 14 |
| 1,DATA DATA6 | | | | |
| | 1-4 | U23 | 3 | 18 |
| | 1-4 | U25 | 9 | 18 |
| | 1-4 | U27 | 14 | 18 |
| | 1-4 | U29 | 19 | 18 |
| | 1-4 | U35 | 7 | 13 |
| | 1-6 | U39 | 38 | 13 |
| 1,DATA DATA7 | | | | |
| | 1-4 | U23 | 3 | 19 |
| | 1-4 | U25 | 9 | 19 |
| | 1-4 | U27 | 14 | 19 |
| | 1-4 | U29 | 19 | 19 |
| | 1-4 | U35 | 7 | 12 |
| | 1-6 | U39 | 38 | 12 |
| 1,DATA DATA8 | | | | |
| | 1-5 | U19 | 4 | 19 |
| | 1-4 | U22 | 2 | 11 |
| | 1-4 | U24 | 8 | 11 |
| | 1-4 | U26 | 13 | 11 |
| | 1-4 | U28 | 18 | 11 |
| | 1-4 | U34 | 4 | 19 |
| | 1-6 | U40 | 39 | 19 |
| 1,DATA DATA9 | | | | |
| | 1-5 | U19 | 4 | 18 |
| | 1-4 | U22 | 2 | 12 |
| | 1-4 | U24 | 8 | 12 |
| | 1-4 | U26 | 13 | 12 |
| | 1-4 | U28 | 18 | 12 |
| | 1-4 | U34 | 4 | 18 |
| | 1-6 | U40 | 39 | 18 |
| 1,DATA DATAA | | | | |
| | 1-5 | U19 | 4 | 17 |
| | 1-4 | U22 | 2 | 13 |
| | 1-4 | U24 | 8 | 13 |
| | 1-4 | U26 | 13 | 13 |
| | 1-4 | U28 | 18 | 13 |
| | 1-4 | U34 | 4 | 17 |
| | 1-6 | U40 | 39 | 17 |
| 1,DATA DATAB | | | | |
| | 1-5 | U19 | 4 | 16 |
| | 1-4 | U22 | 2 | 15 |
| | 1-4 | U24 | 8 | 15 |
| | 1-4 | U26 | 13 | 15 |
| | 1-4 | U28 | 18 | 15 |
| | 1-4 | U34 | 4 | 16 |
| | 1-6 | U40 | 39 | 16 |
| 1,DATA DATAC | | | | |
| | 1-5 | U19 | 4 | 15 |
| | 1-4 | U22 | 2 | 16 |
| | 1-4 | U24 | 8 | 16 |
| | 1-4 | U26 | 13 | 16 |
| | 1-4 | U28 | 18 | 16 |
| | 1-4 | U34 | 4 | 15 |
| | 1-6 | U40 | 39 | 15 |

| Signal Desc | Path Ref | Circuit Designator | Symbol Ref | Pin |
|---|---|---|---|---|
| 1,DATA DATAD | | | | |
| | 1-5 | U19 | 4 | 14 |
| | 1-4 | U22 | 2 | 17 |
| | 1-4 | U24 | 8 | 17 |
| | 1-4 | U26 | 13 | 17 |
| | 1-4 | U28 | 18 | 17 |
| | 1-4 | U34 | 4 | 14 |
| | 1-6 | U40 | 39 | 14 |
| 1,DATA DATAE | | | | |
| | 1-5 | U19 | 4 | 13 |
| | 1-4 | U22 | 2 | 13 |
| | 1-4 | U24 | [illegible] | 18 |
| | 1-4 | [illegible] | [illegible] | 18 |
| | 1-4 | [illegible] | [illegible] | 13 |
| | 1-4 | [illegible] | [illegible] | 13 |
| | 1-6 | U40 | 39 | 13 |
| 1,DATA DATAF | | | | |
| | 1-5 | U19 | 4 | 12 |
| | 1-4 | U22 | 2 | 19 |
| | 1-4 | U24 | 8 | 19 |
| | 1-4 | U26 | 13 | 19 |
| | 1-4 | U28 | 18 | 19 |
| | 1-4 | U34 | 4 | 12 |
| | 1-6 | U40 | 39 | 12 |
| 1,IAD IAD0 | | | | |
| | 1-6 | U38 | 117 | 42 |
| | 1-6 | U49 | 32 | 39 |
| 1,IAD IAD1 | | | | |
| | 1-6 | U38 | 117 | 13 |
| | 1-6 | U49 | 32 | 38 |
| 1,IAD IAD2 | | | | |
| | 1-6 | U38 | 117 | 28 |
| | 1-6 | U49 | 32 | 37 |
| 1,IAD IAD3 | | | | |
| | 1-6 | U38 | 117 | 43 |
| | 1-6 | U49 | 32 | 36 |
| 1,IAD IAD4 | | | | |
| | 1-6 | U38 | 117 | 14 |
| | 1-6 | U49 | 32 | 35 |
| 1,IAD IAD5 | | | | |
| | 1-6 | U38 | 117 | 29 |
| | 1-6 | U49 | 32 | 34 |
| 1,IAD IAD6 | | | | |
| | 1-6 | U38 | 117 | 44 |
| | 1-6 | U49 | 32 | 33 |
| 1,IAD IAD7 | | | | |
| | 1-6 | U38 | 117 | 15 |
| | 1-6 | U49 | 32 | 32 |
| 1,IAST IAST | | | | |
| | 1-6 | U38 | 117 | 30 |
| | 1-6 | U49 | 32 | 30 |
| 1,IAST IRD | | | | |
| | 1-6 | U38 | 117 | 60 |
| | 1-6 | U49 | 32 | 17 |
| 1,IAST IREQ | | | | |
| | 1-6 | U38 | 117 | 45 |
| | 1-6 | U49 | 32 | 12 |
| 1,IAST IWR | | | | |
| | 1-6 | U38 | 117 | 59 |
| | 1-6 | U49 | 32 | 16 |
| 1,INT INT0 | | | | |
| | 1-6 | U49 | 32 | 13 |
| 1,INT INT1 | | | | |
| | 1-6 | U49 | 32 | 14 |
| 1,MEMORY ADDRESS ADR0 | | | | |
| | 1-4 | U32 | 29 | 1 |
| | 1-4 | U33 | 27 | 5 |
| | 1-6 | U44 | 30 | 7 |
| | 1-6 | U47 | 44 | 13 |
| 1,MEMORY ADDRESS MA0 | | | | |
| | 1-5 | U20 | 8 | 13 |
| | 1-4 | U22 | 2 | 10 |
| | 1-4 | U23 | 3 | 10 |
| | 1-4 | U24 | 8 | 10 |
| | 1-4 | U25 | 9 | 10 |

| Signal Desc | Path Ref | Circuit Designator | Symbol Ref | Pin |
|---|---|---|---|---|
| | 1-4 | U26 | 13 | 10 |
| | 1-4 | U27 | 14 | 10 |
| | 1-4 | U28 | 18 | 10 |
| | 1-4 | U29 | 19 | 10 |
| | 1-4 | U36 | 11 | 2 |
| | 1-6 | U47 | 44 | 16 |
| 1, MEMORY ADDRESS MA1 | | | | |
| | 1-5 | U20 | 8 | 17 |
| | 1-4 | U22 | 2 | 9 |
| | 1-4 | U23 | 3 | 9 |
| | 1-4 | U24 | 8 | 9 |
| | 1-4 | U25 | 9 | 9 |
| | 1-4 | U26 | 13 | 9 |
| | 1-4 | U27 | 14 | 9 |
| | 1-4 | U28 | 18 | 9 |
| | 1-4 | U29 | 19 | 9 |
| | 1-4 | U36 | 11 | 5 |
| | 1-6 | U47 | 44 | 14 |
| 1, MEMORY ADDRESS MA2 | | | | |
| | 1-5 | U20 | 8 | 16 |
| | 1-4 | U22 | 2 | 8 |
| | 1-4 | U23 | 3 | 8 |
| | 1-4 | U24 | 8 | 8 |
| | 1-4 | U25 | 9 | 8 |
| | 1-4 | U26 | 13 | 8 |
| | 1-4 | U27 | 14 | 8 |
| | 1-4 | U28 | 18 | 8 |
| | 1-4 | U29 | 19 | 8 |
| | 1-4 | U36 | 11 | 6 |
| | 1-6 | U47 | 44 | 12 |
| 1, MEMORY ADDRESS MA3 | | | | |
| | 1-5 | U20 | 8 | 15 |
| | 1-4 | U22 | 2 | 7 |
| | 1-4 | U23 | 3 | 7 |
| | 1-4 | U24 | 8 | 7 |
| | 1-4 | U25 | 9 | 7 |
| | 1-4 | U26 | 13 | 7 |
| | 1-4 | U27 | 14 | 7 |
| | 1-4 | U28 | 18 | 7 |
| | 1-4 | U29 | 19 | 7 |
| | 1-4 | U36 | 11 | 9 |
| | 1-6 | U47 | 44 | 9 |
| 1, MEMORY ADDRESS MA4 | | | | |
| | 1-5 | U20 | 8 | 14 |
| | 1-4 | U22 | 2 | 6 |
| | 1-4 | U23 | 3 | 6 |
| | 1-4 | U24 | 8 | 6 |
| | 1-4 | U25 | 9 | 6 |
| | 1-4 | U26 | 13 | 6 |
| | 1-4 | U27 | 14 | 6 |
| | 1-4 | U28 | 18 | 6 |
| | 1-4 | U29 | 19 | 6 |
| | 1-4 | U36 | 11 | 12 |
| | 1-6 | U47 | 44 | 7 |
| 1, MEMORY ADDRESS MA5 | | | | |
| | 1-5 | U20 | 8 | 13 |
| | 1-4 | U22 | 2 | 5 |
| | 1-4 | U23 | 3 | 5 |
| | 1-4 | U24 | 8 | 5 |
| | 1-4 | U25 | 9 | 5 |
| | 1-4 | U26 | 13 | 5 |
| | 1-4 | U27 | 14 | 5 |
| | 1-4 | U28 | 18 | 5 |
| | 1-4 | U29 | 19 | 5 |
| | 1-4 | U36 | 11 | 15 |
| | 1-6 | U47 | 44 | 5 |
| 1, MEMORY ADDRESS MA6 | | | | |
| | 1-5 | U20 | 8 | 12 |
| | 1-4 | U22 | 2 | 4 |
| | 1-4 | U23 | 3 | 4 |
| | 1-4 | U24 | 8 | 4 |
| | 1-4 | U25 | 9 | 4 |
| | 1-4 | U26 | 13 | 4 |
| | 1-4 | U27 | 14 | 4 |
| | 1-4 | U28 | 18 | 4 |
| | 1-4 | U29 | 19 | 4 |
| | 1-4 | U36 | 11 | 16 |
| | 1-6 | U47 | 44 | 3 |
| 1, MEMORY ADDRESS MA7 | | | | |
| | 1-5 | U21 | 9 | 1[illegible] |
| | 1-4 | U22 | 2 | 3 |
| | 1-4 | U23 | 3 | 3 |
| | 1-4 | U24 | 8 | 3 |
| | 1-4 | U25 | 9 | 3 |
| | 1-4 | U26 | 13 | 3 |
| | 1-4 | U27 | 14 | 3 |
| | 1-4 | U28 | 18 | 3 |
| | 1-4 | U29 | 19 | 3 |

| Signal Desc | Path Ref | Circuit Designator | Symbol Ref | Pin |
|---|---|---|---|---|
| | 1-4 | U36 | 11 | 19 |
| | 1-6 | U48 | 171 | 13 |
| 1,MEMORY ADDRESS MA8 | | | | |
| | 1-5 | U21 | 9 | 18 |
| | 1-4 | U22 | 2 | 25 |
| | 1-4 | U23 | 3 | 25 |
| | 1-4 | U24 | 8 | 25 |
| | 1-4 | U25 | 9 | 25 |
| | 1-4 | U26 | 13 | 25 |
| | 1-4 | U27 | 14 | 25 |
| | 1-4 | U23 | 18 | 25 |
| | 1-4 | U29 | 19 | 25 |
| | 1-4 | U37 | 15 | 2 |
| | 1-6 | U48 | 171 | 16 |
| 1,MEMORY ADDRESS MA9 | | | | |
| | 1-5 | U21 | 9 | 17 |
| | 1-4 | U22 | 2 | 24 |
| | 1-4 | U23 | [illegible] | 24 |
| | [illegible] | U24 | [illegible] | [illegible] |
| | [illegible] | [illegible] | [illegible] | [illegible] |
| | [illegible] | [illegible] | [illegible] | [illegible] |
| | 1-4 | [illegible] | 14 | 24 |
| | 1-4 | [illegible] | 18 | 24 |
| | 1-4 | U29 | 19 | 24 |
| | 1-4 | U37 | 15 | 5 |
| | 1-6 | U48 | 171 | 14 |
| 1,MEMORY ADDRESS MA10 | | | | |
| | 1-5 | U21 | 9 | 16 |
| | 1-4 | U22 | 2 | 21 |
| | 1-4 | U23 | 3 | 21 |
| | 1-4 | U24 | 8 | 21 |
| | 1-4 | U25 | 9 | 21 |
| | 1-4 | U26 | 13 | 21 |
| | 1-4 | U27 | 14 | 21 |
| | 1-4 | U28 | 18 | 21 |
| | 1-4 | U29 | 19 | 21 |
| | 1-4 | U37 | 15 | 6 |
| | 1-6 | U48 | 171 | 13 |
| 1,MEMORY ADDRESS MA11 | | | | |
| | 1-5 | U21 | 9 | 15 |
| | 1-4 | U22 | 2 | 23 |
| | 1-4 | U23 | 3 | 23 |
| | 1-4 | U24 | 8 | 23 |
| | 1-4 | U25 | 9 | 23 |
| | 1-4 | U26 | 13 | 23 |
| | 1-4 | U27 | 14 | 23 |
| | 1-4 | U28 | 18 | 23 |
| | 1-4 | U29 | 19 | 23 |
| | 1-4 | U37 | 15 | 9 |
| | 1-6 | U48 | 171 | 9 |
| 1,MEMORY ADDRESS MA12 | | | | |
| | 1-5 | U21 | 9 | 14 |
| | 1-4 | U22 | 2 | 2 |
| | 1-4 | U23 | 3 | 2 |
| | 1-4 | U24 | 8 | 2 |
| | 1-4 | U25 | 9 | 2 |
| | 1-4 | U26 | 13 | 2 |
| | 1-4 | U27 | 14 | 2 |
| | 1-4 | U28 | 18 | 2 |
| | 1-4 | U29 | 19 | 2 |
| | 1-4 | U37 | 15 | 12 |
| | 1-6 | U48 | 171 | 7 |
| 1,MEMORY ADDRESS MA13 | | | | |
| | 1-5 | U21 | 9 | 13 |
| | 1-4 | U32 | 29 | 5 |
| | 1-4 | U33 | 27 | 1 |
| | 1-4 | U37 | 15 | 15 |
| | 1-6 | U48 | 171 | 5 |
| 1,MEMORY ADDRESS MA14 | | | | |
| | 1-5 | U21 | 9 | 12 |
| | 1-4 | U32 | 29 | 6 |
| | 1-4 | U33 | 27 | 2 |
| | 1-4 | U37 | 15 | 15 |
| | 1-6 | U48 | 171 | 3 |
| 1,MMA DS/ | | | | |
| | 1-6 | U42 | 49 | 3 |
| | 1-6 | U49 | 32 | 7 |
| 1,MMA M/W | | | | |
| | 1-6 | U42 | 49 | 9 |
| | 1-6 | U49 | 32 | 8 |
| 1,MMA MMA2 | | | | |
| | 1-6 | U38 | 117 | 15 |
| | 1-6 | U42 | 49 | 2 |
| | 1-6 | U49 | 32 | 1 |

| Signal Desc | Path Ref | Circuit Designator | Symbol Ref | Pin |
|---|---|---|---|---|
| 1,MMA MMA3 | | | | |
| | 1-6 | U38 | 117 | 31 |
| | 1-6 | U49 | 32 | 2 |
| 1,MMA MMA4 | | | | |
| | 1-6 | U38 | 117 | 46 |
| | 1-6 | U49 | 32 | 3 |
| 1,MMA MMA5 | | | | |
| | 1-6 | U38 | 117 | 47 |
| | 1-6 | U42 | 49 | 8 |
| | 1-6 | [illegible] | 32 | 4 |
| 1,MMA SEL0 | | | | |
| | 1-6 | U42 | 49 | 4 |
| | 1-6 | U49 | 32 | 5 |
| 1,MMA SEL1 | | | | |
| | 1-6 | U42 | 49 | [illegible] |
| | 1-6 | U49 | 32 | [illegible] |
| 1,MMD MMD0 | | | | |
| | 1-6 | U38 | 117 | 12 |
| | 1-6 | U38 | 117 | 24 |
| | 1-6 | U49 | 32 | 21 |
| | 1-6 | U52 | 203 | 1 |
| | 1-6 | U53 | 202 | 1 |
| 1,MMD MMD1 | | | | |
| | 1-6 | U38 | 117 | 27 |
| | 1-6 | U38 | 117 | 39 |
| | 1-6 | U49 | 32 | 22 |
| | 1-6 | U52 | 203 | 2 |
| | 1-6 | U53 | 202 | 2 |
| 1,MMD MMD2 | | | | |
| | 1-6 | U38 | 117 | 8 |
| | 1-6 | U38 | 117 | 11 |
| | 1-6 | U49 | 32 | 23 |
| | 1-6 | U52 | 203 | 3 |
| | 1-6 | U53 | 202 | 3 |
| 1,MMD MMD3 | | | | |
| | 1-6 | U38 | 117 | 23 |
| | 1-6 | U38 | 117 | 26 |
| | 1-6 | U49 | 32 | 24 |
| | 1-6 | U52 | 203 | 4 |
| | 1-6 | U53 | 202 | 4 |
| 1,MMD MMD4 | | | | |
| | 1-6 | U38 | 117 | 10 |
| | 1-6 | U38 | 117 | 33 |
| | 1-6 | U49 | 32 | 25 |
| | 1-6 | U52 | 203 | 5 |
| | 1-6 | U53 | 202 | 5 |
| 1,MMD MMD5 | | | | |
| | 1-6 | U38 | 117 | 7 |
| | 1-6 | U38 | 117 | 25 |
| | 1-6 | U49 | 32 | 26 |
| | 1-6 | U52 | 203 | 6 |
| | 1-6 | U53 | 202 | 6 |
| 1,MMD MMD6 | | | | |
| | 1-6 | U38 | 117 | 22 |
| | 1-6 | U38 | 117 | 40 |
| | 1-6 | U49 | 32 | 27 |
| | 1-6 | U52 | 203 | 7 |
| | 1-6 | U53 | [illegible] | 7 |
| 1,MMD MMD7 | | | | |
| | 1-6 | U38 | 1 | 9 |
| | 1-6 | U38 | 1 | 37 |
| | 1-6 | U49 | [illegible] | 28 |
| | 1-6 | U52 | [illegible] | 8 |
| | 1-6 | U53 | [illegible] | 8 |
| 1,MPAR MPAR0/ | | | | |
| | 1-6 | U38 | [illegible] | 101 |
| | 1-6 | U60 | [illegible] | 2 |
| | 1-6 | U60 | [illegible] | 11 |
| 1,MPAR MPAR1/ | | | | |
| | 1-6 | U38 | 117 | 147 |
| | 1-6 | U60 | 195 | 4 |
| | 1-6 | U60 | 195 | 13 |
| 1,MPAR MPAR2/ | | | | |
| | 1-6 | U38 | 117 | 146 |
| | 1-6 | U60 | 195 | 15 |
| 1,MPAR MPAR3/ | | | | |
| | 1-6 | U38 | 117 | 144 |

| Signal Desc | Path Ref | Circuit Designator | Symbol Ref | Pin |
|---|---|---|---|---|
| | 1-6 | U60 | 195 | 17 |
| 1,MWTC/ MRTC/ | | | | |
| | 1-6 | U39 | 33 | 11 |
| | 1-6 | U40 | 39 | 11 |
| | 1-6 | U43 | 29 | 19 |
| | 1-6 | U43 | 29 | 19 |
| 1,MWTC/ MWTC/ SEE 1,MWTC/ MRTC/ | | | | |
| 1,RTSYNC/ BUSERR/ | | | | |
| | 1-6 | P1 | 46 | C23 |
| | 1-6 | U38 | 117 | 153 |
| 1,RTSYNC/ RTSYNC/ | | | | |
| | 1-6 | P1 | 46 | B25 |
| | 1-6 | U38 | 117 | 156 |
| 1,SCDIR SCDIR0 | | | | |
| | 1-6 | U38 | 117 | 112 |
| | 1-6 | U62 | 196 | 1 |
| 1,SCDIR SCDIR1 | | | | |
| | 1-6 | U38 | 117 | 151 |
| | 1-6 | U61 | 197 | 1 |
| 1,TIMOUT BCLK/ | | | | |
| | 1-6 | U38 | 117 | 67 |
| | 1-6 | U41 | 48 | 1 |
| | 1-6 | U43 | 29 | 1 |
| | 1-6 | U44 | 30 | 1 |
| | 1-6 | U63 | 201 | 10 |
| 1,TIMOUT LATCHN | | | | |
| | 1-6 | U38 | 117 | 68 |
| | 1-6 | U63 | 200 | 8 |
| 1,TIMOUT RST/ | | | | |
| | 1-6 | P1 | 46 | B23 |
| | 1-6 | U41 | 48 | 8 |
| 1,TIMOUT TIMOUT | | | | |
| | 1-6 | U38 | 117 | 76 |
| | 1-6 | U63 | 198 | 6 |
| 1,UCODE ADDR A0 | | | | |
| | 1-3 | U1 | 2 | 8 |
| | 1-3 | U2 | 3 | 8 |
| | 1-3 | U3 | 4 | 8 |
| | 1-3 | U4 | 5 | 8 |
| | 1-3 | U5 | 6 | 8 |
| | 1-3 | U6 | 7 | 8 |
| | 1-3 | U7 | 8 | 8 |
| | 1-3 | U8 | 9 | 8 |
| | 1-3 | U9 | 17 | 33 |
| 1,UCODE ADDR A1 | | | | |
| | 1-3 | U1 | 2 | 7 |
| | 1-3 | U2 | 3 | 7 |
| | 1-3 | U3 | 4 | 7 |
| | 1-3 | U4 | 5 | 7 |
| | 1-3 | U5 | 6 | 7 |
| | 1-3 | U6 | 7 | 7 |
| | 1-3 | U7 | 8 | 7 |
| | 1-3 | U8 | 9 | 7 |
| | 1-3 | U9 | 17 | 35 |
| 1,UCODE ADDR A2 | | | | |
| | 1-3 | U1 | 2 | 6 |
| | 1-3 | U2 | 3 | 6 |
| | 1-3 | U3 | 4 | 6 |
| | 1-3 | U4 | 5 | 6 |
| | 1-3 | U5 | 6 | 6 |
| | 1-3 | U6 | 7 | 6 |
| | 1-3 | U7 | 8 | 6 |
| | 1-3 | U8 | 9 | 6 |
| | 1-3 | U9 | 17 | 37 |
| 1,UCODE ADDR A3 | | | | |
| | 1-3 | U1 | 2 | 5 |
| | 1-3 | U2 | 3 | 5 |
| | 1-3 | U3 | 4 | 5 |
| | 1-3 | U4 | 5 | 5 |
| | 1-3 | U5 | 6 | 5 |
| | 1-3 | U6 | 7 | 5 |
| | 1-3 | U7 | 8 | 5 |
| | 1-3 | U8 | 9 | 5 |
| | 1-3 | U9 | 17 | 39 |
| 1,UCODE ADDR A4 | | | | |
| | 1-3 | U1 | 2 | 4 |
| | 1-3 | U2 | 3 | 4 |
| | 1-3 | U3 | 4 | 4 |
| | 1-3 | U4 | 5 | 4 |

| Signal Desc | Path Ref | Circuit Designator | Symbol Ref | Pin |
|---|---|---|---|---|
| | 1-3 | U5 | 6 | 4 |
| | 1-3 | U6 | 7 | 4 |
| | 1-3 | U7 | 8 | 4 |
| | 1-3 | U8 | 9 | 4 |
| | 1-3 | U9 | 17 | 1 |
| 1,UCODE ADDR A5 | 1-3 | U1 | 2 | 3 |
| | 1-3 | U2 | 3 | 3 |
| | 1-3 | U3 | 4 | 3 |
| | 1-3 | U4 | 5 | 3 |
| | 1-3 | U5 | 6 | 3 |
| | 1-3 | U6 | 7 | 3 |
| | 1-3 | U7 | 8 | 3 |
| | 1-3 | U8 | 9 | 3 |
| | 1-3 | U9 | 17 | 3 |
| 1,UCODE ADDR A6 | 1-3 | U1 | 2 | 2 |
| | 1-3 | U2 | 3 | 2 |
| | 1-3 | U3 | 4 | 2 |
| | 1-3 | U4 | 5 | 2 |
| | 1-3 | U5 | 6 | 2 |
| | 1-3 | U6 | 7 | 2 |
| | 1-3 | U7 | 8 | 2 |
| | 1-3 | U8 | 9 | 2 |
| | 1-3 | U9 | 17 | 18 |
| 1,UCODE ADDR A7 | 1-3 | U1 | 2 | 1 |
| | 1-3 | U2 | 3 | 1 |
| | 1-3 | U3 | 4 | 1 |
| | 1-3 | U4 | 5 | 1 |
| | 1-3 | U5 | 6 | 1 |
| | 1-3 | U6 | 7 | 1 |
| | 1-3 | U7 | 8 | 1 |
| | 1-3 | U8 | 9 | 1 |
| | 1-3 | U9 | 17 | 20 |
| 1,UCODE ADDR A8 | 1-3 | U1 | 2 | 23 |
| | 1-3 | U2 | 3 | 23 |
| | 1-3 | U3 | 4 | 23 |
| | 1-3 | U4 | 5 | 23 |
| | 1-3 | U5 | 6 | 23 |
| | 1-3 | U6 | 7 | 23 |
| | 1-3 | U7 | 8 | 23 |
| | 1-3 | U8 | 9 | 23 |
| | 1-3 | U9 | 17 | 22 |
| 1,UCODE ADDR A9 | 1-3 | U1 | 2 | 22 |
| | 1-3 | U2 | 3 | 22 |
| | 1-3 | U3 | 4 | 22 |
| | 1-3 | U4 | 5 | 22 |
| | 1-3 | U5 | 6 | 22 |
| | 1-3 | U6 | 7 | 22 |
| | 1-3 | U7 | 8 | 22 |
| | 1-3 | U8 | 9 | 22 |
| | 1-3 | U9 | 17 | 24 |
| 1,UCODE ADDR AA | 1-3 | U1 | 2 | 21 |
| | 1-3 | U2 | 3 | 21 |
| | 1-3 | U3 | 4 | 21 |
| | 1-3 | U4 | 5 | 21 |
| | 1-3 | U5 | 6 | 21 |
| | 1-3 | U6 | 7 | 21 |
| | 1-3 | U7 | 8 | 21 |
| | 1-3 | U8 | 9 | 21 |
| | 1-3 | U9 | 17 | 26 |
| 1,YBUS Y0 | 1-3 | U13 | 20 | 17 |
| | 1-3 | U14 | 22 | 51 |
| | 1-4 | U35 | 7 | 1 |
| | 1-4 | U36 | 11 | 3 |
| | 1-3 | U64 | 61 | 3 |
| | 1-7 | U65 | 4 | 12 |
| | 1-7 | U66 | 5 | 3 |
| | 1-7 | U67 | 66 | 12 |
| | 1-7 | U69 | 3 | 45 |
| | 1-7 | U70 | 55 | 45 |
| | 1-7 | U82 | 99 | 1 |
| 1,YBUS Y1 | 1-3 | U13 | 20 | 12 |
| | 1-3 | U14 | 22 | 50 |
| | 1-4 | U35 | 7 | 2 |
| | 1-4 | U36 | 11 | 4 |
| | 1-3 | U64 | 61 | 4 |
| | 1-7 | U65 | 4 | 13 |
| | 1-7 | U66 | 5 | 4 |
| | 1-7 | U67 | 66 | 13 |

| Signal Desc | Path Ref | Circuit Designator | Symbol Ref | Pin |
|---|---|---|---|---|
| | 1-7 | U69 | 3 | 46 |
| | 1-7 | U70 | 55 | 46 |
| | 1-7 | U82 | 99 | 2 |
| 1,YBUS Y2 | | | | |
| | 1-3 | U13 | 20 | 17 |
| | 1-3 | U14 | 22 | 49 |
| | 1-4 | U35 | 7 | 3 |
| | 1-4 | U36 | 11 | 7 |
| | 1-3 | U64 | 61 | 7 |
| | 1-7 | U65 | 4 | 14 |
| | 1-7 | U66 | 5 | 7 |
| | 1-7 | U67 | 66 | 14 |
| | 1-7 | U69 | 3 | 47 |
| | 1-7 | U70 | 55 | 47 |
| | 1-7 | U82 | 99 | 3 |
| 1,YBUS Y3 | | | | |
| | 1-3 | U13 | 20 | 16 |
| | 1-3 | U14 | 22 | 48 |
| | 1-4 | U35 | 7 | 4 |
| | 1-4 | U36 | 11 | 8 |
| | 1-3 | U64 | 61 | 8 |
| | 1-7 | U65 | 4 | 15 |
| | 1-7 | U66 | 5 | 8 |
| | 1-7 | U67 | 66 | 15 |
| | 1-7 | U69 | 3 | 48 |
| | 1-7 | U70 | 55 | 48 |
| | 1-7 | U82 | 99 | 4 |
| 1,YBUS Y4 | | | | |
| | 1-3 | U13 | 20 | 15 |
| | 1-3 | U14 | 22 | 47 |
| | 1-4 | U35 | 7 | 5 |
| | 1-4 | U36 | 11 | 13 |
| | 1-3 | U64 | 61 | 13 |
| | 1-7 | U65 | 4 | 16 |
| | 1-7 | U66 | 5 | 13 |
| | 1-7 | U67 | 66 | 16 |
| | 1-7 | U69 | 3 | 50 |
| | 1-7 | U70 | 55 | 50 |
| | 1-7 | U82 | 99 | 5 |
| 1,YBUS Y5 | | | | |
| | 1-3 | U13 | 20 | 14 |
| | 1-3 | U14 | 22 | 46 |
| | 1-4 | U35 | 7 | 6 |
| | 1-4 | U36 | 11 | 14 |
| | 1-3 | U64 | 61 | 14 |
| | 1-7 | U65 | 4 | 17 |
| | 1-7 | U66 | 5 | 14 |
| | 1-7 | U67 | 66 | 17 |
| | 1-7 | U69 | 3 | 44 |
| | 1-7 | U70 | 55 | 44 |
| | 1-7 | U82 | 99 | 6 |
| 1,YBUS Y6 | | | | |
| | 1-3 | U13 | 20 | 13 |
| | 1-3 | U14 | 22 | 45 |
| | 1-4 | U35 | 7 | 7 |
| | 1-4 | U36 | 11 | 17 |
| | 1-3 | U64 | 61 | 17 |
| | 1-7 | U65 | 4 | 18 |
| | 1-7 | U66 | 5 | 17 |
| | 1-7 | U67 | [illegible] | 18 |
| | 1-7 | U69 | | 41 |
| | 1-7 | U70 | | 41 |
| | 1-7 | U82 | | 7 |
| 1,YBUS Y7 | | | | |
| | 1-3 | U13 | | 12 |
| | 1-3 | U14 | | 42 |
| | 1-4 | U35 | | 8 |
| | 1-4 | U36 | | 18 |
| | 1-3 | U64 | | 18 |
| | 1-7 | U65 | | 19 |
| | 1-7 | U66 | | 18 |
| | 1-7 | U67 | | 19 |
| | 1-7 | U69 | | 42 |
| | 1-7 | U70 | [illegible] | 42 |
| | 1-7 | U82 | [illegible] | 8 |
| 1,YBUS Y8 | | | | |
| | 1-3 | U12 | 19 | 19 |
| | 1-3 | U14 | 22 | 39 |
| | 1-4 | U34 | 4 | 1 |
| | 1-4 | U37 | 15 | 3 |
| | 1-7 | U68 | 78 | 3 |
| | 1-7 | U69 | 3 | 2 |
| | 1-7 | U70 | 55 | 2 |
| 1,YBUS Y9 | | | | |
| | 1-3 | U12 | 19 | 18 |
| | 1-3 | U14 | 22 | 38 |

| Signal Desc | Path Ref | Circuit Designator | Symbol Ref | Pin |
|---|---|---|---|---|
| | 1-4 | U34 | 4 | 2 |
| | 1-4 | U37 | 15 | 4 |
| | 1-7 | U68 | 78 | 4 |
| | 1-7 | U69 | 3 | 3 |
| | 1-7 | U70 | 55 | 3 |
| 1,YBUS Y10 | 1-3 | U12 | 19 | 17 |
| | 1-3 | U14 | 22 | 37 |
| | 1-4 | U34 | 4 | 3 |
| | 1-4 | U37 | 15 | 7 |
| | 1-7 | U68 | 78 | 7 |
| | 1-7 | U69 | 3 | 4 |
| | 1-7 | U70 | 55 | 4 |
| 1,YBUS Y11 | 1-3 | U12 | 19 | 16 |
| | 1-3 | U14 | 22 | 34 |
| | 1-4 | U34 | 4 | 4 |
| | 1-4 | U37 | 15 | 8 |
| | 1-7 | U68 | 78 | 8 |
| | 1-7 | U69 | 3 | 5 |
| | 1-7 | U70 | 55 | 5 |
| 1,YBUS Y12 | 1-3 | U12 | 19 | 15 |
| | 1-3 | U14 | 22 | 33 |
| | 1-4 | U34 | 4 | 5 |
| | 1-4 | U37 | 15 | 13 |
| | 1-7 | U68 | 78 | 13 |
| | 1-7 | U69 | 3 | 6 |
| | 1-7 | U70 | 55 | 6 |
| 1,YBUS Y13 | 1-3 | U12 | 19 | 14 |
| | 1-3 | U14 | 22 | 32 |
| | 1-4 | U34 | 4 | 6 |
| | 1-4 | U37 | 15 | 14 |
| | 1-7 | U68 | 78 | 14 |
| | 1-7 | U69 | 3 | 54 |
| | 1-7 | U70 | 55 | 54 |
| 1,YBUS Y14 | 1-3 | U12 | 19 | 13 |
| | 1-3 | U14 | 22 | 31 |
| | 1-4 | U34 | 4 | 7 |
| | 1-4 | U37 | 15 | 17 |
| | 1-7 | U68 | 78 | 17 |
| | 1-7 | U69 | 3 | 55 |
| | 1-7 | U70 | 55 | 55 |
| 1,YBUS Y15 | 1-3 | U12 | 19 | 12 |
| | 1-3 | U14 | 22 | 30 |
| | 1-4 | U34 | 4 | 8 |
| | 1-4 | U37 | 15 | 13 |
| | 1-7 | U68 | 78 | 13 |
| | 1-7 | U69 | 3 | 56 |
| | 1-7 | U70 | 55 | 56 |

Appendix G

```
###################### P I N   L I S T ####################

   LABEL     ** FNC **PIN --------- PIN** FNC **     LABEL
3CLK         ** CK  **  1-|         |-20 ** +5V **VCC
3SC0         ** I   **  2-|         |-19 ** /O  **RD
3SC2         ** I   **  3-|         |-18 ** /O  **WR
3SC3         ** I   **  4-|   8     |-17 ** O   **ADDCLK
3SC4         ** I   **  5-|   2     |-16 ** O   **SEQ
3SC5         ** I   **  6-|   S     |-15 ** O   **WIDTH
3SC6         ** I   **  7-|   1     |-14 ** O   **ACCESS
:NTCLK       ** O   **  8-|   5     |-13 ** O   **MEMREQ
.ENO-        ** I   **  9-|   5     |-12 ** O   **EXFER
:ND          ** OV  ** 10-|         |-11 ** /OE **/OE
                           ---------

/ACCESS: D = /BSC0 * BSC6 + BSC0 * /ACCESS
;
/WIDTH: D = /BSC0 * BSC2 * BSC3 +
            BSC0 * /WIDTH
;
/SEQ: D = /BSC4 * /BSC3 * BSC2  "NO EOC LATCHED"
;
/ADDCLK: D = /BSC0
;
CNTCLK = /BSC0 + BSC4 * /SEQ   "WHEN NO EOC AND BSC4 HIGH"
;
```

```
32S155                                   !FF TYPE!EB   EA !        !    POLARITY    !
                                         !_______!_________!        !________________!
___                                      !A:A:A:A!A    !A  !        !L:L:H:H:L:H:L:L!
T  !
E  !--------------------------------------------------------!--------!----------------
R  ! !   I   !       B(i)      ! Q(p)  ! Q(n)  ! P ! R !     B(o)       !
M  !C!------------------------------------------------------!B!A!B!A!----------------
___! !3_2_1_0!7_6_5_4_3_2_1_0!3_2_1_0!3_2_1_0!_!_!_!_!7_6_5_4_3_2_1_0!
  0!A!L L L H!- - - -,- - - -!- - - -!. . . .!. . . .!. . . A,A . A A.
  1!A!H L - H!- - - -,- - H H!- - - L!. . . .!. . . .!. A . .,A . A A!
  2!A!- L - H!- - - -,- - H H!- - - H!. . . .!. . . .!A . . .,A . A A!
  3!A!- - - H!- - - -,- - - -!- - - -!. . . .!. . . .!. . A .,A . A A!
  4!A!L - - -!- - - -,- - - -!- - - -!. . . .!. . . .!. . A .,A . A A!
  5!A!- - - -!- - - -,- - - L!- - - -!. . . .!. . . .!. . A .,A . A A!
  6!A!- - - L!- - - -,- - H -!- - - -!. . . A!. . . .!. . . .,A . A A!
  7!A!- - - H!- - - -,- - - -!- - - H!. . . A!. . . .!. . . .,A . A A!
  8!A!- H H L!- - - -,- - - -!- - - -!. . A .!. . . .!. . . .,A . A A!
  9!A!- - - H!- - - -,- - - -!- - H -!. . A .!. . . .!. . . .,A . A A!
 10!A!L L H -!- - - -,- - - -!- - - -!. A . .!. . . .!. . . .,A . A A!
 11!A!- - - L!- - - -,- - - -!- - - -!A . . .!. . . .!. . . .,A A A A!
 12!A!H - - -!- - - -,- - - -!- H - -!. . . .!. . . .!. . . .,A A A A!
 13!0!0 0 0 0!0 0 0 0,0 0 0 0!0 0 0 0!0 0 0 0!A A A A!A A A A,A A A A!
 14!0!0 0 0 0!0 0 0 0,0 0 0 0!0 0 0 0!0 0 0 0!A A A A!A A A A,A A A A!
 15!0!0 0 0 0!0 0 0 0,0 0 0 0!0 0 0 0!0 0 0 0!A A A A!A A A A,A A A A!
 16!0!0 0 0 0!0 0 0 0,0 0 0 0!0 0 0 0!0 0 0 0!A A A A!A A A A,A A A A!
 17!0!0 0 0 0!0 0 0 0,0 0 0 0!0 0 0 0!0 0 0 0!A A A A!A A A A,A A A A!
 18!0!0 0 0 0!0 0 0 0,0 0 0 0!0 0 0 0!0 0 0 0!A A A A!A A A A,A A A A!
 19!0!0 0 0 0!0 0 0 0,0 0 0 0!0 0 0 0!0 0 0 0!A A A A!A A A A,A A A A!
 20!0!0 0 0 0!0 0 0 0,0 0 0 0!0 0 0 0!0 0 0 0!A A A A!A A A A,A A A A!
 21!0!0 0 0 0!0 0 0 0,0 0 0 0!0 0 0 0!0 0 0 0!A A A A!A A A A,A A A A!
 22!0!0 0 0 0!0 0 0 0,0 0 0 0!0 0 0 0!0 0 0 0!A A A A!A A A A,A A A A!
 23!0!0 0 0 0!0 0 0 0,0 0 0 0!0 0 0 0!0 0 0 0!A A A A!A A A A,A A A A!
 24!0!0 0 0 0!0 0 0 0,0 0 0 0!0 0 0 0!0 0 0 0!A A A A!A A A A,A A A A!
 25!0!0 0 0 0!0 0 0 0,0 0 0 0!0 0 0 0!0 0 0 0!A A A A!A A A A,A A A A!
 26!0!0 0 0 0!0 0 0 0,0 0 0 0!0 0 0 0!0 0 0 0!A A A A!A A A A,A A A A!
 27!0!0 0 0 0!0 0 0 0,0 0 0 0!0 0 0 0!0 0 0 0!A A A A!A A A A,A A A A!
 28!0!0 0 0 0!0 0 0 0,0 0 0 0!0 0 0 0!0 0 0 0!A A A A!A A A A,A A A A!
 29!0!0 0 0 0!0 0 0 0,0 0 0 0!0 0 0 0!0 0 0 0!A A A A!A A A A,A A A A!
 30!0!0 0 0 0!0 0 0 0,0 0 0 0!0 0 0 0!0 0 0 0!A A A A!A A A A,A A A A!
 31!0!0 0 0 0!0 0 0 0,0 0 0 0!0 0 0 0!0 0 0 0!A A A A!A A A A,A A A A!
 Fc!0!0 0 0 0!0 0 0 0,0 0 0 0!0 0 0 0!                                  .
 Lb!.!0 0 0 0!0 0 0 0,0 0 0 0!0 0 0 0!                                  .
 La!.!0 0 0 0!0 0 0 0,0 0 0 0!0 0 0 0!                                  .
 D7!-!- - - -!- - - -,- - - -!- - - -!                                  .
 D6!-!- - - -!- - - -,- - - -!- - - -!                                  .
 D5!-!- - - -!- - - -,- - - -!- - - -!                                  .
 D4!-!- - - -!- - - -,- - - -!- - - -!                                  .
 D3!.!0 0 0 0!0 0 0 0,0 0 0 0!0 0 0 0!                                  .
 D2!-!- - - -!- - - -,- - - -!- - - -!                                  .
 D1!.!0 0 0 0!0 0 0 0,0 0 0 0!0 0 0 0!                                  .
 D0!.!0 0 0 0!0 0 0 0,0 0 0 0!0 0 0 0!                                  .

       B B B B R W M E A C B B A S W A A S W A              R W M E A C B B
       S S S S D R E X E N S S D E I C D E I C              D R E X E N S S
       C C C C     M F N T C C D Q D C D Q D C                  M F N T C C
       4 3 2 0     R E O C 6 5 C   T E C   T E                  R E O C 6 5
```

```
#################### P I N   L I S T ####################

   LABEL      ** FNC **PIN --------- PIN** FNC **     LABEL
A7            ** I    **   1-|         |-20 ** +5V **VCC
A6            ** I    **   2-|         |-19 ** O   **MATCH
A5            ** I    **   3-|         |-18 ** I   **B0
A4            ** I    **   4-|    8    |-17 ** I   **B1
A3            ** I    **   5-|    2    |-16 ** I   **B2
A2            ** I    **   6-|    S    |-15 ** I   **B3
A1            ** I    **   7-|    1    |-14 ** I   **B4
A0            ** I    **   8-|    5    |-13 ** I   **B5
TEMP          ** O    **   9-|    3    |-12 ** I   **B6
GND           ** OV   **  10-|         |-11 ** I   **B7
                              ---------
@DEVICE TYPE
82S153
@DRAWING
multi-bus 2 interface
@REVISION
1
@DATE
10-08-85
@SYMBOL
U54
@COMPANY
mcair
@NAME
kevin brady
@DESCRIPTION
this pla compares the BAD address lines from the bus with
a value held in latches and issues an active high MATCH
signal upon an exact match
@COMMON PRODUCT TERM
@I/O DIRECTION
@OUTPUT POLARITY
@LOGIC EQUATION
TEMP   =    (A0 * /B0 + /A0 * B0) +
            (A1 * /B1 + /A1 * B1) +
            (A2 * /B2 + /A2 * B2) +
            (A3 * /B3 + /A3 * B3) +
            (A4 * /B4 + /A4 * B4) +
            (A5 * /B5 + /A5 * B5) +
            (A6 * /B6 + /A6 * B6) +
            (A7 * /B7 + /A7 * B7);

MATCH = /TEMP;
```

| TERM | I | | | | | | | | B(1) | | | | | | | | | | B(o) | | | | | | | | | |
|---|---|---|---|---|---|---|---|---|---|---|---|---|---|---|---|---|---|---|---|---|---|---|---|---|---|---|---|---|
| POLARITY | | | | | | | | | | | | | | | | | | | H | H | H | H | H | H | H | H | H | H |
| | 7 | 6 | 5 | 4 | 3 | 2 | 1 | 0 | 9 | 8 | 7 | 6 | 5 | 4 | 3 | 2 | 1 | 0 | 9 | 8 | 7 | 6 | 5 | 4 | 3 | 2 | 1 | 0 |
| 0 | H | - | - | - | - | - | - | - | - | L | - | - | - | - | - | - | - | - | . | A | A | A | A | A | A | A | A | A |
| 1 | L | - | - | - | - | - | - | - | - | H | - | - | - | - | - | - | - | - | . | A | A | A | A | A | A | A | A | A |
| 2 | - | H | - | - | - | - | - | - | - | - | L | - | - | - | - | - | - | - | . | A | A | A | A | A | A | A | A | A |
| 3 | - | L | - | - | - | - | - | - | - | - | H | - | - | - | - | - | - | - | . | A | A | A | A | A | A | A | A | A |
| 4 | - | - | H | - | - | - | - | - | - | - | - | L | - | - | - | - | - | - | . | A | A | A | A | A | A | A | A | A |
| 5 | - | - | L | - | - | - | - | - | - | - | - | H | - | - | - | - | - | - | . | A | A | A | A | A | A | A | A | A |
| 6 | - | - | - | H | - | - | - | - | - | - | - | - | L | - | - | - | - | - | . | A | A | A | A | A | A | A | A | A |
| 7 | - | - | - | L | - | - | - | - | - | - | - | - | H | - | - | - | - | - | . | A | A | A | A | A | A | A | A | A |
| 8 | - | - | - | - | H | - | - | - | - | - | - | - | - | L | - | - | - | - | . | A | A | A | A | A | A | A | A | A |
| 9 | - | - | - | - | L | - | - | - | - | - | - | - | - | H | - | - | - | - | . | A | A | A | A | A | A | A | A | A |
| 10 | - | - | - | - | - | H | - | - | - | - | - | - | - | - | L | - | - | - | . | A | A | A | A | A | A | A | A | A |
| 11 | - | - | - | - | - | L | - | - | - | - | - | - | - | - | H | - | - | - | . | A | A | A | A | A | A | A | A | A |
| 12 | - | - | - | - | - | - | H | - | - | - | - | - | - | - | - | L | - | - | . | A | A | A | A | A | A | A | A | A |
| 13 | - | - | - | - | - | - | L | - | - | - | - | - | - | - | - | H | - | - | . | A | A | A | A | A | A | A | A | A |
| 14 | - | - | - | - | - | - | - | H | - | - | - | - | - | - | - | - | L | - | . | A | A | A | A | A | A | A | A | A |
| 15 | - | - | - | - | - | - | - | L | - | - | - | - | - | - | - | - | H | - | . | A | A | A | A | A | A | A | A | A |
| 16 | - | - | - | - | - | - | - | - | - | - | - | - | - | - | - | - | - | L | A | A | A | A | A | A | A | A | A | . |
| 17 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 18 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 19 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 20 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 21 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 22 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 23 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 24 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 25 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 26 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 27 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 28 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 29 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 30 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 31 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| D9 | - | - | - | - | - | - | - | - | - | - | - | - | - | - | - | - | - | - | | | | | | | | | | . |
| D8 | 0 | 0 | 0 | 0 | 0 | 0 | 0 | 0 | 0 | 0 | 0 | 0 | 0 | 0 | 0 | 0 | 0 | 0 | | | | | | | | | | . |
| D7 | 0 | 0 | 0 | 0 | 0 | 0 | 0 | 0 | 0 | 0 | 0 | 0 | 0 | 0 | 0 | 0 | 0 | 0 | | | | | | | | | | . |
| D6 | 0 | 0 | 0 | 0 | 0 | 0 | 0 | 0 | 0 | 0 | 0 | 0 | 0 | 0 | 0 | 0 | 0 | 0 | | | | | | | | | | . |
| D5 | 0 | 0 | 0 | 0 | 0 | 0 | 0 | 0 | 0 | 0 | 0 | 0 | 0 | 0 | 0 | 0 | 0 | 0 | | | | | | | | | | . |
| D4 | 0 | 0 | 0 | 0 | 0 | 0 | 0 | 0 | 0 | 0 | 0 | 0 | 0 | 0 | 0 | 0 | 0 | 0 | | | | | | | | | | . |
| D3 | 0 | 0 | 0 | 0 | 0 | 0 | 0 | 0 | 0 | 0 | 0 | 0 | 0 | 0 | 0 | 0 | 0 | 0 | | | | | | | | | | . |
| D2 | 0 | 0 | 0 | 0 | 0 | 0 | 0 | 0 | 0 | 0 | 0 | 0 | 0 | 0 | 0 | 0 | 0 | 0 | | | | | | | | | | . |
| D1 | 0 | 0 | 0 | 0 | 0 | 0 | 0 | 0 | 0 | 0 | 0 | 0 | 0 | 0 | 0 | 0 | 0 | 0 | | | | | | | | | | . |
| D0 | - | - | - | - | - | - | - | - | - | - | - | - | - | - | - | - | - | - | | | | | | | | | | . |
| | A0 | A1 | A2 | A3 | A4 | A5 | A6 | A7 | MATCH | B0 | B1 | B2 | B3 | B4 | B5 | B6 | B7 | TEMP | MATCH | B0 | B1 | B2 | B3 | B4 | B5 | B6 | B7 | TEMP |

```
   LABEL    ** FNC **PIN ---------- PIN** FNC **      LABEL
A7          ** I   **  1-|         |-20 ** +5V **VCC
A6          ** I   **  2-|         |-19 ** O   **MATCH
A5          ** I   **  3-|         |-18 ** I   **B0
A4          ** I   **  4-|    8    |-17 ** I   **B1
A3          ** I   **  5-|    2    |-16 ** I   **B2
A2          ** I   **  6-|    S    |-15 ** I   **B3
A1          ** I   **  7-|    1    |-14 ** I   **B4
A0          ** I   **  8-|    5    |-13 ** I   **B5
TEMP        ** O   **  9-|    3    |-12 ** I   **B6
GND         ** 0V  ** 10-|         |-11 ** I   **B7
                          ----------
```

```
@DEVICE TYPE
82S153
@DRAWING
multi-bus 2 interface
@REVISION
1
@DATE
10-08-85
@SYMBOL
U55
@COMPANY
mcair
@NAME
kevin brady
@DESCRIPTION
this pla compares the BAD address lines from the bus with
a value held in latches and issues an active high MATCH
signal upon an exact match
@COMMON PRODUCT TERM
@I/O DIRECTION
@OUTPUT POLARITY
@LOGIC EQUATION
TEMP   =   (A0 * /B0 + /A0 * B0) +
           (A1 * /B1 + /A1 * B1) +
           (A2 * /B2 + /A2 * B2) +
           (A3 * /B3 + /A3 * B3) +
           (A4 * /B4 + /A4 * B4) +
           (A5 * /B5 + /A5 * B5) +
           (A6 * /B6 + /A6 * B6) +
           (A7 * /B7 + /A7 * B7);

MATCH = /TEMP;
```

```
82S153                                          !      POLARITY       !
                                                 _____________________
 T !                                            !H:H:H:H:H:H:H:H:H:H!
 E !-----------------------------------------------------------------
 R !        I        !        B(i)        !        B(o)         !
 M !-----------------------------------------------------------------
___!7 6 5 4 3 2 1 0!9 8 7 6 5 4 3 2 1 0!9 8 7 6 5 4 3 2 1 0!
  0!H - - -,- - - -!- L,- - - -,- - - -!. A,A A A A,A A A A!
  1!L - - -,- - - -!- H,- - - -,- - - -!. A,A A A A,A A A A!
  2!- H - -,- - - -!- -,L - - -,- - - -!. A,A A A A,A A A A!
  3!- L - -,- - - -!- -,H - - -,- - - -!. A,A A A A,A A A A!
  4!- - H -,- - - -!- -,- L - -,- - - -!. A,A A A A,A A A A!
  5!- - L -,- - - -!- -,- H - -,- - - -!. A,A A A A,A A A A!
  6!- - - H,- - - -!- -,- - L -,- - - -!. A,A A A A,A A A A!
  7!- - - L,- - - -!- -,- - H -,- - - -!. A,A A A A,A A A A!
  8!- - - -,H - - -!- -,- - - L,- - - -!. A,A A A A,A A A A!
  9!- - - -,L - - -!- -,- - - H,- - - -!. A,A A A A,A A A A!
 10!- - - -,- H - -!- -,- - - -,L - - -!. A,A A A A,A A A A!
 11!- - - -,- L - -!- -,- - - -,H - - -!. A,A A A A,A A A A!
 12!- - - -,- - H -!- -,- - - -,- L - -!. A,A A A A,A A A A!
 13!- - - -,- - L -!- -,- - - -,- H - -!. A,A A A A,A A A A!
 14!- - - -,- - - H!- -,- - - -,- - L -!. A,A A A A,A A A A!
 15!- - - -,- - - L!- -,- - - -,- - H -!. A,A A A A,A A A A!
 16!- - - -,- - - -!- -,- - - -,- - - L!A A,A A A A,A A A .!
 17!0 0 0 0,0 0 0 0!0 0,0 0 0 0,0 0 0 0!A A,A A A A,A A A A!
 18!0 0 0 0,0 0 0 0!0 0,0 0 0 0,0 0 0 0!A A,A A A A,A A A A!
 19!0 0 0 0,0 0 0 0!0 0,0 0 0 0,0 0 0 0!A A,A A A A,A A A A!
 20!0 0 0 0,0 0 0 0!0 0,0 0 0 0,0 0 0 0!A A,A A A A,A A A A!
 21!0 0 0 0,0 0 0 0!0 0,0 0 0 0,0 0 0 0!A A,A A A A,A A A A!
 22!0 0 0 0,0 0 0 0!0 0,0 0 0 0,0 0 0 0!A A,A A A A,A A A A!
 23!0 0 0 0,0 0 0 0!0 0,0 0 0 0,0 0 0 0!A A,A A A A,A A A A!
 24!0 0 0 0,0 0 0 0!0 0,0 0 0 0,0 0 0 0!A A,A A A A,A A A A!
 25!0 0 0 0,0 0 0 0!0 0,0 0 0 0,0 0 0 0!A A,A A A A,A A A A!
 26!0 0 0 0,0 0 0 0!0 0,0 0 0 0,0 0 0 0!A A,A A A A,A A A A!
 27!0 0 0 0,0 0 0 0!0 0,0 0 0 0,0 0 0 0!A A,A A A A,A A A A!
 28!0 0 0 0,0 0 0 0!0 0,0 0 0 0,0 0 0 0!A A,A A A A,A A A A!
 29!0 0 0 0,0 0 0 0!0 0,0 0 0 0,0 0 0 0!A A,A A A A,A A A A!
 30!0 0 0 0,0 0 0 0!0 0,0 0 0 0,0 0 0 0!A A,A A A A,A A A A!
 31!0 0 0 0,0 0 0 0!0 0,0 0 0 0,0 0 0 0!A A,A A A A,A A A A!
 D9!- - - -,- - - -!- -,- - - -,- - - -!                   .
 D8!0 0 0 0,0 0 0 0!0 0,0 0 0 0,0 0 0 0!                   .
 D7!0 0 0 0,0 0 0 0!0 0,0 0 0 0,0 0 0 0!                   .
 D6!0 0 0 0,0 0 0 0!0 0,0 0 0 0,0 0 0 0!                   .
 D5!0 0 0 0,0 0 0 0!0 0,0 0 0 0,0 0 0 0!                   .
 D4!0 0 0 0,0 0 0 0!0 0,0 0 0 0,0 0 0 0!                   .
 D3!0 0 0 0,0 0 0 0!0 0,0 0 0 0,0 0 0 0!                   .
 D2!0 0 0 0,0 0 0 0!0 0,0 0 0 0,0 0 0 0!                   .
 D1!0 0 0 0,0 0 0 0!0 0,0 0 0 0,0 0 0 0!                   .
 D0!- - - -,- - - -!- -,- - - -,- - - -!                   .

    A A A A A A A A M B B B B B B B B T M B B B B B B B B T
    0 1 2 3 4 5 6 7 A 0 1 2 3 4 5 6 7 E A 0 1 2 3 4 5 6 7 E
                    T                 M T                 M
                    C                 P C                 P
                    H                   H
```

```
#################### P I N   L I S T ####################

   LABEL      ** FNC **PIN --------- PIN** FNC **     LABEL
CNTCLK        ** CK  **   1-|         |-20 ** +5V **VCC
CNT_IN        ** I   **   2-|         |-19 ** B   **LAD8
BSC0          ** I   **   3-|         |-18 ** B   **LAD9
N/C           ** I   **   4-|    8    |-17 ** B   **LAD10
N/C           ** I   **   5-|    2    |-16 ** B   **LAD11
CNT_FULL      ** O   **   6-|    S    |-15 ** B   **LAD12
N/C           ** /B  **   7-|    1    |-14 ** B   **LAD13
N/C           ** /B  **   8-|    5    |-13 ** B   **LAD14
N/C           ** /B  **   9-|    9    |-12 ** B   **LAD15
GND           ** 0V  **  10-|         |-11 ** /OE **/AEN0
                            ---------
@DEVICE TYPE
82S159
@DRAWING
MULTI-BUS II INTERFACE
@REVISION
1
@DATE
10-08-85
@SYMBOL
J46
@COMPANY
MCAIR (DEPT. 314)
@NAME
KEVIN P. BRADY
@DESCRIPTION
THIS PLA IS THE LATCH/COUNTER FOR THE SYSTEM
ADDRESS LINES. ON BSC0 LOW, THE ADDRESS IS LATCHED IN
FROM THE BUS. ON SUBSEQUENT TRANSACTIONS, THIS PLA
FORMS PART OF A 16 BIT COUNTER. IT HAS A CASCADE IN
(CNT_IN) AND AN OUTPUT SIGNAL (CNT_FULL) TO TELL
THE LOW_ADD_CNT AN FFH HAS BEEN REACHED.
@COMMON PRODUCT TERM
ENABLE = CNT_IN * BSC0
;
@COMPLEMENT ARRAY
@I/O DIRECTION
@OUTPUT POLARITY
@FLIP FLOP CONTROL
@OUTPUT ENABLE
EA = /AEN0;
EB = /AEN0;
@REGISTER LOAD
LA = /BSC0;
LB = /BSC0;  "LOAD ON REQUEST PHASE"
@ASYNCHRONOUS PRESET/RESET
RA = 0;        "IDLE"
PA = 0;
RB = 0;
PB = 0;
@FLIP FLOP MODE
M0,M1,M2,M3,M4,M5,M6,M7 = 1;  "J-K TYPE"
@LOGIC EQUATION
/LAD8: T = ENABLE
;
/LAD9: T = ENABLE * /LAD8
;
/LAD10: T = ENABLE * /LAD8 * /LAD9
;
/LAD11: T = ENABLE * /LAD8 * /LAD9 * /LAD10
;
```

```
/LAD12: T = ENABLE * /LAD8 * /LAD9 * /LAD10 *
            /LAD11
;
/LAD13: T = ENABLE * /LAD8 * /LAD9 * /LAD10 *
            /LAD11 * /LAD12
;
/LAD14: T = ENABLE * /LAD8 * /LAD9 * /LAD10 *
            /LAD11 * /LAD12 * /LAD13
;
/LAD15: T = ENABLE * /LAD8 * /LAD9 * /LAD10 *
            /LAD11 * /LAD12 * /LAD13 * /LAD14
;
CNT_FULL = /LAD15 * /LAD14 * /LAD13 * /LAD12 *
           /LAD11 * /LAD10 * /LAD9 * /LAD8
;
```

```
82S159                      ! F/F TYPE        ! E(b)= !E(a) = !POLARTY!
                            !                 !       !       !       !
T  !                        !.:.:.:.:.:.:.:.:.!  A    !  A    !L:L:L:H!
E  !------------------------------------------------------------------
R  ! !   I    ! B(i)  !     Q(p)         !        Q(n)      ! B(o)  !
M  !C!----------------------------------------------------------------
___!_!3_2_1_0!3_2_1_0!7_6_5_4_3_2_1_0!7_6_5_4_3_2_1_0!3_2_1_0!
  0!A!- - H H!- - - -!- - - -,- - - -!0 - - -,- - - -!A A A .!
  1!A!- - H H!- - - -!H - - -,- - - -!- 0 - -,- - - -!A A A .!
  2!A!- - H H!- - - -!H H - -,- - - -!- - 0 -,- - - -!A A A .!
  3!A!- - H H!- - - -!H H H -,- - - -!- - - 0,- - - -!A A A .!
  4!A!- - H H!- - - -!H H H H,- - - -!- - - -,0 - - -!A A A .!
  5!A!- - H H!- - - -!H H H H,H - - -!- - - -,- 0 - -!A A A .!
  6!A!- - H H!- - - -!H H H H,H H - -!- - - -,- - 0 -!A A A .!
  7!A!- - H H!- - - -!H H H H,H H H -!- - - -,- - - 0!A A A .!
  8!A!- - - -!- - - -!H H H H,H H H H!- - - -,- - - -!A A A A!
  9!0!0 0 0 0!0 0 0 0!0 0 0 0,0 0 0 0!0 0 0 0,0 0 0 0!A A A A!
 10!0!0 0 0 0!0 0 0 0!0 0 0 0,0 0 0 0!0 0 0 0,0 0 0 0!A A A A!
 11!0!0 0 0 0!0 0 0 0!0 0 0 0,0 0 0 0!0 0 0 0,0 0 0 0!A A A A!
 12!0!0 0 0 0!0 0 0 0!0 0 0 0,0 0 0 0!0 0 0 0,0 0 0 0!A A A A!
 13!0!0 0 0 0!0 0 0 0!0 0 0 0,0 0 0 0!0 0 0 0,0 0 0 0!A A A A!
 14!0!0 0 0 0!0 0 0 0!0 0 0 0,0 0 0 0!0 0 0 0,0 0 0 0!A A A A!
 15!0!0 0 0 0!0 0 0 0!0 0 0 0,0 0 0 0!0 0 0 0,0 0 0 0!A A A A!
 16!0!0 0 0 0!0 0 0 0!0 0 0 0,0 0 0 0!0 0 0 0,0 0 0 0!A A A A!
 17!0!0 0 0 0!0 0 0 0!0 0 0 0,0 0 0 0!0 0 0 0,0 0 0 0!A A A A!
 18!0!0 0 0 0!0 0 0 0!0 0 0 0,0 0 0 0!0 0 0 0,0 0 0 0!A A A A!
 19!0!0 0 0 0!0 0 0 0!0 0 0 0,0 0 0 0!0 0 0 0,0 0 0 0!A A A A!
 20!0!0 0 0 0!0 0 0 0!0 0 0 0,0 0 0 0!0 0 0 0,0 0 0 0!A A A A!
 21!0!0 0 0 0!0 0 0 0!0 0 0 0,0 0 0 0!0 0 0 0,0 0 0 0!A A A A!
 22!0!0 0 0 0!0 0 0 0!0 0 0 0,0 0 0 0!0 0 0 0,0 0 0 0!A A A A!
 23!0!0 0 0 0!0 0 0 0!0 0 0 0,0 0 0 0!0 0 0 0,0 0 0 0!A A A A!
 24!0!0 0 0 0!0 0 0 0!0 0 0 0,0 0 0 0!0 0 0 0,0 0 0 0!A A A A!
 25!0!0 0 0 0!0 0 0 0!0 0 0 0,0 0 0 0!0 0 0 0,0 0 0 0!A A A A!
 26!0!0 0 0 0!0 0 0 0!0 0 0 0,0 0 0 0!0 0 0 0,0 0 0 0!A A A A!
 27!0!0 0 0 0!0 0 0 0!0 0 0 0,0 0 0 0!0 0 0 0,0 0 0 0!A A A A!
 28!0!0 0 0 0!0 0 0 0!0 0 0 0,0 0 0 0!0 0 0 0,0 0 0 0!A A A A!
 29!0!0 0 0 0!0 0 0 0!0 0 0 0,0 0 0 0!0 0 0 0,0 0 0 0!A A A A!
 30!0!0 0 0 0!0 0 0 0!0 0 0 0,0 0 0 0!0 0 0 0,0 0 0 0!A A A A!
 31!0!0 0 0 0!0 0 0 0!0 0 0 0,0 0 0 0!0 0 0 0,0 0 0 0!A A A A!
 Fc!0!0 0 0 0!0 0 0 0!0 0 0 0,0 0 0 0!                       .
 Pb!.!0 0 0 0!0 0 0 0!0 0 0 0,0 0 0 0!                       .
 Rb!.!0 0 0 0!0 0 0 0!0 0 0 0,0 0 0 0!                       .
 Lb!-!- - L -!- - - -!- - - -,- - - -!                       .
 Pa!.!0 0 0 0!0 0 0 0!0 0 0 0,0 0 0 0!                       .
 Ra!.!0 0 0 0!0 0 0 0!0 0 0 0,0 0 0 0!                       .
 La!-!- - L -!- - - -!- - - -,- - - -!                       .
 D3!.!0 0 0 0!0 0 0 0!0 0 0 0,0 0 0 0!                       .
 D2!.!0 0 0 0!0 0 0 0!0 0 0 0,0 0 0 0!                       .
 D1!.!0 0 0 0!0 0 0 0!0 0 0 0,0 0 0 0!                       .
 D0!-!- - - -!- - - -!- - - -,- - - -!                       .

     N N B C N N N C L L L L L L L L L L L L L L L L N N N C
     / / S N / / / N A A A A A A A A A A A A A A A A / / / N
     C C C T C C C T D D D D D D D D D D D D D D D D C C C T
         0 _       _ 8 9 1 1 1 1 1 1 8 9 1 1 1 1 1 1       _
```

```
   LABEL     ** FNC **PIN --------- PIN** FNC **     LABEL
:NTCLK       ** CK  **   1-|         |-20 ** +5V **VCC
/IDTH        ** I   **   2-|         |-19 ** B   **LAD0
:NT_FULL     ** I   **   3-|         |-18 ** B   **LAD1
3SCO         ** I   **   4-|    8    |-17 ** B   **LAD2
:EQ          ** I   **   5-|    2    |-16 ** B   **LAD3
:NT_OUT      ** O   **   6-|    S    |-15 ** B   **LAD4
:NDMEM       ** O   **   7-|    1    |-14 ** B   **LAD5
3HEN         ** /O  **   8-|    5    |-13 ** B   **LAD6
[/C          ** /B  **   9-|    9    |-12 ** B   **LAD7
:ND          ** OV  **  10-|         |-11 ** /OE **/AEN0
                            ---------
@DEVICE TYPE
32S159
@DRAWING
MULTI-BUS II INTERFACE
@REVISION
1
@DATE
10-08-85
@SYMBOL
J45
@COMPANY
[illegible] ([illegible]. 31[illegible])
@NAME
KEVIN P. BRADY
@DESCRIPTION
THIS PLA LATCHES IN THE ADDRESS FROM THE BUS WHEN
SCO IS LOW. WHEN SCO IS HIGH THE ADDRESS IS
INCREMENTED. IF WIDTH IS 0 THEN IT IS AN 8 BIT XFER
AND THE ADDRESS IS INCREMENTED BY 1. IF WIDTH IS ONE
THEN IT IS INCREMENTED BY TWO. THIS PLA ALSO ISSUES AN
LAENDMEM SIGNAL WHEN THE END OF MEMORY HAS BEEN REACHED .
IF WIDTH = 0 THEN END OF MEMEORY IS DEFINED AS FFFFH,
ELSE IT IS FFFEH. THIS IS USED BY OTHER PLAS TO
DETERMINE A CONTINUATION ERROR.

PINS:
ENDMEM       - OUTPUT - SIGNALS END OF 64K BLOCK
WIDTH        - INPUT  - 0 = 8BITS, 1 = 16 BITS
BSCO         - INPUT  - 0 = REQUEST PHASE
BHEN         - OUT    - USED BY HOST FOR DECODING
@COMMON PRODUCT TERM
@COMPLEMENT ARRAY
@I/O DIRECTION
@OUTPUT POLARITY
@FLIP FLOP CONTROL
@OUTPUT ENABLE
EA = /AEN0;
EB = /AEN0;
@REGISTER LOAD
LA = SEQ;
LB = SEQ;        "LOAD DURING REQUEST PHASE"
@ASYNCHRONOUS PRESET/RESET
RA = 0;      "IDLE"
PA = 0;
RB = 0;
PB = 0;
@FLIP FLOP MODE
M0,M1,M2,M3,M4,M5,M6,M7 = 1;    "J-K MODE"
@LOGIC EQUATION
/LAD0: T = /WIDTH * /SEQ
;
```

```
/LAD1: T = /WIDTH * /SEQ * /LAD0 +
            WIDTH * /SEQ
;
/LAD2: T = /WIDTH * /SEQ * /LAD0 * /LAD1 +
            WIDTH * /SEQ * /LAD1
;
/LAD3: T = /WIDTH * /SEQ * /LAD0 * /LAD1 *
           /LAD2 +
            WIDTH * /SEQ * /LAD1 * /LAD2
;
/LAD4: T = /WIDTH * /SEQ * /LAD0 * /LAD1 *
           /LAD2 * /LAD3 +
           WIDTH * /SEQ * /LAD1 * /LAD2 *
           /LAD3

/LAD5: T = /WIDTH * /SEQ * /LAD0 * /LAD1 *
           /LAD2 * /LAD3 * /LAD4 +
           WIDTH * /SEQ * /LAD1 * /LAD2 *
           /LAD3 * /LAD4

/LAD6: T = /WIDTH * /SEQ * /LAD0 * /LAD1 *
           /LAD2 * /LAD3 * /LAD4 * /LAD5 +
           WIDTH * /SEQ * /LAD1 * /LAD2 *
           /LAD3 * /LAD4 * /LAD5

/LAD7: T = /WIDTH * /SEQ * /LAD0 * /LAD1 *
           /LAD2 * /LAD3 * /LAD4 * /LAD5 * /LAD6 +
           WIDTH * /SEQ * /LAD1 * /LAD2 *
           /LAD3 * /LAD4 * /LAD5 * /LAD6

CNT_OUT = /LAD0 * /LAD1 * /LAD2 * /LAD3 * /LAD4 *
          /LAD5 * /LAD6 * /LAD7

HEN = /(WIDTH)

ENDMEM = /WIDTH * CNT_FULL * CNT_OUT +
          WIDTH * CNT_FULL * /LAD7 * /LAD6 * /LAD5 *
          /LAD4 * /LAD3 * /LAD2 * /LAD1 * LAD0
```

```
82S159                   ! F/F TYPE         ! E(b)= !E(a) = !POLARTY!
                         !__________________!_______!_______!_______!
 T !                     !.:.:.:.:.:.:.:.!    A    !   A    !L:L:H:H!
 E !------------------------------------------------------------------
 R ! !    I    ! B(i)   !       Q(p)        !       Q(n)       ! B(o)  !
 M !C!------------------------------------------------------------------
___!_!3_2_1_0!3_2_1_0!7_6_5_4_3_2_1_0!7_6_5_4_3_2_1_0!3_2_1_0!
  0!A!L - - L!- - - -!- - - -,- - - -!0 - - -,- - - -!A . . .
  1!A!L - - L!- - - -!H - - -,- - - -!- 0 - -,- - - -!A .
  2!A!L - - H!- - - -!- - - -,- - - -!- 0 - -,- - - -!A . . .!
  3!A!L - - L!- - - -!H H - -,- - - -!- - 0 -,- - - -!A . . .!
  4!A!L - - H!- - - -!- H - -,- - - -!- - 0 -,- - - -!A . . .!
  5!A!L - - L!- - - -!H H H -,- - - -!- - - 0,- - - -!A . . .!
  6!A!L - - H!- - - -!- H H -,- - - -!- - - 0,- - - -!A . . .!
  7!A!L - - L!- - - -!H H H H,- - - -!- - - -,0 - - -!A . . .!
  8!A!L - - H!- - - -!- H H H,- - - -!- - - -,0 - - -!A . . .!
  9!A!L - - L!- - - -!H H H H,H - - -!- - - -,- 0 - -!A . . .!
 10!A!L - - H!- - - -!- H H H,H - - -!- - - -,- 0 - -!A . . .!
 11!A!L - - L!- - - -!H H H H,H H - -!- - - -,- - 0 -!A . . .!
 12!A!L - - H!- - - -!- H H H,H H - -!- - - -,- - 0 -!A . . .!
 13!A!L - - L!- - - -!H H H H,H H H -!- - - -,- - - 0!A . . .!
 14!A!L - - H!- - - -!- H H H,H H H -!- - - -,- - - 0!A . . .!
 15!A!- - - -!- - - -!H H H H,H H H H!- - - -,- - - -!A . . A!
 16!A!- - - H!- - - -!- - - -,- - - -!- - - -,- - - -!A A . .!
 17!A!- - H L!- - - H!- - - -,- - - -!- - - -,- - - -!A . A .!
 18!A!- - H H!- - - -!L H H H,H H H H!- - - -,- - - -!A . A .!
 19!0!0 0 0 0!0 0 0 0!0 0 0 0,0 0 0 0!0 0 0 0,0 0 0 0!A A A A!
 20!0!0 0 0 0!0 0 0 0!0 0 0 0,0 0 0 0!0 0 0 0,0 0 0 0!A A A A!
 21!0!0 0 0 0!0 0 0 0!0 0 0 0,0 0 0 0!0 0 0 0,0 0 0 0!A A A A!
 22!0!0 0 0 0!0 0 0 0!0 0 0 0,0 0 0 0!0 0 0 0,0 0 0 0!A A A A!
 23!0!0 0 0 0!0 0 0 0!0 0 0 0,0 0 0 0!0 0 0 0,0 0 0 0!A A A A!
 24!0!0 0 0 0!0 0 0 0!0 0 0 0,0 0 0 0!0 0 0 0,0 0 0 0!A A A A!
 25!0!0 0 0 0!0 0 0 0!0 0 0 0,0 0 0 0!0 0 0 0,0 0 0 0!A A A A!
 26!0!0 0 0 0!0 0 0 0!0 0 0 0,0 0 0 0!0 0 0 0,0 0 0 0!A A A A!
 27!0!0 0 0 0!0 0 0 0!0 0 0 0,0 0 0 0!0 0 0 0,0 0 0 0!A A A A!
 28!0!0 0 0 0!0 0 0 0!0 0 0 0,0 0 0 0!0 0 0 0,0 0 0 0!A A A A!
 29!0!0 0 0 0!0 0 0 0!0 0 0 0,0 0 0 0!0 0 0 0,0 0 0 0!A A A A!
 30!0!0 0 0 0!0 0 0 0!0 0 0 0,0 0 0 0!0 0 0 0,0 0 0 0!A A A A!
 31!0!0 0 0 0!0 0 0 0!0 0 0 0,0 0 0 0!0 0 0 0,0 0 0 0!A A A A!
 Fc!0!0 0 0 0!0 0 0 0!0 0 0 0,0 0 0 0!                                .
 Pb!.!0 0 0 0!0 0 0 0!0 0 0 0,0 0 0 0!                                .
 Rb!.!0 0 0 0!0 0 0 0!0 0 0 0,0 0 0 0!                                .
 Lb!-!H - - -!- - - -!- - - -,- - - -!                                .
 Pa!.!0 0 0 0!0 0 0 0!0 0 0 0,0 0 0 0!                                .
 Ra!.!0 0 0 0!0 0 0 0!0 0 0 0,0 0 0 0!                                .
 La!-!H - - -!- - - -!- - - -,- - - -!                                .
 D3!.!0 0 0 0!0 0 0 0!0 0 0 0,0 0 0 0!                                .
 D2!-!- - - -!- - - -!- - - -,- - - -!                                .
 D1!-!- - - -!- - - -!- - - -,- - - -!                                .
 D0!-!- - - -!- - - -!- - - -,- - - -!                                .

     S B C W N B E C L L L L L L L L L L L L L L L L N B E C
     E S N I / H N N A A A A A A A A A A A A A A A A / H N N
     Q C T D C E D T D D D D D D D D D D D D D D D D C E D T
       0 _ T   N M _ 0 1 2 3 4 5 6 7 0 1 2 3 4 5 6 7   N M _
```

```
#################### P I N   L I S T ####################

  LABEL      ** FNC **PIN --------- PIN** FNC **     LABEL
 .CLK        ** CK  **   1-|        |-20 ** +5V **VCC
 .SC0        ** I   **   2-|        |-19 ** B   **AGERR1
 3SC2        ** I   **   3-|        |-18 ** B   **AGERR0
 3SC3        ** I   **   4-|   8    |-17 ** B   **N/C
 3SC4        ** I   **   5-|   2    |-16 ** O   **XNU
 3SC5        ** I   **   6-|   S    |-15 ** O   **CONERR
 SYSADD0     ** I   **   7-|   1    |-14 ** O   **WERR
 DBERR       ** I   **   8-|   5    |-13 ** B   **AGERR2
 .BCS        ** I   **   9-|   5    |-12 [illegible]
 GND         ** 0V  **  10-|        |-11 ** /OE **/OE
                            ---------
@DEVICE TYPE
32S155
@DRAWING
MULTI BUS II INTERFACE
@REVISION
1
@DATE
10-08-85
@SYMBOL
J44
@COMPANY
MCAIR
@NAME
KEVIN BRADY
@DESCRIPTION
THIS PLA GENERATES ERROR CODES TO THE MULTMODULE
ERRORS DETECTED ARE
TRANSFER-NOT-UNDERSTOOD (XNU)
   16 BIT XFR WITH ODD ADDRESS

WIDTH ERROR (WERR)
   24 OR 32 BIT XFR

CONTINUATION ERROR (CONERR)
  SEQUENTIAL XFR PASSED 64k BLOCK

@COMMON PRODUCT TERM
@COMPLEMENT ARRAY
@I/O DIRECTION
D5 = /MBCS;   "OUTPUT ERRORS WHEN WE ARE SELECTED"
D6 = /MBCS;
D7 = /MBCS;
@OUTPUT POLARITY
@FLIP FLOP CONTROL
FC = 0;   "D TYPE"
@OUTPUT ENABLE
EA = /OE;
EB = /OE;
@REGISTER LOAD
@ASYNCHRONOUS PRESET/RESET
RA = /DBERR;
PA = 0;
RB = /DBERR;
PB = 0;
@FLIP FLOP MODE
M0,M1,M2 = FC;
@LOGIC EQUATION
/WERR: D = /BSC0 * BSC2 * /BSC3 * BSC4 * BSC5 +   "24 BITS"
           /BSC0 * /BSC2 * /BSC3 * BSC4 * BSC5 +  "32 BITS"
            BSC0 * /WERR            "HOLD"
```

```
;
/XNU: D = /BSC0 * /BSC2 * BSC3 * BSC4 * BSC5 +      "16 BITS"
          BSC0 * /XNU
;
/CONERR: D =  ENDMEM * (BSC2 * /BSC3 * /BSC4 * BSC0) +
             /ENDMEM * /CONERR
;
AGERR0 = (/XNU * SYSADD0) + /WERR
;
AGERR1 = (/XNU * SYSADD0) + /CONERR

AGERR2 = 0;      "NO ERRORS REPORTED HERE"

82S155                                  !FF TYPE!EB   EA !        !    POLARITY    !
                                        !_______!_________!        !________________!
 T !                                    !A:A:A:A!A    !A   !        !H:H:H:L:L:L:L:L!
 E !--------------------------------------------------!--------!-----------------
 R ! !    I    !       B(i)            ! Q(p)   ! Q(n)   ! P ! R !      B(o)      !
 M !C!--------------------------------------------------!B!A!B!A!-----------------
   ! !3_2_1_0!7_6_5_4_3_2_1_0!3_2_1_0!3_2_1_0!_!_!_!_!7_6_5_4_3_2_1_0!
  0!A!H L H L!- - - -,- - - - H!- - - -!0 . . .!. . . .!. . . .,. . . .!
  1!A!H L L L!- - - -,- - - - H!- - - -!0 . . A!. . . .!. . . .,. . . .!
  2!A!- - - H!- - - -,- - - - -!- - - H!0 . . A!. . . .!. . . A,A A A A!
  3!A!H H L L!- - - -,- - - - H!- - - -!0 A . .!. . . .!. . . A,A A A A!
  4!A!- - - H!- - - -,- - - - -!- H - -!0 A . .!. . . .!. . . A,A A A A!
  5!A!L L H H!- - - H,- - - - -!- - - -!0 . A .!. . . .!. . . A,A A A A!
  6!A!- - - -!- - - L,- - - - -!- - H -!0 . A .!. . . .!. . . A,A A A A!
  7!A!- - - -!- - - -,- - H -!- H - -!0 . . .!. . . .!A A . A,A A A A!
  8!A!- - - -!- - - -,- - - - -!- - - H!0 . . .!. . . .!. A . A,A A A A!
  9!A!- - - -!- - - -,- - - - -!- - H -!0 . . .!. . . .!A . . A,A A A A!
 10!A!- - - -!- - - -,- L - -!- - - -!0 . . .!. . A A!. . . A,A A A A!
 11!0!0 0 0 0!0 0 0 0,0 0 0 0!0 0 0 0!0 0 0 0!A A A A!A A A A,A A A A!
 12!0!0 0 0 0!0 0 0 0,0 0 0 0!0 0 0 0!0 0 0 0!A A A A!A A A A,A A A A!
 13!0!0 0 0 0!0 0 0 0,0 0 0 0!0 0 0 0!0 0 0 0!A A A A!A A A A,A A A A!
 14!0!0 0 0 0!0 0 0 0,0 0 0 0!0 0 0 0!0 0 0 0!A A A A!A A A A,A A A A!
 15!0!0 0 0 0!0 0 0 0,0 0 0 0!0 0 0 0!0 0 0 0!A A A A!A A A A,A A A A!
 16!0!0 0 0 0!0 0 0 0,0 0 0 0!0 0 0 0!0 0 0 0!A A A A!A A A A,A A A A!
 17!0!0 0 0 0!0 0 0 0,0 0 0 0!0 0 0 0!0 0 0 0!A A A A!A A A A,A A A A!
 18!0!0 0 0 0!0 0 0 0,0 0 0 0!0 0 0 0!0 0 0 0!A A A A!A A A A,A A A A!
 19!0!0 0 0 0!0 0 0 0,0 0 0 0!0 0 0 0!0 0 0 0!A A A A!A A A A,A A A A!
 20!0!0 0 0 0!0 0 0 0,0 0 0 0!0 0 0 0!0 0 0 0!A A A A!A A A A,A A A A!
 21!0!0 0 0 0!0 0 0 0,0 0 0 0!0 0 0 0!0 0 0 0!A A A A!A A A A,A A A A!
 22!0!0 0 0 0!0 0 0 0,0 0 0 0!0 0 0 0!0 0 0 0!A A A A!A A A A,A A A A!
 23!0!0 0 0 0!0 0 0 0,0 0 0 0!0 0 0 0!0 0 0 0!A A A A!A A A A,A A A A!
 24!0!0 0 0 0!0 0 0 0,0 0 0 0!0 0 0 0!0 0 0 0!A A A A!A A A A,A A A A!
 25!0!0 0 0 0!0 0 0 0,0 0 0 0!0 0 0 0!0 0 0 0!A A A A!A A A A,A A A A!
 26!0!0 0 0 0!0 0 0 0,0 0 0 0!0 0 0 0!0 0 0 0!A A A A!A A A A,A A A A!
 27!0!0 0 0 0!0 0 0 0,0 0 0 0!0 0 0 0!0 0 0 0!A A A A!A A A A,A A A A!
 28!0!0 0 0 0!0 0 0 0,0 0 0 0!0 0 0 0!0 0 0 0!A A A A!A A A A,A A A A!
 29!0!0 0 0 0!0 0 0 0,0 0 0 0!0 0 0 0!0 0 0 0!A A A A!A A A A,A A A A!
 30!0!0 0 0 0!0 0 0 0,0 0 0 0!0 0 0 0!0 0 0 0!A A A A!A A A A,A A A A!
 31!0!0 0 0 0!0 0 0 0,0 0 0 0!0 0 0 0!0 0 0 0!A A A A!A A A A,A A A A!
 Fc!0!0 0 0 0!0 0 0 0,0 0 0 0!0 0 0 0!                                  .
 Lb!.!0 0 0 0!0 0 0 0,0 0 0 0!0 0 0 0!                                  .
 La!.!0 0 0 0!0 0 0 0,0 0 0 0!0 0 0 0!                                  .
 D7!-!- - - -!- - - -,L - - -!- - - -!                                  .
 D6!-!- - - -!- - - -,L - - -!- - - -!                                  .
 D5!-!- - - -!- - - -,L - - -!- - - -!                                  .
 D4!.!0 0 0 0!0 0 0 0,0 0 0 0!0 0 0 0!                                  .
 D3!.!0 0 0 0!0 0 0 0,0 0 0 0!0 0 0 0!                                  .
 D2!.!0 0 0 0!0 0 0 0,0 0 0 0!0 0 0 0!                                  .
 D1!.!0 0 0 0!0 0 0 0,0 0 0 0!0 0 0 0!                                  .
 D0!.!0 0 0 0!0 0 0 0,0 0 0 0!0 0 0 0!                                  .
```

```
B B B B A A A E M D S B N X C W N X C W        A A A E M D S B
S S S S G G G N B B Y S / N O E / N O E        G G G N B B Y S
C C C C E E E D C E S C C U N R C U N R        E E E D C E S C
4 3 2 0 R R R M S R A 5     E R     E R        R R R M S R A 5

  LABEL      ** FNC **PIN --------- PIN** FNC **     LABEL
AEN0         ** I   **  1-|       |-20 ** +5V **VCC
A2           ** I   **  2-|       |-19 ** /O  **WR
DS           ** I   **  3-|       |-18 ** /O  **RD
SEL0         ** I   **  4-|   8   |-17 ** O   **SEL_L
SEL1         ** I   **  5-|   2   |-16 ** O   **SEL_H
WAIT         ** I   **  6-|   S   |-15 ** O   **IAEN0
MINT         ** I   **  7-|   1   |-14 ** O   **B1AEN0
A5           ** I   **  8-|   5   |-13 ** O   **B2AEN0
M_OR_W       ** O   **  9-|   3   |-12 ** O   **BE0
GND          ** OV  ** 10-|       |-11 ** /O  **REG
                           ---------
```

@DEVICE TYPE
82S153
@DRAWING
MULTI-BUS II INTERFACE
@REVISION
1
@DATE
10-08-85
@SYMBOL
U42
@COMPANY
MCAIR (DEPT. 314)
@NAME
KEVIN P. BRADY
@DESCRIPTION
This pla decodes signals from the 8751H and issues MM contol signals. In addition, Aen0 from the host is buffered with 2 true and 1 inverted output.

```
Pins:
A2           input   address line from 8751H
A5           input   address line from 8751H
DS          input   strobe from 8751
sel0,sel1    inputs  encoded select lines
wait         input   wait from MM
mint         input   mint from MM
WR           output  write line to MM
RD           output  read line to MM
sel_l        output to latch low add comp value
sel_h        output to latch hgh add comp value
be0          output to MM byte enable 0

Encoding Scheme:

    inputs              active   state          return

a5 ds a2 sel1 sel0
x   0  x   0    0       rd,reg,be0 = 0           wait
x   0  x   0    1       wr,reg,be0 = 0           wait
1   0  0   1    0       sel_h = 1,be0 = 0        mint
1   0  1   1    0       swl_l = 1,be0 = 0        mint
x   0  x   1    1       wr,reg = 0,be0 = 1       wait
x   1  x   x    x       be0 = 0                  mint
```

```
all outputs inactive (=1) unless specified

@COMMON PRODUCT TERM
@I/O DIRECTION
@OUTPUT POLARITY
@LOGIC EQUATION
B2Aen0 = Aen0
;
B1Aen0 = Aen0
;
IAen0 = /Aen0
;
RD = /(/DS*/SEL1*/SEL0)
;
WR = /(/DS*SEL0)
SEL_L = (/DS*/A2*A5*SEL1*/SEL0)
;
SEL_H = (/DS*A2*A5*SEL1*/SEL0)
;
REG = /(/DS*/SEL1 + /DS*SEL0)
;
BE0 = (/DS*SEL1*SEL0)
;
M_OR_W = (/DS*/SEL1 + /DS*SEL0)*WAIT + (/DS*SEL1*/SEL0 + DS)*MINT
```

```
___
 T !                                              !L:L:H:H:H:H:H:H:L:H!
 E !------------------------------------------------------------------
 R !        I        !          B(i)             !        B(o)        !
 M !------------------------------------------------------------------
___!7_6_5_4_3_2_1_0!9_8_7_6_5_4_3_2_1_0!9_8_7_6_5_4_3_2_1_0!
  0!- - - -,- - - H!- -,- - - -,- - - -!. .,. . . A,A . . .!
  1!- - - -,- - - L!- -,- - - -,- - - -!. .,. . A .,. . . .!
  2!- - - L,L L - -!- -,- - - -,- - - -!. A,. . . .,. . . .!
  3!- - - -,H L - -!- -,- - - -,- - - -!A .,. . . .,. . A .!
  4!H - - H,L L L -!- -,- - - -,- - - -!. .,A . . .,. . . .!
  5!H - - H,L L H -!- -,- - - -,- - - -!. .,. A . .,. . . .!
  6!- - - L,- L - -!- -,- - - -,- - - -!. .,. . . .,. . A .!
  7!- - - H,H L - -!- -,- - - -,- - - -!. .,. . . .,. . A .!
  8!- - H L,- L - -!- -,- - - -,- - - -!. .,. . . .,. A . .!
  9!- - H -,H L - -!- -,- - - -,- - - -!. .,. . . .,. . . A!
 10!- H - H,L L - -!- -,- - - -,- - - -!. .,. . . .,. . . A!
 11!- H - -,- H - -!- -,- - - -,- - - -!. .,. . . .,. . . A!
 12!0 0 0 0,0 0 0 0!0 0,0 0 0 0,0 0 0 0!A A,A A A A,A A A A!
 13!0 0 0 0,0 0 0 0!0 0,0 0 0 0,0 0 0 0!A A,A A A A,A A A A!
 14!0 0 0 0,0 0 0 0!0 0,0 0 0 0,0 0 0 0!A A,A A A A,A A A A!
 15!0 0 0 0,0 0 0 0!0 0,0 0 0 0,0 0 0 0!A A,A A A A,A A A A!
 16!0 0 0 0,0 0 0 0!0 0,0 0 0 0,0 0 0 0!A A,A A A A,A A A A!
 17!0 0 0 0,0 0 0 0!0 0,0 0 0 0,0 0 0 0!A A,A A A A,A A A A!
 18!0 0 0 0,0 0 0 0!0 0,0 0 0 0,0 0 0 0!A A,A A A A,A A A A!
 19!0 0 0 0,0 0 0 0!0 0,0 0 0 0,0 0 0 0!A A,A A A A,A A A A!
 20!0 0 0 0,0 0 0 0!0 0,0 0 0 0,0 0 0 0!A A,A A A A,A A A A!
 21!0 0 0 0,0 0 0 0!0 0,0 0 0 0,0 0 0 0!A A,A A A A,A A A A!
 22!0 0 0 0,0 0 0 0!0 0,0 0 0 0,0 0 0 0!A A,A A A A,A A A A!
 23!0 0 0 0,0 0 0 0!0 0,0 0 0 0,0 0 0 0!A A,A A A A,A A A A!
 24!0 0 0 0,0 0 0 0!0 0,0 0 0 0,0 0 0 0!A A,A A A A,A A A A!
 25!0 0 0 0,0 0 0 0!0 0,0 0 0 0,0 0 0 0!A A,A A A A,A A A A!
 26!0 0 0 0,0 0 0 0!0 0,0 0 0 0,0 0 0 0!A A,A A A A,A A A A!
 27!0 0 0 0,0 0 0 0!0 0,0 0 0 0,0 0 0 0!A A,A A A A,A A A A!
 28!0 0 0 0,0 0 0 0!0 0,0 0 0 0,0 0 0 0!A A,A A A A,A A A A!
 29!0 0 0 0,0 0 0 0!0 0,0 0 0 0,0 0 0 0!A A,A A A A,A A A A!
 30!0 0 0 0,0 0 0 0!0 0,0 0 0 0,0 0 0 0!A A,A A A A,A A A A!
 31!0 0 0 0,0 0 0 0!0 0,0 0 0 0,0 0 0 0!A A,A A A A,A A A A!
```

```
D9!- - - -,- - - -!- -,- - - -,- - - -!
D8!- - - -,- - - -!- -,- - - -,- - - -!
D7!- - - -,- - - -!- -,- - - -,- - - -!
D6!- - - -,- - - -!- -,- - - -,- - - -!
D5!- - - -,- - - -!- -,- - - -,- - - -!
D4!- - - -,- - - -!- -,- - - -,- - - -!
D3!- - - -,- - - -!- -,- - - -,- - - -!
D2!- - - -,- - - -!- -,- - - -,- - - -!
D1!- - - -,- - - -!- -,- - - -,- - - -!
D0!- - - -,- - - -!- -,- - - -,- - - -!

   A M W S S D A A W R S S I B B B R M W R S S I B B B R M
   5 I A E E S 2 E R D E E A 1 2 E E _ R D E E A 1 2 E E _
     N I L L     N     L L E A A 0 G O     L L E A A 0 G O
     T T 1 0     0     _ _   N E E   R     _ _   N E E   R
                       L H 0 N N     _     L H 0 N N     _

  LABEL        ** FNC **PIN --------- PIN** FNC **     LABEL
3CLK           ** CK  **  1-|       |-20 ** +5V **VCC
IATCH_H        ** I   **  2-|       |-19 **  /B **N/C
IATCH_L        ** I   **  3-|       |-18 ** O   **INIT
)BERR          ** I   **  4-|   8   |-17 ** O   **DELAY
:XFER          ** I   **  5-|   2   |-16 ** O   **MEMINIT
IEMREQ         ** I   **  6-|   S   |-15 ** B   **N/C
:EL_H          ** I   **  7-|   1   |-14 ** O   **MBCS
:ST            ** I   **  8-|   5   |-13 ** [illegible]
'/C            ** /B  **  9-|   5   |-12 ** O   **[illegible]
;ND            ** 0V  ** 10-|       |-11 ** /OE **/OE
                             ---------

@DEVICE TYPE
32S155
@DRAWING
nulti-bus II interface
@REVISION
1
@DATE
2-27-86
@SYMBOL
J41
@COMPANY
ncair
@NAME
kevin brady
@DESCRIPTION
this chip issues the mbcs to the host. when the memory
address have been latched by the 8751 (/MEMINIT) and the
addresses match, mbcs goes low. it is cleared on a
bus error, at reset and on end-of-transfer.
The bus Reset signal (RST) is buffered, with 1 true
output for the host, 1 true for the 97 that is disabled when
the signal is high to allow the 97 to force its reset from the
watchdog and one inverted for the MM and the 8751.
@COMMON PRODUCT TERM
@COMPLEMENT ARRAY
@I/O DIRECTION
D5 = /RST;    "DISABLE WHEN HIGH"
@OUTPUT POLARITY
@FLIP FLOP CONTROL
FC = 0;  "D TYPE"
@OUTPUT ENABLE
EA = /OE;
EB = /OE;
@REGISTER LOAD
```

```
@ASYNCHRONOUS PRESET/RESET
RA = EXFER + /RST + /DBERR;
PA = 0;  "IDLE"
RB = /RST;
PB = 0;
@FLIP FLOP MODE
M0 = FC;
M2 = FC;
M3 = FC;
@LOGIC EQUATION
/MBCS:  D = MATCH_L * MATCH_H * /MEMREQ *
            /MEMINIT +
            MEMREQ * /MBCS
;
/DELAY: D = SEL_H
;
/MEMINIT: D = SEL_H * /DELAY +
              /SEL_H * /MEMINIT
;
HRST = RST
;
97RST = RST           "ADDED TO COMPENSATE FOR 97 FORCING RESET"
;
INIT = /RST
;

T  !
E  !--------------------------------------------!-------!----------------
R  ! !   I    !      B(i)        ! Q(p)  ! Q(n)  ! P ! R !      B(o)      !
M  !C!-------------------------------------------!B!A!B!A!----------------
   ! !3_2_1_0!7_6_5_4_3_2_1_0!3_2_1_0!3_2_1_0!_!_!_!_!7_6_5_4_3_2_1_0!
  0!A!- - H H!- - - -,- - - L!- H - -!. . 0 A!. . . .!A . . .,A A A A!
  1!A!- - - -!- - - -,- - - H!- - - H!. . 0 A!. . . .!A . . .,A A A A!
  2!A!- - - -!- - - -,- - H -!- - - -!A . 0 .!. . . .!A . . .,A A A A!
  3!A!- - - -!- - - -,- - H -!H - - -!. A 0 .!. . . .!A . . .,A A A A!
  4!A!- - - -!- - - -,- - L -!- H - -!. A 0 .!. . . .!A . . .,A A A A!
  5!A!- - - -!- - - -,- H - -!- - - -!. . 0 .!. . . .!A . A A,A A A A!
  6!A!- - - -!- - - -,- L - -!- - - -!. . 0 .!. . A A!A A . .,A A A A!
  7!A!H - - -!- - - -,- - - -!- - - -!. . 0 .!. . . A!A . . .,A A A A!
  8!A!- L - -!- - - -,- - - -!- - - -!. . 0 .!. . . A!A . . .,A A A A!
  9!0!0 0 0 0!0 0 0 0,0 0 0 0!0 0 0 0!0 0 0 0!A A A A!A A A A,A A A A!
 10!0!0 0 0 0!0 0 0 0,0 0 0 0!0 0 0 0!0 0 0 0!A A A A!A A A A,A A A A!
 11!0!0 0 0 0!0 0 0 0,0 0 0 0!0 0 0 0!0 0 0 0!A A A A!A A A A,A A A A!
 12!0!0 0 0 0!0 0 0 0,0 0 0 0!0 0 0 0!0 0 0 0!A A A A!A A A A,A A A A!
 13!0!0 0 0 0!0 0 0 0,0 0 0 0!0 0 0 0!0 0 0 0!A A A A!A A A A,A A A A!
 14!0!0 0 0 0!0 0 0 0,0 0 0 0!0 0 0 0!0 0 0 0!A A A A!A A A A,A A A A!
 15!0!0 0 0 0!0 0 0 0,0 0 0 0!0 0 0 0!0 0 0 0!A A A A!A A A A,A A A A!
 16!0!0 0 0 0!0 0 0 0,0 0 0 0!0 0 0 0!0 0 0 0!A A A A!A A A A,A A A A!
 17!0!0 0 0 0!0 0 0 0,0 0 0 0!0 0 0 0!0 0 0 0!A A A A!A A A A,A A A A!
 18!0!0 0 0 0!0 0 0 0,0 0 0 0!0 0 0 0!0 0 0 0!A A A A!A A A A,A A A A!
 19!0!0 0 0 0!0 0 0 0,0 0 0 0!0 0 0 0!0 0 0 0!A A A A!A A A A,A A A A!
 20!0!0 0 0 0!0 0 0 0,0 0 0 0!0 0 0 0!0 0 0 0!A A A A!A A A A,A A A A!
 21!0!0 0 0 0!0 0 0 0,0 0 0 0!0 0 0 0!0 0 0 0!A A A A!A A A A,A A A A!
 22!0!0 0 0 0!0 0 0 0,0 0 0 0!0 0 0 0!0 0 0 0!A A A A!A A A A,A A A A!
 23!0!0 0 0 0!0 0 0 0,0 0 0 0!0 0 0 0!0 0 0 0!A A A A!A A A A,A A A A!
 24!0!0 0 0 0!0 0 0 0,0 0 0 0!0 0 0 0!0 0 0 0!A A A A!A A A A,A A A A!
 25!0!0 0 0 0!0 0 0 0,0 0 0 0!0 0 0 0!0 0 0 0!A A A A!A A A A,A A A A!
 26!0!0 0 0 0!0 0 0 0,0 0 0 0!0 0 0 0!0 0 0 0!A A A A!A A A A,A A A A!
 27!0!0 0 0 0!0 0 0 0,0 0 0 0!0 0 0 0!0 0 0 0!A A A A!A A A A,A A A A!
 28!0!0 0 0 0!0 0 0 0,0 0 0 0!0 0 0 0!0 0 0 0!A A A A!A A A A,A A A A!
 29!0!0 0 0 0!0 0 0 0,0 0 0 0!0 0 0 0!0 0 0 0!A A A A!A A A A,A A A A!
 30!0!0 0 0 0!0 0 0 0,0 0 0 0!0 0 0 0!0 0 0 0!A A A A!A A A A,A A A A!
 31!0!0 0 0 0!0 0 0 0,0 0 0 0!0 0 0 0!0 0 0 0!A A A A!A A A A,A A A A!
 Fc!0!0 0 0 0!0 0 0 0,0 0 0 0!0 0 0 0!
```

```
Lb!.!0 0 0 0!0 0 0 0,0 0 0 0!0 0 0 0!
La!.!0 0 0 0!0 0 0 0,0 0 0 0!0 0 0 0!
D7!.!0 0 0 0!0 0 0 0,0 0 0 0!0 0 0 0!
D6!-!- - - -!- - - -,- - - -!- - - -!
D5!-!- - - -!- - - -,- L - -!- - - -!
D4!-!- - - -!- - - -,- - - -!- - - -!
D3!.!0 0 0 0!0 0 0 0,0 0 0 0!0 0 0 0!
D2!.!0 0 0 0!0 0 0 0,0 0 0 0!0 0 0 0!
D1!.!0 0 0 0!0 0 0 0,0 0 0 0!0 0 0 0!
D0!.!0 0 0 0!0 0 0 0,0 0 0 0!0 0 0 0!

     E D M M N I 9 H N R S M D M N M D M N M          N I 9 H N R S M
     X B A A / N 7 R / S E E E E / B E E / B          / N 7 R / S E E
     F E T T C I R S C T L M L M C C L M C C          C I R S C T L M
     E R C C   T S T     _ R A I   S A I   S            T S T     _ R

   LABEL      ** FNC **PIN --------- PIN** FNC **     LABEL
 CLK          ** CK  **  1-|         |-20 ** +5V **VCC
 E0           ** I   **  2-|         |-19 ** O   **N/C
 E1           ** I   **  3-|         |-18 ** O   **NOTSYNC
 E2           ** I   **  4-|    8    |-17 ** O   **NORMAL
 INDAT1       ** I   **  5-|    2    |-16 ** O   **RESET
 INDAT0       ** I   **  6-|    S    |-15 ** O   **F3
 OUTDAT1      ** O   **  7-|    1    |-14 ** O   **F2
 OUTDAT0      ** O   **  8-|    5    |-13 ** O   **F1
 SHUTOFF      ** O   **  9-|    9    |-12 ** O   **F0
 GND          ** 0V  ** 10-|         |-11 ** /OE **/OE
                            ---------
```

```
@DEVICE TYPE
82S159
@DRAWING
RTIO 1553 CARD
@REVISION
01
@DATE
4/12/85
@SYMBOL
mux card u21 and u30
@COMPANY
McDonnell Douglas
@NAME
Kevin Brady
@COMPLEMENT ARRAY
/C = /(F0*/F1*F2*/F3 + /F0*F1*F2*F3);
@DESCRIPTION
This pla takes in valid 1553 data and inserts OFLIP
type errors upon command.

Control is via 3 lines defined as E0,E1,E2. These
lines must stay set for the entire mux word.

The errors are defined as

E0  E1  E2
0   0   0  Sync Late(defined for command sync)
0   0   1  Sync Early
0   1   0  Manchester High Error
0   1   1  Manchester Low Error
1   0   0  Parity
1   0   1  Balance Low
1   1   0  Balance High
1   1   1  Normal Operation
```

```
THIS PLA IS IDENTICAL TO MB1,MB2 PLA

@I/O DIRECTION
@OUTPUT POLARITY
@I/O STEERING
@COMMON PRODUCT TERM
"DEFINITION OF THE COUNT TERMS THAT THE LOGIC
 TRIGGERS UPON"

COUNT10 = F0*/F1*F2*/F3*/RESET;
COUNT1 = /F0*F1*F2*F3*/RESET;
@FLIP FLOP CONTROL
"D TYPE"

FC = 0;
@OUTPUT ENABLE
EA  = 0;
EB = 0;
@REGISTER LOAD
@ASYNCHRONOUS PRESET/RESET
PA = 0;
RA = RESET;
PB = 0;
RB = 0;
@FLIP FLOP MODE
M0,M1,M2,M3 = 1;
M4,M5,M6 = FC;
@LOGIC EQUATION
"SHUTOFF STOPS THE COUNTER AT 15"
SHUTOFF  = /F0*/F1*/F2*/F3;
"RESET TRIGGERS ON THE INCOMING DATA AND ENABLES"
/RESET: D = INDAT1+INDAT0;
"NOTSYNC TELLS WHEN AN  ERROR COND. IS NOT A SYNC"
/NOTSYNC: D = E1+E2;
"NORMAL IS THE NO ERROR COND."
/NORMAL: D = E0*E1*E2;
/F0: T = /SHUTOFF;
/F1: T = /SHUTOFF*/F0;
/F2: T = /SHUTOFF*/F0*/F1;
/F3: T = /SHUTOFF*/F0*/F1*/F2;

"COMMON TERMS COUNT10,COUNT1 DEFINED EARLIER"

OUTDAT1 = /RESET*INDAT1*E0*E1*E2         +
          COUNT10*/E0*E1*E2              +
          COUNT10*/E0*/E1*E2*/INDAT1     +
          COUNT1*/E0*/E1*/E2             +
          COUNT10*E0*/E1*/E2*INDAT1      +
          INDAT1*/RESET*NORMAL*/C        +
          COUNT1*NORMAL*/NOTSYNC*INDAT1  +
          COUNT10*NOTSYNC*INDAT1         +
          RESET*INDAT1;

OUTDAT0 = /RESET*INDAT0*E0*E1*E2            +
          COUNT10*E0*E1*/E2                 +
           COUNT10*/E0*/E1*E2*/INDAT0       +
          COUNT1*E0*/E1*/E2                 +
          COUNT10*INDAT0*/E0*E1*E2          +
          /RESET*NORMAL*INDAT0*/C           +
          COUNT1*NORMAL*/NOTSYNC*INDAT0     +
          COUNT10*NOTSYNC*INDAT0            +
          RESET*INDAT0;
```

```
                             ! F/F TYPE          ! E(b)= !E(a) = !POLARTY!
                             !___________________!_______!_______!_______!
T  !                         !A:A:A:A:.:.:.:.!  .    !   .   !H:H:H:L!
E  !---------------------------------------------------------------------
R  ! !   I    ! B(1)   !       Q(p)          !      Q(n)      ! B(o)   !
M  !C!-------------------------------------------------------------------
___!_!3_2_1_0!3_2_1_0!7_6_5_4_3_2_1_0!7_6_5_4_3_2_1_0!3_2_1_0!
  0!A!- - - -!- - - -!- - - -,H L H L!0 . . .,- - - -!. . . A!
  1!A!- - - -!- - - -!- - - -,L L L H!0 . . .,- - - -!. . . A!
  2!-!- - - -!- - - -!- - - -,H H H H!0 . . .,- - - -!A . . A!
  3!-!H - - -!- - - -!- - - -,- - - -!0 . . A,- - - -!. . . A!
  4!-!- - - -!- - - H!- - - -,- - - -!0 . . A,- - - -!. . . A!
  5!-!- - H -!- - - -!- - - -,- - - -!0 A . .,- - - -!. . . A!
  6!-!- H - -!- - - -!- - - -,- - - -!0 A . .,- - - -!. . . A!
  7!-!- H H H!- - - -!- - - -,- - - -!0 A . .,- - - -!. . . A!
  8!-!- - - -!L - - -!- - - -,- - - -!0 . A .,- - - -!. . . A!
  9!-!- - - -!L - - -!- - - -,- - - -!0 . . .,- - - 0!. . . A!
 10!-!- - - -!L - - -!- - - -,- - - H!0 . . .,- - 0 -!. . . A!
 11!-!- - - -!L - - -!- - - -,- - H H!0 . . .,- 0 - -!. . . A!
 12!-!H H H H!- - - -!- - - -,- H H H!0 . . .,0 - - -!. . . A!
 13!-!- H H L!- - - -!- - - H,H L H L!0 . . .,- - - -!. . A A!
 14!-!L H L L!- - - -!- - - H,H L H L!0 . . .,- - - -!. . A A!
 15!-!- L L L!- - - -!- - - H,L L L H!0 . . .,- - - -!. . A A!
 16!-!H L L H!- - - -!- - - H,H L H L!0 . . .,- - - -!. . A A!
 17!.!H - - -!- - - -!- - L H,- - - -!0 . . .,- - - -!. . A A!
 18!-!H - - -!- - - -!- H L H,L L L H!0 . . .,- - - -!. . A A!
 19!-!H - - -!- - - -!- L - H,H L H L!0 . . .,- - - -!. . A A!
 20!-!H - - -!- - - -!- - - L,- - - -!0 . . .,- - - -!. . A A!
 21!-!- H H H!- - - H!- - - H,- - - -!0 . . .,- - - -!. . A A!
 22!-!- L H H!- - - -!- - - H,H L H L!0 . . .,- - - -!. A . A!
 23!-!- H L L!- - - L!- - - H,H L H L!0 . . .,- - - -!. A . A!
 24!-!- L L H!- - - -!- - - H,L L L H!0 . . .,- - - -!. A . A!
 25!-!- H H L!- - - H!- - - H,H L H L!0 . . .,- - - -!. A . A!
 26!.!- - - -!- - - H!- - L H,- - - -!0 . . .,- - - -!. A . A!
 27!-!- - - -!- - - H!- H L H,L L L H!0 . . .,- - - -!. A . A!
 28!-!- - - -!- - - H!- L - H,H L H L!0 . . .,- - - -!. A . A!
 29!-!- - - -!- - - H!- - - L,- - - -!0 . . .,- - - -!. A . A!
 30!0!0 0 0 0!0 0 0 0!0 0 0 0,0 0 0 0!0 0 0 0,0 0 0 0!A A A A!
 31!0!0 0 0 0!0 0 0 0!0 0 0 0,0 0 0 0!0 0 0 0,0 0 0 0!A A A A!
 Fc!0!0 0 0 0!0 0 0 0!0 0 0 0,0 0 0 0!
 Pb!.!0 0 0 0!0 0 0 0!0 0 0 0,0 0 0 0!
 Rb!.!0 0 0 0!0 0 0 0!0 0 0 0,0 0 0 0!
 Lb!.!0 0 0 0!0 0 0 0!0 0 0 0,0 0 0 0!
 Pa!.!0 0 0 0!0 0 0 0!0 0 0 0,0 0 0 0!
 Ra!-!- - - -!- - - -!- - - L,- - - -!
 La!.!0 0 0 0!0 0 0 0!0 0 0 0,0 0 0 0!
 D3!-!- - - -!- - - -!- - - -,- - - -!
 D2!-!- - - -!- - - -!- - - -,- - - -!
 D1!-!- - - -!- - - -!- - - -,- - - -!
 D0!.!0 0 0 0!0 0 0 0!0 0 0 0,0 0 0 0!

     I E E E S O O I N N N R F F F F N N N R F F F F S O O I
     N 2 1 0 H U U N / O O E 3 2 1 0 / O O E 3 2 1 0 H U U N
     D       U T T D C T R S         C T R S         U T T D
     A       T D D A   S M E           S M E         T D D A
```

```
   LABEL      ** FNC **PIN --------- PIN** FNC **     LABEL
BCLKB         ** CK  **   1-|         |-20 ** +5V **VCC
DATAIN        ** I   **   2-|         |-19 ** O   **FF7
TAKEDATA      ** I   **   3-|         |-18 ** O   **FF6
BANKSEL       ** I   **   4-|    8    |-17 ** O   **FF5
AD15          ** I   **   5-|    2    |-16 ** O   **FF4
RTRDY         ** O   **   6-|    S    |-15 ** O   **FF3
NEWAD15       ** O   **   7-|    1    |-14 ** O   **FF2
N/C           ** /B  **   8-|    5    |-13 ** O   **FF1
N/C           ** /B  **   9-|    9    |-12 ** O   **FF0
GND           ** OV  **  10-|         |-11 ** /OE **RTADDRA
                             ---------

T !
E !---------------------------------------------------------------
R ! !   I    ! B(i)  !       Q(p)        !       Q(n)      ! B(o)  !
M !C!---------------------------------------------------------------
  !_!3_2_1_0!3_2_1_0!7_6_5_4_3_2_1_0!7_6_5_4_3_2_1_0!3_2_1_0!
 0!-!- - - -!- - - -!- - - -,- - - -!- - . .,. . . 0!. . . .
 1!-!- - - L!- - - -!- - - -,- - - -!- - . .,. . A -!A A . .
 2!-!- - - -!- - - -!- - - -,- - H -!- - . .,. A . -!A A . .!
 3!-!- - - -!- - - -!- - - -,- H - -!- - . .,A . . -!A A . .!
 4!-!- - - -!- - - -!- - - -,H - - -!- - . A,. . . -!A A . .!
 5!-!- - - -!- - - -!- - - H,- - - -!- - A .,. . . -!A A . .!
 6!-!- - - -!- - - -!- - - -,- - - H!- 0 . .,. . . -!A A . .!
 7!-!- - - -!- - - -!- H - -,- - - H!0 - . .,. . . -!A A . .!
 8!-!- - - -!- - - -!L H - -,- - - L!- - . .,. . . -!A A . A!
 9!-!- - - -!- - - -!L H - -,- - - H!- - . .,. . . -!A A . A!
10!-!H H - -!- - - -!- - - -,- - - -!- - . .,. . . -!A A A .!
11!0!0 0 0 0!0 0 0 0!0 0 0 0,0 0 0 0!0 0 0 0,0 0 0 0!A A A A!
12!0!0 0 0 0!0 0 0 0!0 0 0 0,0 0 0 0!0 0 0 0,0 0 0 0!A A A A!
13!0!0 0 0 0!0 0 0 0!0 0 0 0,0 0 0 0!0 0 0 0,0 0 0 0!A A A A!
14!0!0 0 0 0!0 0 0 0!0 0 0 0,0 0 0 0!0 0 0 0,0 0 0 0!A A A A!
15!0!0 0 0 0!0 0 0 0!0 0 0 0,0 0 0 0!0 0 0 0,0 0 0 0!A A A A!
16!0!0 0 0 0!0 0 0 0!0 0 0 0,0 0 0 0!0 0 0 0,0 0 0 0!A A A A!
17!0!0 0 0 0!0 0 0 0!0 0 0 0,0 0 0 0!0 0 0 0,0 0 0 0!A A A A!
18!0!0 0 0 0!0 0 0 0!0 0 0 0,0 0 0 0!0 0 0 0,0 0 0 0!A A A A!
19!0!0 0 0 0!0 0 0 0!0 0 0 0,0 0 0 0!0 0 0 0,0 0 0 0!A A A A!
20!0!0 0 0 0!0 0 0 0!0 0 0 0,0 0 0 0!0 0 0 0,0 0 0 0!A A A A!
21!0!0 0 0 0!0 0 0 0!0 0 0 0,0 0 0 0!0 0 0 0,0 0 0 0!A A A A!
22!0!0 0 0 0!0 0 0 0!0 0 0 0,0 0 0 0!0 0 0 0,0 0 0 0!A A A A!
23!0!0 0 0 0!0 0 0 0!0 0 0 0,0 0 0 0!0 0 0 0,0 0 0 0!A A A A!
24!0!0 0 0 0!0 0 0 0!0 0 0 0,0 0 0 0!0 0 0 0,0 0 0 0!A A A A!
25!0!0 0 0 0!0 0 0 0!0 0 0 0,0 0 0 0!0 0 0 0,0 0 0 0!A A A A!
26!0!0 0 0 0!0 0 0 0!0 0 0 0,0 0 0 0!0 0 0 0,0 0 0 0!A A A A!
27!0!0 0 0 0!0 0 0 0!0 0 0 0,0 0 0 0!0 0 0 0,0 0 0 0!A A A A!
28!0!0 0 0 0!0 0 0 0!0 0 0 0,0 0 0 0!0 0 0 0,0 0 0 0!A A A A!
29!0!0 0 0 0!0 0 0 0!0 0 0 0,0 0 0 0!0 0 0 0,0 0 0 0!A A A A!
30!0!0 0 0 0!0 0 0 0!0 0 0 0,0 0 0 0!0 0 0 0,0 0 0 0!A A A A!
31!0!0 0 0 0!0 0 0 0!0 0 0 0,0 0 0 0!0 0 0 0,0 0 0 0!A A A A!
Fc!0!0 0 0 0!0 0 0 0!0 0 0 0,0 0 0 0!                        .
Pb!-!- - H -!- - - -!- - - -,- - - -!                        .
Rb!.!0 0 0 0!0 0 0 0!0 0 0 0,0 0 0 0!                        .
Lb!.!0 0 0 0!0 0 0 0!0 0 0 0,0 0 0 0!                        .
Pa!-!- - H -!- - - -!- - - -,- - - -!                        .
Ra!.!0 0 0 0!0 0 0 0!0 0 0 0,0 0 0 0!                        .
La!.!0 0 0 0!0 0 0 0!0 0 0 0,0 0 0 0!                        .
D3!.!0 0 0 0!0 0 0 0!0 0 0 0,0 0 0 0!                        .
D2!.!0 0 0 0!0 0 0 0!0 0 0 0,0 0 0 0!                        .
D1!-!- - - -!- - - -!- - - -,- - - -!                        .
D0!-!- - - -!- - - -!- - - -,- - - -!                        .
```

```
  A B T D N N N R F F F F F F F F F F F F F F F F N N N R
  D A A A / / E T F F F F F F F F F F F F F F F F / / E T
  1 N K T C C W R 7 6 5 4 3 2 1 0 7 6 5 4 3 2 1 0 C C W R
  5 K E A     A D                                     A D
   LABEL      ** FNC **PIN --------- PIN** FNC **     LABEL
BCLKB         ** CK  **   1-|         |-20 ** +5V **VCC
DATAIN        ** I   **   2-|         |-19 ** O   **FF7
TAKEDATA      ** I   **   3-|         |-18 ** O   **FF6
N/C           ** I   **   4-|    8    |-17 ** O   **FF5
N/C           ** I   **   5-|    2    |-16 ** O   **FF4
RTRDY         ** O   **   6-|    S    |-15 ** O   **FF3
N/C           ** /B  **   7-|    1    |-14 ** O   **FF2
N/C           ** /B  **   8-|    5    |-13 ** O   **FF1
N/C           ** /B  **   9-|    9    |-12 ** O   [illegible]
GND           ** OV  **  10-|         |-11 ** /OE **RTADDRA
                            ---------
@DEVICE TYPE
32S159
@DRAWING
MIP1553
@REVISION
01
@DATE
OCTOBER 1, 1985
@SYMBOL
@COMPANY
MCDONNEL AIRCRAFT
@NAME
RICH WITHERS
@COMPLEMENT ARRAY
/C = /(0);
@DESCRIPTION
 THIS IS THE RT PARCER PLA FOR THE NEW 1553(U67).
THIS PLA PROVIDES THE RT AND SUBADDR FROM THE
SERIAL DATA STREAM BEFORE ALL BITS ARE READ IN.
@I/O DIRECTION
D0 = 1;
@OUTPUT POLARITY
X0=1;
@I/O STEERING
@COMMON PRODUCT TERM
@FLIP FLOP CONTROL
FC = 0;
@OUTPUT ENABLE
EA,EB = RTADDRA;
@REGISTER LOAD
LA = 0;
LB = 0;
@ASYNCHRONOUS PRESET/RESET
PA = TAKEDATA;
PB = TAKEDATA;
RA = 0;
RB = 0;
@FLIP FLOP MODE
M1,M2,M3,M4,M5 = FC;
M0,M6,M7 = 1;
@LOGIC EQUATION
/FF0: T=1;
/FF1: D=/DATAIN;
/FF2: D=/FF1;
/FF3: D=/FF2;
/FF4: D=/FF3;
/FF5: D=/FF4;
/FF6: T=/FF0;
/FF7: T=/FF0*/FF6;
RTRDY = FF7*/FF6*FF0 + FF7*/FF6*/FF0;
```

```
T !
E !---------------------------------------------------------------
R ! !     I     ! B(i)  !         Q(p)          !         Q(n)          ! B(o)   !
M !C!---------------------------------------------------------------
  !_!3_2_1_0!3_2_1_0!7_6_5_4_3_2_1_0!7_6_5_4_3_[illegible]
 0!-!- - - -!- - - -!- - - -,- - - -!- - . .,. . . [illegible]!A [illegible]
 1!-!- - - L!- - - -!- - - -,- - - -!- - . .,. . A -!A A A . .
 2!-!- - - -!- - - -!- - - -,- - H -!- - . .,. A . -!A A A .!
 3!-!- - - -!- - - -!- - - -,- H - -!- - . .,A . . -!A A A .!
 4!-!- - - -!- - - -!- - - -,H - - -!- - . A,. . . -!A A A .!
 5!-!- - - -!- - - -!- - - H,- - - -!- - A .,. . . -!A A A .!
 6!-!- - - -!- - - -!- - - -,- - - H!- 0 . .,. . . -!A A A .!
 7!-!- - - -!- - - -!- H - -,- - - H!0 - . .,. . . -!A A A .!
 8!-!- - - -!- - - -!L H - -,- - - L!- - . .,. . . -!A A A A!
 9!-!- - - -!- - - -!L H - -,- - - H!- - . .,. . . -!A A A A!
10!0!0 0 0 0!0 0 0 0!0 0 0 0,0 0 0 0!0 0 0 0,0 0 0 0!A A A A!
11!0!0 0 0 0!0 0 0 0!0 0 0 -0,0 0 0 0!0 0 0 0,0 0 0 0!A A A A!
12!0!0 0 0 0!0 0 0 0!0 0 0 0,0 0 0 0!0 0 0 0,0 0 0 0!A A A A!
13!0!0 0 0 0!0 0 0 0!0 0 0 0,0 0 0 0!0 0 0 0,0 0 0 0!A A A A!
14!0!0 0 0 0!0 0 0 0!0 0 0 0,0 0 0 0!0 0 0 0,0 0 0 0!A A A A!
15!0!0 0 0 0!0 0 0 0!0 0 0 0,0 0 0 0!0 0 0 0,0 0 0 0!A A A A!
16!0!0 0 0 0!0 0 0 0!0 0 0 0,0 0 0 0!0 0 0 0,0 0 0 0!A A A A!
17!0!0 0 0 0!0 0 0 0!0 0 0 0,0 0 0 0!0 0 0 0,0 0 0 0!A A A A!
18!0!0 0 0 0!0 0 0 0!0 0 0 0,0 0 0 0!0 0 0 0,0 0 0 0!A A A A!
19!0!0 0 0 0!0 0 0 0!0 0 0 0,0 0 0 0!0 0 0 0,0 0 0 0!A A A A!
20!0!0 0 0 0!0 0 0 0!0 0 0 0,0 0 0 0!0 0 0 0,0 0 0 0!A A A A!
21!0!0 0 0 0!0 0 0 0!0 0 0 0,0 0 0 0!0 0 0 0,0 0 0 0!A A A A!
22!0!0 0 0 0!0 0 0 0!0 0 0 0,0 0 0 0!0 0 0 0,0 0 0 0!A A A A!
23!0!0 0 0 0!0 0 0 0!0 0 0 0,0 0 0 0!0 0 0 0,0 0 0 0!A A A A!
24!0!0 0 0 0!0 0 0 0!0 0 0 0,0 0 0 0!0 0 0 0,0 0 0 0!A A A A!
25!0!0 0 0 0!0 0 0 0!0 0 0 0,0 0 0 0!0 0 0 0,0 0 0 0!A A A A!
26!0!0 0 0 0!0 0 0 0!0 0 0 0,0 0 0 0!0 0 0 0,0 0 0 0!A A A A!
27!0!0 0 0 0!0 0 0 0!0 0 0 0,0 0 0 0!0 0 0 0,0 0 0 0!A A A A!
28!0!0 0 0 0!0 0 0 0!0 0 0 0,0 0 0 0!0 0 0 0,0 0 0 0!A A A A!
29!0!0 0 0 0!0 0 0 0!0 0 0 0,0 0 0 0!0 0 0 0,0 0 0 0!A A A A!
30!0!0 0 0 0!0 0 0 0!0 0 0 0,0 0 0 0!0 0 0 0,0 0 0 0!A A A A!
31!0!0 0 0 0!0 0 0 0!0 0 0 0,0 0 0 0!0 0 0 0,0 0 0 0!A A A A!
Fc!0!0 0 0 0!0 0 0 0!0 0 0 0,0 0 0 0!                          .
Pb!-!- - H -!- - - -!- - - -,- - - -!                          .
Rb!.!0 0 0 0!0 0 0 0!0 0 0 0,0 0 0 0!                          .
Lb!.!0 0 0 0!0 0 0 0!0 0 0 0,0 0 0 0!                          .
Pa!-!- - H -!- - - -!- - - -,- - - -!                          .
Ra!.!0 0 0 0!0 0 0 0!0 0 0 0,0 0 0 0!                          .
La!.!0 0 0 0!0 0 0 0!0 0 0 0,0 0 0 0!                          .
D3!.!0 0 0 0!0 0 0 0!0 0 0 0,0 0 0 0!                          .
D2!.!0 0 0 0!0 0 0 0!0 0 0 0,0 0 0 0!                          .
D1!.!0 0 0 0!0 0 0 0!0 0 0 0,0 0 0 0!                          .
D0!-!- - - -!- - - -!- - - -,- - - -!                          .

     N N T D N N N R F F F F F F F F F F F F F F F F N N N R
     / / A A / / / T F F F F F F F F F F F F F F F F / / / T
     C C K T C C C R 7 6 5 4 3 2 1 0 7 6 5 4 3 2 1 0 C C C R
         E A       D                                       D

   LABEL        ** FNC **PIN ---------- PIN** FNC **      LABEL
 C0             ** I   **  1-|        |-20 ** +5V **VCC
 C1             ** I   **  2-|        |-19 ** /O  **CMUXOUT
 C2             ** I   **  3-|        |-18 ** B   **N/C
 C3             ** I   **  4-|   8    |-17 ** I   **DPMXACK
 C4             ** I   **  5-|   2    |-16 ** I   **TIMER
 P              ** I   **  6-|   S    |-15 ** I   **CMUXA
 BUSA           ** I   **  7-|   1    |-14 ** I   **CMUXB
 BUSB           ** I   **  8-|   5    |-13 ** I   **ZERO
 [illegible]    ** I   **  9-|   3    |-12 ** I   **[illegible]
 GND            ** 0V  ** 10-|        |-11 ** [illegible] **[illegible]
                             ----------
```

```
@DEVICE TYPE
82S153
@DRAWING
MIP153
@REVISION
@DATE
OCTOBER 1, 1985
@SYMBOL
@COMPANY
MCDONNEL AIRCRAFT
@NAME
RICH WITHERS
@COMPLEMENT ARRAY
@DESCRIPTION
THIS IS THE CONDITION MUX PLA (U10). IT PROVIDES BOTH THE
MUX AND PROCESSOR CONDITIONS THAT ARE EXAMINED ON EACH
CYCLE TO THE CPU SO IT CAN CONTROL ITS INSTRUCTION SEQ.
@LOGIC EQUATION
CMUXOUT=/(/P*/C4*/C3*/C2*/C1*/C0+
          P*/C4*/C3*/C2*/C1* C0* ZERO+
         /P*/C4*/C3*/C2*/C1* C0*/ZERO+
          P*/C4*/C3*/C2* C1*/C0* CARRY+
         /P*/C4*/C3*/C2* C1*/C0*/CARRY+
          P*/C4*/C3*/C2* C1* C0* NEG+
         /P*/C4*/C3*/C2* C1* C0*/NEG+
          P*/C4*/C3* C2*/C1*/C0* OFLOW+
         /P*/C4*/C3* C2*/C1*/C0*/OFLOW+
          P*/C4*/C3* C2*/C1* C0* DPMXACK+
         /P*/C4*/C3* C2*/C1* C0*/DPMXACK+
          P*/C4*/C3* C2* C1*/C0* TIMER+
         /P*/C4*/C3* C2* C1*/C0*/TIMER+
         /BUSB*/C4* C3*/CMUXB*/P+
         /BUSB*/C4* C3* CMUXB* P+
         /BUSA*/C4* C3*/CMUXA*/P+
         /BUSA*/C4* C3* CMUXA* P+
          P* C4*/C3* CMUXA+
         /P* C4*/C3*/CMUXA+
          P* C4*/C3* CMUXB+
         /P* C4*/C3*/CMUXB);
@I/O DIRECTION
D0=0;
D1=0;
D2=0;
D3=0;
D4=0;
D5=0;
D6=0;
D7=0;
D9=1;
@OUTPUT POLARITY
X9 = 1;
@I/O STEERING
@COMMON PRODUCT TERM
@FLIP FLOP CONTROL
@OUTPUT ENABLE
@REGISTER LOAD
@ASYNCHRONOUS PRESET/RESET
@FLIP FLOP MODE
```

| TERM | I | | | | | | | | B(i) | | | | | | | | | | B(o) | | | | | | | | | |
|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 9 | 8 | 7 | 6 | 5 | 4 | 3 | 2 | 1 | 0 | 9 | 8 | 7 | 6 | 5 | 4 | 3 | 2 | 1 | 0 |
| 0 | - | - | L | L | L | L | L | L | - | - | - | - | - | - | - | - | - | - | A | A | A | A | A | A | A | A | A | A |
| 1 | - | - | H | L | L | L | L | H | - | - | - | - | - | - | H | - | - | - | A | A | A | A | A | A | A | A | A | A |
| 2 | - | - | L | L | L | L | L | H | - | - | - | - | - | - | L | - | - | - | A | A | A | A | A | A | A | A | A | A |
| 3 | - | - | H | L | L | L | H | L | - | - | - | - | - | - | - | H | - | - | A | A | A | A | A | A | A | A | A | A |
| 4 | - | - | L | L | L | L | H | L | - | - | - | - | - | - | - | L | - | - | A | A | A | A | A | A | A | A | A | A |
| 5 | - | - | H | L | L | L | H | H | - | - | - | - | - | - | - | - | H | - | A | A | A | A | A | A | A | A | A | A |
| 6 | - | - | L | L | L | L | H | H | - | - | - | - | - | - | - | - | L | - | A | A | A | A | A | A | A | A | A | A |
| 7 | - | - | H | L | L | H | L | L | - | - | - | - | - | - | - | - | - | H | A | A | A | A | A | A | A | A | A | A |
| 8 | - | - | L | L | L | H | L | L | - | - | - | - | - | - | - | - | - | L | A | A | A | A | A | A | A | A | A | A |
| 9 | - | - | H | L | L | H | L | H | - | - | H | - | - | - | - | - | - | - | A | A | A | A | A | A | A | A | A | A |
| 10 | - | - | L | L | L | H | L | H | - | - | L | - | - | - | - | - | - | - | A | A | A | A | A | A | A | A | A | A |
| 11 | - | - | H | L | L | H | H | L | - | - | - | H | - | - | - | - | - | - | A | A | A | A | A | A | A | A | A | A |
| 12 | - | - | L | L | L | H | H | L | - | - | - | L | - | - | - | - | - | - | A | A | A | A | A | A | A | A | A | A |
| 13 | L | - | L | L | H | - | - | - | - | - | - | - | - | L | - | - | - | - | A | A | A | A | A | A | A | A | A | A |
| 14 | L | - | H | L | H | - | - | - | - | - | - | - | - | H | - | - | - | - | A | A | A | A | A | A | A | A | A | A |
| 15 | - | L | L | L | H | - | - | - | - | - | - | - | L | - | - | - | - | - | A | A | A | A | A | A | A | A | A | A |
| 16 | - | L | H | L | H | - | - | - | - | - | - | - | H | - | - | - | - | - | A | A | A | A | A | A | A | A | A | A |
| 17 | - | - | H | H | L | - | - | - | - | - | - | - | H | - | - | - | - | - | A | A | A | A | A | A | A | A | A | A |
| 18 | - | - | L | H | L | - | - | - | - | - | - | - | L | - | - | - | - | - | A | A | A | A | A | A | A | A | A | A |
| 19 | - | - | H | H | L | - | - | - | - | - | - | - | - | H | - | - | - | - | A | A | A | A | A | A | A | A | A | A |
| 20 | - | - | L | H | L | - | - | - | - | - | - | - | - | L | - | - | - | - | A | A | A | A | A | A | A | A | A | A |
| 21 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 22 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 23 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 24 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 25 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 26 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 27 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 28 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 29 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 30 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 31 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| D9 | - | - | - | - | - | - | - | - | - | - | - | - | - | - | - | - | - | - | | | | | | | | | | |
| D8 | 0 | 0 | 0 | 0 | 0 | 0 | 0 | 0 | 0 | 0 | 0 | 0 | 0 | 0 | 0 | 0 | 0 | 0 | | | | | | | | | | |
| D7 | 0 | 0 | 0 | 0 | 0 | 0 | 0 | 0 | 0 | 0 | 0 | 0 | 0 | 0 | 0 | 0 | 0 | 0 | | | | | | | | | | |
| D6 | 0 | 0 | 0 | 0 | 0 | 0 | 0 | 0 | 0 | 0 | 0 | 0 | 0 | 0 | 0 | 0 | 0 | 0 | | | | | | | | | | |
| D5 | 0 | 0 | 0 | 0 | 0 | 0 | 0 | 0 | 0 | 0 | 0 | 0 | 0 | 0 | 0 | 0 | 0 | 0 | | | | | | | | | | |
| D4 | 0 | 0 | 0 | 0 | 0 | 0 | 0 | 0 | 0 | 0 | 0 | 0 | 0 | 0 | 0 | 0 | 0 | 0 | | | | | | | | | | |
| D3 | 0 | 0 | 0 | 0 | 0 | 0 | 0 | 0 | 0 | 0 | 0 | 0 | 0 | 0 | 0 | 0 | 0 | 0 | | | | | | | | | | |
| D2 | 0 | 0 | 0 | 0 | 0 | 0 | 0 | 0 | 0 | 0 | 0 | 0 | 0 | 0 | 0 | 0 | 0 | 0 | | | | | | | | | | |
| D1 | 0 | 0 | 0 | 0 | 0 | 0 | 0 | 0 | 0 | 0 | 0 | 0 | 0 | 0 | 0 | 0 | 0 | 0 | | | | | | | | | | |
| D0 | 0 | 0 | 0 | 0 | 0 | 0 | 0 | 0 | 0 | 0 | 0 | 0 | 0 | 0 | 0 | 0 | 0 | 0 | | | | | | | | | | |
| | BUSB | BUSA | P | C4 | C3 | C2 | C1 | C0 | CMUXO | N/C | DPMXA | TIMER | CMUXA | CMUXB | ZERO | CARRY | NEG | OFLOW | CMUXO | N/C | DPMXA | TIMER | CMUXA | CMUXB | ZERO | CARRY | NEG | OFLOW |

343 344

```
   LABEL     ** FNC **PIN --------- PIN** FNC **     LABEL
M0           ** I   **  1-|         |-20 ** +5V **VCC
M1           ** I   **  2-|         |-19 ** /O  **BC0
M2           ** I   **  3-|         |-18 ** /O  **BC1
M3           ** I   **  4-|    8    |-17 ** /O  **BC2
M4           ** I   **  5-|    2    |-16 ** /O  **BC3
BUSB         ** I   **  6-|    S    |-15 ** /O  **BC4
BUSA         ** I   **  7-|    1    |-14 ** /O  **AC0
N/C          ** I   **  8-|    5    |-13 ** /O  **AC1
AC4          ** /O  **  9-|    3    |-12 ** /O  **AC2
GND          ** GV  ** 10-|         |-11 ** /O  **AC3
                           ---------
@DEVICE TYPE
82S153
@DRAWING
MIP1553
@REVISION
@DATE
OCTOBER 1, 1985
@SYMBOL
@COMPANY
MCDONNEL AIRCRAFT
@NAME
RICH WITHERS
@COMPLIMENT ARRAY
@DESCRIPTION
THIS IS THE MUX CONTROL PLA (U81). THIS PLA CONTROLS WHICH
BUS (A OR B) THE DATA IS SENT OUT ON.
@LOGIC EQUATION
AC0=/(/M0*/BUSA);
BC0=/(/M0*/BUSB);
AC1=/(/M1*/BUSA);
BC1=/(/M1*/BUSB);
AC2=/(/M2*/BUSA);
BC2=/(/M2*/BUSB);
AC3=/(/M3*/BUSA);
BC3=/(/M3*/BUSB);
AC4=/(/M4*/BUSA);
BC4=/(/M4*/BUSB);
@I/O DIRECTION
D0=1;
D1=1;
D2=1;
D3=1;
D4=1;
D5=1;
D6=1;
D7=1;
D8=1;
D9=1;
@OUTPUT POLARITY
X0,X1,X2,X3,X4,X5,X6,X7,X8,X9=1;
@I/O STEERING
@COMMON PRODUCT TERM
@FLIP FLOP CONTROL
@OUTPUT ENABLE
@REGISTER LOAD
@ASYNCHRONOUS PRESET/RESET
@FLIP FLOP MODE
```

| TERM | I | | | | | | | | B(i) | | | | | | | | | | B(o) | | | | | | | | | |
|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 9 | 8 | 7 | 6 | 5 | 4 | 3 | 2 | 1 | 0 | 9 | 8 | 7 | 6 | 5 | 4 | 3 | 2 | 1 | 0 |
| 0 | - | L | - | - | - | - | - | L | - | - | - | - | - | - | - | - | - | - | . | . | . | . | . | A | . | . | . | . |
| 1 | - | - | L | - | - | - | - | L | - | - | - | - | - | - | - | - | - | - | A | . | . | . | . | . | . | . | . | . |
| 2 | - | L | - | - | - | - | L | - | - | - | - | - | - | - | - | - | - | - | . | . | . | . | . | . | A | . | . | . |
| 3 | - | - | L | - | - | - | L | - | - | - | - | - | - | - | - | - | - | - | . | A | . | . | . | . | . | . | . | . |
| 4 | - | L | - | - | - | L | - | - | - | - | - | - | - | - | - | - | - | - | . | . | . | . | . | . | . | A | . | . |
| 5 | - | - | L | - | - | L | - | - | - | - | - | - | - | - | - | - | - | - | . | . | A | . | . | . | . | . | . | . |
| 6 | - | L | - | - | L | - | - | - | - | - | - | - | - | - | - | - | - | - | . | . | . | . | . | . | . | . | A | . |
| 7 | - | - | L | - | L | - | - | - | - | - | - | - | - | - | - | - | - | - | . | . | . | A | . | . | . | . | . | . |
| 8 | - | L | - | L | - | - | - | - | - | - | - | - | - | - | - | - | - | - | . | . | . | . | . | . | . | . | . | A |
| 9 | - | - | L | L | - | - | - | - | - | - | - | - | - | - | - | - | - | - | . | . | . | . | A | . | . | . | . | . |
| 10 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 11 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 12 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 13 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 14 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 15 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 16 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 17 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 18 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 19 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 20 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 21 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 22 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 23 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 24 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 25 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 26 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 27 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 28 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 29 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 30 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| 31 | 0 | 0 | 0 | 0 | 0 | 0 | 0 | 0 | 0 | 0 | 0 | 0 | 0 | 0 | 0 | 0 | 0 | 0 | A | A | A | A | A | A | A | A | A | A |
| D9 | - | - | - | - | - | - | - | - | - | - | - | - | - | - | - | - | - | - | | | | | | | | | | |
| D8 | - | - | - | - | - | - | - | - | - | - | - | - | - | - | - | - | - | - | | | | | | | | | | |
| D7 | - | - | - | - | - | - | - | - | - | - | - | - | - | - | - | - | - | - | | | | | | | | | | |
| D6 | - | - | - | - | - | - | - | - | - | - | - | - | - | - | - | - | - | - | | | | | | | | | | |
| D5 | - | - | - | - | - | - | - | - | - | - | - | - | - | - | - | - | - | - | | | | | | | | | | |
| D4 | - | - | - | - | - | - | - | - | - | - | - | - | - | - | - | - | - | - | | | | | | | | | | |
| D3 | - | - | - | - | - | - | - | - | - | - | - | - | - | - | - | - | - | - | | | | | | | | | | |
| D2 | - | - | - | - | - | - | - | - | - | - | - | - | - | - | - | - | - | - | | | | | | | | | | |
| D1 | - | - | - | - | - | - | - | - | - | - | - | - | - | - | - | - | - | - | | | | | | | | | | |
| D0 | - | - | - | - | - | - | - | - | - | - | - | - | - | - | - | - | - | - | | | | | | | | | | |
| | N/C | BUSA | BUSB | M4 | M3 | M2 | M1 | M0 | BC0 | BC1 | BC2 | BC3 | BC4 | AC0 | AC1 | AC2 | AC3 | AC4 | BC0 | BC1 | BC2 | BC3 | BC4 | AC0 | AC1 | AC2 | AC3 | AC4 |

```
   LABEL      ** FNC **PIN --------- PIN** FNC **     LABEL
BCLK2         ** CK  **   1-|       |-20 ** +5V **VCC
WR8097        ** I   **   2-|       |-19 ** O   **REQ0
RD2           ** I   **   3-|       |-18 ** O   **REQ1
WRUCDE        ** I   **   4-|   8   |-17 ** O   **REQ2
RD1           ** I   **   5-|   2   |-16 ** O   **AEN1
RESET         ** /O  **   6-|   S   |-15 ** O   **WE
MBCS          ** I   **   7-|   1   |-14 ** O   **AEN0
MWTC          ** I   **   8-|   5   |-13 ** O   **OE
MRTC2         ** I   **   9-|   9   |-12 ** O   **AEN2
GND           ** 0V  **  10-|       |-11 ** /OE **OE1
                             ---------
DEVICE TYPE
82S159
DRAWING
MIP1553
REVISION
01
DATE
19 JULY 1985
SYMBOL
NONE
COMPANY
NCAIR
NAME
 RICH WITHERS
COMPLEMENT ARRAY
/C = /(0);
DESCRIPTION
THIS IS THE BUS ARBITRATION PLA FOR THE 1553 CARD (U-30).
IT USES A PARALLEL PRIORITY SCHEME WITH EACH DEVICE
RELEASING THE BUS WHEN ITS READ OR WRITE IS FINISHED.
LOGIC EQUATION
/AEN0: D= (AEN2*REQ1*AEN1*/REQ0)+/AEN0;
/AEN1: D= (AEN0*AEN2*/REQ1)+/AEN1;
/AEN2: D= (AEN0*AEN1*REQ0*REQ1*/REQ2) + /AEN2;
/REQ0: D= (/MWTC*/MBCS) + (/MRTC2*/MBCS);
/REQ1: D= /WRUCDE + /RD1;
/REQ2: D= /WR8097 + /RD2;
/OE: D= (/AEN0*/MRTC2) + (/AEN1*/RD1) + (/AEN2*/RD2);
RESET=/((/AEN0*MWTC*MRTC2)+ (/AEN1*WRUCDE*RD1) +
       (/AEN2*WR8097*RD2));
/WE: D= (/AEN0*/MWTC)+(/AEN1*/WRUCDE)+
        (/AEN2*/WR8097);
I/O DIRECTION
OUTPUT POLARITY
I0 = 0;
I/O STEERING
COMMON PRODUCT TERM
FLIP FLOP CONTROL
FC= 0;
OUTPUT ENABLE
EA,EB= OE1;
REGISTER LOAD
ASYNCHRONOUS PRESET/RESET
RB=/RESET;
RA=/RESET;
PA = 0;
PB = 0;
FLIP FLOP MODE
M0,M1,M2,M3,M4,M5,M6,M7= FC;
```

```
   LABEL      ** FNC **PIN ---------- PIN** FNC **     LABEL
MA13          ** I   **  1-|        |-20 ** +5V **VCC
MA14          ** I   **  2-|        |-19 ** O   **XACK2
AEN0          ** I   **  3-|        |-18 ** /O  **SBL
AEN1          ** I   **  4-|   8    |-17 ** /O  **SBHL
ADR0          ** I   **  5-|   2    |-16 ** I   **RDY3
BHEN2         ** I   **  6-|   S    |-15 ** I   **RDY2
AEN2          ** I   **  7-|   1    |-14 ** I   **RDY1
MEMRDY        ** I   **  8-|   5    |-13 ** I   **RDY0
MBXACK        ** /O  **  9-|   3    |-12 ** /O  **SBH
GND           ** 0V  ** 10-|        |-11 ** /O  **DPMXACK
                            ----------

@DEVICE TYPE
82S153
@DRAWING

MIP1553
@REVISION
01
@DATE
19 JULY 1985
@SYMBOL
NONE
@COMPANY
MCAIR
@NAME
RICH WITHERS
@COMPLEMENT ARRAY
@DESCRIPTION

THIS IS THE ACKNOWLEDGE PLA FOR THE 1553 BOARD (U-33).
IT GENERATES THE APPROPRIATE SIGNALS TO ALLOW THE PROCESSOR
REQUESTING THE BUS TO BE GIVEN THE BUS WHEN IT IS READY.
@I/O DIRECTION
@OUTPUT POLARITY
 X0,X1,X2,X7,X8 = 1;
 X9 = 0;
@I/O STEERING
@COMMON PRODUCT TERM
MB0=/AEN0*/MA14*/MA13*RDY0*MEMRDY;
MB1=/AEN0*/MA14*MA13*RDY1*MEMRDY;
MB2=/AEN0*MA14*/MA13*RDY2*MEMRDY;
MB3=/AEN0*MA14*MA13*RDY3*MEMRDY;
DP0=/AEN1*/MA14*/MA13*RDY0*MEMRDY;
DP1=/AEN1*/MA14*MA13*RDY1*MEMRDY;
DP2=/AEN1*MA14*/MA13*RDY2*MEMRDY;
DP3=/AEN1*MA14*MA13*RDY3*MEMRDY;
XA0=/AEN2*/MA14*/MA13*RDY0*MEMRDY;
XA1=/AEN2*/MA14*MA13*RDY1*MEMRDY;
XA2=/AEN2*MA14*/MA13*RDY2*MEMRDY;
XA3=/AEN2*MA14*MA13*RDY3*MEMRDY;
@FLIP FLOP CONTROL
@OUTPUT ENABLE
@REGISTER LOAD
@ASYNCHRONOUS PRESET/RESET
@FLIP FLOP MODE
@LOGIC EQUATION
MBXACK=/(MB0+MB1+MB2+MB3);
DPMXACK=/(DP0+DP1+DP2+DP3);
XACK2=XA0+XA1+XA2+XA3;
SBH=/(/BHEN2*/ADR0*/AEN0);
SBL=/((/BHEN2*/ADR0*/AEN0)+(BHEN2*/ADR0*/AEN0));
SBHL=/(BHEN2*ADR0*/AEN0);
```

```
T !
E !--------------------------------------------------------------------
R !          I           !            B(i)            !         B(o)          !
M !--------------------------------------------------------------------
__!7_6_5_4_3_2_1_0!9_8_7_6_5_4_3_2_1_0!9_8_7_6_5_4_3_2_1_0.
 0!H - - -,- L L L!- -,- - - -,H - - -!. .,. A A A,A . . .!
 1!H - - -,- L L H!- -,- - - H,- - - -!. .,. A A A,A . . .
 2!H - - -,- L H L!- -,- - H -,- - - -!. .,. A A A,A . . A!
 3!H - - -,- L H H!- -,- H - -,- - - -!. .,. A A A,A . . A!
 4!H - - -,L - L L!- -,- - - -,H - - -!. .,. A A A,A . A .!
 5!H - - -,L - L H!- -,- - - H,- - - -!. .,. A A A,A . A .!
 6!H - - -,L - H L!- -,- - H -,- - - -!. .,. A A A,A . A .!
 7!H - - -,L - H H!- -,- H - -,- - - -!. .,. A A A,A . A .!
 8!H L - -,- - L L!- -,- - - -,H - - -!A .,. A A A,A . . .!
 9!H L - -,- - L H!- -,- - - H,- - - -!A .,. A A A,A . . .!
10!H L - -,- - H L!- -,- - H -,- - - -!A .,. A A A,A . . .!
11!H L - -,- - H H!- -,- H.- -,- - - -!A .,. A A A,A . . .!
12!- - L L,- L - -!- -,- - - -,- - - -!. A,. A A A,A A . .!
13!- - H L,- L - -!- -,- - - -,- - - -!. A,. A A A,A . . .!
14!- - H H,- L - -!- -,- - - -,- - - -!. .,A A A A,A . . .!
15!0 0 0 0,0 0 0 0!0 0,0 0 0 0,0 0 0 0!A A,A A A A,A A A A!
16!0 0 0 0,0 0 0 0!0 0,0 0 0 0,0 0 0 0!A A,A A A A,A A A A!
17!0 0 0 0,0 0 0 0!0 0,0 0 0.0,0 0 0 0!A A,A A A A,A A A A!
18!0 0 0 0,0 0 0 0!0 0,0 0 0 0,0 0 0 0!A A,A A A A,A A A A!
19!0 0 0 0,0 0 0 0!0 0,0 0 0 0,0 0 0 0!A A,A A A A,A A A A!
20!0 0 0 0,0 0 0 0!0 0,0 0 0 0,0 0 0 0!A A,A A A A,A A A A!
21!0 0 0 0,0 0 0 0!0 0,0 0 0 0,0 0 0 0!A A,A A A A,A A A A!
22!0 0 0 0,0 0 0 0!0 0,0 0 0 0,0 0 0 0!A A,A A A A,A A A A!
23!0 0 0 0,0 0 0 0!0 0,0 0 0 0,0 0 0 0!A A,A A A A,A A A A!
24!0 0 0 0,0 0 0 0!0 0,0 0 0 0,0 0 0 0!A A,A A A A,A A A A!
25!0 0 0 0,0 0 0 0!0 0,0 0 0 0,0 0 0 0!A A,A A A A,A A A A!
26!0 0 0 0,0 0 0 0!0 0,0 0 0 0,0 0 0 0!A A,A A A A,A A A A!
27!0 0 0 0,0 0 0 0!0 0,0 0 0 0,0 0 0 0!A A,A A A A,A A A A!
28!0 0 0 0,0 0 0 0!0 0,0 0 0 0,0 0 0 0!A A,A A A A,A A A A!
29!0 0 0 0,0 0 0 0!0 0,0 0 0 0,0 0 0 0!A A,A A A A,A A A A!
30!0 0 0 0,0 0 0 0!0 0,0 0 0 0,0 0 0 0!A A,A A A A,A A A A!
31!0 0 0 0,0 0 0 0!0 0,0 0 0 0,0 0 0 0!A A,A A A A,A A.A A!
D9!- - - -,- - - -!- -,- - - -,- - - -!                   .
D8!- - - -,- - - -!- -,- - - -,- - - -!                   .
D7!- - - -,- - - -!- -,- - - -,- - - -!                   .
D6!0 0 0 0,0 0 0 0!0 0,0 0 0 0,0 0 0 0!                   .
D5!0 0 0 0,0 0 0 0!0 0,0 0 0 0,0 0 0 0!                   .
D4!0 0 0 0,0 0 0 0!0 0,0 0 0 0,0 0 0 0!                   .
D3!0 0 0 0,0 0 0 0!0 0,0 0 0 0,0 0 0 0!                   .
D2!- - - -,- - - -!- -,- - - -,- - - -!                   .
D1!- - - -,- - - -!- -,- - - -,- - - -!                   .
D0!- - - -,- - - -!- -,- - - -,- - - -!                   .

   M A B A A A M M X S S R R R R S D M X S S R R R R S D M
   E E H D E E A A A B B D D D D B P B A B B D D D D B P B
   M N E R N N 1 1 C L H Y Y Y Y H M X C L H Y Y Y Y H M X
   R 2 N 0 1 0 4 3 K   L 3 2 1 0   X A K   L 3 2 1 0   X A
   D   2           2               A C 2               A C
```

```
******************** AG001E1 ********************
#################### P I N   L I S T ####################

 LABEL      ** FNC **PIN ---------- PIN** FNC **     LABEL
ADR0        ** I    **  1-|         |-20 ** +5V **VCC
AEN0        ** I    **  2-|         |-19 ** O   **BHEN2
AEN1        ** I    **  3-|         |-18 ** B   **N/C
3HEN1       ** I    **  4-|    8    |-17 ** /O  **CS7
MA13        ** I    **  5-|    2    |-16 ** /O  **CS6
MA14        ** I    **  6-|    S    |-15 ** /O  **CS5
AEN2        ** I    **  7-|    1    |-14 ** /O  **CS4
CSVALID     ** I    **  8-|    5    |-13 ** /O  **CS3
CS0         ** /O   **  9-|    3    |-12 ** /O  **CS2
GND         ** OV   ** 10-|         |-11 ** /O  **CS1
                           ---------

******************** AG001E1 ********************
@DEVICE TYPE
32S153
@DRAWING
MIP1553
@REVISION
01
@DATE
19 JULY 1985
@SYMBOL
NONE
@COMPANY
CAIR
@NAME
RICH WITHERS
@COMPLEMENT ARRAY
@DESCRIPTION
THIS IS THE CHIP SELECT PLA FOR THE 1553 BOARD (U32).
IT WILL GENERATE THE CHIP SELECT FROM ITS INPUT SIGNALS.
@I/O DIRECTION
@OUTPUT POLARITY
X0,X1,X2,X3,X4,X5,X6,X7 = 1;
X9 = 0;
@I/O STEERING
@COMMON PRODUCT TERM
CS00=CSVALID*/AEN1*/MA14*/MA13;
CS01=CSVALID*/AEN0*/MA14*/MA13*/BHEN1*/ADR0;
CS02=CSVALID*/AEN0*/MA14*/MA13*ADR0*BHEN1;
CS03=CSVALID*/AEN2*/MA14*/MA13;
CS11=CSVALID*/AEN0*/MA14*/MA13*BHEN1*/ADR0;
CS12=CSVALID*/AEN0*/MA14*/MA13*/ADR0*/BHEN1;
CS20=CSVALID* /AEN1*/MA14*MA13;
CS21=CSVALID*/AEN0*/MA14*MA13*/BHEN1*/ADR0;
CS22=CSVALID*/AEN0*/MA14*MA13*ADR0*BHEN1;
CS23=CSVALID*/AEN2*/MA14*MA13;
CS31=CSVALID*/AEN0*/MA14*MA13*BHEN1*/ADR0;
CS32=CSVALID*/AEN0*/MA14*MA13*/ADR0*/BHEN1;
CS40=CSVALID* /AEN1*MA14*/MA13;
CS41=CSVALID*/AEN0*MA14*/MA13*/BHEN1*/ADR0;
CS42=CSVALID*/AEN0*MA14*/MA13*ADR0*BHEN1;
CS43=CSVALID*/AEN2*MA14*/MA13;
CS51=CSVALID*/AEN0*MA14*/MA13*BHEN1*/ADR0;
CS52=CSVALID*/AEN0*MA14*/MA13*/ADR0*/BHEN1;
CS60=CSVALID* /AEN1*MA14*MA13;
CS61=CSVALID*/AEN0*MA14*MA13*/BHEN1*/ADR0;
CS62=CSVALID*/AEN0*MA14*MA13*ADR0*BHEN1;
CS63=CSVALID*/AEN2*MA14*MA13;
```

```
)S71=CSVALID*/AEN0*MA14*MA13*BHEN1*/ADR0;
)S72=CSVALID*/AEN0*MA14*MA13*/ADR0*/BHEN1;
;FLIP FLOP CONTROL
;OUTPUT ENABLE
;REGISTER LOAD
;ASYNCHRONOUS PRESET/RESET
;FLIP FLOP MODE
;LOGIC EQUATION
3HEN2=BHEN1;
:S0 = /(DS00 + DS01 + DS02 + DS03);
:S1 = /(DS00 + DS11 + DS12 + DS03);
:S2 = /(DS20 + DS21 + DS22 + DS23);
:S3 = /(DS20 + DS31 + DS32 + DS23);
CS4 = /(DS40 + DS41 + DS42 + DS43);
CS5 = /(DS40 + DS51 + DS52 + DS43);
CS6 = /(DS60 + DS61 + DS62 + DS63);
CS7 = /(DS60 + DS71 + DS72 + DS63);

********************* AG001E1 ********************
)ust/Project - RICH WITHERS
)ate         - 19 JULY 1985
Rev/I. D.    - 01

32S153                                   !      POLARITY       !
                                         _______________________
T !                                      !H:H:L:L:L:L:L:L:L:L!
E !------------------------------------------------------------
R !         I        !         B(i)        !       B(o)        !
M !------------------------------------------------------------
__!7_6_5_4_3_2_1_0!9_8_7_6_5_4_3_2_1_0!9_8_7_6_5_4_3_2_1_
 0!- - - -,H - - -!- -,- - - -,- - - -!A A,. . . .,. . . .
 1!H - L L,- L - -!- -,- - - -,- - - -!. A,. . . .,. . A A.
 2!H - L L,L - L L!- -,- - - -,- - - -!. A,. . . .,. . A A!
 3!H - L L,H - L H!- -,- - - -,- - - -!. A,. . . .,. . . A!
 4!H L L L,- - - -!- -,- - - -,- - - -!. A,. . . .,. . A A!
 5!H - L L,H - L L!- -,- - - -,- - - -!. A,. . . .,. . A .!
 6!H - L H,- L - -!- -,- - - -,- - - -!. A,. . . .,A A . .!
 7!H - L H,L - L L!- -,- - - -,- - - -!. A,. . . .,A A . .!
 8!H - L H,H - L H!- -,- - - -,- - - -!. A,. . . .,. A . .!
 9!H L L H,- - - -!- -,- - - -,- - - -!. A,. . . .,A A . .!
10!H - L H,H - L L!- -,- - - -,- - - -!. A,. . . .,A . . .!
11!H - H L,- L - -!- -,- - - -,- - - -!. A,. . A A,. . . .!
12!H - H L,L - L L!- -,- - - -,- - - -!. A,. . A A,. . . .!
13!H - H L,H - L H!- -,- - - -,- - - -!. A,. . . A,. . . .!
14!H L H L,- - - -!- -,- - - -,- - - -!. A,. . A A,. . . .!
15!H - H L,H - L L!- -,- - - -,- - - -!. A,. . A .,. . . .!
16!H - H H,- L - -!- -,- - - -,- - - -!. A,A A . .,. . . .!
17!H - H H,L - L L!- -,- - - -,- - - -!. A,A A . .,. . . .!
18!H - H H,H - L H!- -,- - - -,- - - -!. A,. A . .,. . . .!
19!H L H H,- - - -!- -,- - - -,- - - -!. A,A A . .,. . . .!
20!H - H H,H - L L!- -,- - - -,- - - -!. A,A . . .,. . . .!
21!0 0 0 0,0 0 0 0!0 0,0 0 0 0,0 0 0 0!A A,A A A A,A A A A!
22!0 0 0 0,0 0 0 0!0 0,0 0 0 0,0 0 0 0!A A,A A A A,A A A A!
23!0 0 0 0,0 0 0 0!0 0,0 0 0 0,0 0 0 0!A A,A A A A,A A A A!
24!0 0 0 0,0 0 0 0!0 0,0 0 0 0,0 0 0 0!A A,A A A A,A A A A!
25!0 0 0 0,0 0 0 0!0 0,0 0 0 0,0 0 0 0!A A,A A A A,A A A A!
26!0 0 0 0,0 0 0 0!0 0,0 0 0 0,0 0 0 0!A A,A A A A,A A A A!
27!0 0 0 0,0 0 0 0!0 0,0 0 0 0,0 0 0 0!A A,A A A A,A A A A!
28!0 0 0 0,0 0 0 0!0 0,0 0 0 0,0 0 0 0!A A,A A A A,A A A A!
29!0 0 0 0,0 0 0 0!0 0,0 0 0 0,0 0 0 0!A A,A A A A,A A A A!
30!0 0 0 0,0 0 0 0!0 0,0 0 0 0,0 0 0 0!A A,A A A A,A A A A!
31!0 0 0 0,0 0 0 0!0 0,0 0 0 0,0 0 0 0!A A,A A A A,A A A A!
```

```
D9!- - - -,- - - -!- -,- - - -,- - - -!
D8!0 0 0 0,0 0 0 0!0 0,0 0 0 0,0 0 0 0!
D7!- - - -,- - - -!- -,- - - -,- - - -!
D6!- - - -,- - - -!- -,- - - -,- - - -!
D5!- - - -,- - - -!- -,- - - -,- - - -!
D4!- - - -,- - - -!- -,- - - -,- - - -!
D3!- - - -,- - - -!- -,- - - -,- - - -!
D2!- - - -,- - - -!- -,- - - -,- - - -!
D1!- - - -,- - - -!- -,- - - -,- - - -!
D0!- - - -,- - - -!- -,- - - -,- - - -!

   C A M M B A A A B N C C C C C C C C B N C C C C C C C C
   S E A A H E E D H / S S S S S S S S H / S S S S S S S S
   V N 1 1 E N N R E C 7 6 5 4 3 2 1 0 E C 7 6 5 4 3 2 1 0
   A 2 4 3 N 1 0 0 N                   N
   L       1       2                   2

******************** AG001F1 ********************
#################### P I N   L I S T ####################

   LABEL      ** FNC **PIN --------- PIN** FNC **     LABEL
3CLKB         ** CK  **  1-|       |-20 ** +5V **VCC
AEN0          ** I   **  2-|       |-19 ** B   **N/C
AEN1          ** I   **  3-|       |-18 ** B   **N/C
AEN2          ** I   **  4-|   8   |-17 ** B   **N/C
MRTC1         ** I   **  5-|   2   |-16 ** O   **CSVALID
MRTC2         ** O   **  6-|   S   |-15 ** O   **MEMRDY
3CLK1         ** I   **  7-|   1   |-14 ** O   **/FF2
3CLK2         ** C   **  8-|   5   |-13 ** C   **/FF1
TEMP          ** O   **  9-|   9   |-12 ** O   **/FF0
GND           ** 0V  ** 10-|       |-11 ** /OE **OE
                            ---------

******************** AG001F1 ********************
!DEVICE TYPE
32S159
!DRAWING
1IP1553
!REVISION
01
!DATE
9 JULY 1985
!SYMBOL
NONE
!COMPANY
CAIR
!NAME
RICH WITHERS
!COMPLEMENT ARRAY
C = /(0);
!DESCRIPTION
THIS IS THE MEMORY READ PLA FOR THE 1553 BOARD (U-31).
T WILL VALIDATE THE CHIP SELECT SIGNAL AND ALSO PROVIDE
. DELAY TO ENSURE THAT THE MEMORY IS READY FOR THE DATA.
!I/O DIRECTION
!OUTPUT POLARITY
X0,X2,X3 = 1;
!I/O STEERING
!COMMON PRODUCT TERM
!FLIP FLOP CONTROL
FC= 0;
!OUTPUT ENABLE
EA,EB= OE;
```

```
!REGISTER LOAD
!ASYNCHRONOUS PRESET/RESET
'B=AEN0*AEN1*AEN2;
'A=AEN0*AEN1*AEN2;
:B = 0;
:A = 0;
!FLIP FLOP MODE
[0,M1,M2= 1;
[3,M4= FC;
!LOGIC EQUATION
'RTC2= MRTC1;
;CLK2= BCLK1;
'MEMRDY: D=/TEMP;
'CSVALID:D= AEN0*AEN1*AEN2;
'F0: T= /MEMRDY*CSVALID;
'F1: T= FF0*/MEMRDY*CSVALID;
'F2: T= FF0*FF1*/MEMRDY*CSVALID;
'EMP=/AEN1*FF0*/FF1*/FF2+
     /AEN0*/FF0*FF1*/FF2+
     /AEN2*/FF0*FF1*/FF2+
     /AEN0*FF0*FF1*/FF2+
     /AEN2*FF0*/FF1*/FF2+
     /AEN1*/FF0*FF1*/FF2;
```

```
******************** AG001F1 ********************
Cust/Project - RICH WITHERS
Date         - 19 JULY 1985
Rev/I. D.    - 01

82S159                  ! F/F TYPE         ! E(b)= !E(a) = !POLARTY!
                        !__________________!_______!_______!_______!
 T !                    !A:A:A:A:A:.:.:.:. !   A   !   A   !H:H:L:H!
 E !------------------------------------------------------------------
 R ! !    I    ! B(i)   !      Q(p)        !      Q(n)     ! B(o)  !
 M !C!----------------------------------------------------------------
___!_!3_2_1_0!3_2_1_0!7_6_5_4_3_2_1_0!7_6_5_4_3_2_1_0!3_2_1_0!
  0!-!H - - -!- - - -!- - - -,- - - -!0 0 0 .,. - - - -!. . . .!
  1!-!- - - -!- - H -!- - - -,- - - -!0 0 0 .,. - - - -!. A A .!
  2!-!- - - -!L - - -!- - - -,- - - -!0 0 0 .,A - - - -!. . A .!
  3!-!- H H H!- - - -!- - - -,- - - -!0 0 0 A,. - - - -!. . A .!
  4!-!- - - -!- - - -!- - - L,H - - -!0 0 0 .,. - - - 0!. . A .!
  5!-!- - - -!- - - -!- - - L,H - - H!0 0 0 .,. - 0 -!. . A .!
  6!-!- - - -!- - - -!- - - L,H - H H!0 0 0 .,. 0 - -!. . A .!
  7!-!- - L -!- - - -!- - - -,- L L H!0 0 0 .,. - - -!A . A .!
  8!-!- - - L!- - - -!- - - -,- L H L!0 0 0 .,. - - -!A . A .!
  9!-!- L - -!- - - -!- - - -,- L H L!0 0 0 .,. - - -!A . A .!
 10!-!- - - L!- - - -!- - - -,- L H H!0 0 0 .,. - - -!A . A .!
 11!-!- L - -!- - - -!- - - -,- L L H!0 0 0 .,. - - -!A . A .!
 12!-!- - L -!- - - -!- - - -,- L H L!0 0 0 .,. - - -!A . A .!
 13!0!0 0 0 0!0 0 0 0!0 0 0 0,0 0 0 0!0 0 0 0,0 0 0 0!A A A A!
 14!0!0 0 0 0!0 0 0 0!0 0 0 0,0 0 0 0!0 0 0 0,0 0 0 0!A A A A!
 15!0!0 0 0 0!0 0 0 0!0 0 0 0,0 0 0 0!0 0 0 0,0 0 0 0!A A A A!
 16!0!0 0 0 0!0 0 0 0!0 0 0 0,0 0 0 0!0 0 0 0,0 0 0 0!A A A A!
 17!0!0 0 0 0!0 0 0 0!0 0 0 0,0 0 0 0!0 0 0 0,0 0 0 0!A A A A!
 18!0!0 0 0 0!0 0 0 0!0 0 0 0,0 0 0 0!0 0 0 0,0 0 0 0!A A A A!
 19!0!0 0 0 0!0 0 0 0!0 0 0 0,0 0 0 0!0 0 0 0,0 0 0 0!A A A A!
 20!0!0 0 0 0!0 0 0 0!0 0 0 0,0 0 0 0!0 0 0 0,0 0 0 0!A A A A!
 21!0!0 0 0 0!0 0 0 0!0 0 0 0,0 0 0 0!0 0 0 0,0 0 0 0!A A A A!
 22!0!0 0 0 0!0 0 0 0!0 0 0 0,0 0 0 0!0 0 0 0,0 0 0 0!A A A A!
 23!0!0 0 0 0!0 0 0 0!0 0 0 0,0 0 0 0!0 0 0 0,0 0 0 0!A A A A!
 24!0!0 0 0 0!0 0 0 0!0 0 0 0,0 0 0 0!0 0 0 0,0 0 0 0!A A A A!
 25!0!0 0 0 0!0 0 0 0!0 0 0 0,0 0 0 0!0 0 0 0,0 0 0 0!A A A A!
 26!0!0 0 0 0!0 0 0 0!0 0 0 0,0 0 0 0!0 0 0 0,0 0 0 0!A A A A!
```

```
27!0!0 0 0 0!0 0 0 0!0 0 0 0,0 0 0 0!0 0 0 0,0 0 0 0!A A A A!
28!0!0 0 0 0!0 0 0 0!0 0 0 0,0 0 0 0!0 0 0 0,0 0 0 0!A A A A!
29!0!0 0 0 0!0 0 0 0!0 0 0 0,0 0 0 0!0 0 0 0,0 0 0 0!A A A A!
30!0!0 0 0 0!0 0 0 0!0 0 0 0,0 0 0 0!0 0 0 0,0 0 0 0!A A A A!
31!0!0 0 0 0!0 0 0 0!0 0 0 0,0 0 0 0!0 0 0 0,0 0 0 0!A A A A!
Fc!0!0 0 0 0!0 0 0 0!0 0 0 0,0 0 0 0!                        .
Pb!-!- H H H!- - - -!- - - -,- - - -!                        .
Rb!.!0 0 0 0!0 0 0 0!0 0 0 0,0 0 0 0!                        .
Lb!.!0 0 0 0!0 0 0 0!0 0 0 0,0 0 0 0!                        .
Pa!-!- H H H!- - - -!- - - -,- - - -!                        .
Ra!.!0 0 0 0!0 0 0 0!0 0 0 0,0 0 0 0!                        .
La!.!0 0 0 0!0 0 0 0!0 0 0 0,0 0 0 0!                        .
D3!-!- - - -!- - - -!- - - -,- - - -!                        .
D2!-!- - - -!- - - -!- - - -,- - - -!                        .
D1!.!0 0 0 0!0 0 0 0!0 0 0 0,0 0 0 0!                        .
D0!-!- - - -!- - - -!- - - -,- - - -!                        .

      M A A A T B B M N N N C M / / / N N N C M / / / T B B M
      R E E E E C C R / / / S E F F F / / / S E F F F E C C R
      T N N N M L L T C C C V M F F F C C C V M F F F M L L T
      C 2 1 0 P K K C       A R 2 1 0       A R 2 1 0 P K K C
```

What is claimed is:

1. A multipurpose bus interface circuit for interfacing a first communications bus to a second communications bus, at least one of said buses being a command/response, time division multiplexing data bus, said interface circuit comprising:
   - a RAM;
   - a main controller adapted primarily to receive and process data from said first bus and said RAM, and to control transfer of said data between said first bus and said RAM;
   - a microstore containing software for said main controller, said software controlling handling and interpretation of data to and from said first bus and processed by said main controller, enabling operation of said main controller to be modified to accommodate its use with different bus standards and data protocols and formats by replacing said software contained in said microstore;
   - a coprocessor having direct access to said RAM, said coprocessor being adapted primarily to process said data transferred to said RAM from said first bus and to process data for main controller scheduling and bus analyzer triggering; and
   - an interface module providing interface between said RAM and said second bus, said module being adapted to format processed data transmitted between said RAM and said second bus.

2. The multipurpose bus interface circuit of claim 1 wherein said software of said microstore enables operation of said main controller with bus standards and data protocols and formats of MIL-STD-1553.

3. The multipurpose bus interface circuit of claim 1 wherein said first bus is a redundant bus.

4. The multipurpose bus interface circuit of claim 1 wherein said second bus provides communication to a host computer.

5. In a data communication system including a bus controller and a plurality of data terminals connected with said controller by a first data bus, said first data bus being a command/response, time division multiplexing data bus, a multipurpose bus interface circuit for interfacing a second data bus for a host computer with said first data bus to provide said host computer with the capacity to operate in a plurality of modes including a bus controller mode for simulating the operation of said bus controller, a remote terminal mode for simulating the operation of one or more of said data terminals, a bus monitor mode for monitoring the operation of one or more of said data terminals, and a bus analyzer mode for analyzing bus traffic, said multipurpose bus interface circuit comprising:
   - a RAM;
   - a main controller adapted primarily to receive and process data from said first bus and said RAM, and to control transfer of said data between said first bus and said RAM;
   - a microstore containing software for said main controller, said software controlling handling and interpretation of data to and from said first bus and processed by said main controller enabling operation of said main controller to be modified to accommodate its use with different bus standards and data protocols and formats by replacing said software contained in said microstore;
   - a coprocessor having direct access to said RAM, said coprocessor being adapted primarily to process said data transferred to said RAM from said first bus in said plurality of operating modes of said interface circuit including processing data for main controller scheduling and bus analyzer triggering; and
   - an interface module providing interface between said RAM and said second bus, said module being adapted to format processed data transmitted between said RAM and said second bus.

6. The multipurpose bus interface circuit of claim 5 wherein said circuit is on a PC card adapted to plug into said host computer.

7. The multipurpose bus interface circuit of claim 5 wherein said software contained in said microstore enables operation of said main controller according to bus standards and data protocols and formats of MIL-STD-1553.

8. The multipurpose bus interface circuit of claim 5 wherein said first bus is a redundant bus.

* * * * *